(12) United States Patent
Goto et al.

(10) Patent No.: US 11,555,152 B2
(45) Date of Patent: Jan. 17, 2023

(54) LIQUID CRYSTAL COMPOSITION AND LIQUID CRYSTAL DISPLAY ELEMENT

(71) Applicant: DIC Corporation, Tokyo (JP)

(72) Inventors: Marina Goto, Kitaadachi-gun (JP); Yuichi Inoue, Kitaadachi-gun (JP); Shota Kosaka, Kitaadachi-gun (JP); Go Sudo, Kitaadachi-gun (JP); Masanao Hayashi, Kitaadachi-gun (JP); Manabu Takachi, Kitaadachi-gun (JP)

(73) Assignee: DIC CORPORATION, Tokyo (JP)

( * ) Notice: Subject to any disclaimer, the term of this patent is extended or adjusted under 35 U.S.C. 154(b) by 40 days.

(21) Appl. No.: 16/090,657

(22) PCT Filed: Apr. 13, 2017

(86) PCT No.: PCT/JP2017/015103
§ 371 (c)(1),
(2) Date: Oct. 2, 2018

(87) PCT Pub. No.: WO2017/188002
PCT Pub. Date: Nov. 2, 2017

(65) Prior Publication Data
US 2019/0119575 A1 Apr. 25, 2019

(30) Foreign Application Priority Data

Apr. 27, 2016 (JP) .............................. JP2016-089246
Dec. 9, 2016 (JP) .................................. 2016-239359

(51) Int. Cl.
| | | |
|---|---|---|
| G02F 1/1333 | (2006.01) | |
| C09K 19/54 | (2006.01) | |
| C09K 19/20 | (2006.01) | |
| G02F 1/1337 | (2006.01) | |
| C09K 19/30 | (2006.01) | |
| C09K 19/32 | (2006.01) | |
| G02F 1/13 | (2006.01) | |
| C09K 19/12 | (2006.01) | |
| C09K 19/34 | (2006.01) | |
| C09K 19/14 | (2006.01) | |

(52) U.S. Cl.
CPC ............ *C09K 19/542* (2013.01); *C09K 19/12* (2013.01); *C09K 19/14* (2013.01); *C09K 19/20* (2013.01); *C09K 19/30* (2013.01); *C09K 19/3003* (2013.01); *C09K 19/3066* (2013.01); *C09K 19/32* (2013.01); *C09K 19/34* (2013.01); *C09K 19/54* (2013.01); *G02F 1/13* (2013.01); *G02F 1/1337* (2013.01); *G02F 1/133703* (2013.01); *C09K 2019/301* (2013.01); *C09K 2019/3004* (2013.01); *C09K 2019/3009* (2013.01); *C09K 2019/3016* (2013.01); *C09K 2019/548* (2013.01)

(58) Field of Classification Search
CPC ...... C09K 19/542; C09K 19/12; C09K 19/14; C09K 19/20; C09K 19/30; C09K 19/3003; C09K 19/3066; C09K 19/32; C09K 19/34; C09K 19/54; C09K 2019/3004; C09K 2019/3009; C09K 2019/301; C09K 2019/3016; C09K 2019/548; G02F 1/13; G02F 1/1337; G02F 1/1334; G02F 1/133703
USPC ....................................................... 252/299.5
See application file for complete search history.

(56) References Cited

U.S. PATENT DOCUMENTS

| | | |
|---|---|---|
| 6,090,308 A | 7/2000 | Coates et al. |
| 6,613,245 B1 | 9/2003 | Ohlemacher et al. |
| 9,725,651 B2 | 8/2017 | Hirata et al. |
| 2002/0060310 A1 | 5/2002 | Hasebe et al. |
| 2005/0116200 A1 | 6/2005 | Nakanishi et al. |
| 2011/0051065 A1 | 3/2011 | Seong et al. |
| 2012/0292567 A1 | 11/2012 | Kuriyama et al. |
| 2015/0299570 A1 | 10/2015 | Kurisawa et al. |
| 2015/0322342 A1 | 11/2015 | Archetti et al. |
| 2016/0046863 A1* | 2/2016 | Archetti ............... C09K 19/062 252/299.62 |
| 2016/0053178 A1 | 2/2016 | Hirschmann et al. |
| 2016/0122650 A1 | 5/2016 | Hirata et al. |
| 2016/0137921 A1 | 5/2016 | Hayashi et al. |
| 2016/0215215 A1 | 7/2016 | Hirata et al. |
| 2016/0264865 A1 | 9/2016 | Hirschmann et al. |
| 2016/0264866 A1 | 9/2016 | Hirschmann et al. |
| 2016/0319191 A1 | 11/2016 | Hirata et al. |
| 2016/0362606 A1 | 12/2016 | Tong et al. |
| 2016/0376506 A1 | 12/2016 | Saito et al. |
| 2017/0327742 A1 | 11/2017 | Sudo et al. |
| 2019/0144750 A1* | 5/2019 | Hayashi .................. C07C 69/54 252/299.66 |
| 2019/0256777 A1 | 8/2019 | Tong et al. |

FOREIGN PATENT DOCUMENTS

| | | |
|---|---|---|
| CN | 104140544 A | 11/2014 |
| CN | 105051001 A | 11/2015 |

(Continued)

OTHER PUBLICATIONS

International Search Report dated Jun. 13, 2017, issued in counterpart International Application No. PCT/JP2017/015103 (2 pages).

(Continued)

*Primary Examiner* — Geraldina Visconti
(74) *Attorney, Agent, or Firm* — WHDA, LLP

(57) ABSTRACT

[Object] An object of the present invention is to provide a liquid crystal composition containing a polymerizable compound for use in the manufacture of a PSA or PSVA liquid crystal display device. The polymerizable compound has a sufficiently high polymerization rate. The PSA or PSVA liquid crystal display device has few or no display defects due to a change in pretilt angle, has an adequate pretilt angle, and has high responsiveness. The present invention also provides a liquid crystal display device having the liquid crystal composition.

[Solution] The object is achieved by using a liquid crystal composition containing one or two or more polymerizable compounds represented by the general formula (I).

20 Claims, No Drawings

(56) References Cited

FOREIGN PATENT DOCUMENTS

| CN | 105073950 A | 11/2015 |
|---|---|---|
| CN | 105385453 A | 3/2016 |
| EP | 2 985 334 A1 | 2/2016 |
| EP | 3 067 405 A1 | 9/2016 |
| EP | 3 067 406 A1 | 9/2016 |
| EP | 3 121 247 A1 | 1/2017 |
| JP | 10-513457 A | 12/1998 |
| JP | 11-130729 A | 5/1999 |
| JP | 2002-145830 A | 5/2002 |
| JP | 2003-307720 A | 10/2003 |
| JP | 2011-74011 A | 4/2011 |
| JP | 2012-018215 A | 1/2012 |
| JP | 2012-087165 A | 5/2012 |
| JP | 2012-180484 A | 9/2012 |
| JP | 2012180484 A | 9/2012 |
| JP | 2012-530144 A | 11/2012 |
| JP | 2012-240945 A | 12/2012 |
| JP | 2013-503952 A | 2/2013 |
| JP | 2013-509457 A | 3/2013 |
| JP | 2013-180974 A | 9/2013 |
| JP | 2014-240469 A | 12/2014 |
| JP | 2016-17034 A | 2/2016 |
| JP | 2016-505669 A | 2/2016 |
| JP | 2017-14486 A | 1/2017 |
| KR | 10-2016-0023607 A | 3/2016 |
| TW | 201502146 A | 1/2015 |
| WO | 2012/086504 A1 | 6/2012 |
| WO | 2013/080850 A1 | 6/2013 |
| WO | 2013/161576 A1 | 10/2013 |
| WO | 2013/161669 A1 | 10/2013 |
| WO | 2014148471 A1 | 9/2014 |
| WO | 2014148472 A1 | 9/2014 |
| WO | 2014203567 A1 | 12/2014 |
| WO | 2015/004954 A1 | 1/2015 |
| WO | 2015034018 A1 | 3/2015 |
| WO | 2016/082922 A1 | 6/2016 |
| WO | 2016/104165 A1 | 6/2016 |

OTHER PUBLICATIONS

International Search Report dated Jun. 13, 2017, issued in counterpart Application No. PCT/JP2017/015102 (2 pages).
Decision to Grant a Patent dated Feb. 15, 2018, issued in counterpart JP Application No. 2018-502192, w/English translation (5 pages).

* cited by examiner

LIQUID CRYSTAL COMPOSITION AND LIQUID CRYSTAL DISPLAY ELEMENT

TECHNICAL FIELD

The present invention relates to a liquid crystal composition containing a polymerizable compound and a liquid crystal display device having the liquid crystal composition.

BACKGROUND ART

PSA (Polymer Sustained Alignment) liquid crystal display devices have a polymer structure for controlling the pretilt angle of liquid crystal molecules in a cell. Because of their high-speed responsivity and high contrast, PSA liquid crystal display devices are being developed as liquid crystal display devices.

PSA liquid crystal display devices are manufactured by injecting a liquid crystal composition containing a polymerizable compound between substrates and polymerizing the polymerizable compound by ultraviolet irradiation to fix the alignment of liquid crystal molecules, which are oriented through the application of a voltage. Thus, the rate of polymerization of a polymerizable compound in liquid crystal compositions for use in PSA liquid crystal display devices is very important in the polymerization of the polymerizable compound. An appropriate rate of polymerization results in a small amount of residual polymerizable compound in a short ultraviolet irradiation time, thereby reducing degradation of a liquid crystal composition due to ultraviolet light.

By contrast, slow polymerization of a polymerizable compound requires a long ultraviolet irradiation time to decrease the amount of residual polymerizable compound. Strong ultraviolet irradiation for extended periods in the polymerization process requires large manufacturing apparatuses and results in low manufacturing efficiency and degradation of liquid crystal compositions. However, a short ultraviolet irradiation time results in an increased amount of residual polymerizable compound due to slow polymerization of a polymerizable compound, and the residual polymerizable compound causes a display defect, that is, image-sticking. Thus, there is a demand for a liquid crystal composition containing a polymerizable compound with a high rate of polymerization.

To increase the rate of polymerization or decrease the amount of residual polymerizable compound, a polymerizable compound to be added to a liquid crystal composition may have a particular structure. For example, Patent Literature 1 discloses a display device including a polymerizable compound having a terphenyl structure as a ring structure, and Patent Literature 2 discloses a display device including a polymerizable compound having an acetylene structure.

As described in examples of Patent Literature 1 and Patent Literature 2, attempts have been made to use the following compound (A) with the terphenyl skeleton or compound (B) with the acetylene structure to improve the rate of polymerization of a polymerizable compound under ultraviolet irradiation.

[Chem.1]

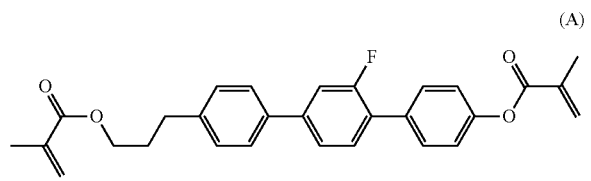
(A)

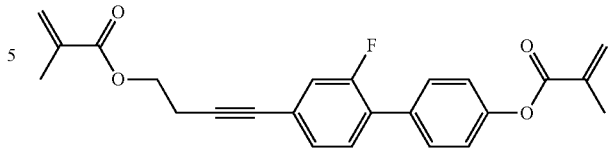
(B)

Although display devices having the compound (A) or the compound (B) as a polymerizable compound contain a sufficiently small amount of residual polymerizable compound, such display devices have display defects due to a change in the pretilt angle of liquid crystal molecules and are difficult to use as practical liquid crystal compositions.

CITATION LIST

Patent Literature

PTL 1: Japanese Unexamined Patent Application Publication (Translation of PCT Application) No. 2013-509457
PTL 2: Japanese Patent Application No. 2012-530144

SUMMARY OF INVENTION

Technical Problem

The present invention provides a liquid crystal composition containing a polymerizable compound for use in the manufacture of a PSA or PSVA liquid crystal display device. The polymerizable compound has a sufficiently high polymerization rate. The PSA or PSVA liquid crystal display device has few or no display defects due to a change in pretilt angle, has an adequate pretilt angle, and has high responsiveness. The present invention also provides a liquid crystal display device having the liquid crystal composition.

Solution to Problem

As a result of extensive studies, the present inventors have completed the present invention by finding that the problems described above can be solved by using a liquid crystal composition containing a polymerizable compound with a particular chemical structure.

Advantageous Effects of Invention

A liquid crystal composition according to the present invention maintains its refractive index anisotropy ($\Delta n$) and nematic phase-isotropic liquid phase transition temperature (Tni), has a low viscosity ($\eta$), a low rotational viscosity ($\gamma 1$), and a high elastic constant (K33), contains a polymerizable compound with a sufficiently high rate of polymerization, and causes no precipitation of the polymerizable compound. A liquid crystal display device having a liquid crystal composition according to the present invention has an adequate pretilt angle, a small amount of residual polymerizable compound, and a high voltage holding ratio (VHR), exhibits a high-speed response, has few or no display defects, such as poor alignment and image-sticking, and has good display quality.

The pretilt angle and the amount of residual polymerizable compound in a liquid crystal composition according to the present invention can be controlled by adjusting the polymerizable compound content or by adjusting a combination of polymerizable compounds, if present, or a combination of a polymerizable compound and another component (for example, another liquid crystal compound). The production efficiency of a liquid crystal composition according to the present invention can be easily improved by optimizing and reducing the energy cost of production. Thus, a liquid crystal display device having a liquid crystal composition according to the present invention is very useful.

DESCRIPTION OF EMBODIMENTS

A liquid crystal composition according to the present invention contains one or two or more polymerizable compounds represented by the general formula (I).

[Chem. 2]

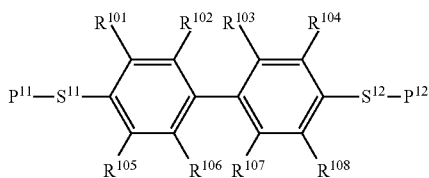
(I)

(wherein $R^{101}$, $R^{102}$, $R^{103}$, $R^{104}$, $R^{105}$, $R^{106}$, $R^{107}$, and $R^{108}$ independently represent $P^{13}$—$S^{13}$—, a fluorine atom, a hydrogen atom, an alkyl group having 1 to 18 carbon atoms optionally substituted with a fluorine atom, or an alkoxy group having 1 to 18 carbon atoms optionally substituted with a fluorine atom, and at least one of $R^{101}$, $R^{102}$, $R^{103}$, $R^{104}$, $R^{105}$, $R^{106}$, $R^{107}$, and $R^{108}$ represents an alkoxy group having 1 to 18 carbon atoms optionally substituted with a fluorine atom, $P^{11}$, $P^{12}$, and $P^{13}$ independently represent a group selected from the formulae (R-1) to (R-9),

[Chem. 3]

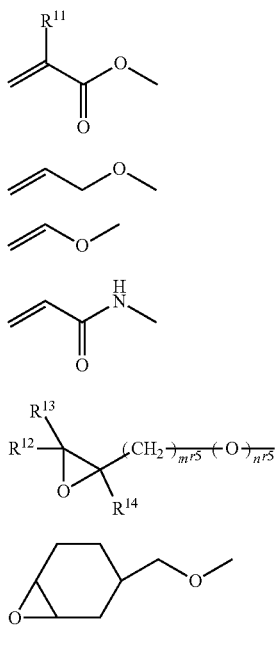

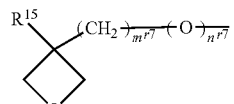
(R-7)

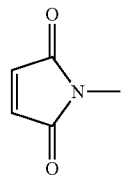
(R-8)

HS—
(R-9)

(wherein $R^{11}$, $R^{12}$, $R^{13}$, $R^{14}$, and $R^{15}$ independently represent a fluorine atom, a hydrogen atom, or an alkyl group having 1 to 5 carbon atoms, and $m^{r5}$, $m^{r7}$, $n^{r5}$, and $n^{r7}$ independently represent 0, 1, or 2)

$S^{11}$, $S^{12}$, and $S^{13}$ independently represent a single bond or an alkylene group having 1 to 15 carbon atoms, and one— $CH_2$— or two or more nonadjacent —$CH_2$—'s in the alkylene group are optionally substituted with —O—, —OCO—, or —COO—, provided that oxygen atoms are not directly adjacent to each other, and pluralities of $P^{13}$s and $S^{13}$s, if present, may be the same or different $P^{13}$s and $S^{13}$s, respectively)

A liquid crystal composition containing a polymerizable compound represented by the general formula (I) with a moderately high rate of polymerization can provide an intended pretilt angle in a short ultraviolet irradiation time. Furthermore, a moderately high rate of polymerization can result in a small amount of residual polymerizable compound. This can improve the production efficiency of PSA liquid crystal display devices. This can also significantly or completely reduce display defects due to a change in pretilt angle (for example, defects such as image-sticking). The term "display defects", as used herein, refers to display defects due to temporal changes in pretilt angle, display defects related to the amount of residual unreacted polymerizable compound, and display defects due to a low voltage holding ratio.

In the general formula (I), $R^{101}$, $R^{102}$, $R^{103}$, $R^{104}$, $R^{105}$, $R^{106}$, $R^{107}$, and $R^{108}$ independently represent $P^{13}$—$S^{13}$—, a fluorine atom, a hydrogen atom, an alkyl group having 1 to 18 carbon atoms optionally substituted with a fluorine atom, or an alkoxy group having 1 to 18 carbon atoms optionally substituted with a fluorine atom. The number of carbon atoms in the alkyl group and the alkoxy group preferably ranges from 1 to 16, more preferably 1 to 10, still more preferably 1 to 8, still more preferably 1 to 6, still more preferably 1 to 4. The alkyl group and the alkoxy group may be linear or branched and are particularly preferably linear.

At least one of $R^{101}$, $R^{102}$, $R^{103}$, $R^{104}$, $R^{105}$, $R^{106}$, $R^{107}$, and $R^{108}$ represents an alkoxy group having 1 to 18 carbon atoms optionally substituted with a fluorine atom. The number of carbon atoms in the alkoxy group preferably ranges from 1 to 15, more preferably 1 to 11, still more preferably 1 to 7, still more preferably 1 to 5, still more preferably 1 to 3, particularly preferably 1. The alkoxy group may be linear or branched and is particularly preferably linear.

In the general formula (I), $R^{101}$, $R^{102}$, $R^{103}$, $R^{104}$, $R^{105}$, $R^{106}$, $R^{107}$, and $R^{108}$ preferably independently represent $P^{13}$—$S^{13}$—, a fluorine atom, a hydrogen atom, or an alkoxy group having 1 to 3 carbon atoms optionally substituted with a fluorine atom, more preferably $P^{13}$—$S^{13}$—, a hydrogen atom, or an alkoxy group having 1 to 3 carbon atoms.

The alkoxy group having 1 to 18 carbon atoms optionally substituted with a fluorine atom is preferably a linear alkoxy group, for example, a methoxy group, an ethoxy group, a propoxy group, a butoxy group, or a fluorinated alkoxy group in which a hydrogen atom in these groups is substituted with a fluorine atom, preferably a methoxy group, an ethoxy group, a propoxy group, a monofluoromethoxy group, a difluoromethoxy group, or a trifluoromethoxy group, more preferably a methoxy group or an ethoxy group, particularly preferably a methoxy group.

In the general formula (I), an alkoxy group having 1 to 18 carbon atoms, particularly 1 to 5 carbon atoms, in the molecule is preferred in terms of a longer UV absorption edge, which enables efficient light absorption under ultraviolet irradiation in the polymerization process and increases the rate of polymerization of a polymerizable compound. An increased number of carbon atoms tends to result in an increased volume of the substituent, a decreased rate of polymerization, and a decreased degree of polymerization. Thus, a methoxy group is particularly preferred.

In the general formula (I), a liquid crystal composition containing a bicyclic polymerizable compound having a benzene ring substituting for a methoxy group is preferred in order to reduce the occurrence of display defects due to a change in pretilt angle and in order to increase the rate of polymerization of the polymerizable compound. A liquid crystal composition containing a monocyclic polymerizable compound substituting for a methoxy group requires a long ultraviolet irradiation time to form a pretilt angle and to decrease the amount of residual polymerizable compound because of slow polymerization of the polymerizable compound. A liquid crystal composition containing a tricyclic polymerizable compound having a benzene ring substituting for a methoxy group is likely to cause display defects due to a change in pretilt angle, although the amount of residual polymerizable compound decreases.

In the general formula (I), preferably one to three, more preferably one or two, particularly preferably one of $R^{101}$, $R^{102}$, $R^{103}$, $R^{104}$, $R^{105}$, $R^{106}$, $R^{107}$, and $R^{108}$ represents an alkoxy group having 1 to 18 carbon atoms optionally substituted with a fluorine atom.

In the general formula (I), when any three of $R^{101}$, $R^{102}$, $R^{103}$, $R^{104}$, $R^{105}$, $R^{106}$, $R^{107}$, and $R^{108}$ represent an alkoxy group having 1 to 18 carbon atoms optionally substituted with a fluorine atom, preferably, a combination of three groups $R^{101}$, $R^{104}$, and $R^{107}$, a combination of three groups $R^{101}$, $R^{103}$, and $R^{106}$, or a combination of three groups $R^{101}$, $R^{102}$, and $R^{104}$ represents an alkoxy group having 1 to 18 carbon atoms optionally substituted with a fluorine atom.

In the general formula (I), when any two of $R^{101}$, $R^{102}$, $R^{103}$, $R^{104}$, $R^{105}$, $R^{106}$, $R^{107}$, and $R^{108}$ represent an alkoxy group having 1 to 18 carbon atoms optionally substituted with a fluorine atom, preferably, a combination of two groups $R^{101}$ and $R^{104}$, a combination of two groups $R^{101}$ and $R^{102}$, a combination of two groups $R^{102}$ and $R^{107}$, or a combination of two groups $R^{101}$ and $R^{106}$ represents an alkoxy group having 1 to 18 carbon atoms optionally substituted with a fluorine atom.

In the general formula (I), when any one of $R^{101}$, $R^{102}$, $R^{103}$, $R^{104}$, $R^{105}$, $R^{106}$, $R^{107}$, and $R^{108}$ represents an alkoxy group having 1 to 18 carbon atoms optionally substituted with a fluorine atom, $R^{101}$ or $R^{102}$ preferably represents an alkoxy group having 1 to 18 carbon atoms optionally substituted with a fluorine atom, and $R^{101}$ or $R^{102}$ particularly preferably represents an alkoxy group having 1 to 5 carbon atoms optionally substituted with a fluorine atom.

When $R^{101}$ represents an alkoxy group having 1 to 18 carbon atoms optionally substituted with a fluorine atom, it is preferred in terms of a longer UV absorption edge, which enables efficient light absorption under ultraviolet irradiation in the polymerization process and increases the rate of polymerization of a polymerizable compound.

When $R^{102}$ represents an alkoxy group having 1 to 18 carbon atoms optionally substituted with a fluorine atom, it is preferred in term of high compatibility with a liquid crystal compound, which enables efficient light absorption under ultraviolet irradiation in the polymerization process and increases the rate of polymerization of a polymerizable compound.

In the general formula (I), preferably none, one, or two, more preferably none or one, particularly preferably none of $R^{101}$, $R^{102}$, $R^{103}$, $R^{104}$, $R^{105}$, $R^{106}$, $R^{107}$, and $R^{108}$ represents $P^{13}$—$S^{13}$—.

In the general formula (I), when one or more of $R^{101}$, $R^{102}$, $R^{103}$, $R^{104}$, $R^{105}$, $R^{106}$, $R^{107}$, and $R^{108}$ represent $P^{13}$—$S^{13}$—, preferably, one or two or more of $R^{101}$, $R^{104}$, $R^{105}$, and $R^{108}$ represent $P^{13}$—$S^{13}$—.

$P^{11}$, $P^{12}$, and $P^{13}$ may be the same polymerizable group (one of the formulae (R-1) to (R-9)) or may be different polymerizable groups.

In the general formula (I), $P^{11}$, $P^{12}$, and $P^{13}$ are preferably independently represented by the formula (R-1), (R-2), (R-3), (R-4), (R-5), or (R-7), more preferably (R-1), (R-2), (R-3), or (R-4), still more preferably (R-1), and still more preferably independently represent an acryl group or a methacryl group.

At least one of $P^{11}$ and $P^{12}$ is preferably represented by the formula (R-1) and more preferably represents an acryl group or a methacryl group, still more preferably a methacryl group. $P^{11}$ and $P^{12}$ particularly preferably represent a methacryl group.

For example, in the general formula (I), $R^{101}$, $R^{102}$, $R^{103}$, $R^{104}$, $R^{105}$, $R^{106}$, $R^{107}$, and $R^{108}$ represent an alkoxy fluorine atom, a hydrogen atom, an alkyl group having 1 to 18 carbon atoms optionally substituted with a fluorine atom, or an alkoxy group having 1 to 18 carbon atoms optionally substituted with a fluorine atom. When one or two of $R^{101}$, $R^{102}$, $R^{103}$, $R^{104}$, $R^{105}$, $R^{106}$, $R^{107}$, and $R^{108}$ represent an alkoxy group having 1 to 18 carbon atoms, $P^{11}$ and $P^{12}$ are preferably independently represented by the formula (R-1), and at least one of $P^{11}$ and $P^{12}$ preferably represents a methacryl group.

$R^{11}$, $R^{12}$, $R^{13}$, $R^{14}$, and $R^{15}$ preferably independently represent a methyl group or a hydrogen atom, preferably a hydrogen atom when the rate of polymerization of a polymerizable compound is regarded as important, preferably a methyl group when a decrease in display defects due to a change in pretilt angle is regarded as important.

In the general formula (I), $S^{11}$, $S^{12}$, and $S^{13}$ preferably independently represent a single bond or an alkylene group having 1 to 5 carbon atoms, particularly preferably a single bond. When $S^{11}$, $S^{12}$, and $S^{13}$ represent a single bond, the amount of residual polymerizable compound after ultraviolet irradiation is sufficiently decreased, and display defects due to a change in pretilt angle are reduced.

The lower limit of the amount of a polymerizable compound represented by the general formula (I) in a liquid crystal composition according to the present invention is preferably 0.01% by mass, preferably 0.02% by mass, preferably 0.03% by mass, preferably 0.04% by mass, preferably 0.05% by mass, preferably 0.06% by mass, preferably 0.07% by mass, preferably 0.08% by mass, preferably 0.09% by mass, preferably 0.1% by mass, preferably 0.12% by mass, preferably 0.15% by mass, preferably 0.17% by mass, preferably 0.2% by mass, preferably 0.22% by mass, preferably 0.25% by mass, preferably 0.27% by mass, preferably 0.3% by mass, preferably 0.32% by mass, preferably 0.35% by mass, preferably 0.37% by mass, preferably 0.4% by mass, preferably 0.42% by mass, preferably 0.45% by mass, preferably 0.5% by mass, preferably 0.55% by mass. The upper limit of the amount of a polymerizable compound represented by the general formula (I) in a liquid crystal composition according to the present invention is preferably 5% by mass, preferably 4.5% by mass, preferably 4% by mass, preferably 3.5% by mass, preferably 3% by mass, preferably 2.5% by mass, preferably 2% by mass, preferably 1.5% by mass, preferably 1% by mass, preferably 0.95% by mass, preferably 0.9% by mass, preferably 0.85% by mass, preferably 0.8% by mass, preferably 0.75% by mass, preferably 0.7% by mass, preferably 0.65% by mass, preferably 0.6% by mass, preferably 0.55% by mass, preferably 0.5% by mass, preferably 0.45% by mass, preferably 0.4% by mass.

More specifically, the amount of a polymerizable compound represented by the general formula (I) in a liquid crystal composition according to the present invention preferably ranges from 0.2% to 0.6% by mass in order to achieve an adequate pretilt angle, a small amount of residual polymerizable compound, or a high voltage holding ratio (VHR), and preferably ranges from 0.01% to 0.4% by mass when a decrease in precipitation at low temperatures is regarded as important. The amount of each of a plurality of polymerizable compounds represented by the general formula (I), if present, preferably ranges from 0.01% to 0.4% by mass. Thus, in order to solve all these problems, the amount of a polymerizable compound represented by the general formula (I) is particularly desirably adjusted to be in the range of 0.1% to 0.6% by mass.

More specifically, a polymerizable compound represented by the general formula (I) according to the present invention is preferably a compound represented by one of the general formulae (I-1-1) to (I-1-2), the general formulae (I-2-1) to (I-2-7), the general formulae (I-3-1) to (I-3-9), the general formulae (I-4-1) to (I-4-4), the general formulae (I-5-1) to (I-5-2), the general formulae (I-6-1) to (I-6-5), and the general formulae (I-7-1) to (1-7-6).

[Chem. 4]

(I-1-1)

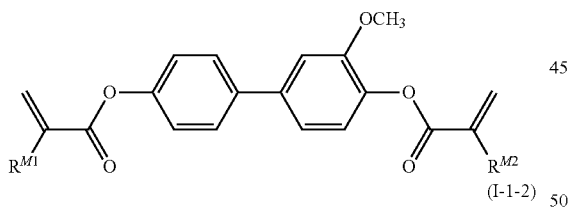

(I-1-2)

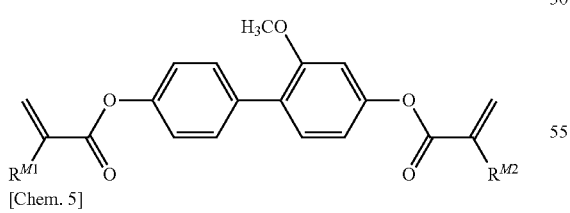

[Chem. 5]

(I-2-1)

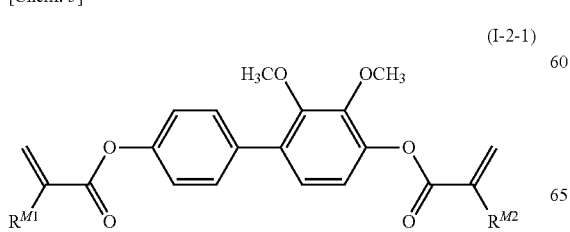

(I-2-2)

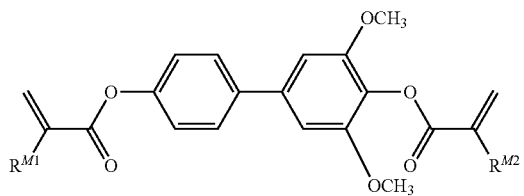

(I-2-3)

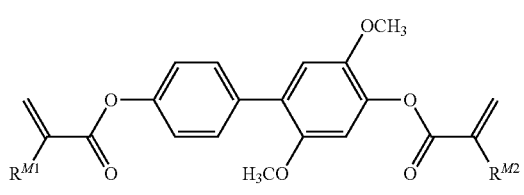

(I-2-4)

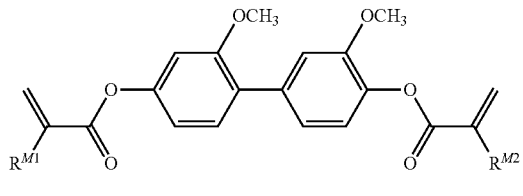

(I-2-5)

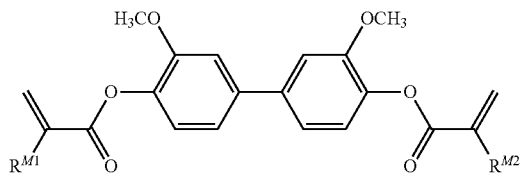

(I-2-6)

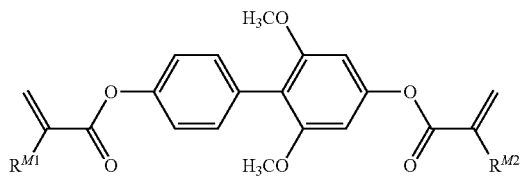

(I-2-7)

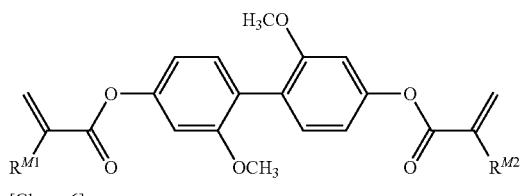

[Chem. 6]

(I-3-1)

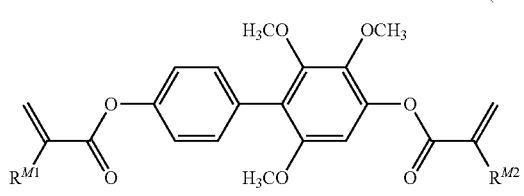

(I-3-2)
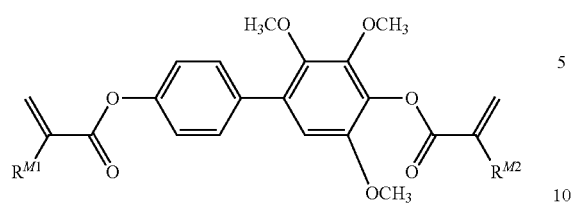
(I-3-3)
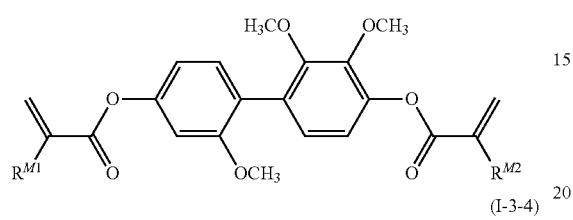
(I-3-4)
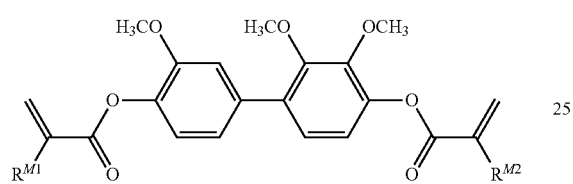
(I-3-5)
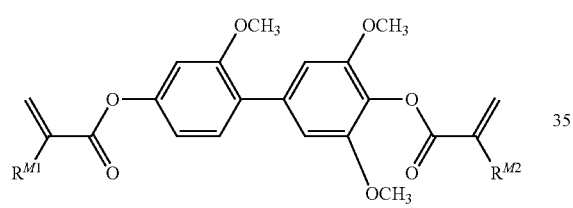
(I-3-6)
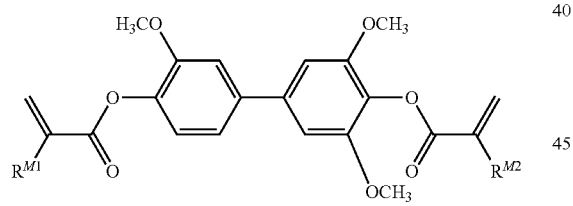
(I-3-7)
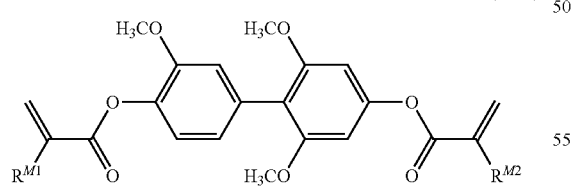
(I-3-8)
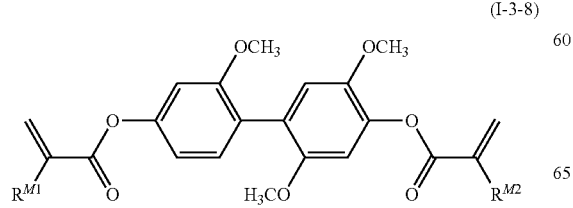
(I-3-9)
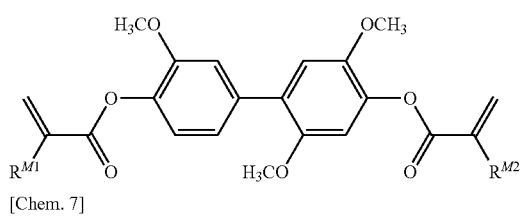
[Chem. 7]
(I-4-1)
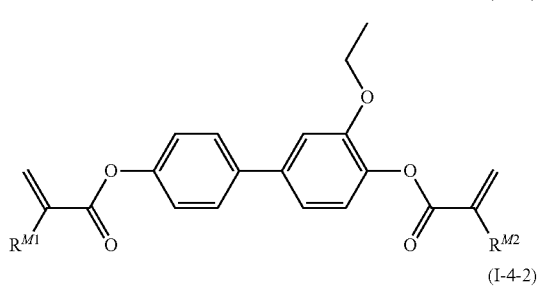
(I-4-2)
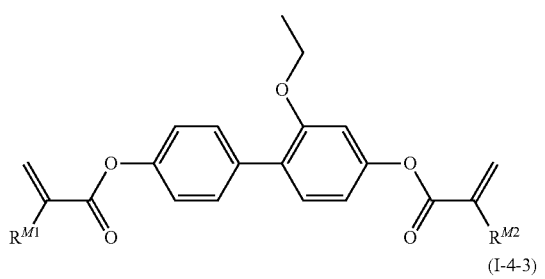
(I-4-3)
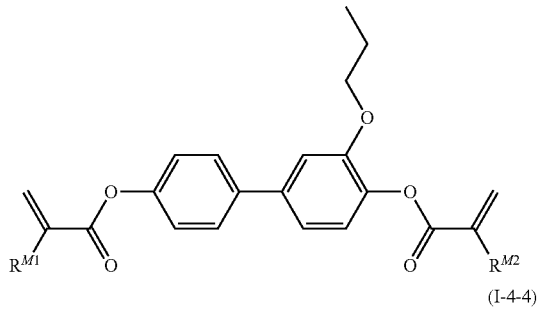
(I-4-4)
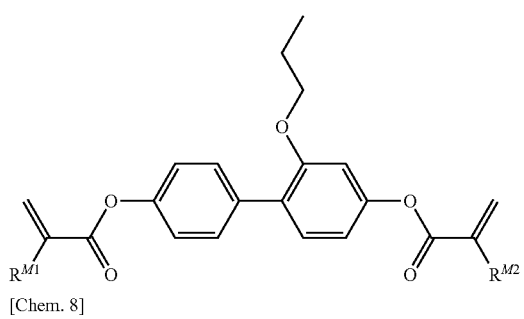
[Chem. 8]
(I-5-1)
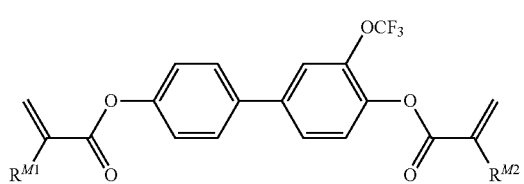

(I-5-2)
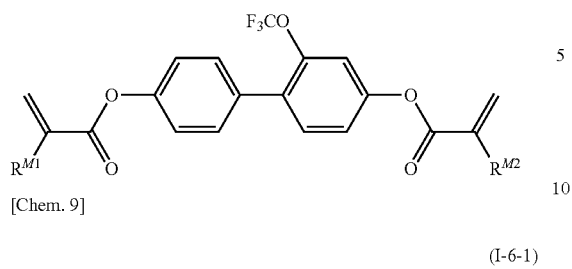
[Chem. 9]
(I-6-1)
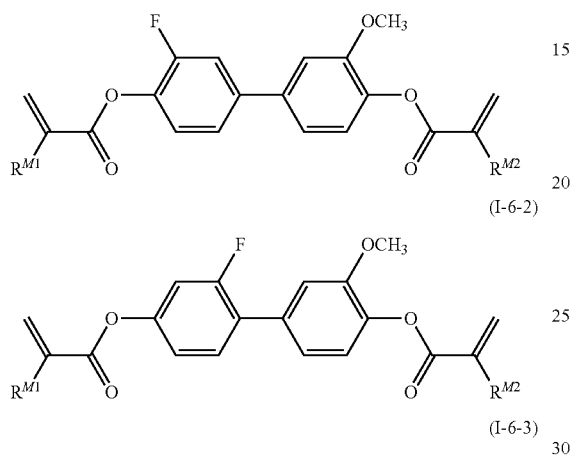
(I-6-2)
(I-6-3)
(I-6-4)
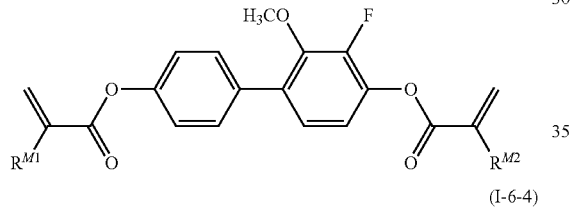
(I-6-5)
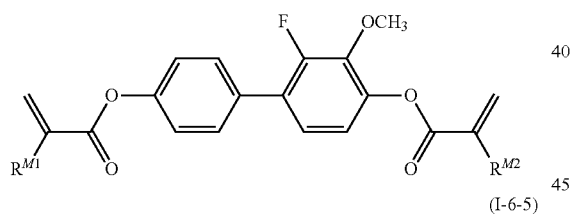
[Chem. 10]
(I-7-1)
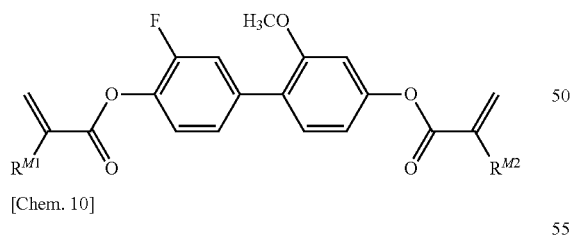
(I-7-2)
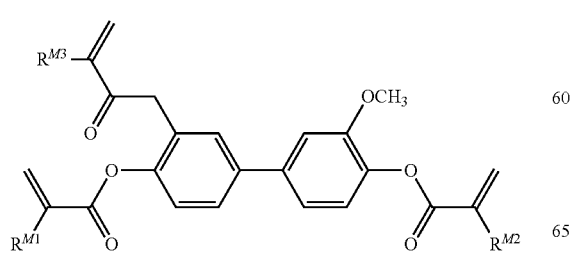
(I-7-3)
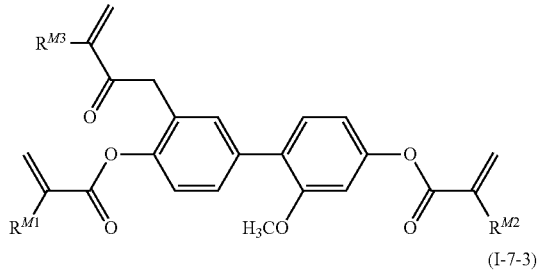
(I-7-4)
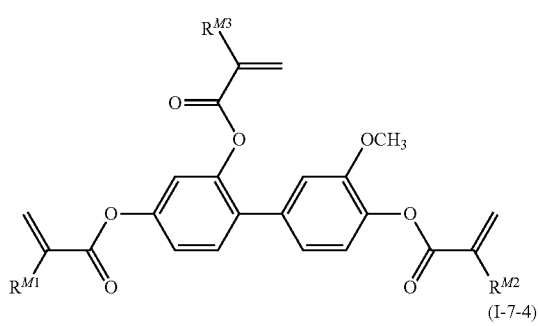
(I-7-5)
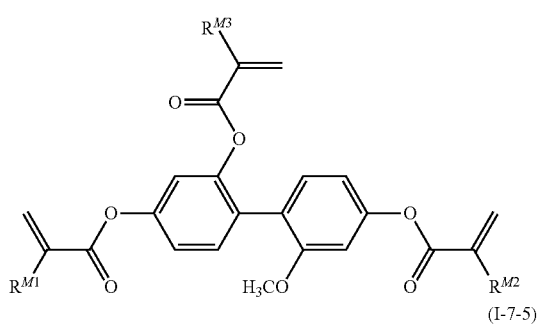
(I-7-6)
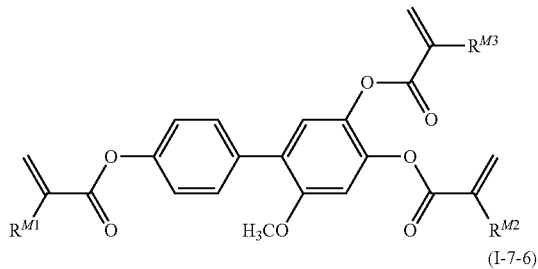
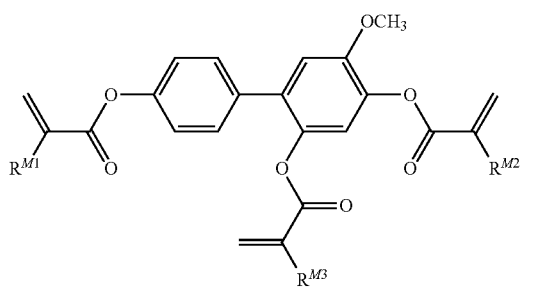
In the formulae, $R^{M1}$, $R^{M2}$, and $R^{M3}$ independently represent a fluorine atom, a hydrogen atom, or an alkyl group having 1 to 5 carbon atoms, preferably a hydrogen atom or an alkyl group having one carbon atom.
Among the compounds represented by the general formulae (I-1-1) and (I-1-2), the general formulae (I-2-1) to (I-2-7), the general formulae (I-3-1) to (I-3-9), the general formulae (I-4-1) to (I-4-4), the general formulae (I-5-1) and (I-5-2), the general formulae (I-6-1) to (I-6-4), and the general formulae (I-7-1) to (I-7-6), more preferred are the general formulae (I-1-1), (I-1-2), (I-4-1), (I-4-2), (I-7-1), and (I-7-2), still more preferred are the general formula (I-1-1), the general formula (I-1-2), and the general formulae (I-6-1) to (I-6-5), and particularly preferred are the general formulae (I-1-1) and (I-1-2).

Liquid crystal compositions containing polymerizable compounds represented by the general formulae (I-1-1) and (I-1-2) are particularly preferred because PSA or PSVA liquid crystal display devices having high responsiveness, an adequate pretilt angle, a small amount of residual polymerizable compound, and few or no defects, such as poor alignment or display defects, due to a change in pretilt angle can be efficiently manufactured.

A liquid crystal composition according to the present invention preferably contains one or two or more compounds selected from the compounds represented by the general formulae (N-1), (N-2), and (N-3) in addition to a compound represented by the general formula (I). These compounds correspond to dielectrically negative compounds (with a negative Δε having an absolute value of more than 2).

The Δε of each compound is extrapolated from the measured dielectric constant anisotropy of a composition prepared by addition to a dielectrically nearly neutral composition at 25° C. In the following description, the amount is expressed in %, which means % by mass.

[Chem. 11]

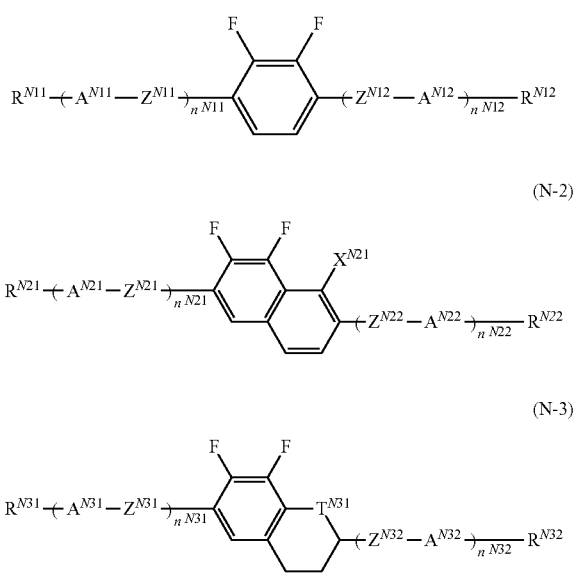

(wherein $R^{N11}$, $R^{N12}$, $R^{21}$, $R^{N22}$, $R^{N31}$, and $R^{N32}$ independently represent an alkyl group having 1 to 8 carbon atoms, and one —$CH_2$— or two or more nonadjacent —$CH_2$—'s in the alkyl group are independently optionally substituted with —CH=CH—, —C≡C—, —O—, —CO—, —COO—, or —OCO—, $A^{N11}$, $A^{N12}$, $A^{N21}$, $A^{N22}$, $A^{N31}$, and $A^{N32}$ independently represent a group selected from the group consisting of (a) a 1,4-cyclohexylene group (in which one —$CH_2$— or two or more nonadjacent —$CH_2$—'s are optionally substituted with —O—), (b) a 1,4-phenylene group (in which one —CH= or two or more nonadjacent —CH='s are optionally substituted with —N=), (c) a naphthalene-2,6-diyl group, a 1,2,3,4-tetrahydronaphthalene-2,6-diyl group, or a decahydronaphthalene-2,6-diyl group (one —CH= or two or more nonadjacent —CH='s in the naphthalene-2,6-diyl group or in the 1,2,3,4-tetrahydronaphthalene-2,6-diyl group are optionally substituted with —N=), and (d) a 1,4-cyclohexenylene group, the groups (a), (b), (c), and (d) are independently optionally substituted with a cyano group, a fluorine atom, or a chlorine atom, $Z^{N11}$, $Z^{N12}$, $Z^{N21}$, $Z^{N22}$, $Z^{N31}$, and $Z^{N32}$ independently represent a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF—, or —C≡C—, $X^{N21}$ represents a hydrogen atom or a fluorine atom, $T^{N31}$ represents —$CH_2$— or an oxygen atom, and $n^{N11}$, $n^{N12}$, $n^{N21}$, $n^{N22}$, $n^{N31}$, and $n^{N32}$ independently represent an integer of 0 to 3, $n^{N11}+n^{N12}$, $n^{N21}+n^{N22}$, and $n^{N31}+n^{N32}$ are independently 1, 2, or 3, and pluralities of $A^{N11}$s to $A^{N32}$s and $Z^{N11}$s to $Z^{N32}$s, if present, may be the same or different $A^{N11}$s to $A^{N32}$s and $Z^{N11}$s to $Z^{N32}$s, respectively)

The compounds represented by the general formulae (N-1), (N-2), and (N-3) preferably have a negative Δε with an absolute value of more than 3.

In the general formulae (N-1), (N-2), and (N-3), $R^{N11}$, $R^{N12}$, $R^{N21}$, $R^{N22}$, $R^{N31}$, and $R^{N32}$ preferably independently represent an alkyl group having 1 to 8 carbon atoms, an alkoxy group having 1 to 8 carbon atoms, an alkenyl group having 2 to 8 carbon atoms, or an alkenyloxy group having 2 to 8 carbon atoms, preferably an alkyl group having 1 to 5 carbon atoms, an alkoxy group having 1 to 5 carbon atoms, an alkenyl group having 2 to 5 carbon atoms, or an alkenyloxy group having 2 to 5 carbon atoms. $R^{11}$, $R^{21}$, and $R^{31}$ more preferably independently represent an alkyl group having 1 to 5 carbon atoms or an alkenyl group having 2 to 5 carbon atoms, and $R^{12}$, $R^{22}$, and $R^{32}$ more preferably independently represent an alkyl group having 1 to 5 carbon atoms, an alkoxy group having 1 to 5 carbon atoms, or an alkenyloxy group having 2 to 5 carbon atoms.

When the ring structure to which each end group ($R^{N11}$, $R^{N12}$, $R^{N21}$, $R^{N22}$, $R^{N31}$, or $R^{N32}$) is bonded is a phenyl group (aromatic), preferred is a linear alkyl group having 1 to 5 carbon atoms, a linear alkoxy group having 1 to 4 carbon atoms, or an alkenyl group having 4 or 5 carbon atoms. When the ring structure to which each end group is bonded is a saturated ring structure, such as cyclohexane, pyran, or dioxane, preferred is a linear alkyl group having 1 to 5 carbon atoms, a linear alkoxy group having 1 to 4 carbon atoms, or a linear alkenyl group having 2 to 5 carbon atoms. In order to stabilize the nematic phase, the total number of carbon atoms and, if present, oxygen atoms is preferably 5 or less, and a straight chain is preferred.

The alkenyl group is preferably selected from the groups represented by the formulae (R1) to (R5). (The dark dot in each formula represents a carbon atom in the ring structure.)

[Chem. 12]

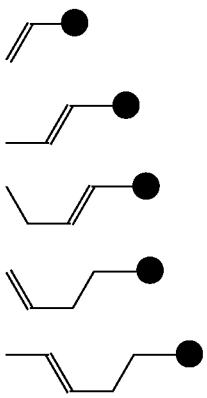

(R1)
(R2)
(R3)
(R4)
(R5)

$A^{N11}$, $A^{N12}$, $A^{N21}$, $A^{N22}$, $A^{N31}$, and $A^{N32}$ preferably independently represent an aromatic when an increased Δn is required, represent an aliphatic when the response speed is improved, represent a trans-1,4-cyclohexylene group, a 1,4-phenylene group, a 2-fluoro-1,4-phenylene group, a 3-fluoro-1,4-phenylene group, a 3,5-difluro-1,4-phenylene group, a 2,3-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group, more preferably independently represent the following structures,

[Chem. 13]

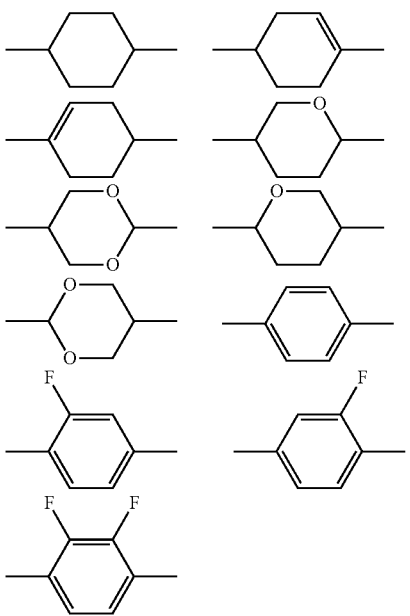

and more preferably represent a trans-1,4-cyclohexylene group, a 1,4-cyclohexenylene group, or a 1,4-phenylene group.

$Z^{N11}$, $Z^{N12}$, $Z^{N21}$, $Z^{N22}$, $Z^{N31}$, and $Z^{N32}$ preferably independently represent —CH$_2$O—, —CF$_2$O—, —CH$_2$CH$_2$—, —CF$_2$CF$_2$—, or a single bond, more preferably —CH$_2$O—, —CH$_2$CH$_2$—, or a single bond, particularly preferably —CH$_2$O— or a single bond.

$X^{N21}$ preferably represents a fluorine atom.

$T^{N31}$ preferably represents an oxygen atom.

$n^{N11}+n^{N12}$, $n^{N21}+n^{N22}$, and $n^{N31}+n^{N32}$ are preferably 1 or 2, and a combination of $n^{N11}$ of 1 and $n^{N12}$ of 0, a combination of $n^{N11}$ of 2 and $n^{N12}$ of 0, a combination of $n^{N11}$ of 1 and $n^{N12}$ of 1, a combination of $n^{N11}$ of 2 and $n^{N12}$ of 1, a combination of $n^{N21}$ of 1 and $n^{N22}$ of 0, a combination of $n^{N21}$ of 2 and $n^{N22}$ of 0, a combination of $n^{N31}$ of 1 and $n^{N32}$ of 0, and a combination of $n^{N31}$ of 2 and $n^{N32}$ of 0 are preferred.

The lower limit of the preferred amount of a compound represented by the formula (N-1) is 1%, 10%, 20%, 30%, 40%, 50%, 55%, 60%, 65%, 70%, 75%, or 80% of the total amount of a composition according to the present invention. The upper limit of the preferred amount is 95%, 85%, 75%, 65%, 55%, 45%, 35%, 25%, or 20%.

The lower limit of the preferred amount of a compound represented by the formula (N-2) is 1%, 10%, 20%, 30%, 40%, 50%, 55%, 60%, 65%, 70%, 75%, or 80% of the total amount of a composition according to the present invention. The upper limit of the preferred amount is 95%, 85%, 75%, 65%, 55%, 45%, 35%, 25%, or 20%.

The lower limit of the preferred amount of a compound represented by the formula (N-3) is 1%, 10%, 20%, 30%, 40%, 50%, 55%, 60%, 65%, 70%, 75%, or 80% of the total amount of a composition according to the present invention. The upper limit of the preferred amount is 95%, 85%, 75%, 65%, 55%, 45%, 35%, 25%, or 20%.

When a low viscosity and a high response speed are required for a composition according to the present invention, the lower limit is preferably low, and the upper limit is preferably low. When a high Tni and high temperature stability are required for a composition according to the present invention, the lower limit is preferably low, and the upper limit is preferably low. When dielectric constant anisotropy is increased to maintain a low drive voltage, the lower limit is preferably high, and the upper limit is preferably high.

Examples of the compounds represented by the general formula (N-1) include the compound group represented by the general formulae (N-1a) to (N-1g).

[Chem. 14]

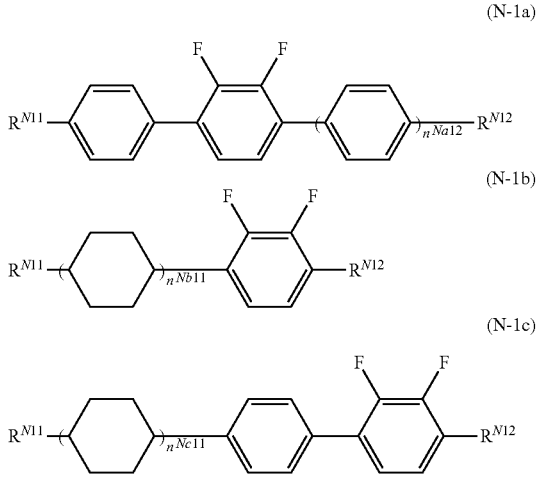

(N-1a)
(N-1b)
(N-1c)

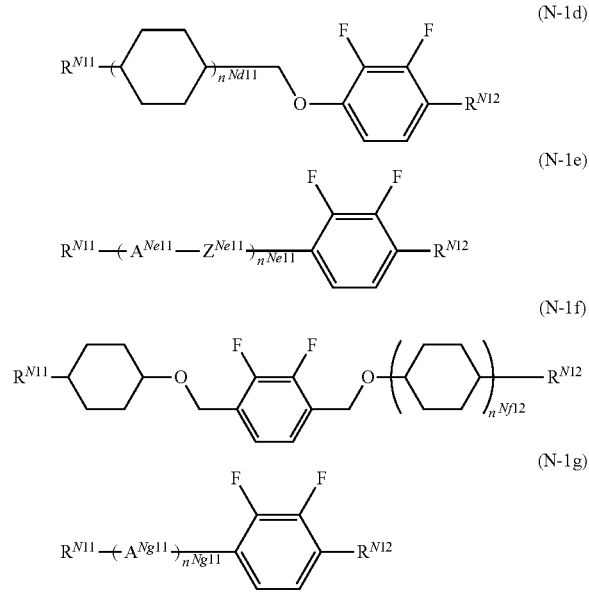

(wherein $R^{N11}$ and $R^{N12}$ have the same meaning as $R^{N11}$ and $R^{N12}$ in the general formula (N-1), $n^{Na12}$ is 0 or 1, $n^{Nb11}$ is 0 or 1, $n^{Nc11}$ is 0 or 1, $n^{Nd11}$ is 0 or 1, $n^{Ne11}$ is 1 or 2, $n^{Nf12}$ is 1 or 2, $n^{Ng11}$ is 1 or 2, $A^{Ne11}$ represents a trans-1,4-cyclohexylene group or a 1,4-phenylene group, $A^{Ng11}$ represents a trans-1,4-cyclohexylene group, a 1,4-cyclohexenylene group, or a 1,4-phenylene group, $A^{Ng11}$ represents a 1,4-cyclohexenylene group when $n^{Ng11}$ is 1, at least one $A^{Ng11}$ represents a 1,4-cyclohexenylene group when $n^{Ng11}$ is 2, $Z^{Ne11}$ represents a single bond or an ethylene group, and $Z^{Ne11}$ represents an ethylene group when $n^{Ne11}$ is 1; at least one $Z^{Ne11}$ represents an ethylene group when $n^{Ne11}$ is 2)

More specifically, a compound represented by the general formula (N-1) is preferably a compound selected from the compound group represented by the general formulae (N-1-1) to (N-1-22).

A compound represented by the general formula (N-1-1) is the following compound.

[Chem. 15]

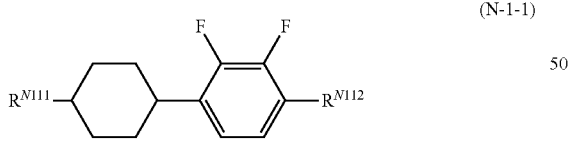

(N-1-1)

(wherein $R^{N111}$ and $R^{N112}$ have the same meaning as $R^{N11}$ and $R^{N12}$, respectively, in the general formula (N-1))

$R^{N111}$ preferably represents an alkyl group having 1 to 5 carbon atoms or an alkenyl group having 2 to 5 carbon atoms, preferably a propyl group, a pentyl group, or a vinyl group. $R^{N112}$ preferably represents an alkyl group having 1 to 5 carbon atoms, an alkenyl group having 4 or 5 carbon atoms, or an alkoxy group having 1 to 4 carbon atoms, preferably an ethoxy group or a butoxy group.

The compounds represented by the general formula (N-1-1) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably increased when improved Δε is regarded as important, is effectively increased when solubility at low temperatures is regarded as important, and is effectively decreased when $T_{NI}$ is regarded as important. When reduced drop marks or improved image-sticking characteristics are desired, the amount is preferably set in a medium range.

The lower limit of the preferred amount of a compound represented by the formula (N-1-1) is 5%, 10%, 13%, 15%, 17%, 20%, 23%, 25%, 27%, 30%, 33%, or 35% of the total amount of a composition according to the present invention. The upper limit of the preferred amount is 50%, 40%, 38%, 35%, 33%, 30%, 28%, 25%, 23%, 20%, 18%, 15%, 13%, 10%, 8%, 7%, 6%, 5%, or 3% of the total amount of a composition according to the present invention.

A compound represented by the general formula (N-1-1) is preferably a compound selected from the compound group represented by the formulae (N-1-1.1) to (N-1-1.22), preferably a compound represented by one of the formulae (N-1-1.1) to (N-1-1.4), preferably the compound represented by the formula (N-1-1.1) or (N-1-1.3).

[Chem. 16]

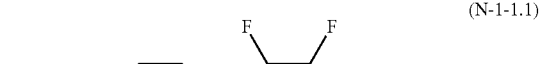

(N-1-1.1)

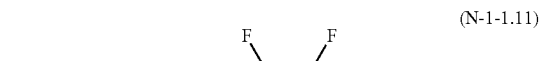

(N-1-1.11)

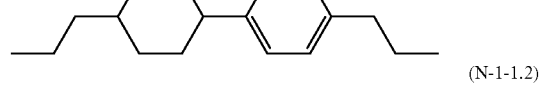

(N-1-1.2)

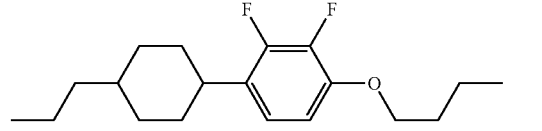

(N-1-1.12)

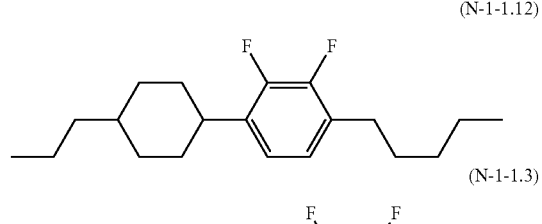

(N-1-1.3)

(N-1-1.13)

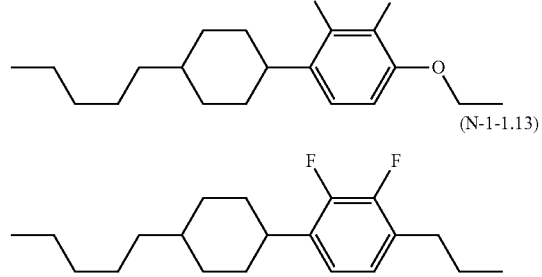

-continued

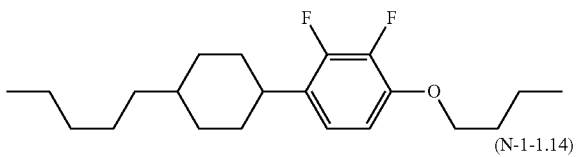
(N-1-1.4)

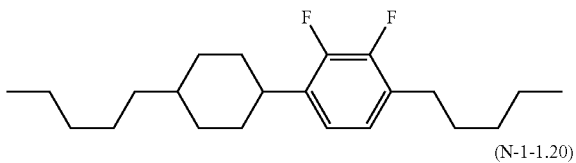
(N-1-1.14)

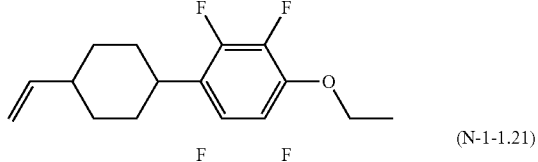
(N-1-1.20)

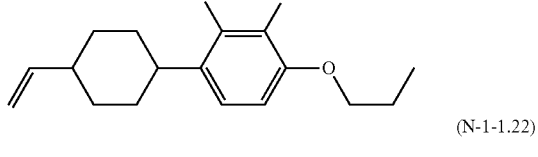
(N-1-1.21)

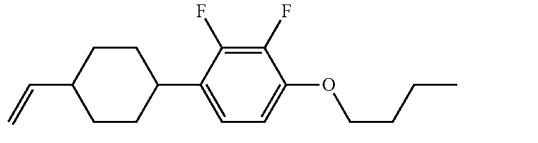
(N-1-1.22)

The compounds represented by the formulae (N-1-1.1) to (N-1-1.22) may be used alone or in combination. The lower limit of the preferred amount of each compound or these compounds is 5%, 10%, 13%, 15%, 17%, 20%, 23%, 25%, 27%, 30%, 33%, or 35% of the total amount of a composition according to the present invention. The upper limit of the preferred amount is 50%, 40%, 38%, 35%, 33%, 30%, 28%, 25%, 23%, 20%, 18%, 15%, 13%, 10%, 8%, 7%, 6%, 5%, or 3% of the total amount of a composition according to the present invention.

A compound represented by the general formula (N-1-2) is the following compound.

[Chem. 17]

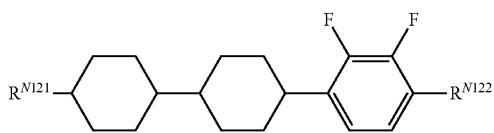
(N-1-2)

(wherein $R^{N121}$ and $R^{N122}$ have the same meaning as $R^{N11}$ and $R^{N12}$, respectively, in the general formula (N-1))

$R^{N121}$ preferably represents an alkyl group having 1 to 5 carbon atoms or an alkenyl group having 2 to 5 carbon atoms, preferably an ethyl group, a propyl group, a butyl group, or a pentyl group. $R^{N122}$ preferably represents an alkyl group having 1 to 5 carbon atoms, an alkenyl group having 4 or 5 carbon atoms, or an alkoxy group having 1 to 4 carbon atoms, preferably a methyl group, a propyl group, a methoxy group, an ethoxy group, or a propoxy group.

The compounds represented by the general formula (N-1-2) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably increased when improved Δε is regarded as important, is effectively decreased when solubility at low temperatures is regarded as important, and is effectively increased when $T_{NI}$ is regarded as important. When reduced drop marks or improved image-sticking characteristics are desired, the amount is preferably set in a medium range.

The lower limit of the preferred amount of a compound represented by the formula (N-1-2) is 5%, 7%, 10%, 13%, 15%, 17%, 20%, 23%, 25%, 27%, 30%, 33%, 35%, 37%, 40%, or 42% of the total amount of a composition according to the present invention. The upper limit of the preferred amount is 50%, 48%, 45%, 43%, 40%, 38%, 35%, 33%, 30%, 28%, 25%, 23%, 20%, 18%, 15%, 13%, 10%, 8%, 7%, 6%, or 5% of the total amount of a composition according to the present invention.

A compound represented by the general formula (N-1-2) is preferably a compound selected from the compound group represented by the formulae (N-1-2.1) to (N-1-2.22), preferably a compound represented by one of the formulae (N-1-2.3) to (N-1-2.7), (N-1-2.10), (N-1-2.11), (N-1-2.13), and (N-1-2.20), preferably a compound represented by one of the formulae (N-1-2.3) to (N-1-2.7) when improved Δε is regarded as important, preferably the compound represented by the formula (N-1-2.10), (N-1-2.11), or (N-1-2.13) when improved $T_{NI}$ is regarded as important, or preferably the compound represented by the formula (N-1-2.20) when an improved response speed is regarded as important.

[Chem. 18]

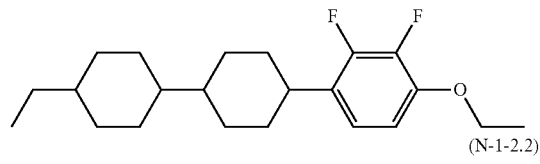
(N-1-2.1)

(N-1-2.2)

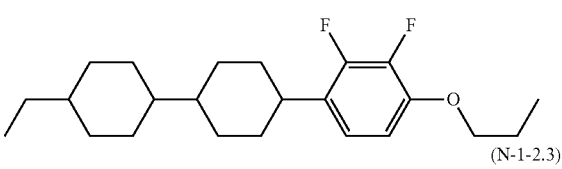
(N-1-2.3)

(N-1-2.4)

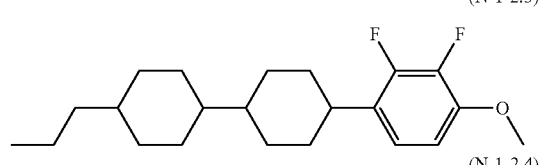

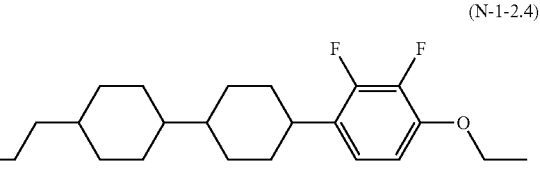

(N-1-2.5)
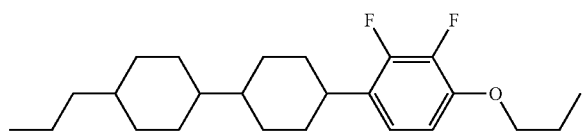

(N-1-2.6)
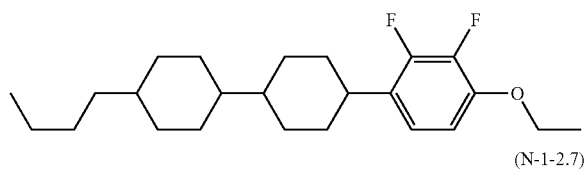

(N-1-2.7)
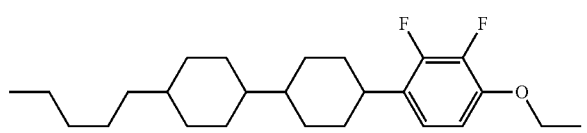

(N-1-2.10)
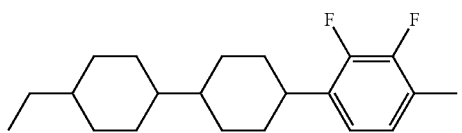

(N-1-2.11)
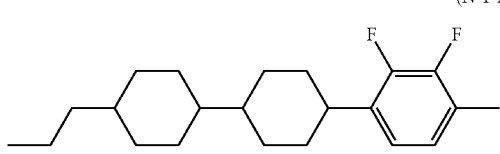

(N-1-2.12)
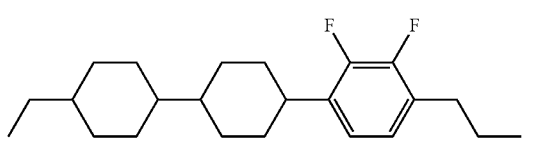

(N-1-2.13)
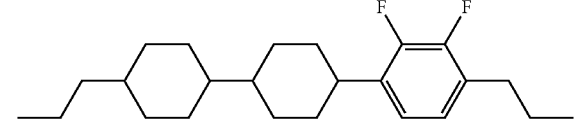

(N-1-2.20)
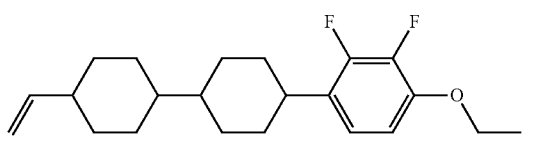

(N-1-2.21)
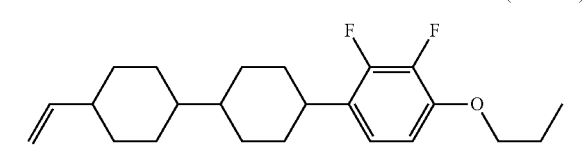

(N-1-2.22)
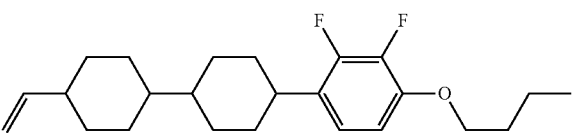

The compounds represented by the formulae (N-1-2.1) to (N-1-2.22) may be used alone or in combination. The lower limit of the preferred amount of each compound or these compounds is 5%, 10%, 13%, 15%, 17%, 20%, 23%, 25%, 27%, 30%, 33%, or 35% of the total amount of a composition according to the present invention. The upper limit of the preferred amount is 50%, 40%, 38%, 35%, 33%, 30%, 28%, 25%, 23%, 20%, 18%, 15%, 13%, 10%, 8%, 7%, 6%, 5%, or 3% of the total amount of a composition according to the present invention.

A compound represented by the general formula (N-1-3) is the following compound.

[Chem. 19]

(N-1-3)
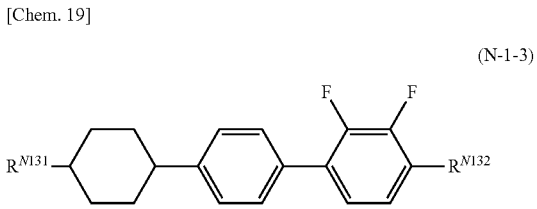

(wherein $R^{N131}$ and $R^{N132}$ have the same meaning as $R^{N11}$ and $R^{N12}$, respectively, in the general formula (N-1))

$R^{N131}$ preferably represents an alkyl group having 1 to 5 carbon atoms or an alkenyl group having 2 to 5 carbon atoms, preferably an ethyl group, a propyl group, or a butyl group. $R^{N132}$ preferably represents an alkyl group having 1 to 5 carbon atoms, an alkenyl group having 3 to 5 carbon atoms, or an alkoxy group having 1 to 4 carbon atoms, preferably a 1-propenyl group, an ethoxy group, a propoxy group, or a butoxy group.

The compounds represented by the general formula (N-1-3) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably increased when improved Δε is regarded as important, is effectively increased when solubility at low temperatures is regarded as important, and is effectively increased when $T_{NI}$ is regarded as important. When reduced drop marks or improved image-sticking characteristics are desired, the amount is preferably set in a medium range.

The lower limit of the preferred amount of a compound represented by the formula (N-1-3) is 5%, 10%, 13%, 15%, 17%, or 20% of the total amount of a composition according to the present invention. The upper limit of the preferred amount is 35%, 30%, 28%, 25%, 23%, 20%, 18%, 15%, or 13% of the total amount of a composition according to the present invention.

A compound represented by the general formula (N-1-3) is preferably a compound selected from the compound group represented by the formulae (N-1-3.1) to (N-1-3.21), preferably a compound represented by one of the formulae (N-1-3.1) to (N-1-3.7) and (N-1-3.21), preferably the compound represented by the formula (N-1-3.1), (N-1-3.2), (N-1-3.3), (N-1-3.4), or (N-1-3.6).

[Chem. 20]

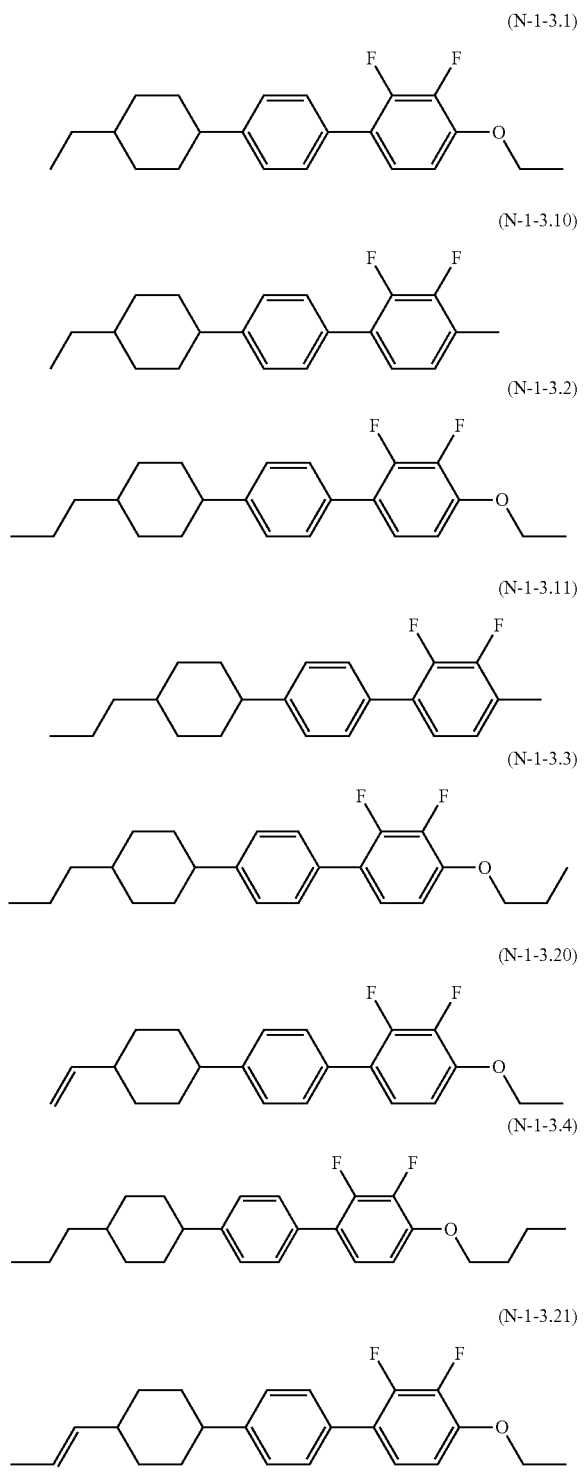

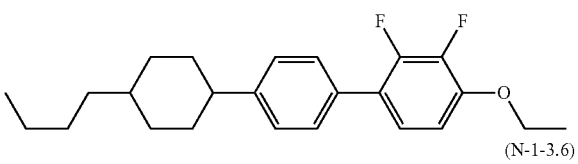

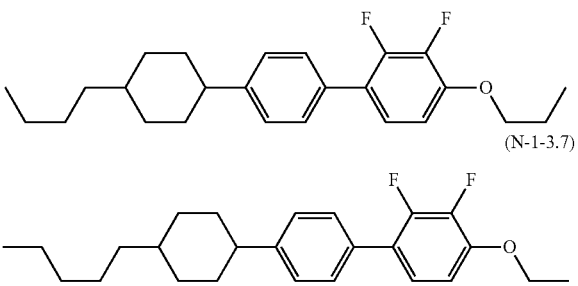

The compounds represented by the formulae (N-1-3.1) to (N-1-3.4), (N-1-3.6), and (N-1-3.21) may be used alone or in combination. A combination of the formula (N-1-3.1) and the formula (N-1-3.2) or a combination of two or three selected from the formulae (N-1-3.3), (N-1-3.4), and (N-1-3.6) is preferred. The lower limit of the preferred amount of each compound or these compounds is 5%, 10%, 13%, 15%, 17%, or 20% of the total amount of a composition according to the present invention. The upper limit of the preferred amount is 35%, 30%, 28%, 25%, 23%, 20%, 18%, 15%, or 13% of the total amount of a composition according to the present invention.

A compound represented by the general formula (N-1-4) is the following compound.

[Chem. 21]

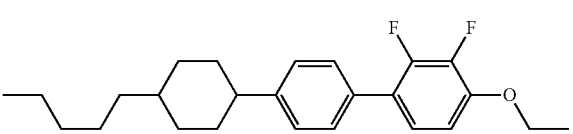

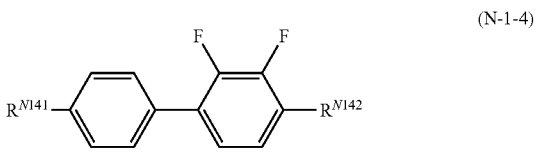

(wherein $R^{N141}$ and $R^{N142}$ have the same meaning as $R^{N11}$ and $R^{N12}$, respectively, in the general formula (N-1))

$R^{N141}$ and $R^{N142}$ preferably independently represent an alkyl group having 1 to 5 carbon atoms, an alkenyl group having 4 or 5 carbon atoms, or an alkoxy group having 1 to 4 carbon atoms, preferably a methyl group, a propyl group, an ethoxy group, or a butoxy group.

The compounds represented by the general formula (N-1-4) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably increased when improved Δε is regarded as important, is effectively increased when solubility at low temperatures is regarded as important, and is effectively decreased when $T_{NI}$ is regarded as important. When reduced drop marks or improved image-sticking characteristics are desired, the amount is preferably set in a medium range.

The lower limit of the preferred amount of a compound represented by the formula (N-1-4) is 3%, 5%, 7%, 10%, 13%, 15%, 17%, or 20% of the total amount of a composition according to the present invention. The upper limit of the preferred amount is 35%, 30%, 28%, 25%, 23%, 20%, 18%, 15%, 13%, 11%, 10%, or 8% of the total amount of a composition according to the present invention.

A compound represented by the general formula (N-1-4) is preferably a compound selected from the compound group represented by the formulae (N-1-4.1) to (N-1-4.14), preferably a compound represented by one of the formulae (N-1-4.1) to (N-1-4.4), preferably the compound represented by the formula (N-1-4.1), (N-1-4.2), or (N-1-4.4).

[Chem. 22]

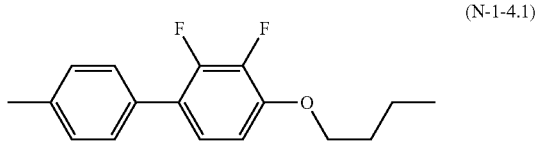
(N-1-4.1)

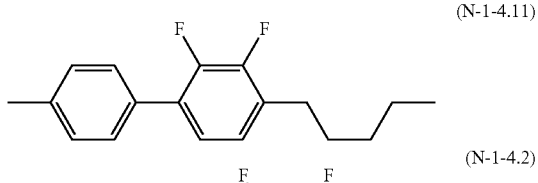
(N-1-4.11)

(N-1-4.2)

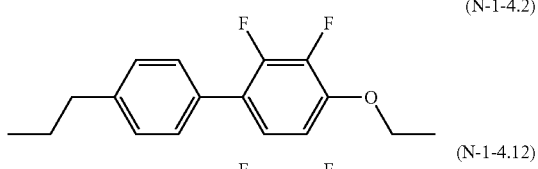
(N-1-4.12)

(N-1-4.3)

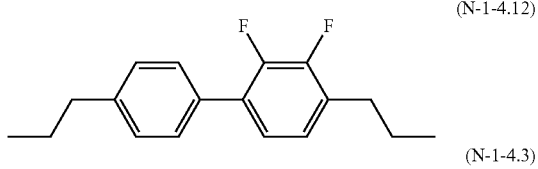
(N-1-4.13)

(N-1-4.4)

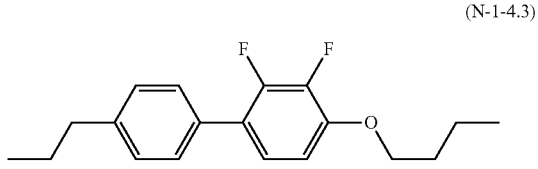
(N-1-4.14)

The compounds represented by the formulae (N-1-4.1) to (N-1-4.14) may be used alone or in combination. The lower limit of the preferred amount of each compound or these compounds is 3%, 5%, 7%, 10%, 13%, 15%, 17%, or 20% of the total amount of a composition according to the present invention. The upper limit of the preferred amount is 35%, 30%, 28%, 25%, 23%, 20%, 18%, 15%, 13%, 11%, 10%, or 8% of the total amount of a composition according to the present invention.

A compound represented by the general formula (N-1-5) is the following compound.

[Chem. 23]

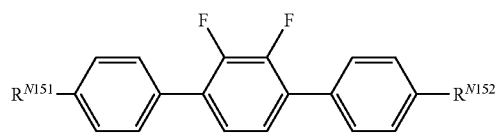
(N-1-5)

(wherein $R^{N151}$ and $R^{N152}$ have the same meaning as $R^{N11}$ and $R^{N12}$, respectively, in the general formula (N-1))

$R^{N151}$ and $R^{N152}$ preferably independently represent an alkyl group having 1 to 5 carbon atoms, an alkenyl group having 4 or 5 carbon atoms, or an alkoxy group having 1 to 4 carbon atoms, preferably an ethyl group, a propyl group, or a butyl group.

The compounds represented by the general formula (N-1-5) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably increased when improved Δε is regarded as important, is effectively decreased when solubility at low temperatures is regarded as important, and is effectively increased when $T_{NI}$ is regarded as important. When reduced drop marks or improved image-sticking characteristics are desired, the amount is preferably set in a medium range.

The lower limit of the preferred amount of a compound represented by the formula (N-1-5) is 5%, 8%, 10%, 13%, 15%, 17%, or 20% of the total amount of a composition according to the present invention. The upper limit of the preferred amount is 35%, 33%, 30%, 28%, 25%, 23%, 20%, 18%, 15%, or 13% of the total amount of a composition according to the present invention.

A compound represented by the general formula (N-1-5) is preferably a compound selected from the compound group represented by the formulae (N-1-5.1) to (N-1-5.6), preferably the compound represented by the formula (N-1-5.1), (N-1-5.2), or (N-1-5.4).

[Chem. 24]

(N-1-5.1)

-continued

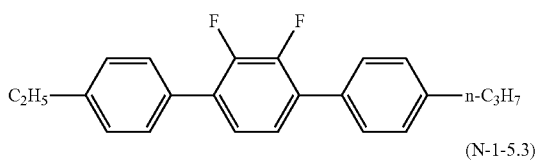
(N-1-5.2)

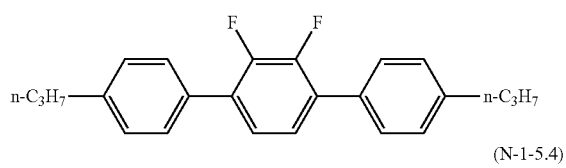
(N-1-5.3)

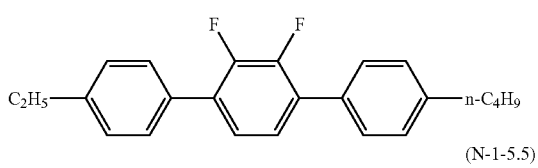
(N-1-5.4)

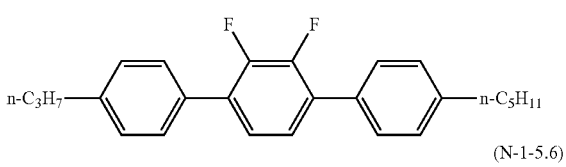
(N-1-5.5)

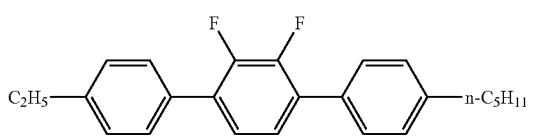
(N-1-5.6)

The compounds represented by the formulae (N-1-5.1), (N-1-5.2), and (N-1-5.4) may be used alone or in combination. The lower limit of the preferred amount of each compound or these compounds is 5%, 8%, 10%, 13%, 15%, 17%, or 20% of the total amount of a composition according to the present invention. The upper limit of the preferred amount is 35%, 33%, 30%, 28%, 25%, 23%, 20%, 18%, 15%, or 13% of the total amount of a composition according to the present invention.

A compound represented by the general formula (N-1-10) is the following compound.

[Chem. 25]

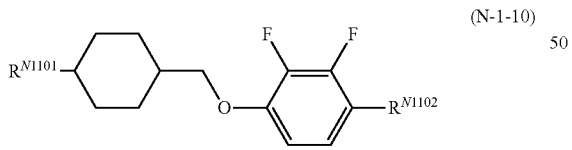
(N-1-10)

(wherein $R^{N1101}$ and $R^{N1102}$ have the same meaning as $R^{N11}$ and $R^{N12}$, respectively, in the general formula (N-1))

$R^{N1101}$ preferably represents an alkyl group having 1 to 5 carbon atoms or an alkenyl group having 2 to 5 carbon atoms, preferably an ethyl group, a propyl group, a butyl group, a vinyl group, or a 1-propenyl group. $R^{N1102}$ preferably represents an alkyl group having 1 to 5 carbon atoms, an alkenyl group having 4 or 5 carbon atoms, or an alkoxy group having 1 to 4 carbon atoms, preferably an ethoxy group, a propoxy group, or a butoxy group.

The compounds represented by the general formula (N-1-10) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably increased when improved $\Delta\varepsilon$ is regarded as important, is effectively increased when solubility at low temperatures is regarded as important, and is effectively increased when $T_{NI}$ is regarded as important. When reduced drop marks or improved image-sticking characteristics are desired, the amount is preferably set in a medium range.

The lower limit of the preferred amount of a compound represented by the formula (N-1-10) is 5%, 10%, 13%, 15%, 17%, or 20% of the total amount of a composition according to the present invention. The upper limit of the preferred amount is 35%, 30%, 28%, 25%, 23%, 20%, 18%, 15%, or 13% of the total amount of a composition according to the present invention.

A compound represented by the general formula (N-1-10) is preferably a compound selected from the compound group represented by the formulae (N-1-10.1) to (N-1-10.14), preferably a compound represented by one of the formulae (N-1-10.1) to (N-1-10.5), (N-1-10.13), and (N-1-10.14), preferably the compound represented by the formula (N-1-10.1), (N-1-10.2), (N-1-10.13), or (N-1-10.14).

[Chem. 26]

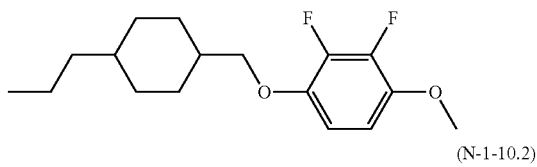
(N-1-10.1)

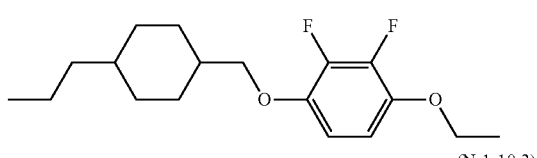
(N-1-10.2)

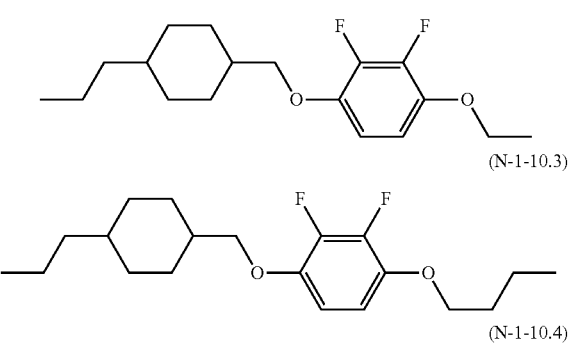
(N-1-10.3)

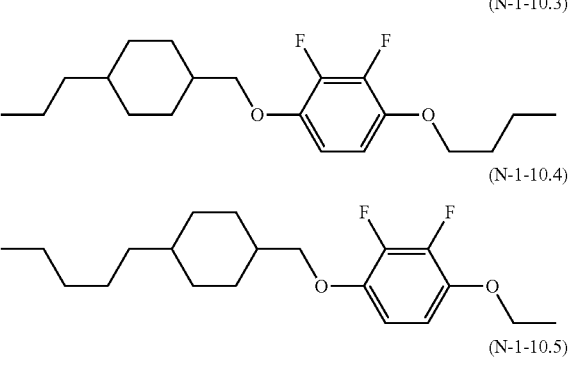
(N-1-10.4)

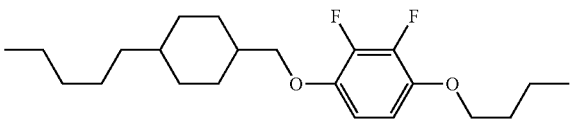
(N-1-10.5)

-continued

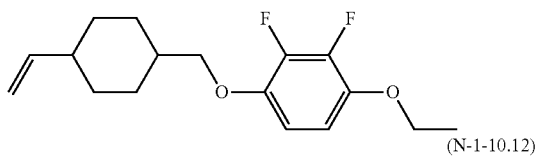
(N-1-10.11)

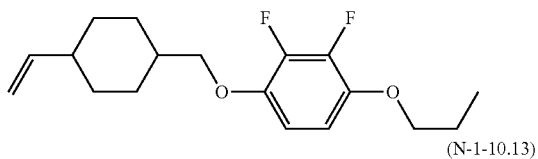
(N-1-10.12)

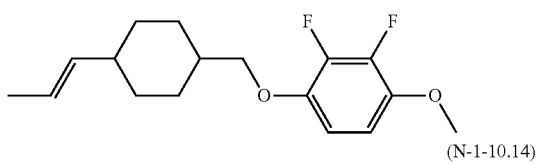
(N-1-10.13)

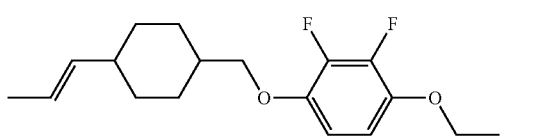
(N-1-10.14)

The compounds represented by the formulae (N-1-10.1), (N-1-10.2), (N-1-10.13), and (N-1-10.14) may be used alone or in combination. The lower limit of the preferred amount of each compound or these compounds is 5%, 10%, 13%, 15%, 17%, or 20% of the total amount of a composition according to the present invention. The upper limit of the preferred amount is 35%, 30%, 28%, 25%, 23%, 20%, 18%, 15%, or 13% of the total amount of a composition according to the present invention.

A compound represented by the general formula (N-1-11) is the following compound.

[Chem. 27]

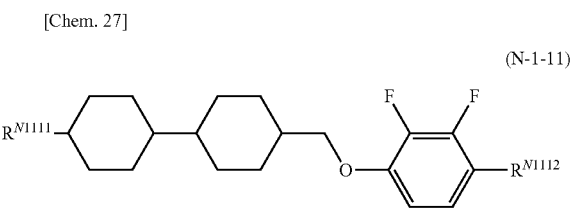
(N-1-11)

(wherein $R^{N1111}$ and $R^{N1112}$ have the same meaning as $R^{N11}$ and $R^{N12}$, respectively, in the general formula (N-1))

$R^{N1111}$ preferably represents an alkyl group having 1 to 5 carbon atoms or an alkenyl group having 2 to 5 carbon atoms, preferably an ethyl group, a propyl group, a butyl group, a vinyl group, or a 1-propenyl group. $R^{N1112}$ preferably represents an alkyl group having 1 to 5 carbon atoms, an alkenyl group having 4 or 5 carbon atoms, or an alkoxy group having 1 to 4 carbon atoms, preferably an ethoxy group, a propoxy group, or a butoxy group.

The compounds represented by the general formula (N-1-11) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably increased when improved $\Delta\varepsilon$ is regarded as important, is effectively decreased when solubility at low temperatures is regarded as important, and is effectively increased when $T_{NI}$ is regarded as important. When reduced drop marks or improved image-sticking characteristics are desired, the amount is preferably set in a medium range.

The lower limit of the preferred amount of a compound represented by the formula (N-1-11) is 5%, 10%, 13%, 15%, 17%, or 20% of the total amount of a composition according to the present invention. The upper limit of the preferred amount is 35%, 30%, 28%, 25%, 23%, 20%, 18%, 15%, or 13% of the total amount of a composition according to the present invention.

A compound represented by the general formula (N-1-11) is preferably a compound selected from the compound group represented by the formulae (N-1-11.1) to (N-1-11.14), preferably a compound represented by one of the formulae (N-1-11.1) to (N-1-11.14), preferably the compound represented by the formula (N-1-11.2) or (N-1-11.4).

[Chem. 28]

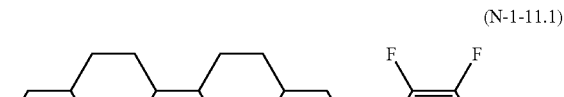
(N-1-11.1)

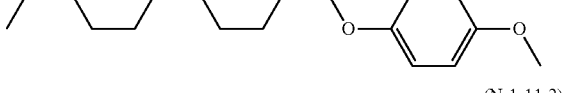
(N-1-11.2)

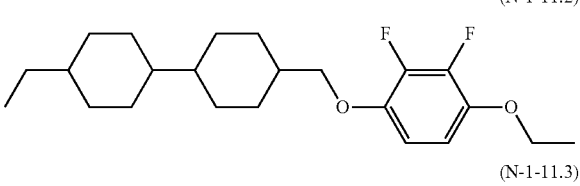
(N-1-11.3)

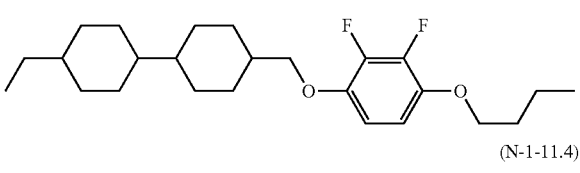
(N-1-11.4)

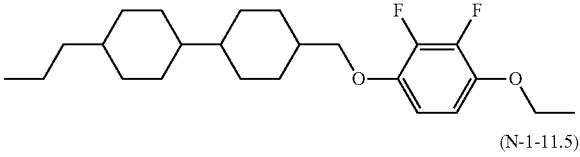
(N-1-11.5)

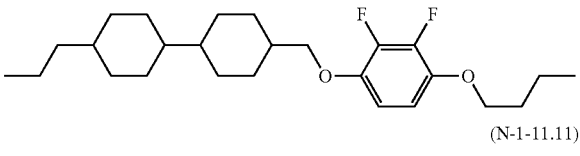
(N-1-11.11)

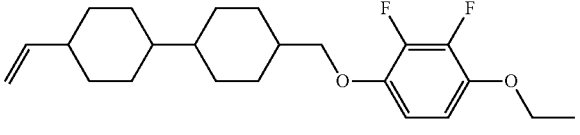

-continued

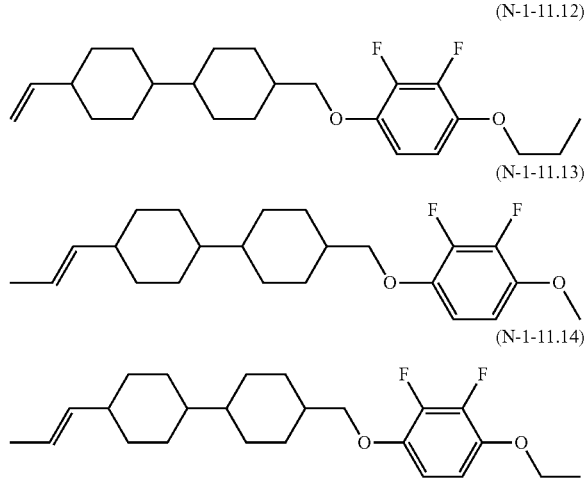

(N-1-11.12)

(N-1-11.13)

(N-1-11.14)

The compounds represented by the formulae (N-1-11.2) and (N-1-11.4) may be used alone or in combination. The lower limit of the preferred amount of each compound or these compounds is 5%, 10%, 13%, 15%, 17%, or 20% of the total amount of a composition according to the present invention. The upper limit of the preferred amount is 35%, 30%, 28%, 25%, 23%, 20%, 18%, 15%, or 13% of the total amount of a composition according to the present invention.

A compound represented by the general formula (N-1-12) is the following compound.

[Chem. 29]

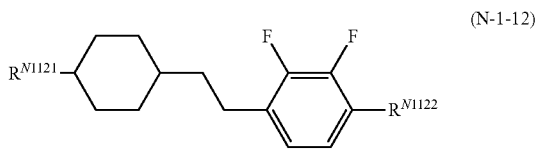

(N-1-12)

(wherein $R^{N1121}$ and $R^{N1122}$ have the same meaning as $R^{N11}$ and $R^{N12}$, respectively, in the general formula (N-1))

$R^{N1121}$ preferably represents an alkyl group having 1 to 5 carbon atoms or an alkenyl group having 2 to 5 carbon atoms, preferably an ethyl group, a propyl group, or a butyl group. $R^{N1122}$ preferably represents an alkyl group having 1 to 5 carbon atoms, an alkenyl group having 4 or 5 carbon atoms, or an alkoxy group having 1 to 4 carbon atoms, preferably an ethoxy group, a propoxy group, or a butoxy group.

The compounds represented by the general formula (N-1-12) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably increased when improved Δε is regarded as important, is effectively increased when solubility at low temperatures is regarded as important, and is effectively increased when $T_{NI}$ is regarded as important. When reduced drop marks or improved image-sticking characteristics are desired, the amount is preferably set in a medium range.

The lower limit of the preferred amount of a compound represented by the formula (N-1-12) is 5%, 10%, 13%, 15%, 17%, or 20% of the total amount of a composition according to the present invention. The upper limit of the preferred amount is 35%, 30%, 28%, 25%, 23%, 20%, 18%, 15%, or 13% of the total amount of a composition according to the present invention.

A compound represented by the general formula (N-1-13) is the following compound.

[Chem. 30]

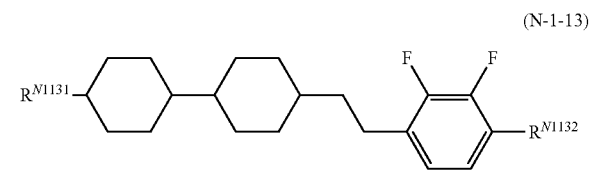

(N-1-13)

(wherein $R^{N1131}$ and $R^{N1132}$ have the same meaning as $R^{N11}$ and $R^{N12}$, respectively, in the general formula (N-1))

$R^{N1131}$ preferably represents an alkyl group having 1 to 5 carbon atoms or an alkenyl group having 2 to 5 carbon atoms, preferably an ethyl group, a propyl group, or a butyl group. $R^{N1132}$ preferably represents an alkyl group having 1 to 5 carbon atoms, an alkenyl group having 4 or 5 carbon atoms, or an alkoxy group having 1 to 4 carbon atoms, preferably an ethoxy group, a propoxy group, or a butoxy group.

The compounds represented by the general formula (N-1-13) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably increased when improved Δε is regarded as important, is effectively increased when solubility at low temperatures is regarded as important, and is effectively increased when $T_{NI}$ is regarded as important. When reduced drop marks or improved image-sticking characteristics are desired, the amount is preferably set in a medium range.

The lower limit of the preferred amount of a compound represented by the formula (N-1-13) is 5%, 10%, 13%, 15%, 17%, or 20% of the total amount of a composition according to the present invention. The upper limit of the preferred amount is 35%, 30%, 28%, 25%, 23%, 20%, 18%, 15%, or 13% of the total amount of a composition according to the present invention.

A compound represented by the general formula (N-1-14) is the following compound.

[Chem. 31]

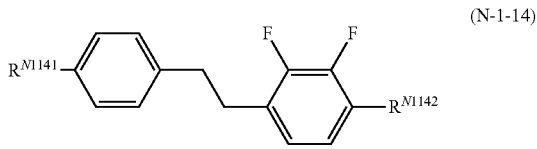

(N-1-14)

(wherein $R^{N1141}$ and $R^{N1142}$ have the same meaning as $R^{N11}$ and $R^{N12}$, respectively, in the general formula (N-1))

$R^{N1141}$ preferably represents an alkyl group having 1 to 5 carbon atoms or an alkenyl group having 2 to 5 carbon atoms, preferably an ethyl group, a propyl group, or a butyl group. $R^{N1142}$ preferably represents an alkyl group having 1 to 5 carbon atoms, an alkenyl group having 4 or 5 carbon atoms, or an alkoxy group having 1 to 4 carbon atoms, preferably an ethoxy group, a propoxy group, or a butoxy group.

The compounds represented by the general formula (N-1-14) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably increased when improved Δε is regarded as important, is effectively increased when solubility at low temperatures is regarded as important, and is effectively increased when $T_{NI}$ is regarded as important. When reduced drop marks or improved image-sticking characteristics are desired, the amount is preferably set in a medium range.

The lower limit of the preferred amount of a compound represented by the formula (N-1-14) is 5%, 10%, 13%, 15%, 17%, or 20% of the total amount of a composition according to the present invention. The upper limit of the preferred amount is 35%, 30%, 28%, 25%, 23%, 20%, 18%, 15%, or 13% of the total amount of a composition according to the present invention.

A compound represented by the general formula (N-1-15) is the following compound.

[Chem. 32]

(N-1-15)

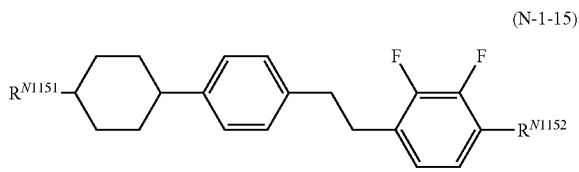

(wherein $R^{N1151}$ and $R^{N1152}$ have the same meaning as $R^{N11}$ and $R^{N12}$m respectively, in the general formula (N-1))

$R^{N1151}$ preferably represents an alkyl group having 1 to 5 carbon atoms or an alkenyl group having 2 to 5 carbon atoms, preferably an ethyl group, a propyl group, or a butyl group. $R^{N1152}$ preferably represents an alkyl group having 1 to 5 carbon atoms, an alkenyl group having 4 or 5 carbon atoms, or an alkoxy group having 1 to 4 carbon atoms, preferably an ethoxy group, a propoxy group, or a butoxy group.

The compounds represented by the general formula (N-1-15) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably increased when improved Δε is regarded as important, is effectively increased when solubility at low temperatures is regarded as important, and is effectively increased when $T_{NI}$ is regarded as important. When reduced drop marks or improved image-sticking characteristics are desired, the amount is preferably set in a medium range.

The lower limit of the preferred amount of a compound represented by the formula (N-1-15) is 5%, 10%, 13%, 15%, 17%, or 20% of the total amount of a composition according to the present invention. The upper limit of the preferred amount is 35%, 30%, 28%, 25%, 23%, 20%, 18%, 15%, or 13% of the total amount of a composition according to the present invention.

A compound represented by the general formula (N-1-16) is the following compound.

[Chem. 33]

(N-1-16)

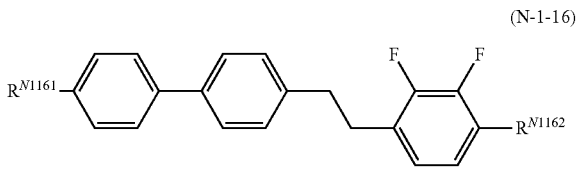

(wherein $R^{N1161}$ and $R^{N1162}$ have the same meaning as $R^{N11}$ and $R^{N12}$, respectively, in the general formula (N-1))

$R^{N1161}$ preferably represents an alkyl group having 1 to 5 carbon atoms or an alkenyl group having 2 to 5 carbon atoms, preferably an ethyl group, a propyl group, or a butyl group. $R^{N1162}$ preferably represents an alkyl group having 1 to 5 carbon atoms, an alkenyl group having 4 or 5 carbon atoms, or an alkoxy group having 1 to 4 carbon atoms, preferably an ethoxy group, a propoxy group, or a butoxy group.

The compounds represented by the general formula (N-1-16) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably increased when improved Δε is regarded as important, is effectively increased when solubility at low temperatures is regarded as important, and is effectively increased when $T_{NI}$ is regarded as important. When reduced drop marks or improved image-sticking characteristics are desired, the amount is preferably set in a medium range.

The lower limit of the preferred amount of a compound represented by the formula (N-1-16) is 5%, 10%, 13%, 15%, 17%, or 20% of the total amount of a composition according to the present invention. The upper limit of the preferred amount is 35%, 30%, 28%, 25%, 23%, 20%, 18%, 15%, or 13% of the total amount of a composition according to the present invention.

A compound represented by the general formula (N-1-17) is the following compound.

[Chem. 34]

(N-1-17)

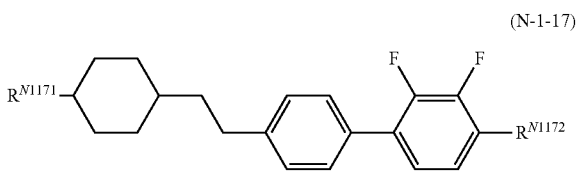

(wherein $R^{N1171}$ and $R^{N1172}$ have the same meaning as $R^{N11}$ and $R^{N12}$, respectively, in the general formula (N-1))

$R^{N1171}$ preferably represents an alkyl group having 1 to 5 carbon atoms or an alkenyl group having 2 to 5 carbon atoms, preferably an ethyl group, a propyl group, or a butyl group. $R^{N1172}$ preferably represents an alkyl group having 1 to 5 carbon atoms, an alkenyl group having 4 or 5 carbon atoms, or an alkoxy group having 1 to 4 carbon atoms, preferably an ethoxy group, a propoxy group, or a butoxy group.

The compounds represented by the general formula (N-1-17) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably increased when improved Δε is regarded as important, is effectively increased when solubility at low temperatures is regarded as important, and is effectively increased when $T_{NI}$ is regarded as important. When reduced drop marks or improved image-sticking characteristics are desired, the amount is preferably set in a medium range.

The lower limit of the preferred amount of a compound represented by the formula (N-1-17) is 5%, 10%, 13%, 15%, 17%, or 20% of the total amount of a composition according to the present invention. The upper limit of the preferred amount is 35%, 30%, 28%, 25%, 23%, 20%, 18%, 15%, or 13% of the total amount of a composition according to the present invention.

A compound represented by the general formula (N-1-18) is the following compound.

[Chem. 35]

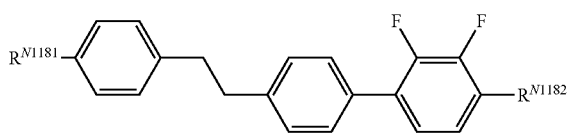

(N-1-18)

(wherein $R^{N1181}$ and $R^{N1182}$ have the same meaning as $R^{N11}$ and $R^{N12}$, respectively, in the general formula (N-1))

$R^{N1181}$ preferably represents an alkyl group having 1 to 5 carbon atoms or an alkenyl group having 2 to 5 carbon atoms, preferably a methyl group, an ethyl group, a propyl group, or a butyl group. $R^{N1182}$ preferably represents an alkyl group having 1 to 5 carbon atoms, an alkenyl group having 4 or 5 carbon atoms, or an alkoxy group having 1 to 4 carbon atoms, preferably an ethoxy group, a propoxy group, or a butoxy group.

The compounds represented by the general formula (N-1-18) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably increased when improved Δε is regarded as important, is effectively increased when solubility at low temperatures is regarded as important, and is effectively increased when $T_{NI}$ is regarded as important. When reduced drop marks or improved image-sticking characteristics are desired, the amount is preferably set in a medium range.

The lower limit of the preferred amount of a compound represented by the formula (N-1-18) is 5%, 10%, 13%, 15%, 17%, or 20% of the total amount of a composition according to the present invention. The upper limit of the preferred amount is 35%, 30%, 28%, 25%, 23%, 20%, 18%, 15%, or 13% of the total amount of a composition according to the present invention.

A compound represented by the general formula (N-1-18) is preferably a compound selected from the compound group represented by the formulae (N-1-18.1) to (N-1-18.5), preferably a compound represented by one of the formulae (N-1-18.1) to (N-1-18.3), preferably the compound represented by the formula (N-1-18.2) or (N-1-18.3).

[Chem. 36]

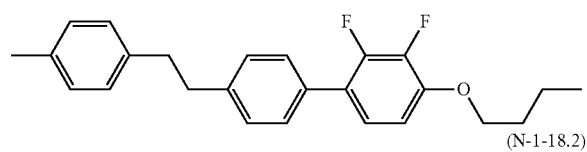

(N-1-18.1)

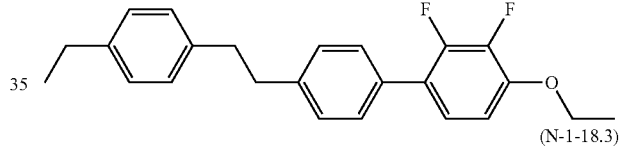

(N-1-18.2)

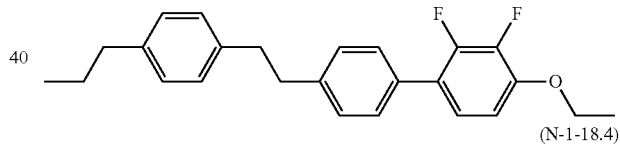

(N-1-18.3)

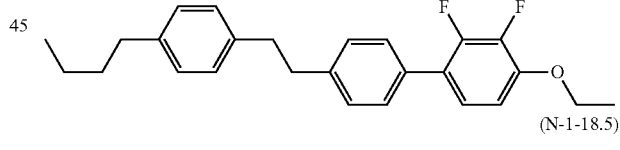

(N-1-18.4)

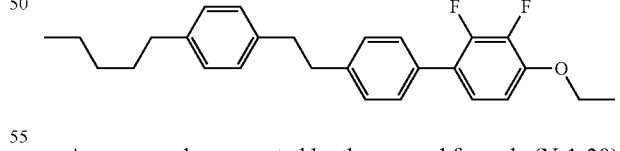

(N-1-18.5)

A compound represented by the general formula (N-1-20) is the following compound.

[Chem. 37]

(N-1-20)

(wherein $R^{N1201}$ and $R^{N1202}$ have the same meaning as $R^{N11}$ and $R^{N12}$, respectively, in the general formula (N-1))

$R^{N1201}$ and $R^{N1202}$ preferably independently represent an alkyl group having 1 to 5 carbon atoms or an alkenyl group having 2 to 5 carbon atoms, preferably an ethyl group, a propyl group, or a butyl group.

The compounds represented by the general formula (N-1-20) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably increased when improved Δε is regarded as important, is effectively increased when solubility at low temperatures is regarded as important, and is effectively increased when $T_{NI}$ is regarded as important. When reduced drop marks or improved image-sticking characteristics are desired, the amount is preferably set in a medium range.

The lower limit of the preferred amount of a compound represented by the formula (N-1-20) is 5%, 10%, 13%, 15%, 17%, or 20% of the total amount of a composition according to the present invention. The upper limit of the preferred amount is 35%, 30%, 28%, 25%, 23%, 20%, 18%, 15%, or 13% of the total amount of a composition according to the present invention.

A compound represented by the general formula (N-1-21) is the following compound.

[Chem. 38]

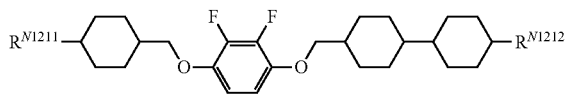

(N-1-21)

(wherein $R^{N1211}$ and $R^{N1212}$ have the same meaning as $R^{N11}$ and $R^{N12}$, respectively, in the general formula (N-1))

$R^{N1211}$ and $R^{N1212}$ preferably independently represent an alkyl group having 1 to 5 carbon atoms or an alkenyl group having 2 to 5 carbon atoms, preferably an ethyl group, a propyl group, or a butyl group.

The compounds represented by the general formula (N-1-21) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably increased when improved Δε is regarded as important, is effectively increased when solubility at low temperatures is regarded as important, and is effectively increased when $T_{NI}$ is regarded as important. When reduced drop marks or improved image-sticking characteristics are desired, the amount is preferably set in a medium range.

The lower limit of the preferred amount of a compound represented by the formula (N-1-21) is 5%, 10%, 13%, 15%, 17%, or 20% of the total amount of a composition according to the present invention. The upper limit of the preferred amount is 35%, 30%, 28%, 25%, 23%, 20%, 18%, 15%, or 13% of the total amount of a composition according to the present invention.

A compound represented by the general formula (N-1-22) is the following compound.

[Chem. 39]

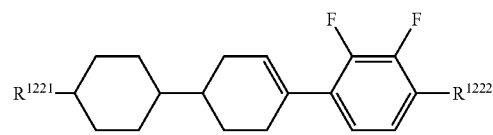

(N-1-22)

(wherein $R^{N1221}$ and $R^{N1222}$ have the same meaning as $R^{N11}$ and $R^{N12}$, respectively, in the general formula (N-1))

$R^{N1221}$ and $R^{N1222}$ preferably independently represent an alkyl group having 1 to 5 carbon atoms or an alkenyl group having 2 to 5 carbon atoms, preferably an ethyl group, a propyl group, or a butyl group.

The compounds represented by the general formula (N-1-22) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably increased when improved Δε is regarded as important, is effectively increased when solubility at low temperatures is regarded as important, and is effectively increased when $T_{NI}$ is regarded as important. When reduced drop marks or improved image-sticking characteristics are desired, the amount is preferably set in a medium range.

The lower limit of the preferred amount of a compound represented by the formula (N-1-22) is 1%, 5%, 10%, 13%, 15%, 17%, or 20% of the total amount of a composition according to the present invention. The upper limit of the preferred amount is 35%, 30%, 28%, 25%, 23%, 20%, 18%, 15%, 13%, 10%, or 5% of the total amount of a composition according to the present invention.

A compound represented by the general formula (N-1-22) is preferably a compound selected from the compound group represented by the formulae (N-1-22.1) to (N-1-22.12), preferably a compound represented by one of the formulae (N-1-22.1) to (N-1-22.5), preferably a compound represented by one of the formulae (N-1-22.1) to (N-1-22.4).

[Chem. 40]

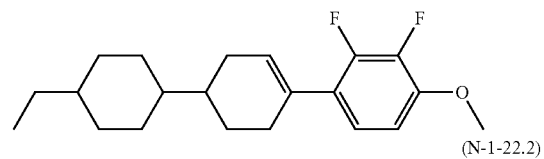

(N-1-22.1)

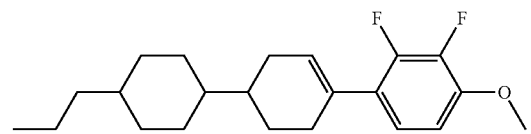

(N-1-22.2)

-continued (N-1-22.3)
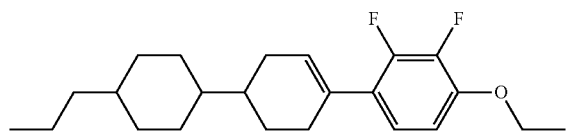

(N-1-22.4)
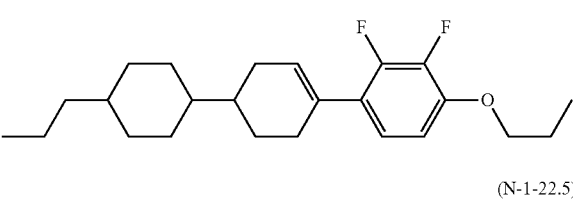

(N-1-22.5)

(N-1-22.6)
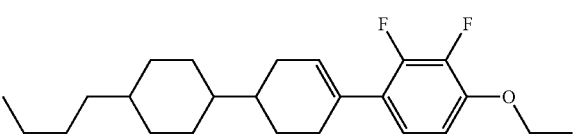

(N-1-22.11)
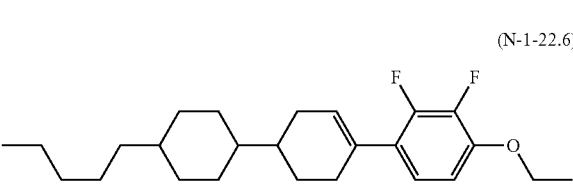

(N-1-22.12)
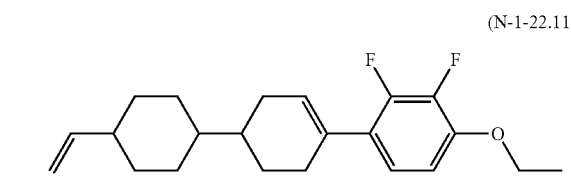

A compound represented by the general formula (N-2) is preferably a compound selected from the compound group represented by the following general formulae (N-2-1) to (N-2-3).

A compound represented by the general formula (N-2-1) is the following compound.

[Chem. 41]

(N-2-1)
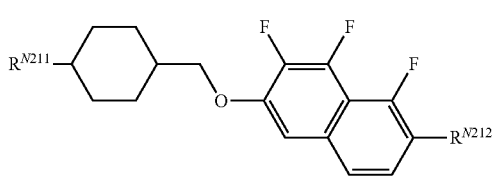

(wherein $R^{N211}$ and $R^{N212}$ have the same meaning as $R^{N21}$ and $R^{N22}$, respectively, in the general formula (N-2))

A compound represented by the general formula (N-2-2) is the following compound.

[Chem. 42]

(N-2-2)
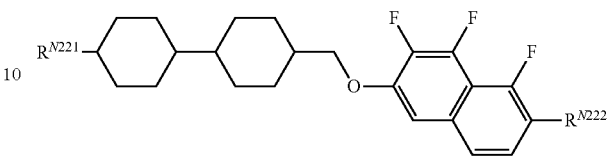

(wherein $R^{N221}$ and $R^{N222}$ have the same meaning as $R^{N21}$ and $R^{N22}$, respectively, in the general formula (N-2))

A compound represented by the general formula (N-2-3) is the following compound.

[Chem. 43]

(N-2-3)
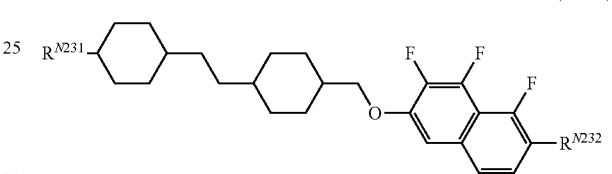

(wherein $R^{N231}$ and $R^{N232}$ have the same meaning as $R^{N21}$ and $R^{N22}$, respectively, in the general formula (N-2))

A compound represented by the general formula (N-3) is preferably a compound selected from the compound group represented by the general formula (N-3-2).

[Chem. 44]

(N-3-2)
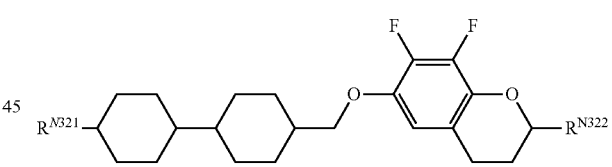

(wherein $R^{N321}$ and $R^{N322}$ have the same meaning as $R^{N31}$ and $R^{321}$, respectively, in the general formula (N-3))

$R^{N321}$ and $R^{N322}$ preferably represent an alkyl group having 1 to 5 carbon atoms or an alkenyl group having 2 to 5 carbon atoms, preferably a propyl group or a pentyl group.

The compounds represented by the general formula (N-3-2) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably increased when improved Δε is regarded as important, is effectively increased when solubility at low temperatures is regarded as important, and is effectively decreased when $T_{NI}$ is regarded as important.

When reduced drop marks or improved image-sticking characteristics are desired, the amount is preferably set in a medium range.

The lower limit of the preferred amount of a compound represented by the formula (N-3-2) is 3%, 5%, 10%, 13%, 15%, 17%, 20%, 23%, 25%, 27%, 30%, 33%, or 35% of the total amount of a composition according to the present invention. The upper limit of the preferred amount is 50%, 40%, 38%, 35%, 33%, 30%, 28%, 25%, 23%, 20%, 18%, 15%, 13%, 10%, 8%, 7%, 6%, or 5% of the total amount of a composition according to the present invention.

A compound represented by the general formula (N-3-2) is preferably a compound selected from the compound group represented by the formulae (N-3-2.1) to (N-3-2.3).

[Chem. 45]

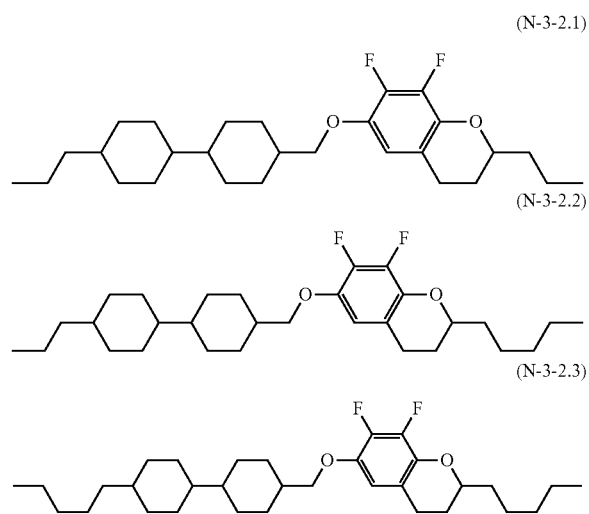

(N-3-2.1)

(N-3-2.2)

(N-3-2.3)

A liquid crystal composition according to the present invention preferably contains one or two or more compounds represented by the general formula (J) in addition to a compound represented by the general formula (I). These compounds correspond to dielectrically positive compounds (with Δε of more than 2).

[Chem. 46]

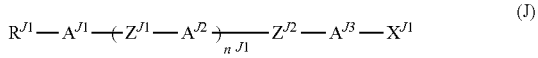

(J)

(wherein $R^{J1}$ represents an alkyl group having 1 to 8 carbon atoms, and one —$CH_2$— or two or more nonadjacent —$CH_2$—'s in the alkyl group are independently optionally substituted with —CH=CH—, —C≡C—, —O—, —CO—, —COO—, or —OCO—, $n^{J1}$ is 0, 1, 2, 3, or 4, $A^{J1}$, $A^{J2}$, and $A^{J3}$ independently represent a group selected from the group consisting of (a) a 1,4-cyclohexylene group (in which one —$CH_2$— or two or more nonadjacent —$CH_2$—'s are optionally substituted with —O—), (b) a 1,4-phenylene group (in which one —CH= or two or more nonadjacent —CH='s are optionally substituted with —N=), and (c) a naphthalene-2,6-diyl group, a 1,2,3,4-tetrahydronaphthalene-2,6-diyl group, or a decahydronaphthalene-2,6-diyl group (one —CH= or two or more nonadjacent —CH='s in the naphthalene-2,6-diyl group or in the 1,2,3,4-tetrahydronaphthalene-2,6-diyl group are optionally substituted with —N=), the groups (a), (b), and (c) are independently optionally substituted with a cyano group, a fluorine atom, a chlorine atom, a methyl group, a trifluoromethyl group, or a trifluoromethoxy group, $Z^{J1}$ and $Z^{J2}$ independently represent a single bond, —$CH_2CH_2$—, —$(CH_2)_4$—, —$OCH_2$—, —$CH_2O$—, —$OCF_2$—, —$CF_2O$—, —COO—, —OCO—, or —C≡C—, if $n^{J1}$ is 2, 3, or 4, a plurality of $A^{J2}$s may be the same or different, and if $n^{J1}$ is 2, 3, or 4, a plurality of $Z^{J1}$s may be the same or different, and $X^{J1}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group)

In the general formula (J), $R^{J1}$ preferably represents an alkyl group having 1 to 8 carbon atoms, an alkoxy group having 1 to 8 carbon atoms, an alkenyl group having 2 to 8 carbon atoms, or an alkenyloxy group having 2 to 8 carbon atoms, preferably an alkyl group having 1 to 5 carbon atoms, an alkoxy group having 1 to 5 carbon atoms, an alkenyl group having 2 to 5 carbon atoms, or an alkenyloxy group having 2 to 5 carbon atoms, more preferably an alkyl group having 1 to 5 carbon atoms or an alkenyl group having 2 to 5 carbon atoms, still more preferably an alkyl group having 2 to 5 carbon atoms or an alkenyl group having 2 or 3 carbon atoms.

$R^{J1}$ is preferably an alkyl group when reliability is regarded as important or an alkenyl group when lower viscosity is regarded as important.

When the ring structure to which $R^{J1}$ is bonded is a phenyl group (aromatic), a linear alkyl group having 1 to 5 carbon atoms, a linear alkoxy group having 1 to 4 carbon atoms, or an alkenyl group having 4 or 5 carbon atoms is preferred. When the ring structure to which $R^{J1}$ is bonded is a saturated ring structure, such as cyclohexane, pyran, or dioxane, a linear alkyl group having 1 to 5 carbon atoms, a linear alkoxy group having 1 to 4 carbon atoms, or a linear alkenyl group having 2 to 5 carbon atoms is preferred. In order to stabilize the nematic phase, the total number of carbon atoms and, if present, oxygen atoms is preferably 5 or less, and a straight chain is preferred.

The alkenyl group is preferably selected from the groups represented by the formulae ($R^1$) to ($R^5$). (The dark dot in each formula represents a carbon atom in the ring structure to which the alkenyl group is bonded.)

[Chem. 47]

(R1)

(R2)

(R3)

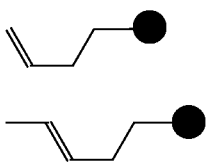

(R4)

(R5)

$A^{J1}$, $A^{J2}$, and $A^{J3}$ preferably independently represent an aromatic when an increased Δn is required, represent an aliphatic when the response speed is improved, or represent a trans-1,4-cyclohexylene group, a 1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group, they optionally being substituted with a fluorine atom, and more preferably independently represent the following structures,

[Chem. 48]

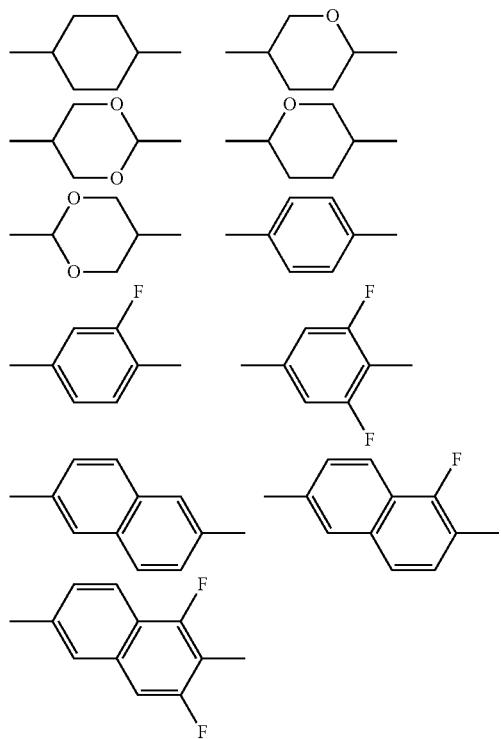

and more preferably independently represent the following structures.

[Chem. 49]

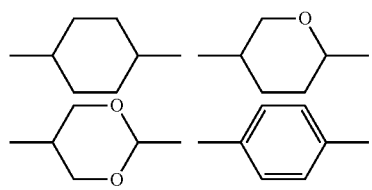

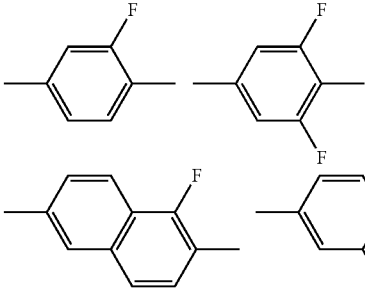

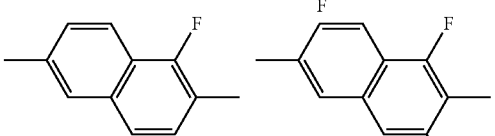

$Z^{J1}$ and $Z^{J2}$ preferably independently represent —CH$_2$O—, —OCH$_2$—, —CF$_2$O—, —CH$_2$CH$_2$—, —CF$_2$CF$_2$—, or a single bond, more preferably —OCH$_2$—, —CF$_2$O—, —CH$_2$CH$_2$—, or a single bond, particularly preferably —OCH$_2$—, —CF$_2$O—, or a single bond.

$X^{J1}$ preferably represents a fluorine atom or a trifluoromethoxy group, preferably a fluorine atom.

$n^{J1}$ is preferably 0, 1, 2, or 3, preferably 0, 1, or 2, preferably 0 or 1 when improved Δε is regarded as important, preferably 1 or 2 when Tni is regarded as important.

Although compounds of any types may be combined, these compounds are combined in a manner that depends on the desired characteristics, such as solubility at low temperatures, transition temperature, electrical reliability, and birefringence index. For example, one, two, or three compounds are used in one embodiment of the present invention. Alternatively, four, five, six, seven, or more compounds are used in another embodiment of the present invention.

The amount of a compound represented by the general formula (J) in a composition according to the present invention should be appropriately adjusted in a manner that depends on the desired characteristics, such as solubility at low temperatures, transition temperature, electrical reliability, birefringence index, process compatibility, drop marks, image-sticking, and dielectric constant anisotropy.

The lower limit of the preferred amount of a compound represented by the general formula (J) is 1%, 10%, 20%, 30%, 40%, 50%, 55%, 60%, 65%, 70%, 75%, or 80% of the total amount of a composition according to the present invention. For example, in one embodiment of the present invention, the upper limit of the preferred amount is 95%, 85%, 75%, 65%, 55%, 45%, 35%, or 25% of the total amount of a composition according to the present invention.

When a low viscosity and a high response speed are required for a composition according to the present invention, the lower limit is preferably decreased, and the upper limit is preferably decreased. When a high Tni and high temperature stability are required for a composition according to the present invention, the lower limit is preferably decreased, and the upper limit is preferably decreased. When the dielectric constant anisotropy is increased to maintain a low drive voltage, the lower limit is preferably increased, and the upper limit is preferably increased.

$R^{J1}$ is preferably an alkyl group when reliability is regarded as important or an alkenyl group when lower viscosity is regarded as important.

A compound represented by the general formula (J) is preferably a compound represented by the general formula (M) or a compound represented by the general formula (K).

A composition according to the present invention preferably contains one or two or more compounds represented by the general formula (M). These compounds correspond to dielectrically positive compounds (with Δε of more than 2).

[Chem. 50]

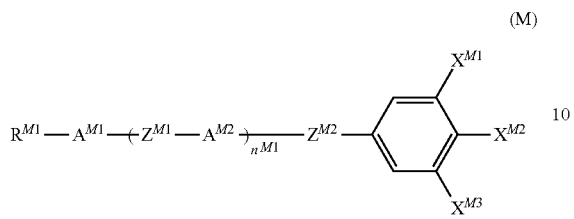

(wherein $R^{M1}$ represents an alkyl group having 1 to 8 carbon atoms, and one —$CH_2$— or two or more nonadjacent —$CH_2$—'s in the alkyl group are independently optionally substituted with —CH=CH—, —C≡C—, —O—, —CO—, —COO—, or —OCO—, $n^{M1}$ is 0, 1, 2, 3, or 4, $A^{M1}$ and $A^{M2}$ independently represent a group selected from the group consisting of (a) a 1,4-cyclohexylene group (in which one —$CH_2$— or two or more nonadjacent —$CH_2$—'s are optionally substituted with —O— or —S—), and (b) a 1,4-phenylene group (in which one —CH= or two or more nonadjacent —CH='s are optionally substituted with —N=), a hydrogen atom in the group (a) and the group (b) is independently optionally substituted with a cyano group, a fluorine atom, or a chlorine atom, $Z^{M1}$ and $Z^{M2}$ independently represent a single bond, —$CH_2CH_2$—, —$(CH_2)_4$—, —$OCH_2$—, —$CH_2O$—, —$OCF_2$—, —$CF_2O$—, —COO—, —OCO—, or —C≡C—, if $n^{M1}$ is 2, 3, or 4, a plurality of $A^{M2}$s may be the same or different, and if $n^{M1}$ is 2, 3, or 4, a plurality of $Z^{M1}$s may be the same or different, $X^{M1}$ and $X^{M3}$ independently represent a hydrogen atom, a chlorine atom, or a fluorine atom, and $X^{M2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group)

In the general formula (M), $R^{M1}$ preferably represents an alkyl group having 1 to 8 carbon atoms, an alkoxy group having 1 to 8 carbon atoms, an alkenyl group having 2 to 8 carbon atoms, or an alkenyloxy group having 2 to 8 carbon atoms, preferably an alkyl group having 1 to 5 carbon atoms, an alkoxy group having 1 to 5 carbon atoms, an alkenyl group having 2 to 5 carbon atoms, or an alkenyloxy group having 2 to 5 carbon atoms, more preferably an alkyl group having 1 to 5 carbon atoms or an alkenyl group having 2 to 5 carbon atoms, still more preferably an alkyl group having 2 to 5 carbon atoms or an alkenyl group having 2 or 3 carbon atoms.

$R^{M1}$ is preferably an alkyl group when reliability is regarded as important or an alkenyl group when lower viscosity is regarded as important.

When the ring structure to which $R^{M1}$ is bonded is a phenyl group (aromatic), $R^{M1}$ preferably represents a linear alkyl group having 1 to 5 carbon atoms, a linear alkoxy group having 1 to 4 carbon atoms, or an alkenyl group having 4 or 5 carbon atoms. When the ring structure to which $R^{M1}$ is bonded is a saturated ring structure, such as cyclohexane, pyran, or dioxane, $R^{M1}$ preferably represents a linear alkyl group having 1 to 5 carbon atoms, a linear alkoxy group having 1 to 4 carbon atoms, or a linear alkenyl group having 2 to 5 carbon atoms. In order to stabilize the nematic phase, the total number of carbon atoms and, if present, oxygen atoms is preferably 5 or less, and a straight chain is preferred.

The alkenyl group is preferably selected from the groups represented by the formulae ($R^1$) to ($R^5$). (The dark dot in each formula represents a carbon atom in the ring structure to which the alkenyl group is bonded.)

[Chem. 51]

 (R1)

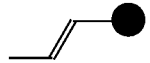 (R2)

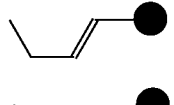 (R3)

 (R4)

 (R5)

$A^{M1}$ and $A^{M2}$ preferably independently represent an aromatic when an increased Δn is required, represent an aliphatic when the response speed is improved, represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group, more preferably independently represent the following structures,

[Chem. 52]

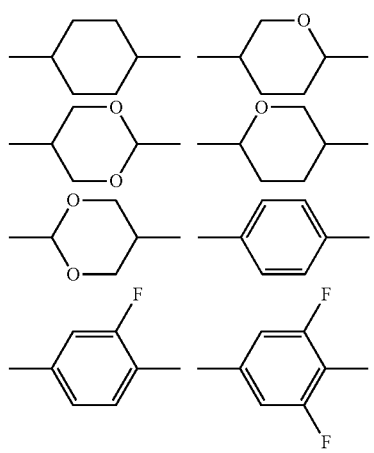

and more preferably independently represent the following structures.

[Chem. 53]

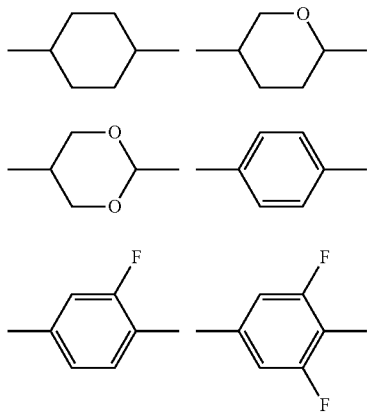

$Z^{M1}$ and $Z^{M2}$ preferably independently represent —CH$_2$O—, —CF$_2$O—, —CH$_2$CH$_2$—, —CF$_2$CF$_2$—, or a single bond, more preferably —CF$_2$O—, —CH$_2$CH$_2$—, or a single bond, particularly preferably —CF$_2$O— or a single bond.

$n^{M1}$ is preferably 0, 1, 2, or 3, preferably 0, 1, or 2, preferably 0 or 1 when improved Δε is regarded as important, preferably 1 or 2 when Tni is regarded as important.

Although compounds of any types may be combined, these compounds are combined in a manner that depends on the desired characteristics, such as solubility at low temperatures, transition temperature, electrical reliability, and birefringence index. For example, one, two, or three compounds are used in one embodiment of the present invention. Alternatively, four, five, six, seven, or more compounds are used in another embodiment of the present invention.

The amount of a compound represented by the formula (M) in a liquid crystal composition according to the present invention should be appropriately adjusted in a manner that depends on the desired characteristics, such as solubility at low temperatures, transition temperature, electrical reliability, birefringence index, process compatibility, drop marks, image-sticking, and dielectric constant anisotropy.

The lower limit of the preferred amount of a compound represented by the formula (M) is 1%, 10%, 20%, 30%, 40%, 50%, 55%, 60%, 65%, 70%, 75%, or 80% of the total amount of a composition according to the present invention. For example, in one embodiment of the present invention, the upper limit of the preferred amount is 95%, 85%, 75%, 65%, 55%, 45%, 35%, or 25% of the total amount of a composition according to the present invention.

When a low viscosity and a high response speed are required for a composition according to the present invention, the lower limit is preferably decreased, and the upper limit is preferably decreased. When a high Tni and high temperature stability are required for a composition according to the present invention, the lower limit is preferably decreased, and the upper limit is preferably decreased. When the dielectric constant anisotropy is increased to maintain a low drive voltage, the lower limit is preferably increased, and the upper limit is preferably increased.

A compound represented by the general formula (M) is preferably a compound selected from the compound group represented by the general formula (M-1), for example.

[Chem. 54]

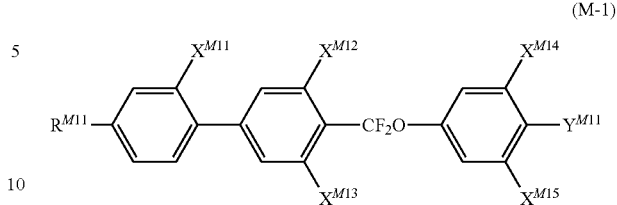

(M-1)

(wherein $R^{M11}$ represents an alkyl group having 1 to 5 carbon atoms, an alkenyl group having 2 to 5 carbon atoms, or an alkoxy group having 1 to 4 carbon atoms, $X^{M11}$ to $X^{M15}$ independently represent a hydrogen atom or a fluorine atom, and $Y^{M11}$ represents a fluorine atom or OCF$_3$)

Although compounds of any types may be combined, these compounds are combined in a manner that depends on the desired characteristics, such as solubility at low temperatures, transition temperature, electrical reliability, and birefringence index. For example, one, two, three, or more compounds are used in one embodiment of the present invention.

The lower limit of the preferred amount of a compound represented by the formula (M-1) is 1%, 2%, 5%, 8%, 10%, 13%, 15%, 18%, 20%, 22%, 25%, or 30% of the total amount of a composition according to the present invention. The upper limit of the preferred amount is 30%, 28%, 25%, 23%, 20%, 18%, 15%, 13%, 10%, 8%, or 5%.

When a low viscosity and a high response speed are required for a composition according to the present invention, the lower limit is preferably decreased, and the upper limit is preferably decreased. When a high Tni and high temperature stability are required for a composition according to the present invention, the lower limit is preferably decreased, and the upper limit is preferably decreased. When the dielectric constant anisotropy is increased to maintain a low drive voltage, the lower limit is preferably increased, and the upper limit is preferably increased.

More specifically, a compound represented by the general formula (M-1) is preferably a compound represented by one of the formulae (M-1.1) to (M-1.4), preferably the compound represented by the formula (M-1.1) or (M-1.2), more preferably the compound represented by the formula (M-1.2). It is also preferable to use the compounds represented by the formulae (M-1.1) and (M-1.2) in combination.

[Chem. 55]

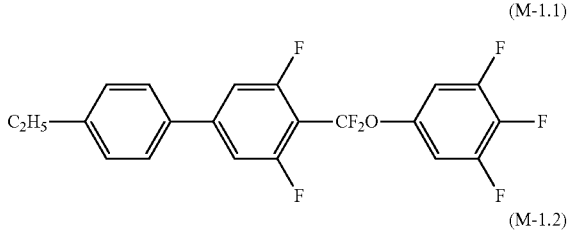

(M-1.1)

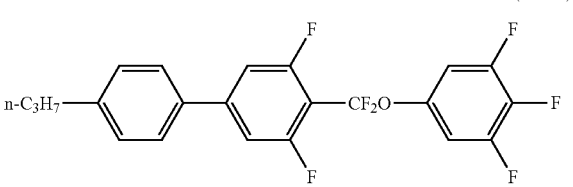

(M-1.2)

-continued (M-1.3)

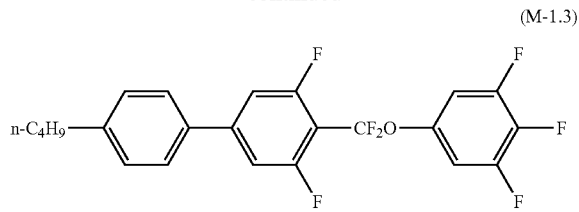

(M-1.4)

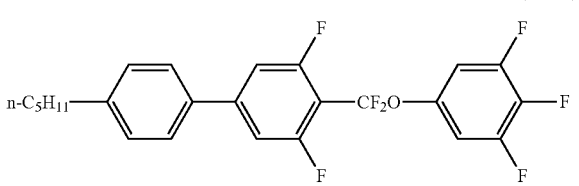

The lower limit of the preferred amount of the compound represented by the formula (M-1.1) is 1%, 2%, 5%, or 6% of the total amount of a composition according to the present invention. The upper limit of the preferred amount is 15%, 13%, 10%, 8%, or 5%.

The lower limit of the preferred amount of the compound represented by the formula (M-1.2) is 1%, 2%, 5%, or 6% of the total amount of a composition according to the present invention. The upper limit of the preferred amount is 30%, 25%, 23%, 20%, 18%, 15%, 13%, 10%, or 8%.

The lower limit of the preferred total amount of the compounds represented by the formulae (M-1.1) and (M-1.2) is 1%, 2%, 5%, or 6% of the total amount of a composition according to the present invention. The upper limit of the preferred amount is 30%, 25%, 23%, 20%, 18%, 15%, 13%, 10%, or 8%.

A compound represented by the general formula (M) is preferably a compound selected from the compound group represented by the general formula (M-2), for example.

[Chem. 56]

(M-2)

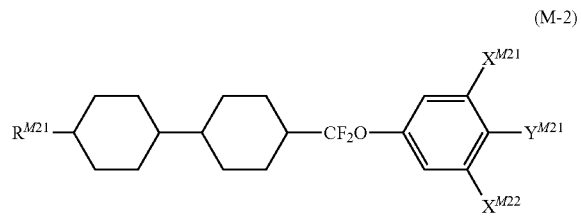

(wherein $R^{M21}$ represents an alkyl group having 1 to 5 carbon atoms, an alkenyl group having 2 to 5 carbon atoms, or an alkoxy group having 1 to 4 carbon atoms, $X^{M21}$ and $X^{M22}$ independently represent a hydrogen atom or a fluorine atom, and $Y^{M21}$ represents a fluorine atom, a chlorine atom, or $OCF_3$.)

The lower limit of the preferred amount of a compound represented by the formula (M-2) is 1%, 2%, 5%, 8%, 10%, 13%, 15%, 18%, 20%, 22%, 25%, or 30% of the total amount of a composition according to the present invention. The upper limit of the preferred amount is 30%, 28%, 25%, 23%, 20%, 18%, 15%, 13%, 10%, 8%, or 5%.

When a low viscosity and a high response speed are required for a composition according to the present invention, the lower limit is preferably decreased, and the upper limit is preferably decreased. When a high Tni and resistance to image-sticking are required for a composition according to the present invention, the lower limit is preferably decreased, and the upper limit is preferably decreased. When the dielectric constant anisotropy is increased to maintain a low drive voltage, the lower limit is preferably increased, and the upper limit is preferably increased.

A compound represented by the general formula (M-2) is preferably a compound represented by one of the formulae (M-2.1) to (M-2.5), preferably the compound represented by the formula (M-2.3) or/and (M-2.5).

[Chem. 57]

(M-2.1)

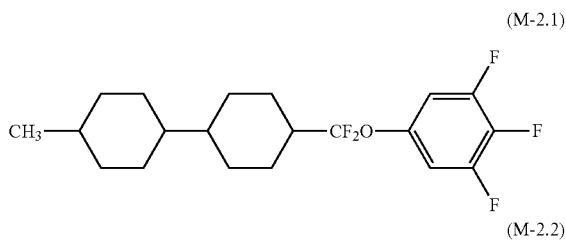

(M-2.2)

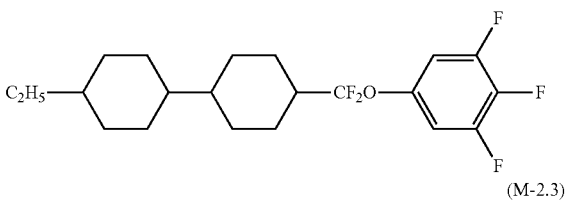

(M-2.3)

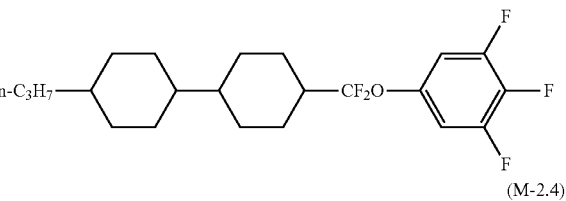

(M-2.4)

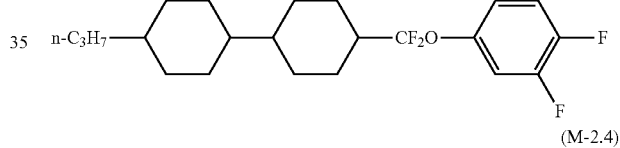

(M-2.5)

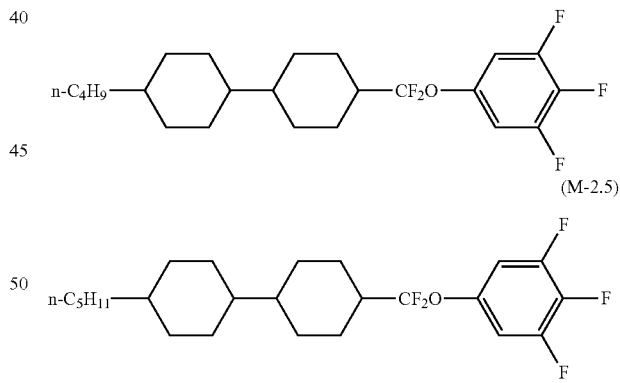

The lower limit of the preferred amount of the compound represented by the formula (M-2.2) is 1%, 2%, 5%, or 6% of the total amount of a composition according to the present invention. The upper limit of the preferred amount is 15%, 13%, 10%, 8%, or 5%.

The lower limit of the preferred amount of the compound represented by the formula (M-2.3) is 1%, 2%, 5%, or 6% of the total amount of a composition according to the present invention. The upper limit of the preferred amount is 30%, 25%, 23%, 20%, 18%, 15%, 13%, 10%, or 8%.

The lower limit of the preferred amount of the compound represented by the formula (M-2.5) is 1%, 2%, 5%, or 6% of the total amount of a composition according to the present invention. The upper limit of the preferred amount is 30%, 25%, 23%, 20%, 18%, 15%, 13%, 10%, or 8%.

The lower limit of the preferred total amount of the compounds represented by the formulae (M-2.2), (M-2.3), and (M-2.5) is 1%, 2%, 5%, or 6% of the total amount of a composition according to the present invention. The upper limit of the preferred amount is 30%, 25%, 23%, 20%, 18%, 15%, 13%, 10%, or 8%.

The amount is preferably 1% or more, more preferably 5% or more, still more preferably 8% or more, still more preferably 10% or more, still more preferably 14% or more, particularly preferably 16% or more, of the total amount of a composition according to the present invention. Considering solubility at low temperatures, transition temperature, and electrical reliability, the maximum ratio is preferably 30% or less, more preferably 25% or less, still more preferably 22% or less, particularly preferably less than 20%.

A compound represented by the general formula (M) for use in a composition according to the present invention is preferably a compound represented by the general formula (M-3).

[Chem. 58]

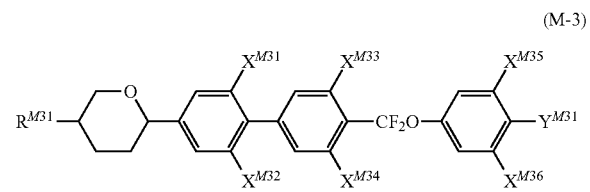

(M-3)

(wherein $R^{M31}$ represents an alkyl group having 1 to 5 carbon atoms, an alkenyl group having 2 to 5 carbon atoms, or an alkoxy group having 1 to 4 carbon atoms, $X^{M31}$ to $X^{M36}$ independently represent a hydrogen atom or a fluorine atom, and $Y^{M31}$ represents a fluorine atom, a chlorine atom, or $OCF_3$)

Although any compounds may be combined, one or two or more compounds are preferably combined in consideration of solubility at low temperatures, transition temperature, electrical reliability, and birefringence index.

The amount of a compound represented by the general formula (M-3) has the upper limit and the lower limit in each embodiment in consideration of characteristics, such as solubility at low temperatures, transition temperature, electrical reliability, and birefringence index.

The lower limit of the preferred amount of a compound represented by the formula (M-3) is 1%, 2%, 4%, 5%, 8%, 10%, 13%, 15%, 18%, or 20% of the total amount of a composition according to the present invention. The upper limit of the preferred amount is 20%, 18%, 15%, 13%, 10%, 8%, or 5%.

More specifically, a compound represented by the general formula (M-3) for use in a composition according to the present invention is preferably a compound represented by one of the formulae (M-3.1) to (M-3.4) and particularly preferably contains the compounds represented by the formulae (M-3.1) and/or (M-3.2).

[Chem. 59]

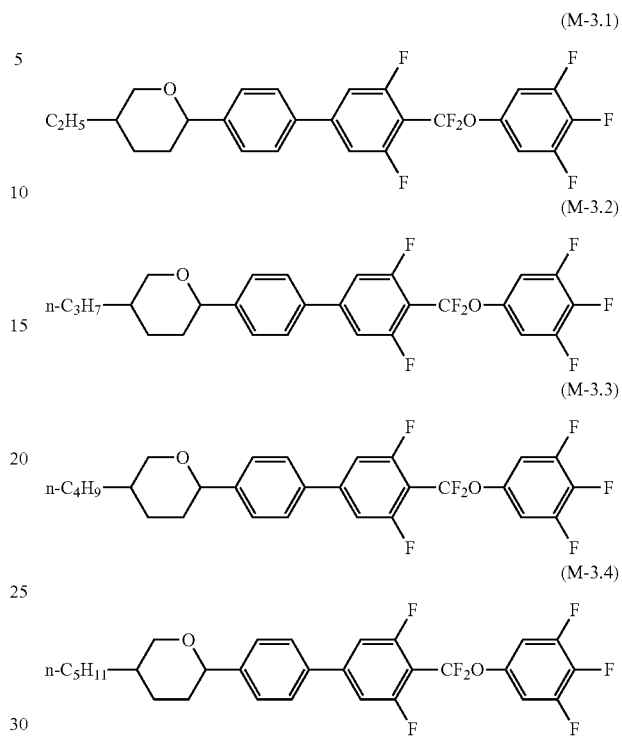

The lower limit of the preferred amount of the compound represented by the formula (M-3.1) is 1%, 2%, 4%, 5%, 8%, 10%, 13%, 15%, 18%, or 20% of the total amount of a composition according to the present invention. The upper limit of the preferred amount is 20%, 18%, 15%, 13%, 10%, 8%, or 5%.

The lower limit of the preferred amount of the compound represented by the formula (M-3.2) is 1%, 2%, 4%, 5%, 8%, 10%, 13%, 15%, 18%, or 20% of the total amount of a composition according to the present invention. The upper limit of the preferred amount is 20%, 18%, 15%, 13%, 10%, 8%, or 5%.

The lower limit of the preferred total amount of the compounds represented by the formulae (M-3.1) and (M-3.2) is 1%, 2%, 4%, 5%, 8%, 10%, 13%, 15%, 18%, or 20% of the total amount of a composition according to the present invention. The upper limit of the preferred amount is 20%, 18%, 15%, 13%, 10%, 8%, or 5%.

A compound represented by the general formula (M) is preferably a compound selected from the group represented by the general formula (M-4).

[Chem. 60]

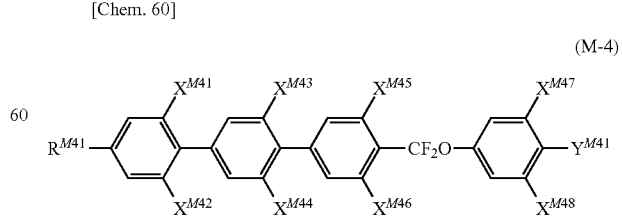

(wherein $R^{M41}$ represents an alkyl group having 1 to 5 carbon atoms, an alkenyl group having 2 to 5 carbon atoms, or an alkoxy group having 1 to 4 carbon atoms, $X^{M41}$ to $X^{M48}$ independently represent a fluorine atom or a hydrogen atom, and $Y^{M41}$ represents a fluorine atom, a chlorine atom, or $OCF_3$)

Although any compounds may be combined, one, two, three, or more compounds are preferably combined in consideration of solubility at low temperatures, transition temperature, electrical reliability, and birefringence index.

The amount of a compound represented by the general formula (M-4) has the upper limit and the lower limit in each embodiment in consideration of characteristics, such as solubility at low temperatures, transition temperature, electrical reliability, and birefringence index.

The lower limit of the preferred amount of a compound represented by the formula (M-4) is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

When a composition according to the present invention is used in liquid crystal display devices with small cell gaps, the amount of a compound represented by the general formula (M-4) is preferably increased. When a composition according to the present invention is used in liquid crystal display devices with low drive voltages, the amount of a compound represented by the general formula (M-4) is preferably increased. When a composition according to the present invention is used in liquid crystal display devices used in low-temperature environments, the amount of a compound represented by the general formula (M-4) is preferably decreased. When a composition according to the present invention is used in liquid crystal display devices with high response speeds, the amount of a compound represented by the general formula (M-4) is preferably decreased.

More specifically, a compound represented by the general formula (M-4) for use in a composition according to the present invention is preferably a compound represented by one of the formulae (M-4.1) to (M-4.4) and preferably contains a compound represented by one of the formulae (M-4.2) to (M-4.4), more preferably the compound represented by the formula (M-4.2).

[Chem. 61]

(M-4.1)

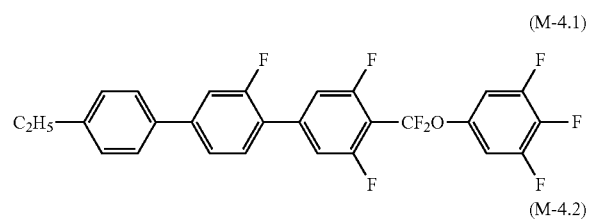

(M-4.2)

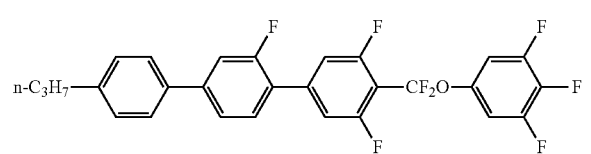

(M-4.3)

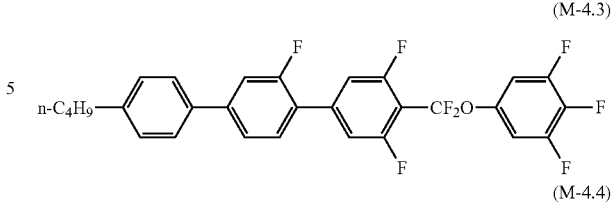

(M-4.4)

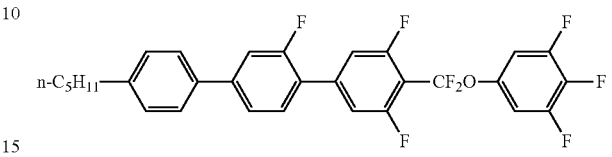

A compound represented by the general formula (M) is preferably a compound represented by the general formula (M-5).

[Chem. 62]

(M-5)

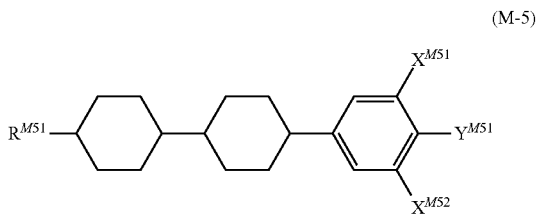

(wherein $R^{M51}$ represents an alkyl group having 1 to 5 carbon atoms, an alkenyl group having 2 to 5 carbon atoms, or an alkoxy group having 1 to 4 carbon atoms, $X^{M51}$ and $X^{M52}$ independently represent a hydrogen atom or a fluorine atom, and $Y^{M51}$ represents a fluorine atom, a chlorine atom, or $OCF_3$)

Although compounds of any types may be combined, compounds are appropriately combined in each embodiment in consideration of solubility at low temperatures, transition temperature, electrical reliability, and birefringence index. For example, one compound is used in one embodiment of the present invention, two compounds are combined in another embodiment, three compounds are combined in still another embodiment, four compounds are combined in still another embodiment, five compounds are combined in still another embodiment, and at least six compounds are combined in still another embodiment.

The lower limit of the preferred amount of a compound represented by the formula (M-5) is 1%, 2%, 5%, 8%, 10%, 13%, 15%, 18%, 20%, 22%, 25%, or 30% of the total amount of a composition according to the present invention. The upper limit of the preferred amount is 50%, 45%, 40%, 35%, 33%, 30%, 28%, 25%, 23%, 20%, 18%, 15%, 13%, 10%, 8%, or 5%.

When a low viscosity and a high response speed are required for a composition according to the present invention, the lower limit is preferably decreased, and the upper limit is preferably decreased. When a high Tni and resistance to image-sticking are required for a composition according to the present invention, the lower limit is preferably decreased, and the upper limit is preferably decreased. When the dielectric constant anisotropy is increased to maintain a low drive voltage, the lower limit is preferably increased, and the upper limit is preferably increased.

A compound represented by the general formula (M-5) is preferably a compound represented by one of the formulae (M-5.1) to (M-5.4).

[Chem. 63]

(M-5.1)
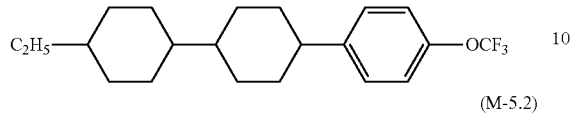

(M-5.2)
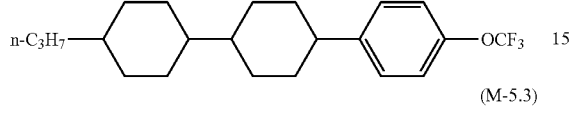

(M-5.3)
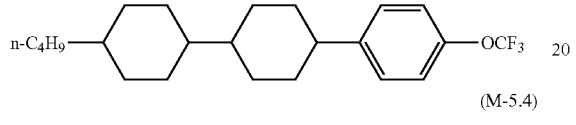

(M-5.4)

The lower limit of the preferred amount of these compounds is 1%, 2%, 5%, 8%, 10%, 13%, or 15% of the total amount of a composition according to the present invention. The upper limit of the preferred amount is 30%, 28%, 25%, 23%, 20%, 18%, 15%, 13%, 10%, 8%, or 5%.

A compound represented by the general formula (M-5) is preferably a compound represented by one of the formulae (M-5.11) to (M-5.17), preferably a compound represented by one of the formulae (M-5.11), (M-5.13), and (M-5.17).

[Chem. 64]

(M-5.11)
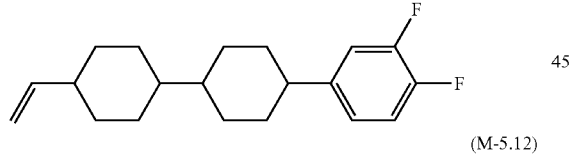

(M-5.12)
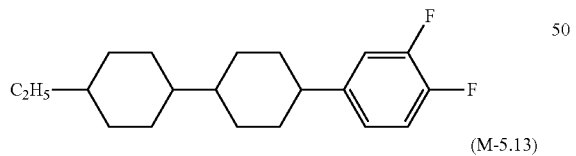

(M-5.13)
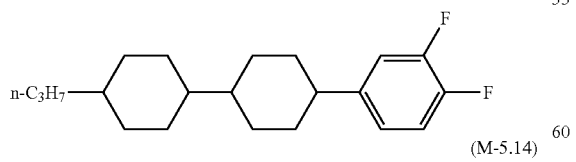

(M-5.14)
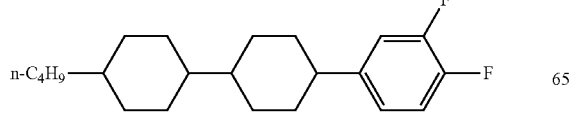

(M-5.15)
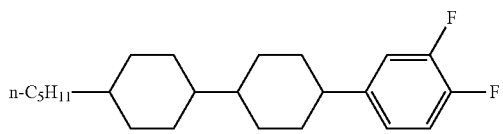

(M-5.16)
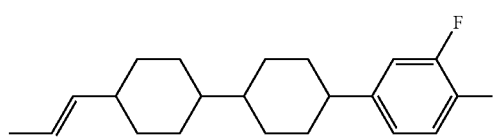

(M-5.17)
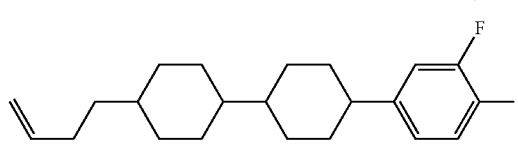

The lower limit of the preferred amount of these compounds is 1%, 2%, 5%, 8%, 10%, 13%, or 15% of the total amount of a composition according to the present invention. The upper limit of the preferred amount is 30%, 28%, 25%, 23%, 20%, 18%, 15%, 13%, 10%, 8%, or 5%.

A compound represented by the general formula (M-5) is preferably a compound represented by one of the formulae (M-5.21) to (M-5.28), preferably a compound represented by one of the formulae (M-5.21), (M-5.22), (M-5.23), and (M-5.25).

[Chem. 65]

(M-5.21)
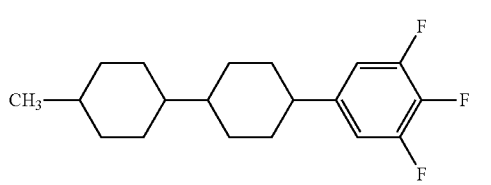

(M-5.22)
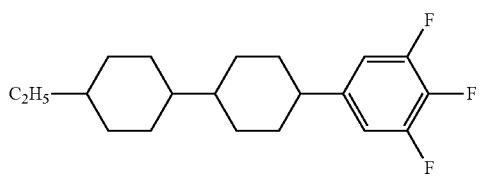

(M-5.23)
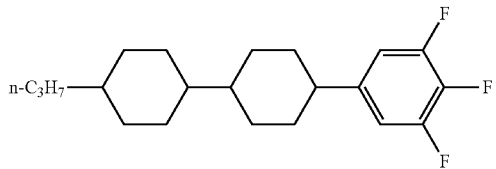

(M-5.24)

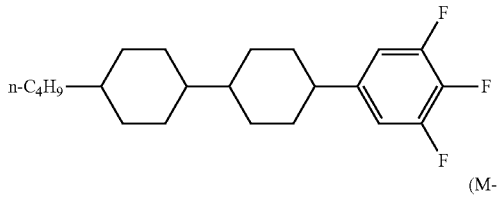

(M-5.25)

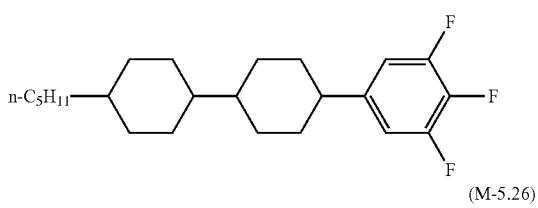

(M-5.26)

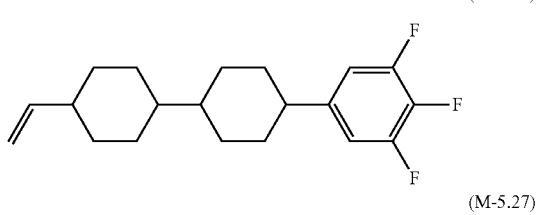

(M-5.27)

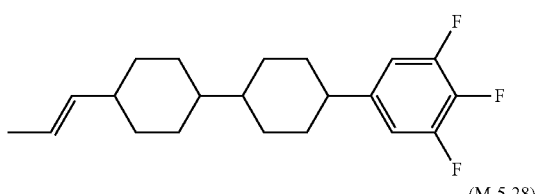

(M-5.28)

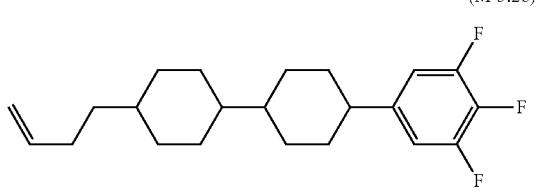

The lower limit of the preferred amount of these compounds is 1%, 2%, 5%, 8%, 10%, 13%, 15%, 18%, 20%, 22%, 25%, or 30% of the total amount of a composition according to the present invention. The upper limit of the preferred amount is 40%, 35%, 33%, 30%, 28%, 25%, 23%, 20%, 18%, 15%, 13%, 10%, 8%, or 5%.

A compound represented by the general formula (M) is preferably a compound represented by the general formula (M-6).

[Chem. 66]

(M-6)

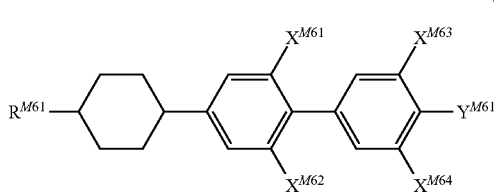

(wherein $R^{M61}$ represents an alkyl group having 1 to 5 carbon atoms, an alkenyl group having 2 to 5 carbon atoms, or an alkoxy group having 1 to 4 carbon atoms, $X^{M61}$ to $X^{M64}$ independently represent a fluorine atom or a hydrogen atom, and $Y^{M61}$ represents a fluorine atom, a chlorine atom, or $OCF_3$)

Although compounds of any types may be combined, compounds are appropriately combined in each embodiment in consideration of solubility at low temperatures, transition temperature, electrical reliability, and birefringence index.

The lower limit of the preferred amount of a compound represented by the formula (M-6) is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

When a composition according to the present invention is used in liquid crystal display devices with low drive voltages, the amount of a compound represented by the general formula (M-6) is preferably increased. When a composition according to the present invention is used in liquid crystal display devices with high response speeds, the amount of a compound represented by the general formula (M-6) is preferably decreased.

More specifically, a compound represented by the general formula (M-6) is preferably a compound represented by one of the formulae (M-6.1) to (M-6.4) and particularly preferably contains the compound represented by the formula (M-6.2) or (M-6.4).

[Chem. 67]

(M-6.1)

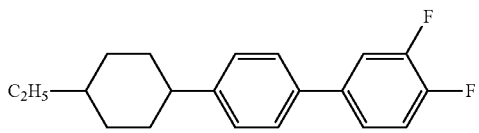

(M-6.2)

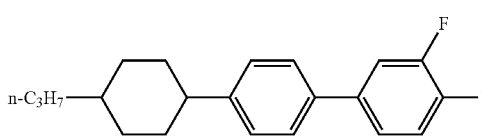

(M-6.3)

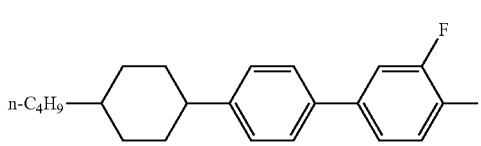

(M-6.4)

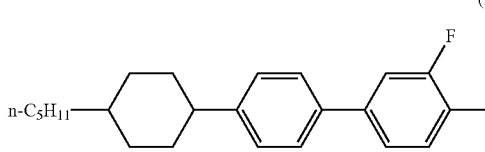

The lower limit of the preferred amount of these compounds is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

More specifically, a compound represented by the general formula (M-6) is preferably a compound represented by one of the formulae (M-6.11) to (M-6.14) and particularly preferably contains the compound represented by the formula (M-6.12) or (M-6.14).

[Chem. 68]

(M-6.11)
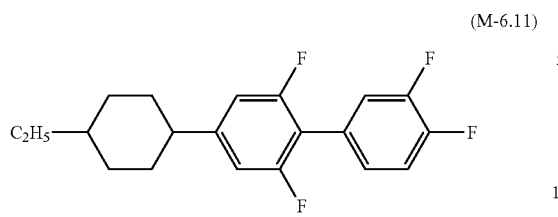

(M-6.12)

(M-6.13)
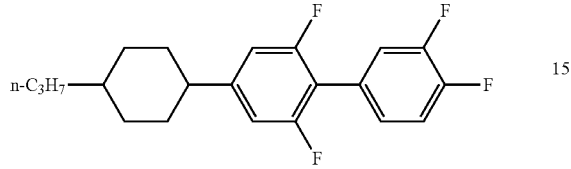

(M-6.14)
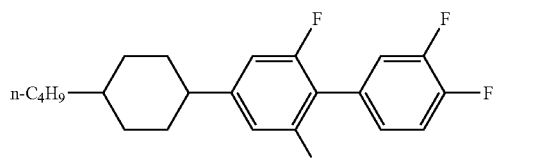

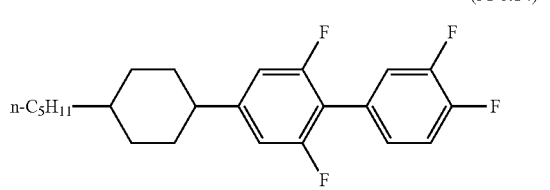

The lower limit of the preferred amount of these compounds is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

More specifically, a compound represented by the general formula (M-6) is preferably a compound represented by one of the formulae (M-6.21) to (M-6.24) and particularly preferably contains the compound represented by the formula (M-6.21), (M-6.22), or (M-6.24).

[Chem. 69]

(M-6.21)
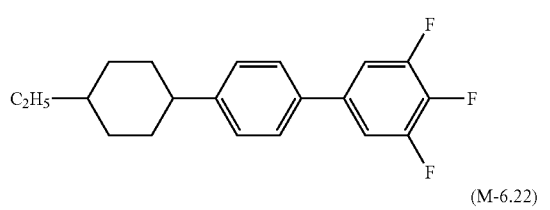

(M-6.22)
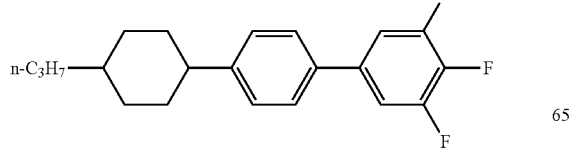

(M-6.23)
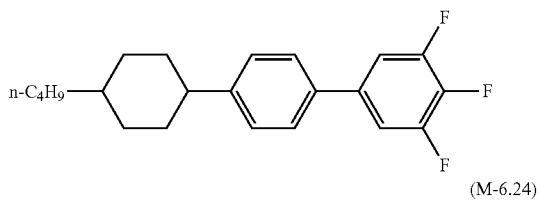

(M-6.24)
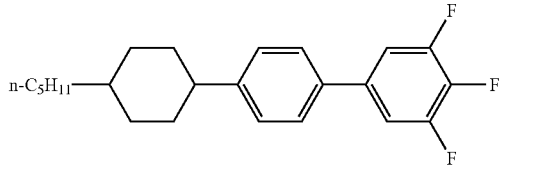

The lower limit of the preferred amount of these compounds is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

More specifically, a compound represented by the general formula (M-6) is preferably a compound represented by one of the formulae (M-6.31) to (M-6.34). In particular, the compounds represented by the formulae (M-6.31) and (M-6.32) are preferably contained.

[Chem. 70]

(M-6.31)
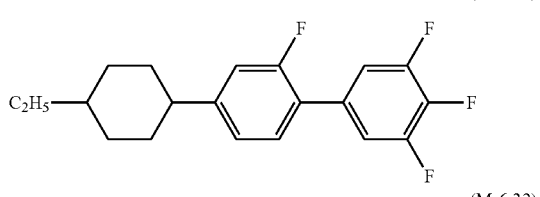

(M-6.32)
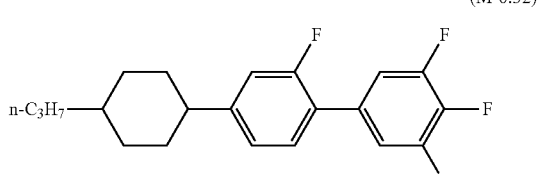

(M-6.33)
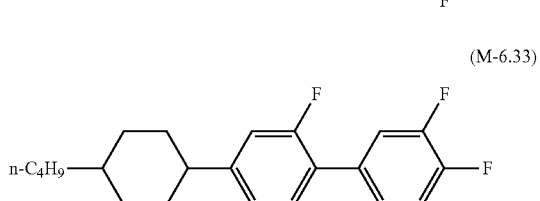

(M-6.34)
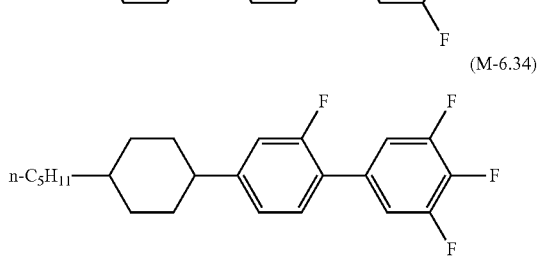

The lower limit of the preferred amount of these compounds is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

More specifically, a compound represented by the general formula (M-6) is preferably a compound represented by one of the formulae (M-6.41) to (M-6.44) and particularly preferably contains the compound represented by the formula (M-6.42).

[Chem. 71]

(M-6.41)

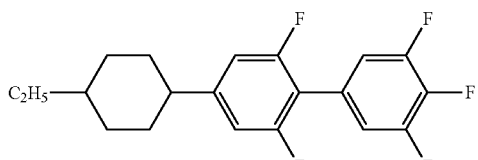

(M-6.42)

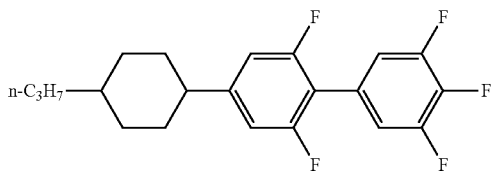

(M-6.43)

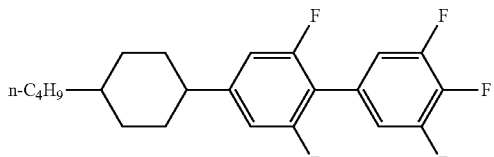

(M-6.44)

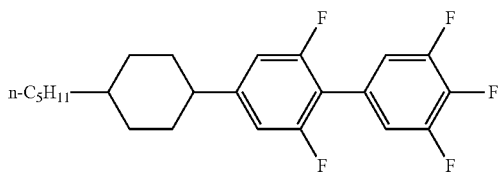

The lower limit of the preferred amount of these compounds is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

A compound represented by the general formula (M) is preferably a compound selected from the compound group represented by the general formula (M-7).

[Chem. 72]

(M-7)

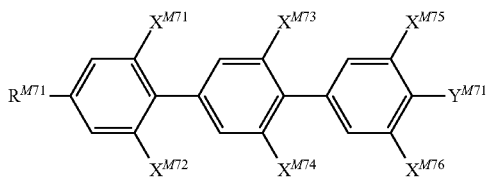

(wherein $X^{M71}$ to $X^{M76}$ independently represent a fluorine atom or a hydrogen atom, $R^{M71}$ represents an alkyl group having 1 to 5 carbon atoms, an alkenyl group having 2 to 5 carbon atoms, or an alkoxy group having 1 to 4 carbon atoms, and $Y^{M71}$ represents a fluorine atom or $OCF_3$)

Although compounds of any types may be combined, one or two of these compounds are preferably contained, one to three of these compounds are more preferably contained, and one to four of these compounds are still more preferably contained.

The amount of a compound represented by the general formula (M-7) has the upper limit and the lower limit in each embodiment in consideration of characteristics, such as solubility at low temperatures, transition temperature, electrical reliability, and birefringence index.

The lower limit of the preferred amount of a compound represented by the formula (M-7) is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

When a composition according to the present invention is used in liquid crystal display devices with small cell gaps, the amount of a compound represented by the general formula (M-7) is preferably increased. When a composition according to the present invention is used in liquid crystal display devices with low drive voltages, the amount of a compound represented by the general formula (M-7) is preferably increased. When a composition according to the present invention is used in liquid crystal display devices used in low-temperature environments, the amount of a compound represented by the general formula (M-7) is preferably decreased. When a composition according to the present invention is used in liquid crystal display devices with high response speeds, the amount of a compound represented by the general formula (M-7) is preferably decreased.

A compound represented by the general formula (M-7) is preferably a compound represented by one of the formulae (M-7.1) to (M-7.4), preferably the compound represented by the formula (M-7.2).

[Chem. 73]

(M-7.1)

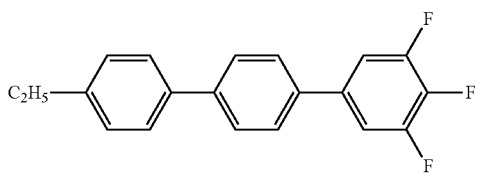

-continued (M-7.2)

n-C₃H₇—[benzene]—[benzene]—[benzene with 3,4,5-triF]

(M-7.3)

n-C₄H₉—[benzene]—[benzene]—[benzene with 3,4,5-triF]

(M-7.4)

n-C₅H₁₁—[benzene]—[benzene]—[benzene with 3,4,5-triF]

The lower limit of the preferred amount of these compounds is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

A compound represented by the general formula (M-7) is preferably a compound represented by one of the formulae (M-7.11) to (M-7.14), preferably the compound represented by the formula (M-7.11) or (M-7.12).

[Chem. 74]

(M-7.11)

C₂H₅—[benzene]—[2-F benzene]—[3,4,5-triF benzene]

(M-7.12)

n-C₃H₇—[benzene]—[2-F benzene]—[3,4,5-triF benzene]

(M-7.13)

n-C₄H₉—[benzene]—[2-F benzene]—[3,4,5-triF benzene]

(M-7.14)

n-C₅H₁₁—[benzene]—[2-F benzene]—[3,4,5-triF benzene]

The lower limit of the preferred amount of these compounds is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

A compound represented by the general formula (M-7) is preferably a compound represented by one of the formulae (M-7.21) to (M-7.24), preferably the compound represented by the formula (M-7.21) or (M-7.22).

[Chem. 75]

(M-7.21)

C₂H₅—[benzene]—[2,6-diF benzene]—[3,4,5-triF benzene]

(M-7.22)

n-C₃H₇—[benzene]—[2,6-diF benzene]—[3,4,5-triF benzene]

(M-7.23)

n-C₄H₉—[benzene]—[2,6-diF benzene]—[3,4,5-triF benzene]

(M-7.24)

n-C₅H₁₁—[benzene]—[2,6-diF benzene]—[3,4,5-triF benzene]

The lower limit of the preferred amount of these compounds is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

A compound represented by the general formula (M) is preferably a compound represented by the general formula (M-8).

[Chem. 76]

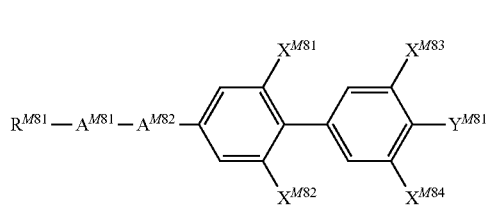

(M-8)

(wherein $X^{M82}$ to $X^{M84}$ independently represent a fluorine atom or a hydrogen atom, $Y^{M81}$ represents a fluorine atom, a chlorine atom, or —$OCF_3$, $R^{M81}$ represents an alkyl group having 1 to 5 carbon atoms, an alkenyl group having 2 to 5 carbon atoms, or an alkoxy group having 1 to 4 carbon atoms, $A^{M81}$ and $A^{M82}$ independently represent a 1,4-cyclohexylene group, a 1,4-phenylene group, or

[Chem. 77]

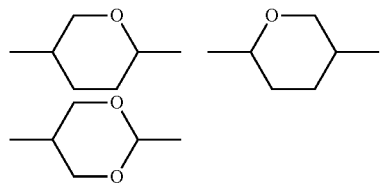

and a hydrogen atom in the 1,4-phenylene group is optionally substituted with a fluorine atom)

The lower limit of the preferred amount of a compound represented by the general formula (M-8) is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

When a low viscosity and a high response speed are required for a composition according to the present invention, the lower limit is preferably decreased, and the upper limit is preferably decreased. When a composition with resistance to image-sticking is required, the lower limit is preferably decreased, and the upper limit is preferably decreased. When the dielectric constant anisotropy is increased to maintain a low drive voltage, the lower limit is preferably increased, and the upper limit is preferably increased.

More specifically, a compound represented by the general formula (M-8) for use in a composition according to the present invention is preferably a compound represented by one of the formulae (M-8.1) to (M-8.4) and particularly preferably contains the compound represented by the formula (M-8.1) or (M-8.2).

[Chem. 78]

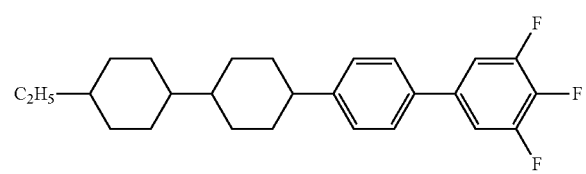

(M-8.1)

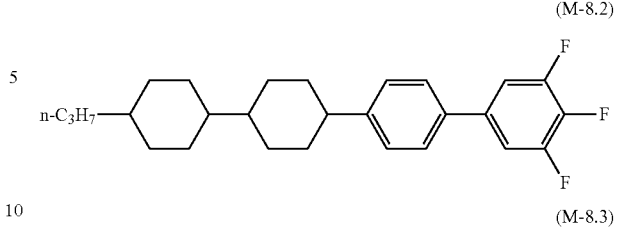

(M-8.2)

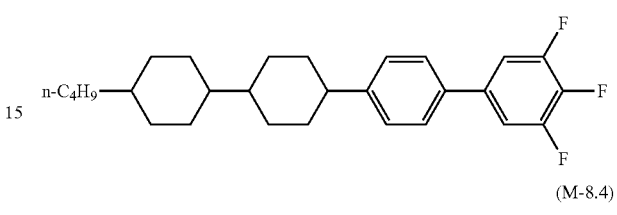

(M-8.3)

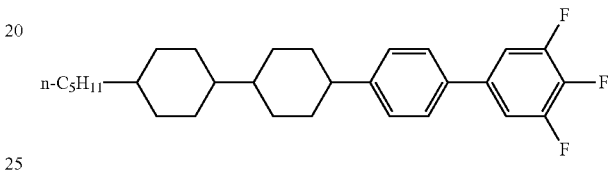

(M-8.4)

The lower limit of the preferred amount of these compounds is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

More specifically, a compound represented by the general formula (M-8) for use in a composition according to the present invention is preferably a compound represented by one of the formulae (M-8.11) to (M-8.14) and particularly preferably contains the compound represented by the formula (M-8.12).

[Chem. 79]

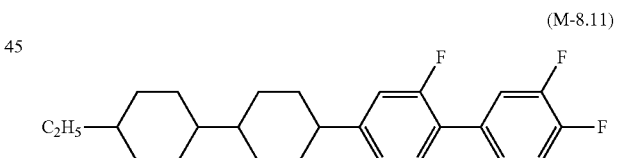

(M-8.11)

(M-8.12)

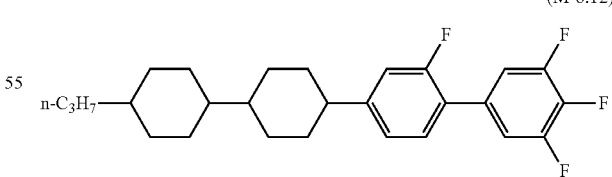

(M-8.13)

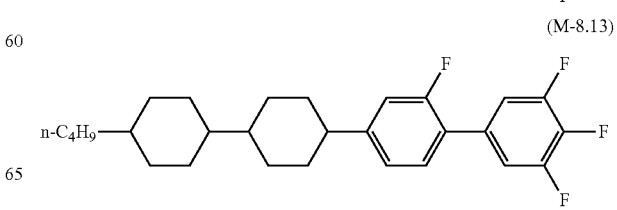

-continued (M-8.14)
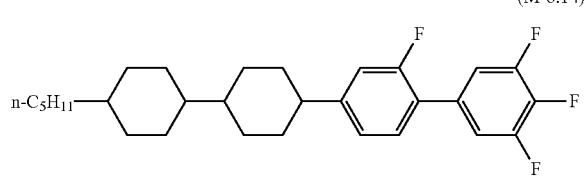

The lower limit of the preferred amount of these compounds is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

More specifically, a compound represented by the general formula (M-8) for use in a composition according to the present invention is preferably a compound represented by one of the formulae (M-8.21) to (M-8.24) and particularly preferably contains the compound represented by the formula (M-8.22).

[Chem. 80]

(M-8.21)
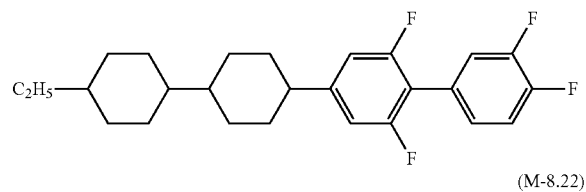

(M-8.22)
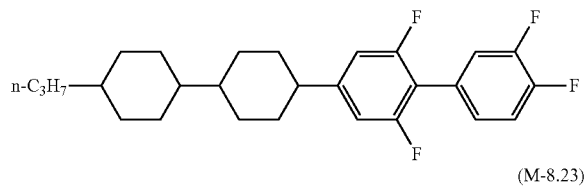

(M-8.23)
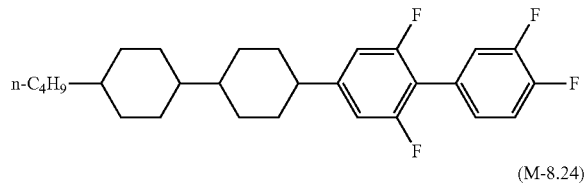

(M-8.24)
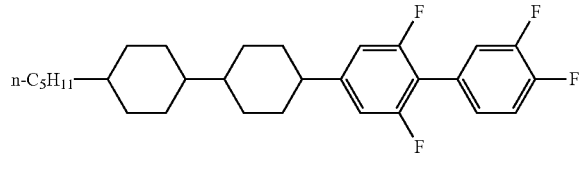

The lower limit of the preferred amount of these compounds is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

More specifically, a compound represented by the general formula (M-8) for use in a composition according to the present invention is preferably a compound represented by one of the formulae (M-8.31) to (M-8.34) and particularly preferably contains the compound represented by the formula (M-8.32).

[Chem. 81]

(M-8.31)
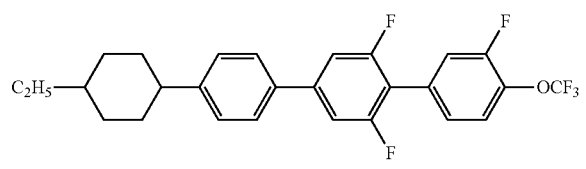

(M-8.32)
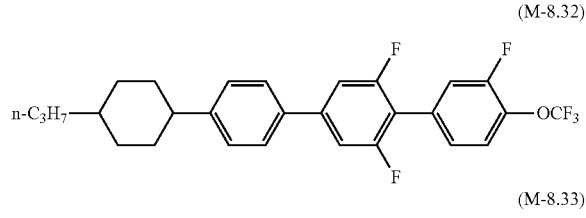

(M-8.33)
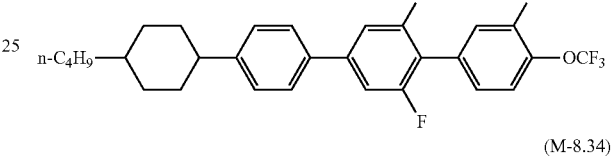

(M-8.34)
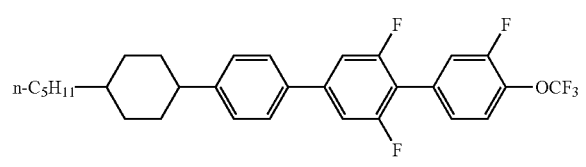

The lower limit of the preferred amount of these compounds is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

More specifically, a compound represented by the general formula (M-8) for use in a composition according to the present invention is preferably a compound represented by one of the formulae (M-8.41) to (M-8.44) and particularly preferably contains the compound represented by the formula (M-8.42).

[Chem. 82]

(M-8.41)
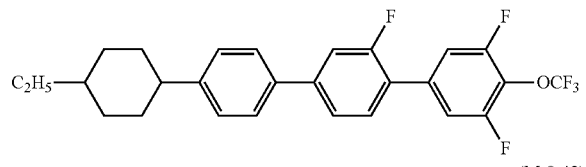

(M-8.42)
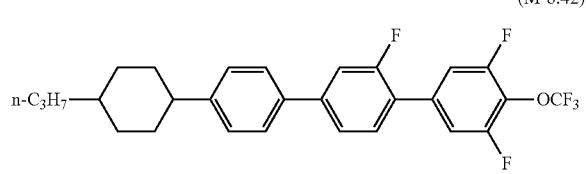

-continued (M-8.43)

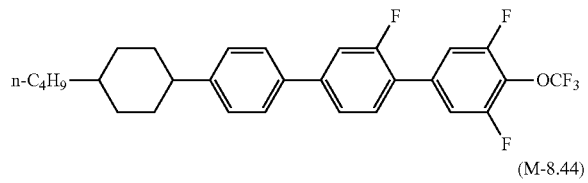

(M-8.44)

The lower limit of the preferred amount of these compounds is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

More specifically, a compound represented by the general formula (M-8) for use in a composition according to the present invention is preferably a compound represented by one of the formulae (M-8.51) to (M-8.54) and particularly preferably contains the compound represented by the formula (M-8.52).

[Chem. 83]

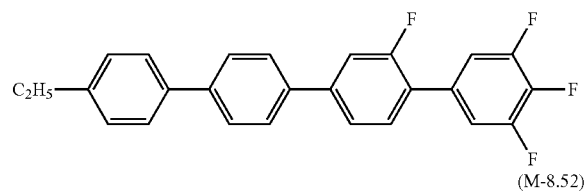

The lower limit of the preferred amount of these compounds is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

A compound represented by the general formula (M) may have the following substructure in its structure.

[Chem. 84]

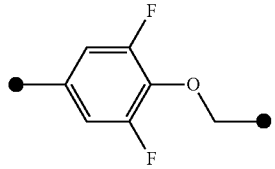

(Each dark dot in the formula represents a carbon atom in the ring structure to which the substructure is bonded.)

A compound having the substructure is preferably a compound represented by one of the general formulae (M-10) to (M-18).

A compound represented by the general formula (M-10) is described below.

[Chem. 85]

(M-10)

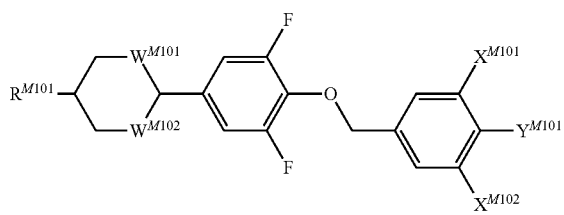

(wherein $X^{M101}$ and $X^{M102}$ independently represent a fluorine atom or a hydrogen atom, $Y^{M101}$ represents a fluorine atom, a chlorine atom, or —OCF$_3$, $R^{M101}$ represents an alkyl group having 1 to 5 carbon atoms, an alkenyl group having 2 to 5 carbon atoms, or an alkoxy group having 1 to 4 carbon atoms, and $W^{M101}$ and $W^{M102}$ independently represent —CH$_2$— or —O—)

The lower limit of the preferred amount of a compound represented by the general formula (M-10) is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

When a low viscosity and a high response speed are required for a composition according to the present invention, the lower limit is preferably decreased, and the upper limit is preferably decreased. When a composition with resistance to image-sticking is required, the lower limit is preferably decreased, and the upper limit is preferably decreased. When the dielectric constant anisotropy is increased to maintain a low drive voltage, the lower limit is preferably increased, and the upper limit is preferably increased.

More specifically, a compound represented by the general formula (M-10) for use in a composition according to the present invention is preferably a compound represented by one of the formulae (M-10.1) to (M-10.12) and particularly preferably contains a compound represented by one of the formulae (M-10.5) to (M-10.12).

[Chem. 86]
(M-10.1)
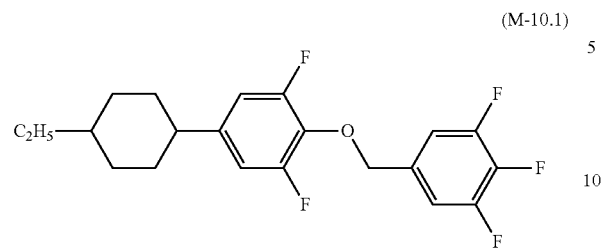
(M-10.2)
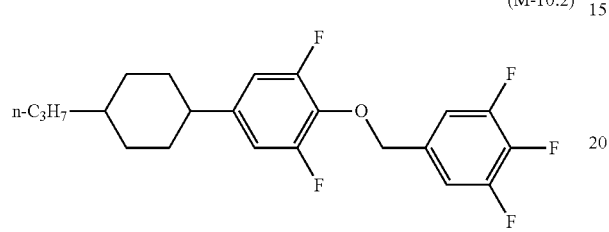
(M-10.3)
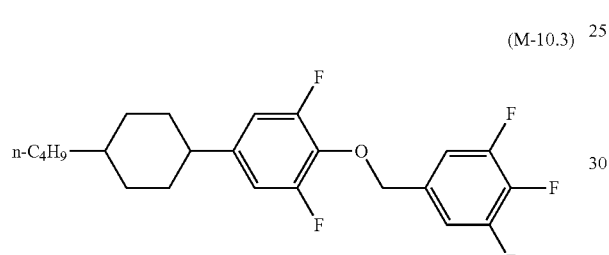
(M-10.4)
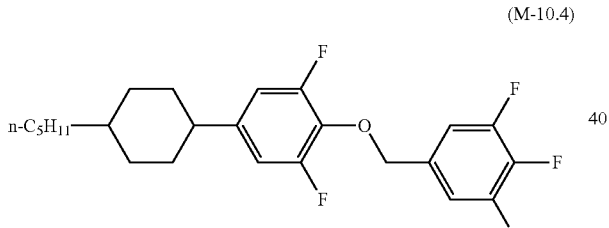
(M-10.5)
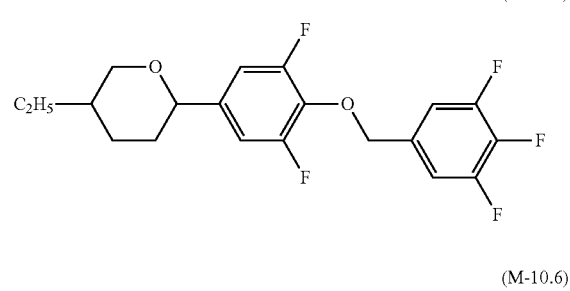
(M-10.6)
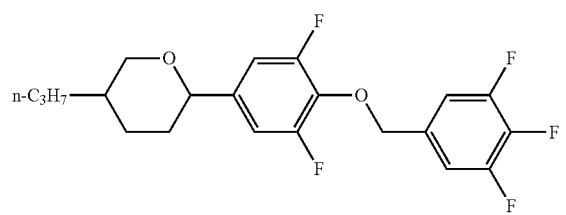
(M-10.7)
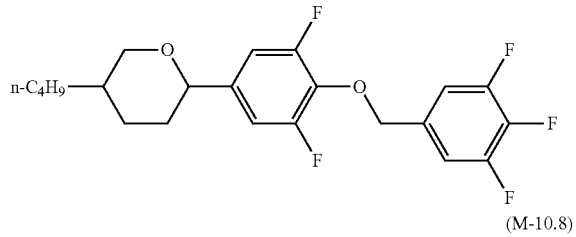
(M-10.8)
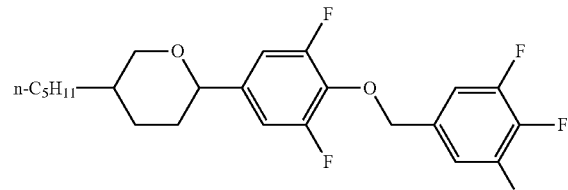
[Chem. 87]
(M-10.9)
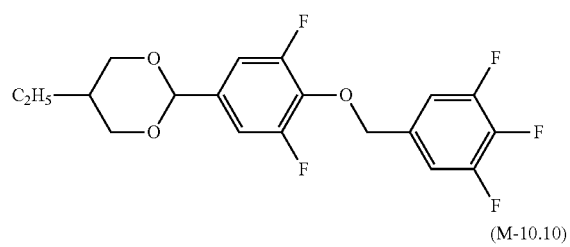
(M-10.10)
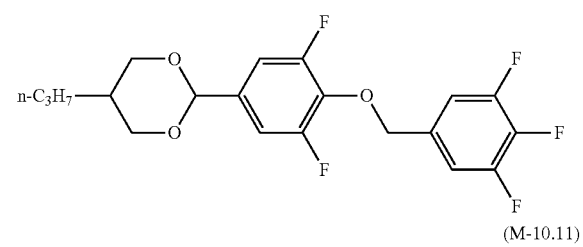
(M-10.11)
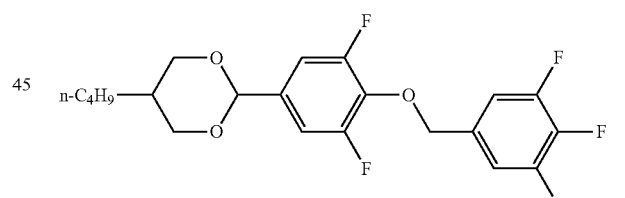
(M-10.12)
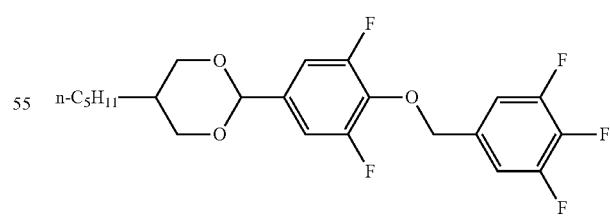
The lower limit of the preferred amount of these compounds is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

A compound represented by the general formula (M-11) is described below.

[Chem. 88]

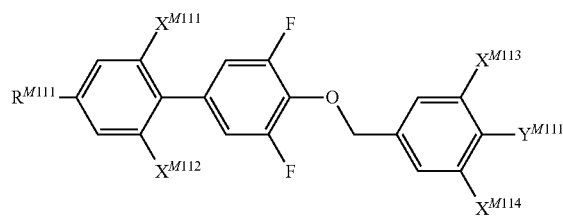
(M-11)

(wherein $X^{M111}$ to $X^{M114}$ independently represent a fluorine atom or a hydrogen atom, $Y^{M111}$ represents a fluorine atom, a chlorine atom, or $-OCF_3$, and $R^{M111}$ represents an alkyl group having 1 to 5 carbon atoms, an alkenyl group having 2 to 5 carbon atoms, or an alkoxy group having 1 to 4 carbon atoms)

The lower limit of the preferred amount of a compound represented by the general formula (M-11) is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

When a low viscosity and a high response speed are required for a composition according to the present invention, the lower limit is preferably decreased, and the upper limit is preferably decreased. When a composition with resistance to image-sticking is required, the lower limit is preferably decreased, and the upper limit is preferably decreased. When the dielectric constant anisotropy is increased to maintain a low drive voltage, the lower limit is preferably increased, and the upper limit is preferably increased.

More specifically, a compound represented by the general formula (M-11) for use in a composition according to the present invention is preferably a compound represented by one of the formulae (M-11.1) to (M-11.8) and particularly preferably contains a compound represented by one of the formulae (M-11.1) to (M-11.4).

[Chem. 89]

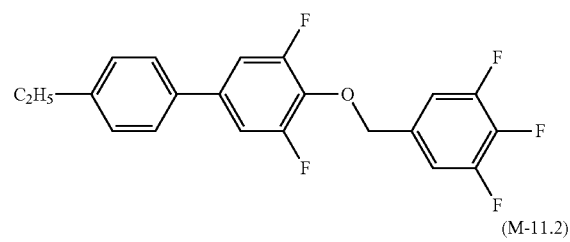
(M-11.1)

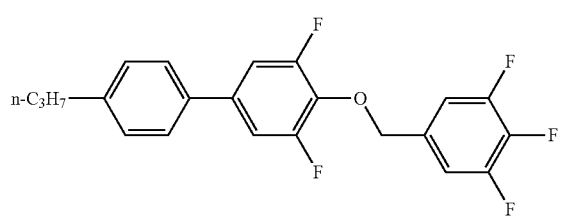
(M-11.2)

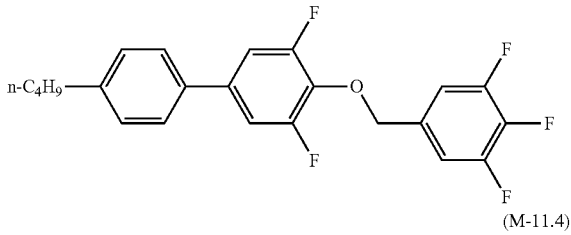
(M-11.3)

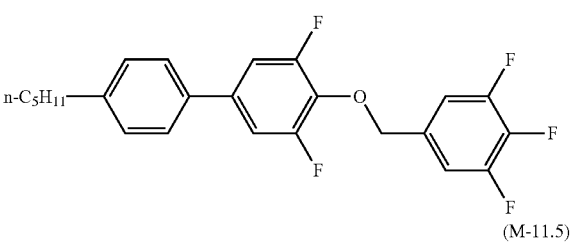
(M-11.4)

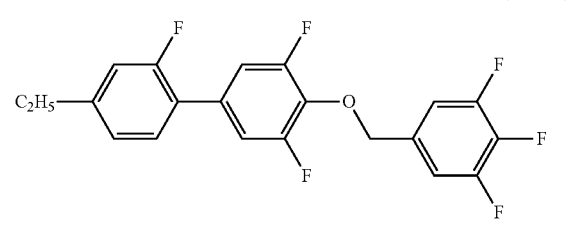
(M-11.5)

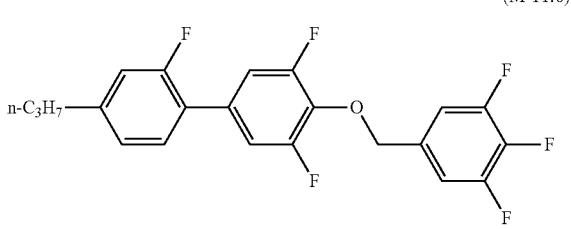
(M-11.6)

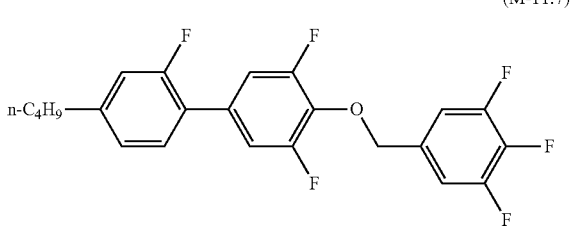
(M-11.7)

(M-11.8)

The lower limit of the preferred amount of these compounds is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

A compound represented by the general formula (M-12) is described below.

[Chem. 90]

(M-12)

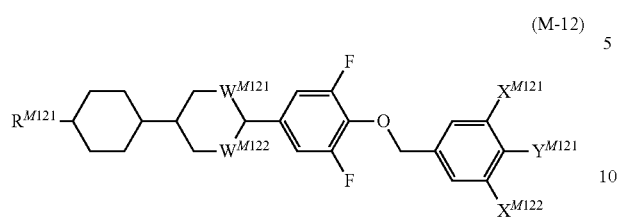

(wherein $X^{M121}$ and $X^{M122}$ independently represent a fluorine atom or a hydrogen atom, $Y^{M121}$ represents a fluorine atom, a chlorine atom, or —OCF$_3$, $R^{M121}$ represents an alkyl group having 1 to 5 carbon atoms, an alkenyl group having 2 to 5 carbon atoms, or an alkoxy group having 1 to 4 carbon atoms, and $W^{M121}$ and $W^{M122}$ independently represent —CH$_2$— or —O—)

The lower limit of the preferred amount of a compound represented by the general formula (M-12) is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

When a low viscosity and a high response speed are required for a composition according to the present invention, the lower limit is preferably decreased, and the upper limit is preferably decreased. When a composition with resistance to image-sticking is required, the lower limit is preferably decreased, and the upper limit is preferably decreased. When the dielectric constant anisotropy is increased to maintain a low drive voltage, the lower limit is preferably increased, and the upper limit is preferably increased.

More specifically, a compound represented by the general formula (M-12) for use in a composition according to the present invention is preferably a compound represented by one of the formulae (M-12.1) to (M-12.12) and particularly preferably contains a compound represented by one of the formulae (M-12.5) to (M-12.8).

[Chem. 91]

(M-12.1)

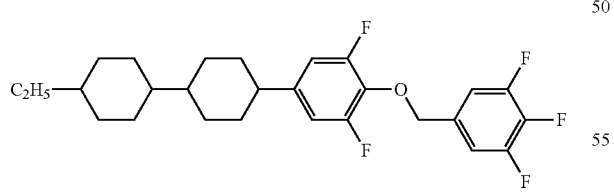

(M-12.2)

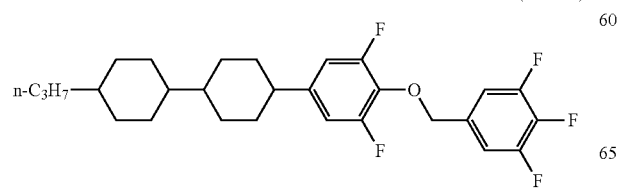

(M-12.3)

(M-12.4)

(M-12.5)

(M-12.6)

(M-12.7)

(M-12.8)

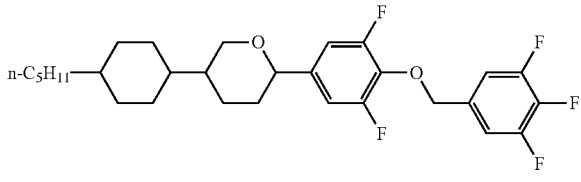

[Chem. 92]

(M-12.9)

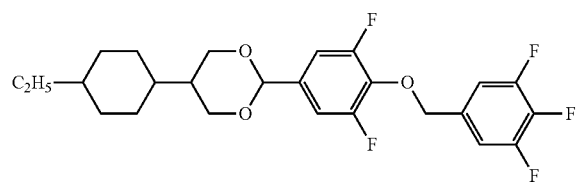

-continued

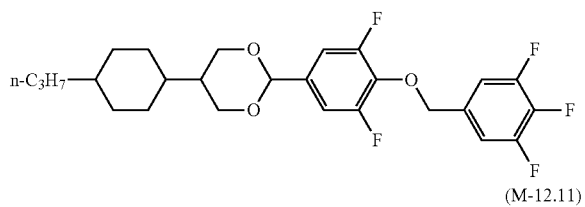

(M-12.10)

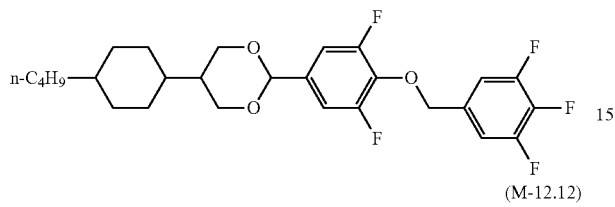

(M-12.11)

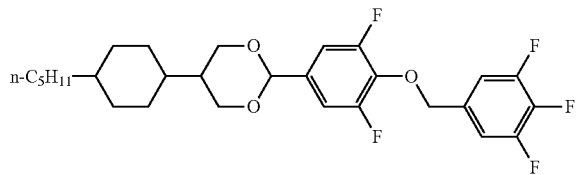

(M-12.12)

The lower limit of the preferred amount of these compounds is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

A compound represented by the general formula (M-13) is described below.

[Chem. 93]

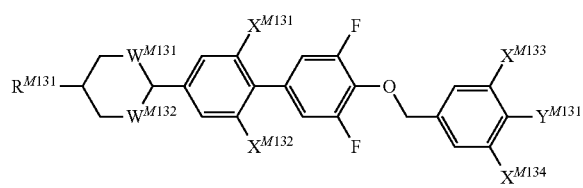

(M-13)

(wherein $X^{M131}$ to $X^{M134}$ independently represent a fluorine atom or a hydrogen atom, $Y^{M131}$ represents a fluorine atom, a chlorine atom, or —$OCF_3$, $R^{M131}$ represents an alkyl group having 1 to 5 carbon atoms, an alkenyl group having 2 to 5 carbon atoms, or an alkoxy group having 1 to 4 carbon atoms, and $W^{M131}$ and $W^{M132}$ independently represent —$CH_2$— or —O—)

The lower limit of the preferred amount of a compound represented by the general formula (M-13) is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

When a low viscosity and a high response speed are required for a composition according to the present invention, the lower limit is preferably decreased, and the upper limit is preferably decreased. When a composition with resistance to image-sticking is required, the lower limit is preferably decreased, and the upper limit is preferably decreased. When the dielectric constant anisotropy is increased to maintain a low drive voltage, the lower limit is preferably increased, and the upper limit is preferably increased.

More specifically, a compound represented by the general formula (M-13) for use in a composition according to the present invention is preferably a compound represented by one of the formulae (M-13.1) to (M-13.28) and particularly preferably contains a compound represented by one of the formulae (M-13.1) to (M-13.4), (M-13.11) to (M-13.14), and (M-13.25) to (M-13.28).

[Chem. 94]

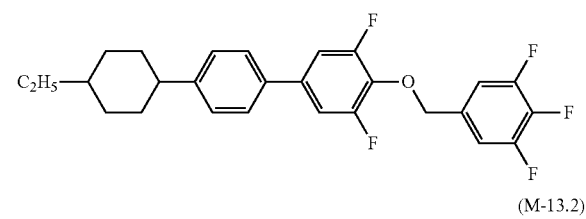

(M-13.1)

(M-13.2)

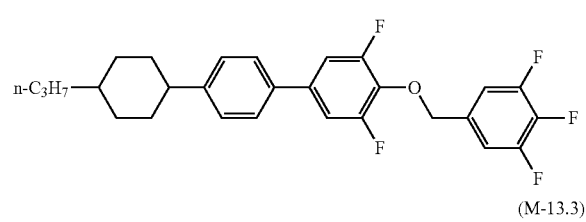

(M-13.3)

(M-13.4)

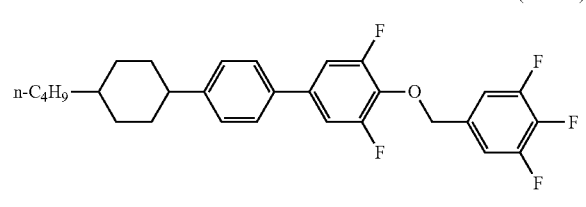

(M-13.5)

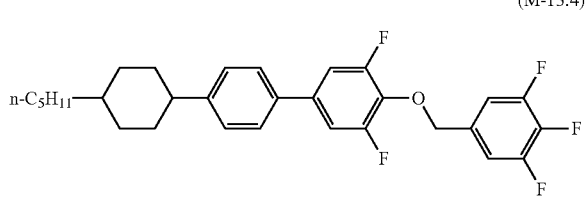

(M-13.6)

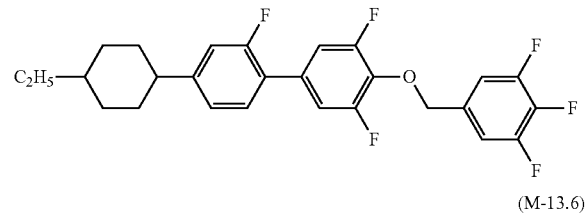

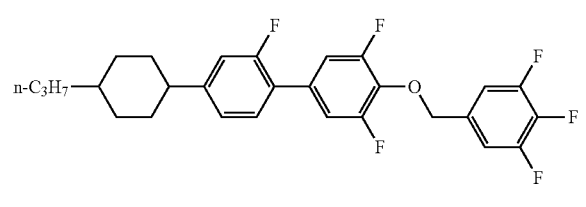

(M-13.7)
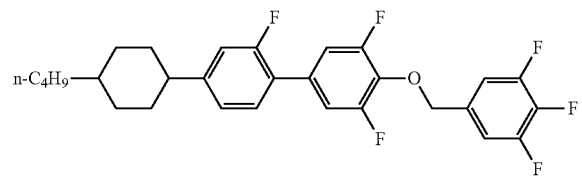
(M-13.8)
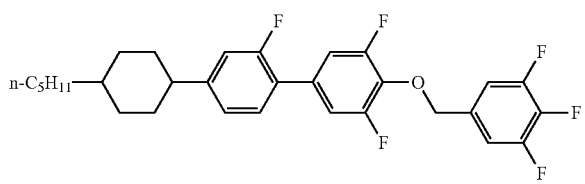
[Chem. 95]
(M-13.11)
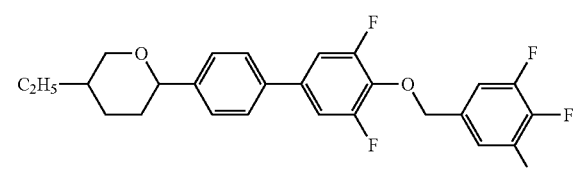
(M-13.12)
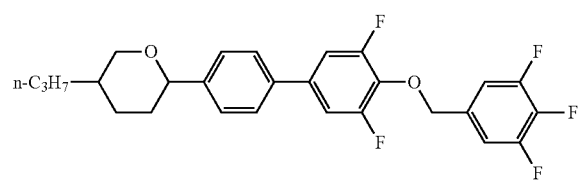
(M-13.13)
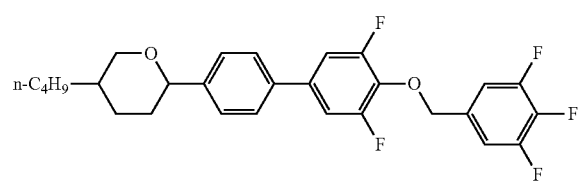
(M-13.14)
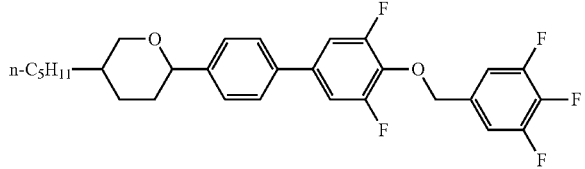
(M-13.15)
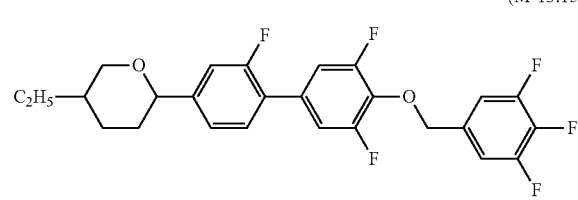
(M-13.16)
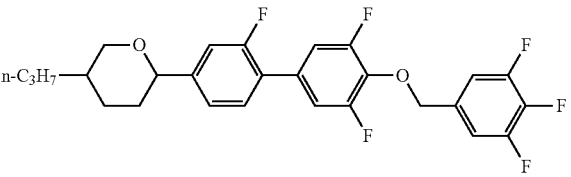
(M-13.17)
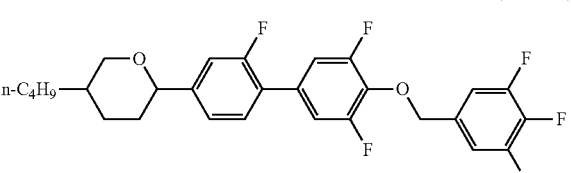
(M-13.18)
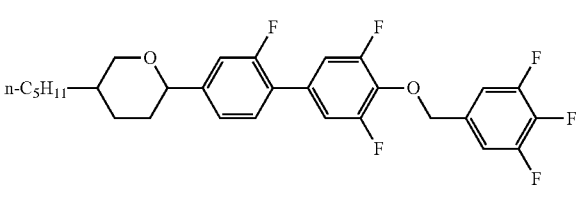
[Chem. 96]
(M-13.21)
(M-13.22)
(M-13.23)
(M-13.24)

-continued (M-13.25)
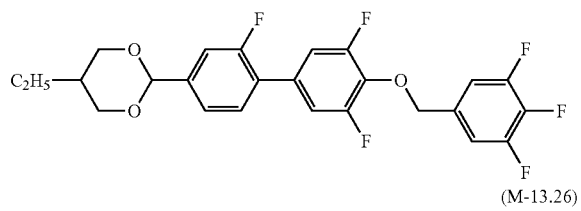

(M-13.26)
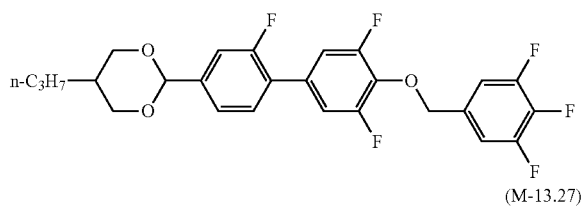

(M-13.27)
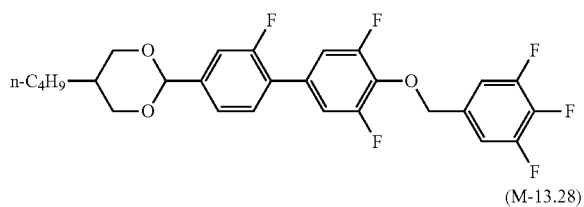

(M-13.28)
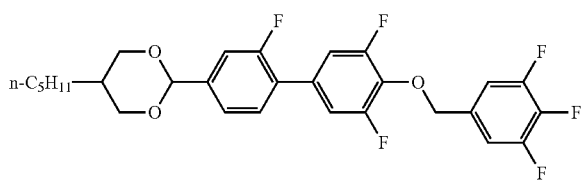

The lower limit of the preferred amount of these compounds is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

A compound represented by the general formula (M-14) is described below.

[Chem. 97]

(M-14)
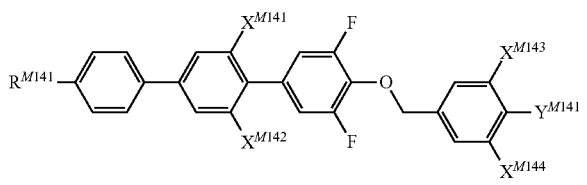

(wherein $X^{M141}$ to $X^{M144}$ independently represent a fluorine atom or a hydrogen atom, $Y^{M141}$ represents a fluorine atom, a chlorine atom, or —$OCF_3$, and $R^{M141}$ represents an alkyl group having 1 to 5 carbon atoms, an alkenyl group having 2 to 5 carbon atoms, or an alkoxy group having 1 to 4 carbon atoms)

The lower limit of the preferred amount of a compound represented by the general formula (M-14) is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

When a low viscosity and a high response speed are required for a composition according to the present invention, the lower limit is preferably decreased, and the upper limit is preferably decreased. When a composition with resistance to image-sticking is required, the lower limit is preferably decreased, and the upper limit is preferably decreased. When the dielectric constant anisotropy is increased to maintain a low drive voltage, the lower limit is preferably increased, and the upper limit is preferably increased.

More specifically, a compound represented by the general formula (M-14) for use in a composition according to the present invention is preferably a compound represented by one of the formulae (M-14.1) to (M-14.8) and particularly preferably contains the compound represented by the formula (M-14.5) or (M-14.8).

[Chem. 98]

(M-14.1)
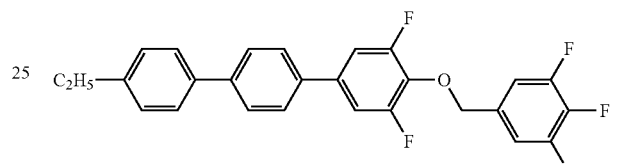

(M-14.2)
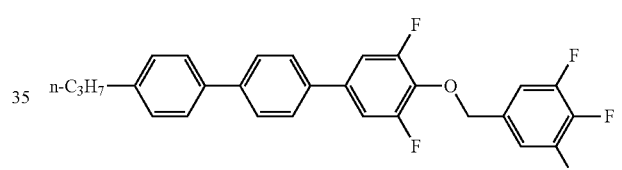

(M-14.3)
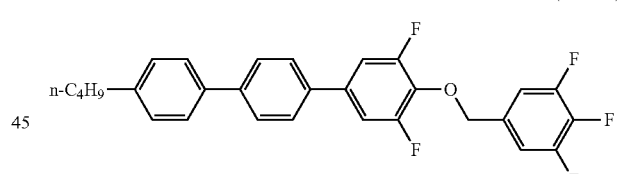

(M-14.4)
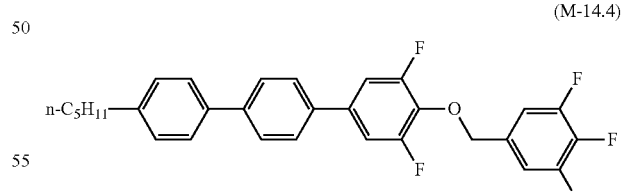

(M-14.5)
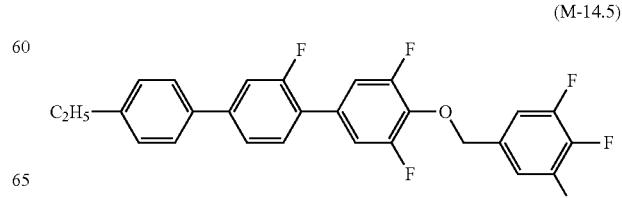

-continued (M-14.6)
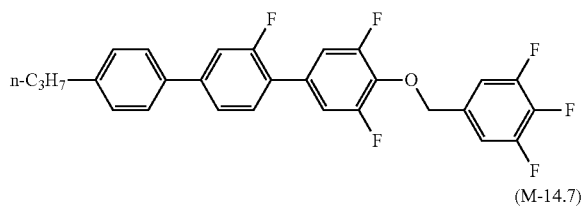

(M-14.7)
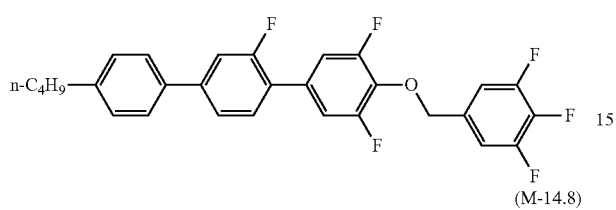

(M-14.8)
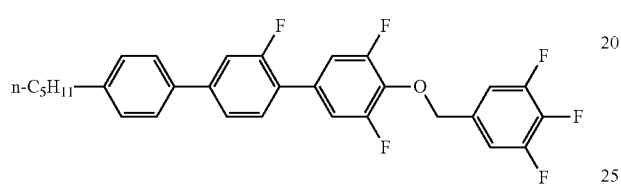

The lower limit of the preferred amount of these compounds is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

A compound represented by the general formula (M-15) is described below.

[Chem. 99]

(M-15)
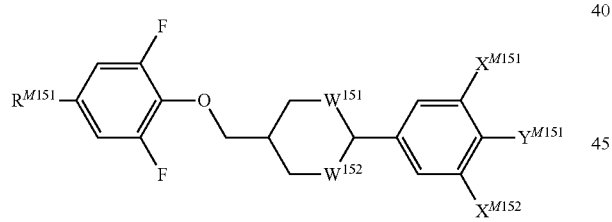

(wherein $X^{M151}$ and $X^{M152}$ independently represent a fluorine atom or a hydrogen atom, $Y^{M151}$ represents a fluorine atom, a chlorine atom, or —$OCF_3$, $R^{M151}$ represents an alkyl group having 1 to 5 carbon atoms, an alkenyl group having 2 to 5 carbon atoms, or an alkoxy group having 1 to 4 carbon atoms, and $W^{M151}$ and $W^{M152}$ independently represent —$CH_2$— or —O—)

The lower limit of the preferred amount of a compound represented by the general formula (M-15) is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

When a low viscosity and a high response speed are required for a composition according to the present invention, the lower limit is preferably decreased, and the upper limit is preferably decreased. When a composition with resistance to image-sticking is required, the lower limit is preferably decreased, and the upper limit is preferably decreased. When the dielectric constant anisotropy is increased to maintain a low drive voltage, the lower limit is preferably increased, and the upper limit is preferably increased.

More specifically, a compound represented by the general formula (M-15) for use in a composition according to the present invention is preferably a compound represented by one of the formulae (M-15.1) to (M-15.14) and particularly preferably contains a compound represented by one of the formulae (M-15.5) to (M-15.8) and (M-15.11) to (M-15.14).

[Chem. 100]

(M-15.1)
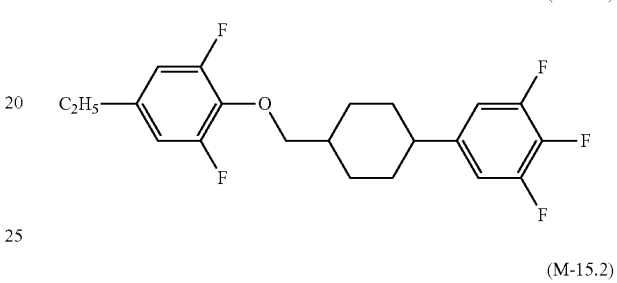

(M-15.2)
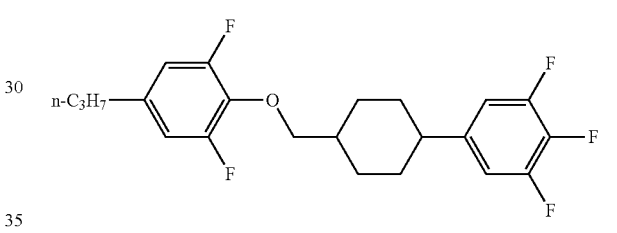

(M-15.3)
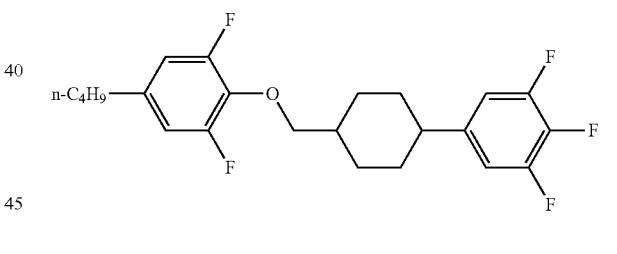

(M-15.4)
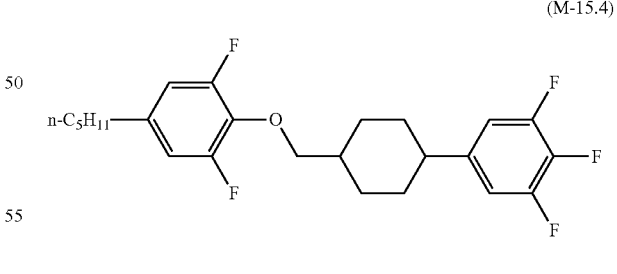

(M-15.5)
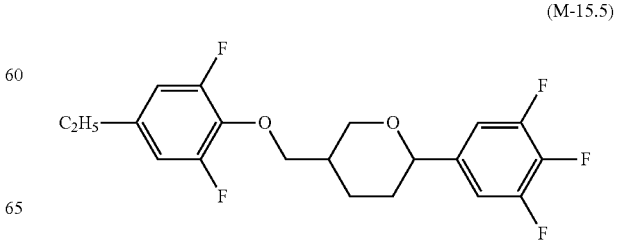

(M-15.6)
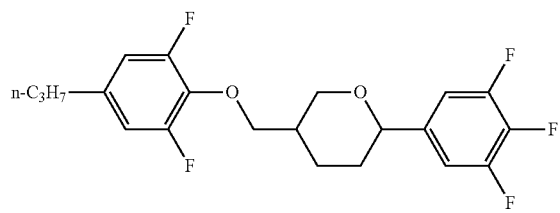

(M-15.7)
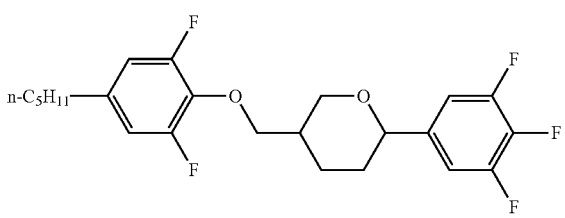

(M-15.8)
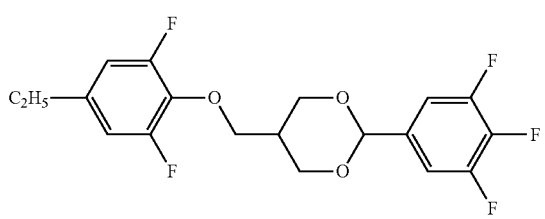

[Chem. 101]

(M-15.11)
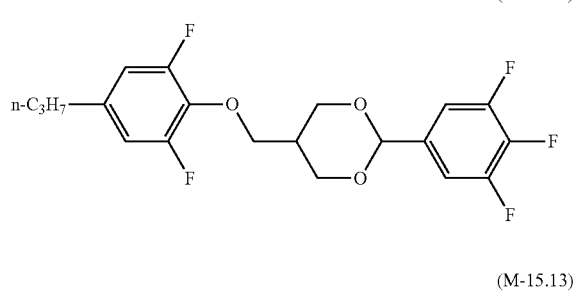

(M-15.12)

(M-15.13)
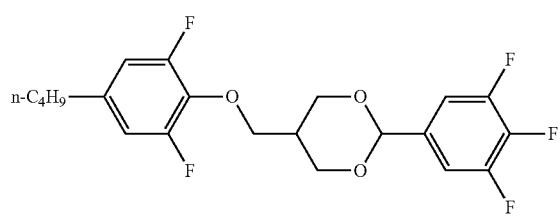

(M-15.14)
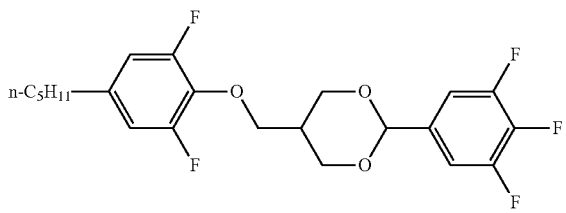

The lower limit of the preferred amount of these compounds is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

A compound represented by the general formula (M-16) is described below.

[Chem. 102]

(M-16)

$$R^{M161} \text{—} \bigcirc \text{—} O \text{—} \bigcirc \text{—} \bigcirc \text{—} Y^{M161}$$

(wherein $X^{M161}$ to $X^{M164}$ independently represent a fluorine atom or a hydrogen atom, $Y^{M161}$ represents a fluorine atom, a chlorine atom, or —$OCF_3$, and $R^{M161}$ represents an alkyl group having 1 to 5 carbon atoms, an alkenyl group having 2 to 5 carbon atoms, or an alkoxy group having 1 to 4 carbon atoms)

The lower limit of the preferred amount of a compound represented by the general formula (M-16) is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

When a low viscosity and a high response speed are required for a composition according to the present invention, the lower limit is preferably decreased, and the upper limit is preferably decreased. When a composition with resistance to image-sticking is required, the lower limit is preferably decreased, and the upper limit is preferably decreased. When the dielectric constant anisotropy is increased to maintain a low drive voltage, the lower limit is preferably increased, and the upper limit is preferably increased.

More specifically, a compound represented by the general formula (M-16) for use in a composition according to the present invention is preferably a compound represented by one of the formulae (M-16.1) to (M-16.8) and particularly preferably contains a compound represented by one of the formulae (M-16.1) to (M-16.4).

[Chem. 103]

(M-16.1)
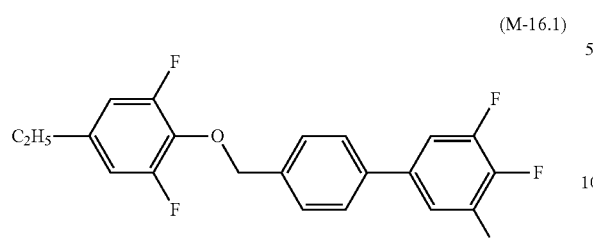

(M-16.2)
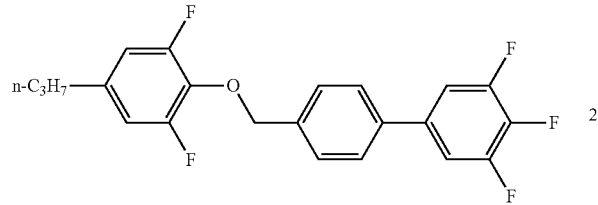

(M-16.3)
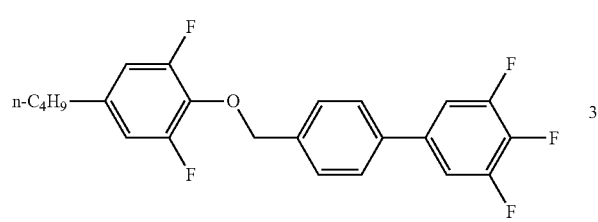

(M-16.4)
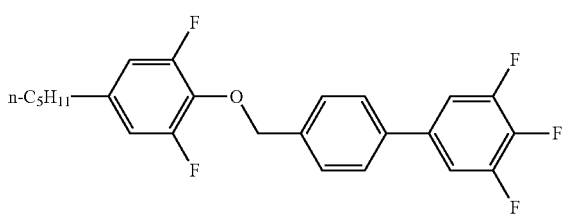

(M-16.5)
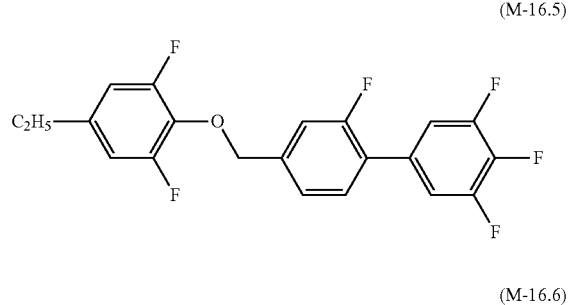

(M-16.6)
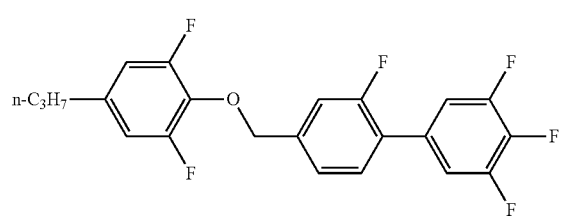

(M-16.7)
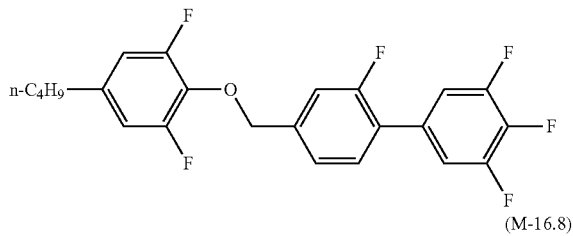

(M-16.8)
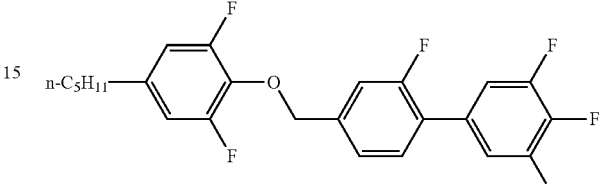

The lower limit of the preferred amount of these compounds is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

A compound represented by the general formula (M-17) is described below.

[Chem. 104]

(M-17)
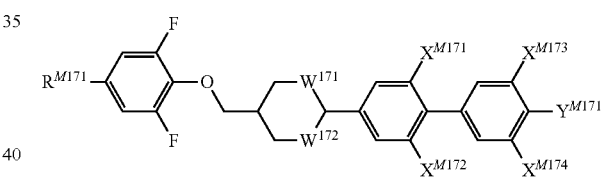

(wherein $X^{M171}$ to $X^{M174}$ independently represent a fluorine atom or a hydrogen atom, $Y^{M171}$ represents a fluorine atom, a chlorine atom, or —OCF$_3$, $R^{M171}$ represents an alkyl group having 1 to 5 carbon atoms, an alkenyl group having 2 to 5 carbon atoms, or an alkoxy group having 1 to 4 carbon atoms, and $W^{M171}$ and $W^{11172}$ independently represent —CH$_2$— or —O—)

The lower limit of the preferred amount of a compound represented by the general formula (M-17) is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

When a low viscosity and a high response speed are required for a composition according to the present invention, the lower limit is preferably decreased, and the upper limit is preferably decreased. When a composition with resistance to image-sticking is required, the lower limit is preferably decreased, and the upper limit is preferably decreased. When the dielectric constant anisotropy is increased to maintain a low drive voltage, the lower limit is preferably increased, and the upper limit is preferably increased.

More specifically, a compound represented by the general formula (M-17) for use in a composition according to the present invention is preferably a compound represented by one of the formulae (M-17.1) to (M-17.52) and particularly preferably contains a compound represented by one of the formulae (M-17.9) to (M-17.12), (M-17.21) to (M-17.28), and (M-17.45) to (M-17.48).
[Chem. 105]
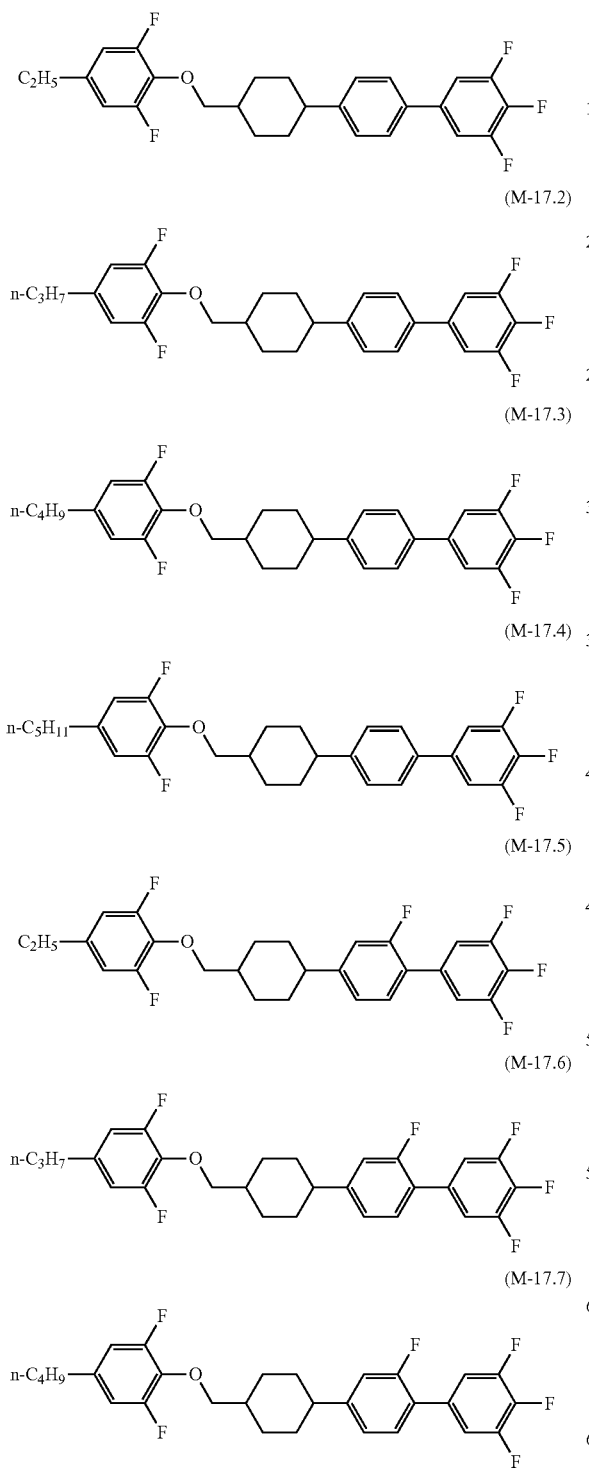
[Chem. 106]
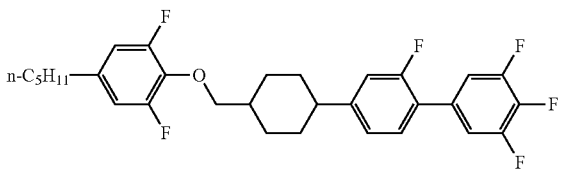
[Chem. 107]

Chemical Structures (M-17.23)
(M-17.24)
(M-17.25)
(M-17.26)
(M-17.27)
(M-17.28)
(M-17.29)
(M-17.30)
(M-17.31)
(M-17.32)

[Chem. 109]

(M-17.41)
(M-17.42)
(M-17.43)
(M-17.44)
(M-17.45)
(M-17.46)

[Chem. 108]

(M-17.47)

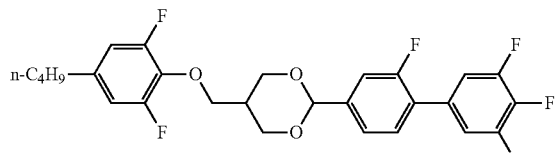

(M-17.48)

(M-17.49)

[Chem. 110]

(M-17.50)

(M-17.51)

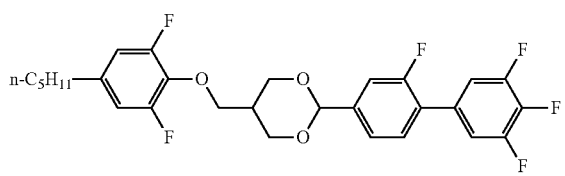

(M-17.52)

The lower limit of the preferred amount of these compounds is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

A compound represented by the general formula (M-18) is described below.

[Chem. 111]

(M-18)

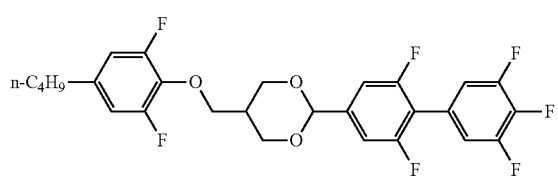

(wherein $X^{M181}$ to $X^{M186}$ independently represent a fluorine atom or a hydrogen atom, $Y^{M181}$ represents a fluorine atom, a chlorine atom, or —OCF$_3$, and $R^{M181}$ represents an alkyl group having 1 to 5 carbon atoms, an alkenyl group having 2 to 5 carbon atoms, or an alkoxy group having 1 to 4 carbon atoms)

The lower limit of the preferred amount of a compound represented by the general formula (M-18) is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

When a low viscosity and a high response speed are required for a composition according to the present invention, the lower limit is preferably decreased, and the upper limit is preferably decreased. When a composition with resistance to image-sticking is required, the lower limit is preferably decreased, and the upper limit is preferably decreased. When the dielectric constant anisotropy is increased to maintain a low drive voltage, the lower limit is preferably increased, and the upper limit is preferably increased.

More specifically, a compound represented by the general formula (M-18) for use in a composition according to the present invention is preferably a compound represented by one of the formulae (M-18.1) to (M-18.12) and particularly preferably contains a compound represented by one of the formulae (M-18.5) to (M-18.8).

[Chem. 112]

(M-18.1)

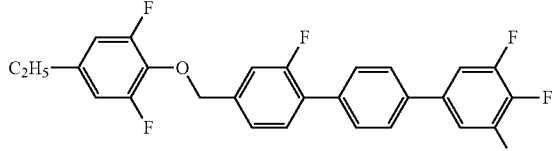

(M-18.2)

(M-18.3)

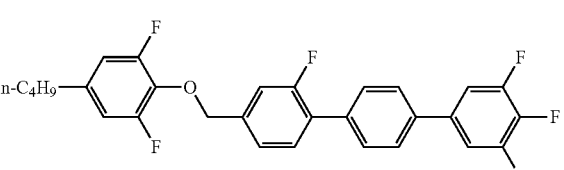

The lower limit of the preferred amount of these compounds is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

A composition according to the present invention preferably contains one or two or more compounds represented by the general formula (K). These compounds correspond to dielectrically positive compounds (with Δε of more than 2).

[Chem. 114]

(wherein $R^{K1}$ represents an alkyl group having 1 to 8 carbon atoms, and one —$CH_2$— or two or more nonadjacent —$CH_2$—'s in the alkyl group are independently optionally substituted with —CH=CH—, —C≡C—, —O—, —CO—, —COO—, or —OCO—, $n^{K1}$ is 0, 1, 2, 3, or 4, $A^{K1}$ and $A^{K2}$ independently represent a group selected from the group consisting of (a) a 1,4-cyclohexylene group (in which one —$CH_2$— or two or more nonadjacent —$CH_2$—'s are optionally substituted with —O— or —S—), and (b) a 1,4-phenylene group (in which one —CH= or two or more nonadjacent —CH='s are optionally substituted with —N=), a hydrogen atom in the group (a) and the group (b) is independently optionally substituted with a cyano group, a fluorine atom, or a chlorine atom, $Z^{K1}$ and $Z^{K2}$ independently represent a single bond, —$CH_2CH_2$—, —$(CH_2)_4$—, —$OCH_2$—, —$CH_2O$—, —$OCF_2$—, —$CF_2O$—, —COO—, —OCO—, or —C≡C—, if $n^{K1}$ is 2, 3, or 4, a plurality of $A^{K2}$s may be the same or different, and if $n^{K1}$ is 2, 3, or 4, a plurality of $Z^{K1}$s may be the same or different, $X^{K1}$ and $X^{K3}$ independently represent a hydrogen atom, a chlorine atom, or a fluorine atom, and $X^{K2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group)

In the general formula (K), $R^{K1}$ preferably represents an alkyl group having 1 to 8 carbon atoms, an alkoxy group having 1 to 8 carbon atoms, an alkenyl group having 2 to 8 carbon atoms, or an alkenyloxy group having 2 to 8 carbon atoms, preferably an alkyl group having 1 to 5 carbon atoms, an alkoxy group having 1 to 5 carbon atoms, an alkenyl group having 2 to 5 carbon atoms, or an alkenyloxy group having 2 to 5 carbon atoms, more preferably an alkyl group having 1 to 5 carbon atoms or an alkenyl group having 2 to 5 carbon atoms, still more preferably an alkyl group having 2 to 5 carbon atoms or an alkenyl group having 2 or 3 carbon atoms.

$R^{K1}$ is preferably an alkyl group when reliability is regarded as important or an alkenyl group when lower viscosity is regarded as important.

When the ring structure to which $R^{K1}$ is bonded is a phenyl group (aromatic), $R^{K1}$ preferably represents a linear alkyl group having 1 to 5 carbon atoms, a linear alkoxy group having 1 to 4 carbon atoms, or an alkenyl group having 4 or 5 carbon atoms. When the ring structure to which $R^{K1}$ is bonded is a saturated ring structure, such as cyclohexane, pyran, or dioxane, $R^{K1}$ preferably represents a linear alkyl group having 1 to 5 carbon atoms, a linear alkoxy group having 1 to 4 carbon atoms, or a linear alkenyl group having 2 to 5 carbon atoms. In order to stabilize the nematic phase, the total number of carbon atoms and, if present, oxygen atoms is preferably 5 or less, and a straight chain is preferred.

The alkenyl group is preferably selected from the groups represented by the formulae ($R^1$) to ($R^5$). (The dark dot in each formula represents a carbon atom in the ring structure to which the alkenyl group is bonded.)

[Chem. 115]

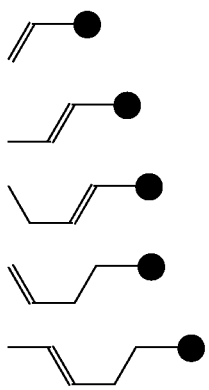

(R1)
(R2)
(R3)
(R4)
(R5)

$A^{K1}$ and $A^{K2}$ preferably independently represent an aromatic when an increased Δn is required, represent an aliphatic when the response speed is improved, represent a trans-1,4-cyclohexylene group, a 1,4-phenylene group, a 2-fluoro-1,4-phenylene group, a 3-fluoro-1,4-phenylene group, a 3,5-difluro-1,4-phenylene group, a 2,3-difluro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group, more preferably independently represent the following structures,

[Chem. 116]

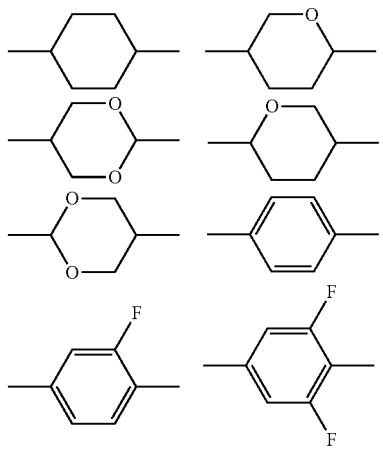

and more preferably independently represent the following structures.

[Chem. 117]

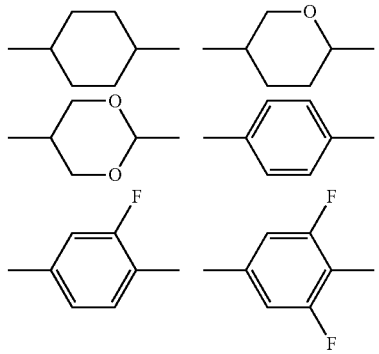

$Z^{K1}$ and $Z^{K2}$ preferably independently represent —$CH_2O$—, —$CF_2O$—, —$CH_2CH_2$—, —$CF_2CF_2$—, or a single bond, more preferably —$CF_2O$—, —$CH_2CH_2$—, or a single bond, particularly preferably —$CF_2O$— or a single bond.

$n^{K1}$ is preferably 0, 1, 2, or 3, preferably 0, 1, or 2, preferably 0 or 1 when improved Δε is regarded as important, preferably 1 or 2 when Tni is regarded as important.

Although compounds of any types may be combined, these compounds are combined in a manner that depends on the desired characteristics, such as solubility at low temperatures, transition temperature, electrical reliability, and birefringence index. For example, one, two, or three compounds are used in one embodiment of the present invention. Alternatively, four, five, six, seven, or more compounds are used in another embodiment of the present invention.

The amount of a compound represented by the general formula (K) in a composition according to the present invention should be appropriately adjusted in a manner that depends on the desired characteristics, such as solubility at low temperatures, transition temperature, electrical reliability, birefringence index, process compatibility, drop marks, image-sticking, and dielectric constant anisotropy.

The lower limit of the preferred amount of a compound represented by the formula (K) is 1%, 10%, 20%, 30%, 40%, 50%, 55%, 60%, 65%, 70%, 75%, or 80% of the total amount of the composition according to the present invention. For example, in one embodiment of the present invention, the upper limit of the preferred amount is 95%, 85%, 75%, 65%, 55%, 45%, 35%, or 25% of the total amount of the composition according to the present invention.

When a low viscosity and a high response speed are required for a composition according to the present invention, the lower limit is preferably decreased, and the upper limit is preferably decreased. When a high Tni and high temperature stability are required for a composition according to the present invention, the lower limit is preferably decreased, and the upper limit is preferably decreased. When the dielectric constant anisotropy is increased to maintain a low drive voltage, the lower limit is preferably increased, and the upper limit is preferably increased.

A compound represented by the general formula (K) is preferably a compound selected from the compound group represented by the general formula (K-1), for example.

[Chem. 118]

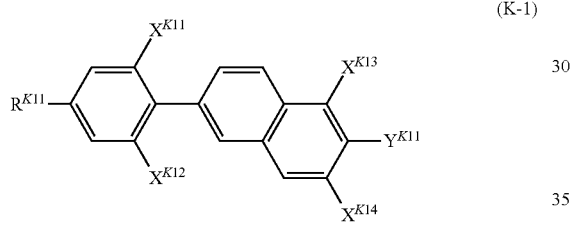

(K-1)

(wherein $R^{K11}$ represents an alkyl group having 1 to 5 carbon atoms, an alkenyl group having 2 to 5 carbon atoms, or an alkoxy group having 1 to 4 carbon atoms, $X^{K11}$ to $X^{K14}$ independently represent a hydrogen atom or a fluorine atom, and $Y^{K11}$ represents a fluorine atom or $OCF_3$)

Although compounds of any types may be combined, these compounds are combined in a manner that depends on the desired characteristics, such as solubility at low temperatures, transition temperature, electrical reliability, and birefringence index. For example, one, two, three, or more compounds are used in one embodiment of the present invention.

The lower limit of the preferred amount of a compound represented by the formula (K-1) is 1%, 2%, 5%, 8%, 10%, 13%, 15%, 18%, 20%, 22%, 25%, or 30% of the total amount of a composition according to the present invention. The upper limit of the preferred amount is 30%, 28%, 25%, 23%, 20%, 18%, 15%, 13%, 10%, 8%, or 5%.

When a low viscosity and a high response speed are required for a composition according to the present invention, the lower limit is preferably decreased, and the upper limit is preferably decreased. When a high Tni and high temperature stability are required for a composition according to the present invention, the lower limit is preferably decreased, and the upper limit is preferably decreased. When the dielectric constant anisotropy is increased to maintain a low drive voltage, the lower limit is preferably increased, and the upper limit is preferably increased.

More specifically, a compound represented by the general formula (K-1) is preferably a compound represented by one of the formulae (K-1.1) to (K-1.4), preferably the compound represented by the formula (K-1.1) or (K-1.2), more preferably the compound represented by the formula (K-1.2). The compound represented by the formula (K-1.1) or (K-1.2) is also preferably used simultaneously.

[Chem. 119]

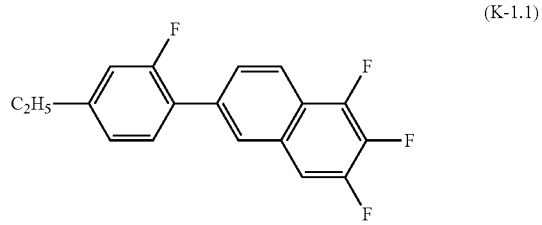

(K-1.1)

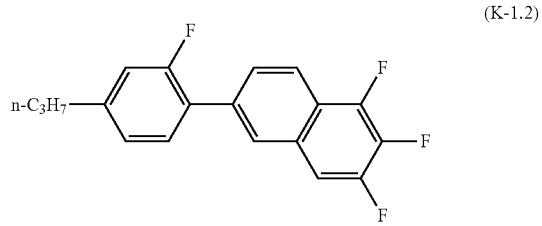

(K-1.2)

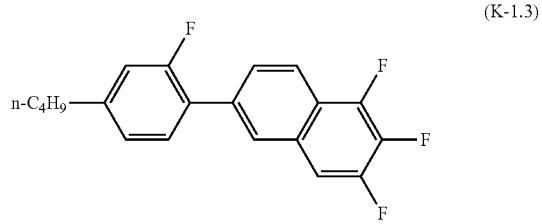

(K-1.3)

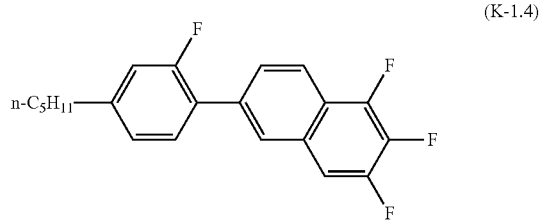

(K-1.4)

The lower limit of the preferred amount of these compounds is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

A compound represented by the general formula (K) is preferably a compound selected from the compound group represented by the general formula (K-2), for example.

[Chem. 120]

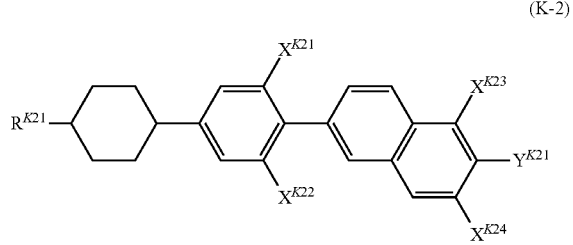

(K-2)

(wherein $R^{K21}$ represents an alkyl group having 1 to 5 carbon atoms, an alkenyl group having 2 to 5 carbon atoms, or an alkoxy group having 1 to 4 carbon atoms, $X^{K21}$ to $X^{K24}$ independently represent a hydrogen atom or a fluorine atom, and $Y^{K21}$ represents a fluorine atom or $OCF_3$)

Although compounds of any types may be combined, these compounds are combined in a manner that depends on the desired characteristics, such as solubility at low temperatures, transition temperature, electrical reliability, and birefringence index. For example, one, two, three, or more compounds are used in one embodiment of the present invention.

The lower limit of the preferred amount of a compound represented by the formula (K-2) is 1%, 2%, 5%, 8%, 10%, 13%, 15%, 18%, 20%, 22%, 25%, or 30% of the total amount of a composition according to the present invention. The upper limit of the preferred amount is 30%, 28%, 25%, 23%, 20%, 18%, 15%, 13%, 10%, 8%, or 5%.

When a low viscosity and a high response speed are required for a composition according to the present invention, the lower limit is preferably decreased, and the upper limit is preferably decreased. When a high Tni and high temperature stability are required for a composition according to the present invention, the lower limit is preferably decreased, and the upper limit is preferably decreased. When the dielectric constant anisotropy is increased to maintain a low drive voltage, the lower limit is preferably increased, and the upper limit is preferably increased.

More specifically, a compound represented by the general formula (K-2) is preferably a compound represented by one of the formulae (K-2.1) to (K-2.6), preferably the compound represented by the formula (K-2.5) or (K-2.6), more preferably the compound represented by the formula (K-2.6). The compound represented by the formula (K-2.5) or (K-2.6) is also preferably used simultaneously.

[Chem. 121]

(K-2.1)

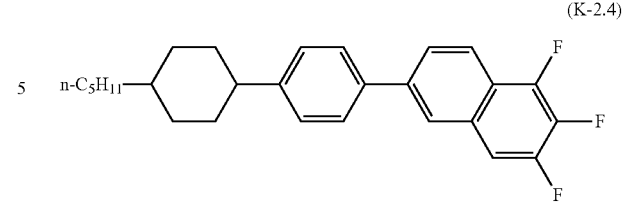

(K-2.2)

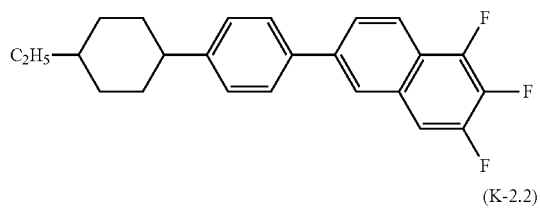

(K-2.3)

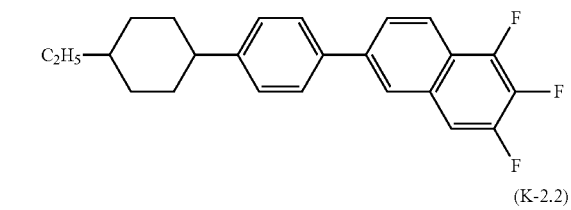

(K-2.4)

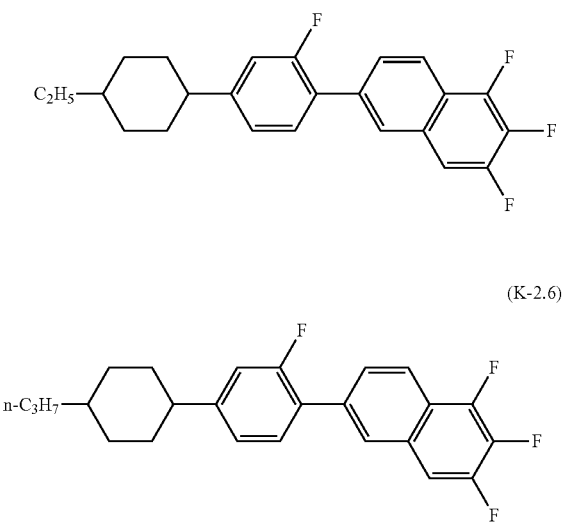

(K-2.5)

(K-2.6)

(K-2.7)

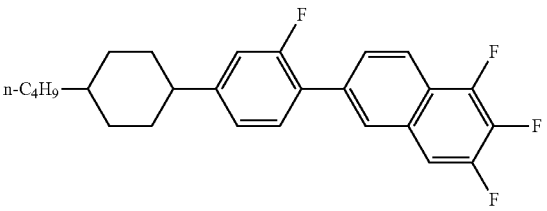

(K-2.8)

The lower limit of the preferred amount of these compounds is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

A compound represented by the general formula (K) is preferably a compound selected from the compound group represented by the general formula (K-3), for example.

[Chem. 122]

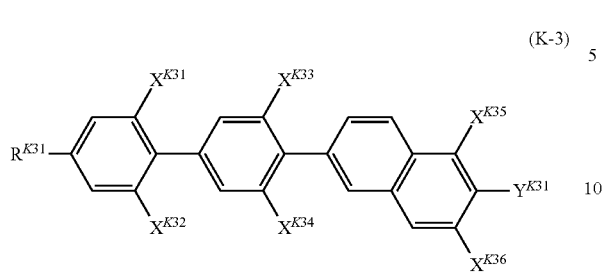
(K-3)

(wherein $R^{K31}$ represents an alkyl group having 1 to 5 carbon atoms, an alkenyl group having 2 to 5 carbon atoms, or an alkoxy group having 1 to 4 carbon atoms, $X^{K31}$ to $X^{K36}$ independently represent a hydrogen atom or a fluorine atom, and $Y^{K31}$ represents a fluorine atom or $OCF_3$)

Although compounds of any types may be combined, these compounds are combined in a manner that depends on the desired characteristics, such as solubility at low temperatures, transition temperature, electrical reliability, and birefringence index. For example, one, two, three, or more compounds are used in one embodiment of the present invention.

The lower limit of the preferred amount of a compound represented by the formula (K-3) is 1%, 2%, 5%, 8%, 10%, 13%, 15%, 18%, 20%, 22%, 25%, or 30% of the total amount of a composition according to the present invention. The upper limit of the preferred amount is 30%, 28%, 25%, 23%, 20%, 18%, 15%, 13%, 10%, 8%, or 5%.

When a low viscosity and a high response speed are required for a composition according to the present invention, the lower limit is preferably decreased, and the upper limit is preferably decreased. When a high Tni and high temperature stability are required for a composition according to the present invention, the lower limit is preferably decreased, and the upper limit is preferably decreased. When the dielectric constant anisotropy is increased to maintain a low drive voltage, the lower limit is preferably increased, and the upper limit is preferably increased.

More specifically, a compound represented by the general formula (K-3) is preferably a compound represented by one of the formulae (K-3.1) to (K-3.4), more preferably the compound represented by the formula (K-3.1) or (K-3.2). It is also preferable to use the compounds represented by the formulae (K-3.1) and (K-3.2) in combination.

[Chem. 123]

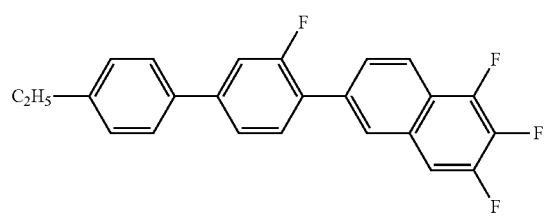
(K-3.1)

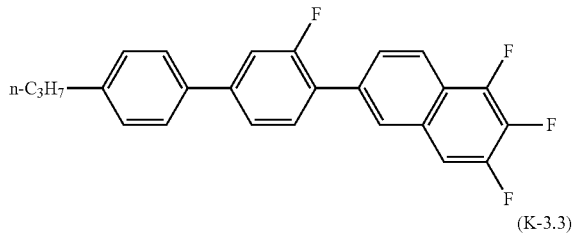
(K-3.2)
(K-3.3)

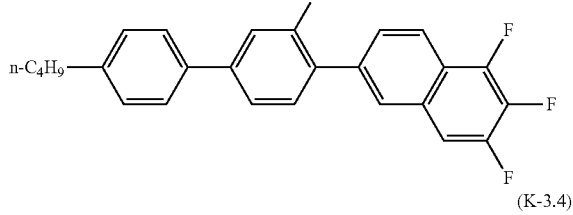
(K-3.4)

The lower limit of the preferred amount of these compounds is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

A compound represented by the general formula (K) is preferably a compound selected from the compound group represented by the general formula (K-4), for example.

[Chem. 124]

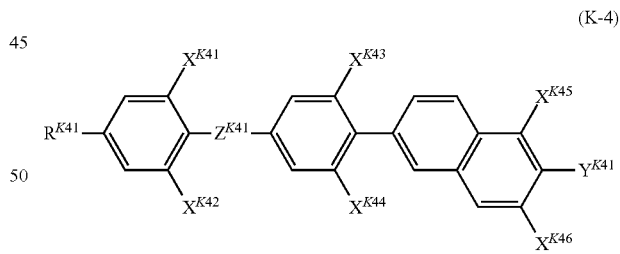
(K-4)

(wherein $R^{K41}$ represents an alkyl group having 1 to 5 carbon atoms, an alkenyl group having 2 to 5 carbon atoms, or an alkoxy group having 1 to 4 carbon atoms, $X^{K41}$ to $X^{K46}$ independently represent a hydrogen atom or a fluorine atom, $Y^{K41}$ represents a fluorine atom or $OCF_3$, and $Z^{K41}$ represents $-OCH_2-$, $-CH_2O-$, $-OCF_2-$, or $-CF_2O-$)

Although compounds of any types may be combined, these compounds are combined in a manner that depends on the desired characteristics, such as solubility at low temperatures, transition temperature, electrical reliability, and birefringence index. For example, one, two, three, or more compounds are used in one embodiment of the present invention.

The lower limit of the preferred amount of a compound represented by the formula (K-4) is 1%, 2%, 5%, 8%, 10%, 13%, 15%, 18%, 20%, 22%, 25%, or 30% of the total amount of a composition according to the present invention. The upper limit of the preferred amount is 30%, 28%, 25%, 23%, 20%, 18%, 15%, 13%, 10%, 8%, or 5%.

When a low viscosity and a high response speed are required for a composition according to the present invention, the lower limit is preferably decreased, and the upper limit is preferably decreased. When a high Tni and high temperature stability are required for a composition according to the present invention, the lower limit is preferably decreased, and the upper limit is preferably decreased. When the dielectric constant anisotropy is increased to maintain a low drive voltage, the lower limit is preferably increased, and the upper limit is preferably increased.

More specifically, a compound represented by the general formula (K-4) is preferably a compound represented by one of the formulae (K-4.1) to (K-4.18), more preferably the compound represented by the formula (K-4.1), (K-4.2), (K-4.11), or (K-4.12). The compounds represented by the formulae (K-4.1), (K-4.2), (K-4.11), (K-4.12) can also preferably be used simultaneously.

[Chem. 125]

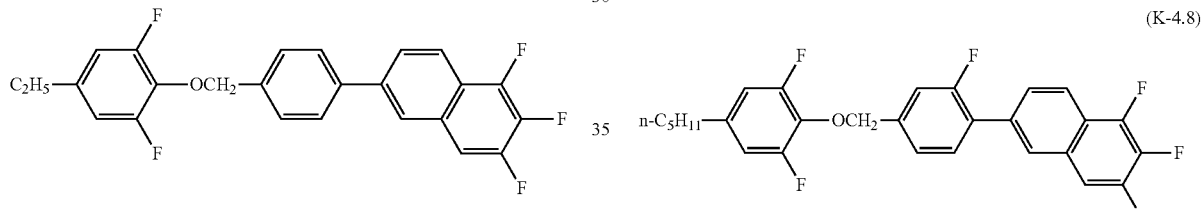

[Chem. 126]

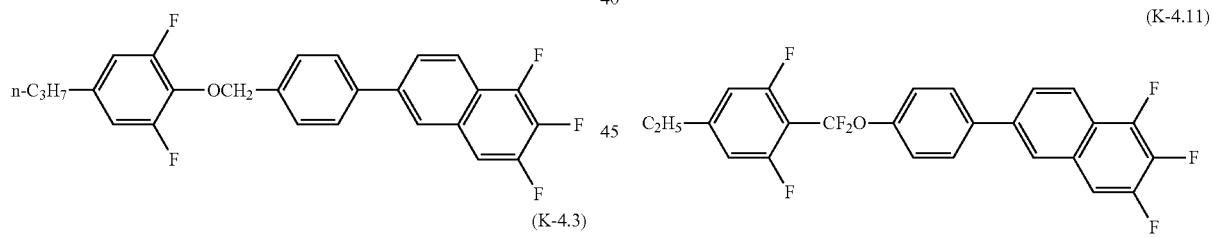

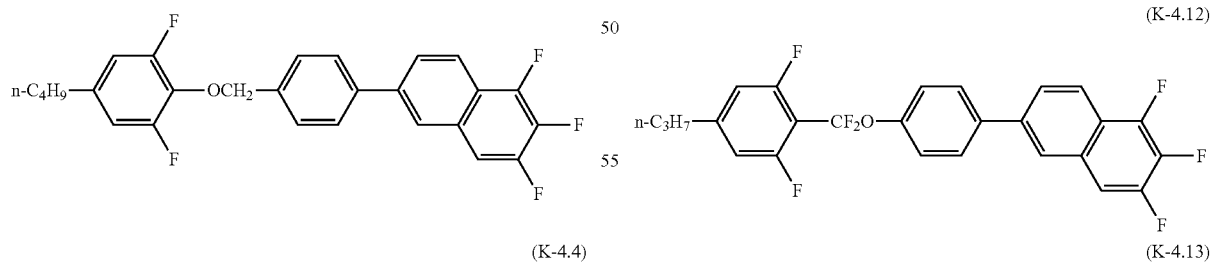

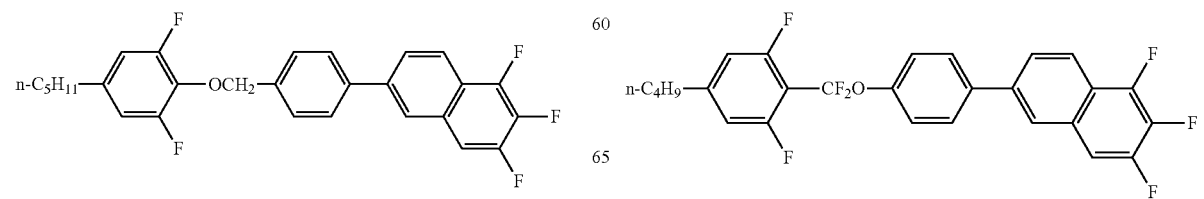

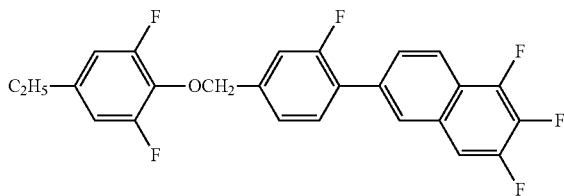

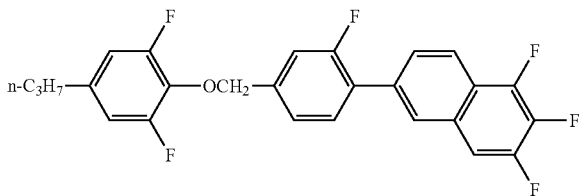

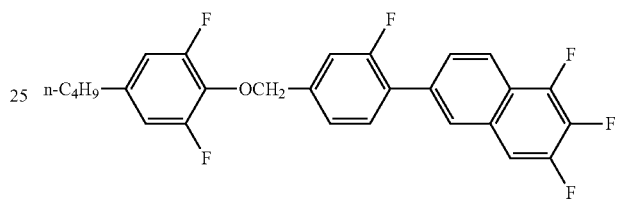

-continued (K-4.14)
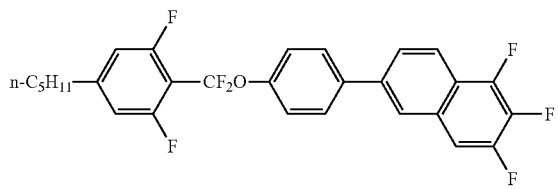

(K-4.15)
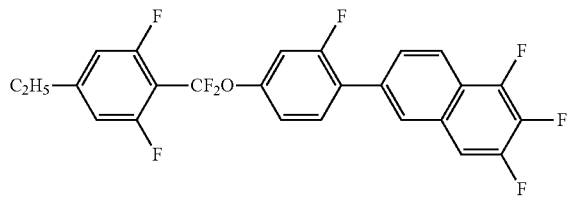

(K-4.16)
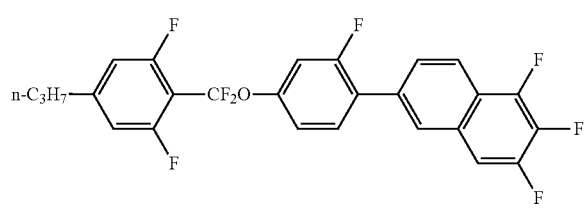

(K-4.17)
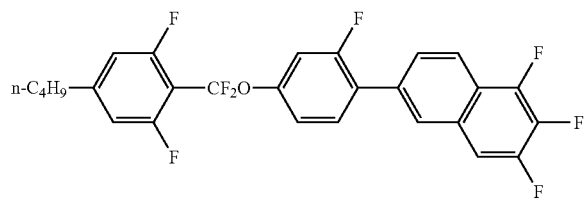

(K-4.18)
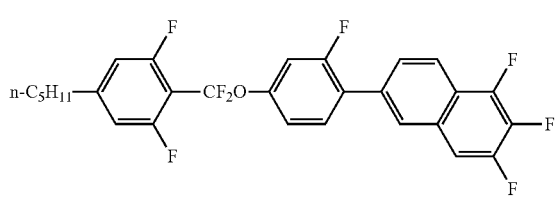

The lower limit of the preferred amount of these compounds is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

A compound represented by the general formula (K) is preferably a compound selected from the compound group represented by the general formula (K-5), for example.

[Chem. 127]

(K-5)
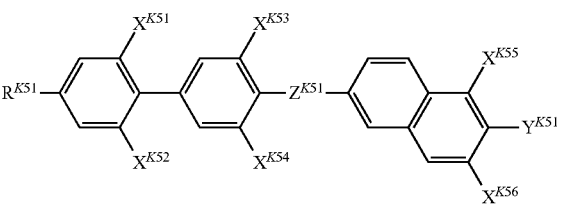

(wherein $R^{K51}$ represents an alkyl group having 1 to 5 carbon atoms, an alkenyl group having 2 to 5 carbon atoms, or an alkoxy group having 1 to 4 carbon atoms, $X^{K51}$ to $X^{K56}$ independently represent a hydrogen atom or a fluorine atom, $Y^{K51}$ represents a fluorine atom or $OCF_3$, and $Z^{K51}$ represents —$OCH_2$—, —$CH_2O$—, —$OCF_2$—, or —$CF_2O$—)

Although compounds of any types may be combined, these compounds are combined in a manner that depends on the desired characteristics, such as solubility at low temperatures, transition temperature, electrical reliability, and birefringence index. For example, one, two, three, or more compounds are used in one embodiment of the present invention.

The lower limit of the preferred amount of a compound represented by the formula (K-5) is 1%, 2%, 5%, 8%, 10%, 13%, 15%, 18%, 20%, 22%, 25%, or 30% of the total amount of a composition according to the present invention. The upper limit of the preferred amount is 30%, 28%, 25%, 23%, 20%, 18%, 15%, 13%, 10%, 8%, or 5%.

When a low viscosity and a high response speed are required for a composition according to the present invention, the lower limit is preferably decreased, and the upper limit is preferably decreased. When a high Tni and high temperature stability are required for a composition according to the present invention, the lower limit is preferably decreased, and the upper limit is preferably decreased. When the dielectric constant anisotropy is increased to maintain a low drive voltage, the lower limit is preferably increased, and the upper limit is preferably increased.

More specifically, a compound represented by the general formula (K-5) is preferably a compound represented by one of the formulae (K-5.1) to (K-5.18), preferably a compound represented by one of the formulae (K-5.11) to (K-5.14), more preferably the compound represented by the formula (K-5.12).

[Chem. 128]

(K-5.1)
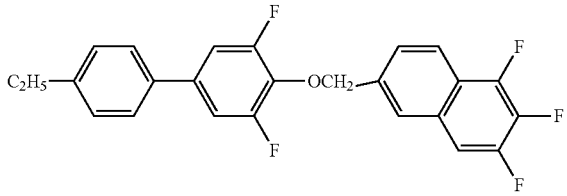

(K-5.2)
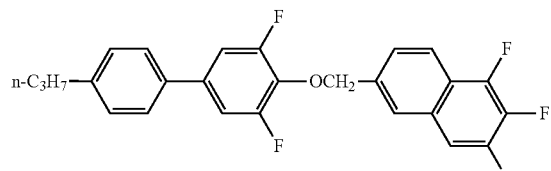
(K-5.3)
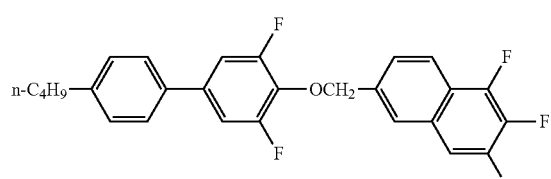
(K-5.4)
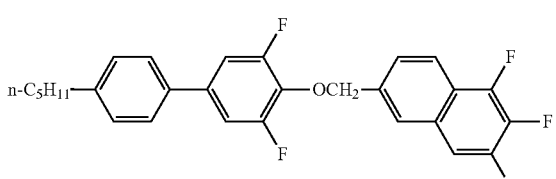
(K-5.5)
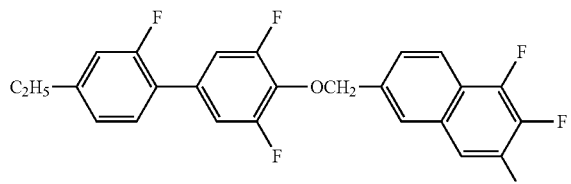
(K-5.6)
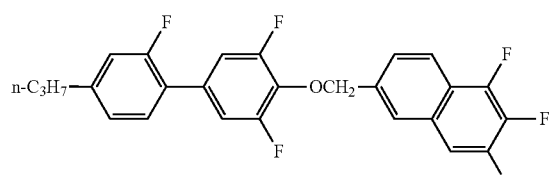
(K-5.7)
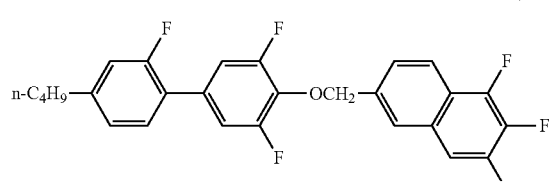
(K-5.8)
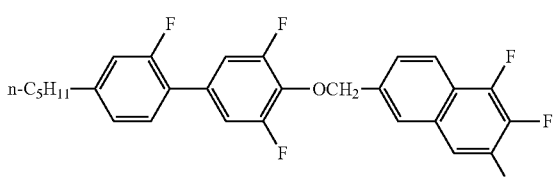
[Chem. 129]
(K-5.11)
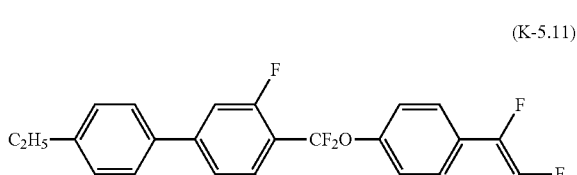
(K-5.12)
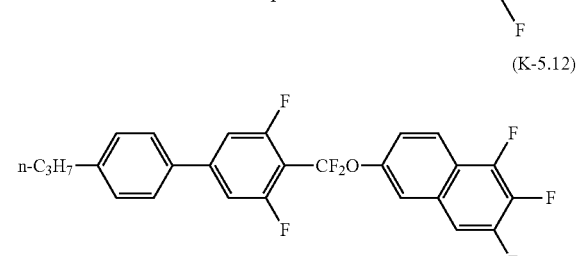
(K-5.13)
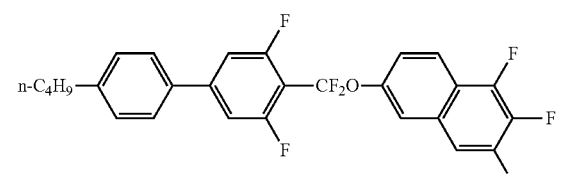
(K-5.14)
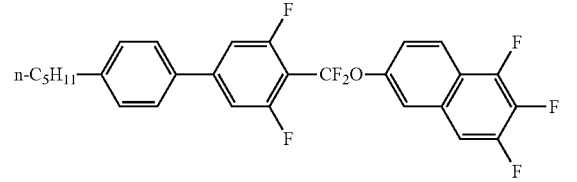
(K-5.15)
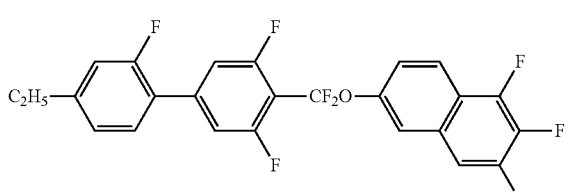
(K-5.16)
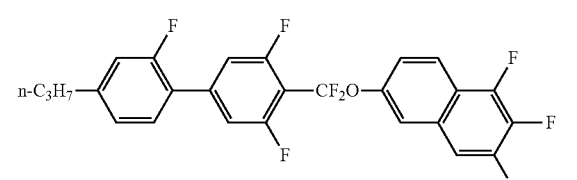
(K-5.17)
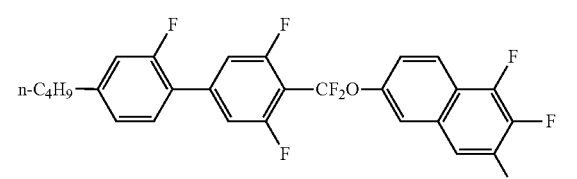

-continued (K-5.18)

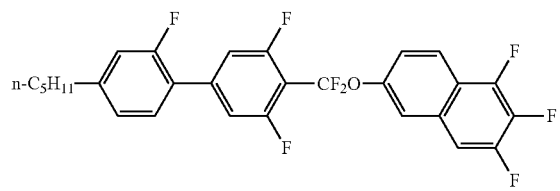

The lower limit of the preferred amount of these compounds is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

A compound represented by the general formula (K) is preferably a compound selected from the compound group represented by the general formula (K-6), for example.

[Chem. 130]

(K-6)

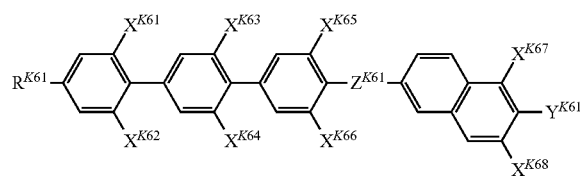

(wherein $R^{K61}$ represents an alkyl group having 1 to 5 carbon atoms, an alkenyl group having 2 to 5 carbon atoms, or an alkoxy group having 1 to 4 carbon atoms, $X^{K61}$ to $X^{K68}$ independently represent a hydrogen atom or a fluorine atom, $Y^{K61}$ represents a fluorine atom or $OCF_3$, and $Z^{K61}$ represents —$OCH_2$—, —$CH_2O$—, —$OCF_2$—, or —$CF_2O$—)

Although compounds of any types may be combined, these compounds are combined in a manner that depends on the desired characteristics, such as solubility at low temperatures, transition temperature, electrical reliability, and birefringence index. For example, one, two, three, or more compounds are used in one embodiment of the present invention.

The lower limit of the preferred amount of a compound represented by the formula (K-6) is 1%, 2%, 5%, 8%, 10%, 13%, 15%, 18%, 20%, 22%, 25%, or 30% of the total amount of a composition according to the present invention. The upper limit of the preferred amount is 30%, 28%, 25%, 23%, 20%, 18%, 15%, 13%, 10%, 8%, or 5%.

When a low viscosity and a high response speed are required for a composition according to the present invention, the lower limit is preferably decreased, and the upper limit is preferably decreased. When a high Tni and high temperature stability are required for a composition according to the present invention, the lower limit is preferably decreased, and the upper limit is preferably decreased. When the dielectric constant anisotropy is increased to maintain a low drive voltage, the lower limit is preferably increased, and the upper limit is preferably increased.

More specifically, a compound represented by the general formula (K-6) is preferably a compound represented by one of the formulae (K-6.1) to (K-6.18), preferably a compound represented by one of the formulae (K-6.15) to (K-6.18), more preferably the compound represented by the formula (K-6.16) or (K-6.17). The compounds represented by the formulae (K-6.16) and (K-6.17) are also preferably used simultaneously.

[Chem. 131]

(K-6.1)

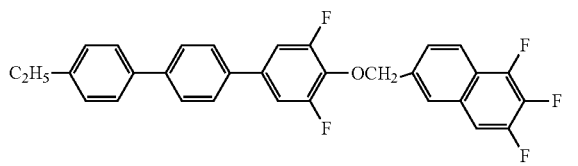

(K-6.2)

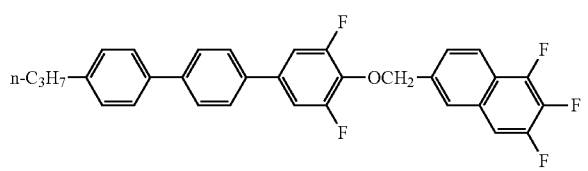

(K-6.3)

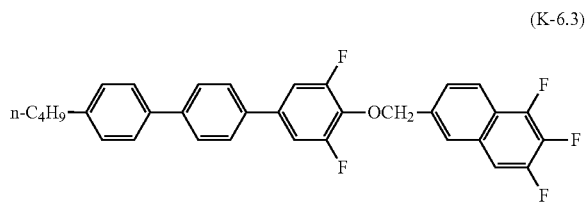

(K-6.4)

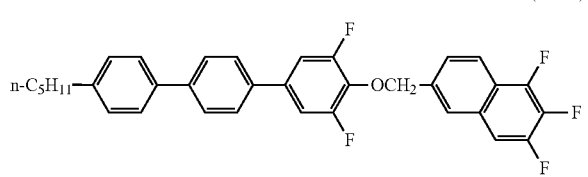

(K-6.5)

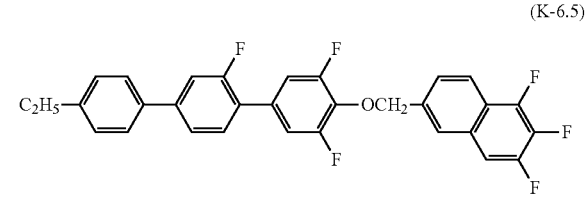

(K-6.6)

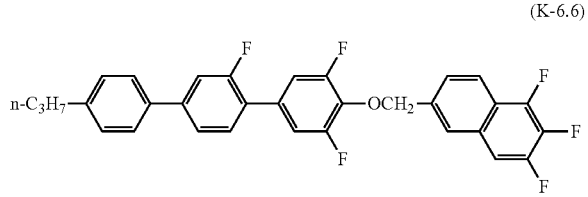

(K-6.7)

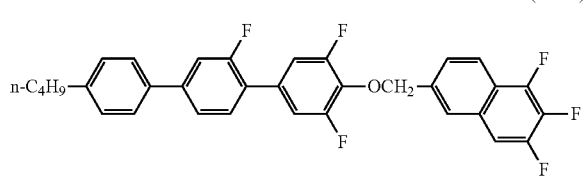

-continued (K-6.8)
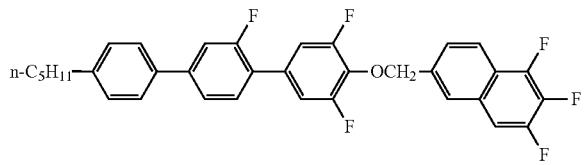

[Chem. 132]

(K-6.11)

(K-6.12)
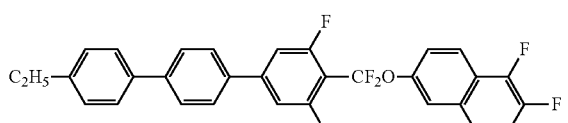

(K-6.13)
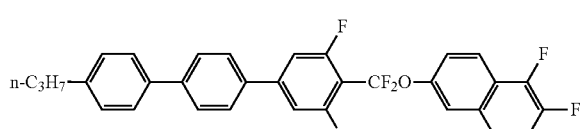

(K-6.14)

(K-6.15)
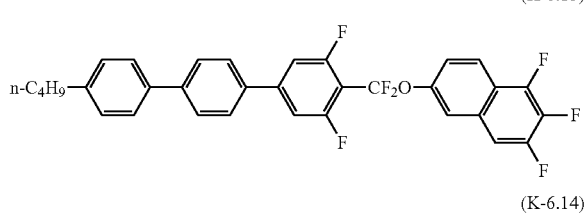

(K-6.16)

(K-6.17)
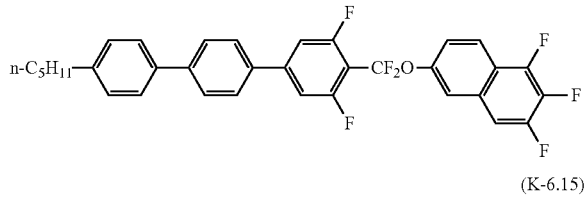
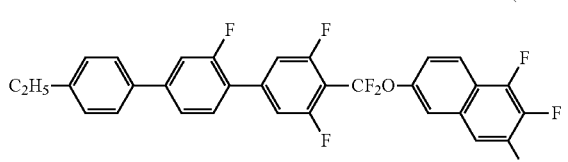
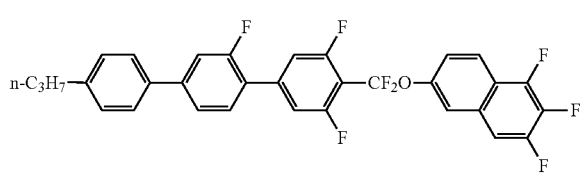
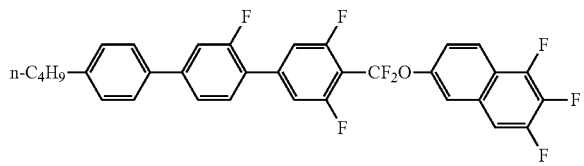

-continued (K-6.18)
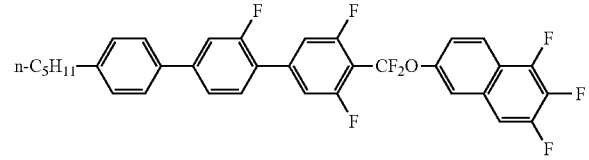

The lower limit of the preferred amount of these compounds is 1%, 2%, 4%, 5%, 8%, 10%, 13%, 15%, 18%, or 20% of the total amount of a composition according to the present invention. The upper limit of the preferred amount is 30%, 28%, 25%, 23%, 20%, 18%, 15%, 13%, 10%, 8%, or 5%.

A liquid crystal composition according to the present invention preferably contains one or two or more compounds represented by the general formula (L) in addition to a compound represented by the general formula (I). A compound represented by the general formula (L) corresponds to a dielectrically nearly neutral compound (with Δε in the range of −2 to 2).

[Chem. 133]

$$R^{L1}\text{-}A^{L1}\text{-}Z^{L1}\text{-}(A^{L2}\text{-}Z^{L2})_{n^{L1}}A^{L3}\text{-}R^{L2} \qquad (L)$$

(wherein $R^{L1}$ and $R^{L2}$ independently represent an alkyl group having 1 to 8 carbon atoms, and one —$CH_2$— or two or more nonadjacent —$CH_2$—'s in the alkyl group are independently optionally substituted with —CH=CH—, —C≡C—, —O—, —CO—, —COO—, or —OCO—, $n^{L1}$ is 0, 1, 2, or 3, $A^{L1}$, $A^{L2}$, and $A^{L3}$ independently represent a group selected from the group consisting of (a) a 1,4-cyclohexylene group (in which one —$CH_2$— or two or more nonadjacent —$CH_2$—'s are optionally substituted with —O—), (b) a 1,4-phenylene group (in which one —CH= or two or more nonadjacent —CH='s are optionally substituted with —N=), and (c) a naphthalene-2,6-diyl group, a 1,2,3,4-tetrahydronaphthalene-2,6-diyl group, or adecahydronaphthalene-2,6-diyl group (one —CH= or two or more nonadjacent —CH='s in the naphthalene-2,6-diyl group or in the 1,2,3,4-tetrahydronaphthalene-2,6-diyl group are optionally substituted with —N=), the groups (a), (b), and (c) are independently optionally substituted with a cyano group, a fluorine atom, or a chlorine atom, $Z^{L1}$ and $Z^{L2}$ independently represent a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF—, or —C≡C—, and if $n^{L1}$ is 2 or 3, a plurality of $A^{L2}$s may be the same or different, and if $n^{L1}$ is 2 or 3, a plurality of $Z^{L2}$s may be the same or different, but the compounds represented by the general formulae (N-1), (N-2), and (N-3) are excluded)

The compounds represented by the general formula (L) may be used alone or in combination. Although compounds of any types may be combined, these compounds are appropriately combined in a manner that depends on the desired characteristics, such as solubility at low temperatures, transition temperature, electrical reliability, and birefringence index. For example, one compound is used in one embodiment of the present invention. Two, three, four, five, six, seven, eight, nine, ten, or more compounds are used in another embodiment of the present invention.

The amount of a compound represented by the general formula (L) in a composition according to the present invention should be appropriately adjusted in a manner that depends on the desired characteristics, such as solubility at low temperatures, transition temperature, electrical reliability, birefringence index, process compatibility, drop marks, image-sticking, and dielectric constant anisotropy.

The lower limit of the preferred amount of a compound represented by the formula (L) is 1%, 10%, 20%, 30%, 40%, 50%, 55%, 60%, 65%, 70%, 75%, or 80% of the total amount of the composition according to the present invention. The upper limit of the preferred amount is 95%, 85%, 75%, 65%, 55%, 45%, 35%, or 25%.

When a low viscosity and a high response speed are required for a composition according to the present invention, the lower limit is preferably high, and the upper limit is preferably high. When a high Tni and high temperature stability are required for a composition according to the present invention, the lower limit is preferably high, and the upper limit is preferably high. When dielectric constant anisotropy is increased to maintain a low driving voltage, the lower limit is preferably low, and the upper limit is preferably low.

When reliability is regarded as important, both $R^{L1}$ and $R^{L2}$ preferably represent an alkyl group. When lower volatility of the compound is regarded as important, both $R^{L1}$ and $R^{L2}$ preferably represent an alkoxy group. When lower viscosity is regarded as important, at least one of $R^{L1}$ and $R^{L2}$ preferably represents an alkenyl group.

The number of halogen atoms in the molecule is preferably 0, 1, 2, or 3, preferably 0 or 1, preferably 1 when compatibility with another liquid crystal molecule is regarded as important.

When the ring structure to which each of $R^{L1}$ and $R^{L2}$ is bonded is a phenyl group (aromatic), $R^{L1}$ and $R^{L2}$ preferably independently represent a linear alkyl group having 1 to 5 carbon atoms, a linear alkoxy group having 1 to 4 carbon atoms, or an alkenyl group having 4 or 5 carbon atoms. When the ring structure to which each of $R^{L1}$ and $R^{L2}$ is bonded is a saturated ring structure, such as cyclohexane, pyran, or dioxane, $R^{L1}$ and $R^{L2}$ preferably independently represent a linear alkyl group having 1 to 5 carbon atoms, a linear alkoxy group having 1 to 4 carbon atoms, or a linear alkenyl group having 2 to 5 carbon atoms. In order to stabilize the nematic phase, the total number of carbon atoms and, if present, oxygen atoms is preferably 5 or less, and a straight chain is preferred.

The alkenyl group is preferably selected from the groups represented by the formulae ($R^1$) to ($R^5$). (The dark dot in each formula represents a carbon atom in the ring structure.)

[Chem. 134]

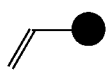

(R1)

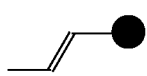

(R2)

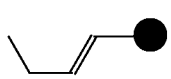

(R3)

-continued

(R4)

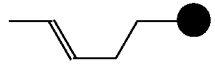

(R5)

When the response speed is regarded as important, $n^{L1}$ is preferably 0. In order to improve the upper limit temperature of the nematic phase, $n^{L1}$ is preferably 2 or 3. In order to achieve the balance therebetween, $n^{L1}$ is preferably 1. In order to satisfy the characteristics required for the composition, compounds with different $n^{L1}$s are preferably combined.

$A^{L1}$, $A^{L2}$, and $A^{L3}$ preferably independently represent an aromatic when an increased Δn is required, represent an aliphatic to improve the response speed, or represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group, more preferably the following structures,

[Chem. 135]

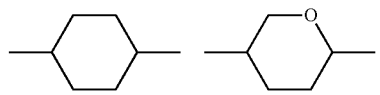

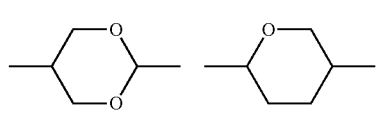

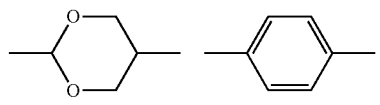

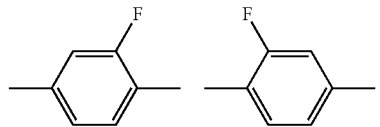

and more preferably independently represent a trans-1,4-cyclohexylene group or a 1,4-phenylene group.

When the response speed is regarded as important, $Z^{L1}$ and $Z^{L2}$ preferably represent a single bond.

The number of halogen atoms in the molecule of a compound represented by the general formula (L) is preferably 0 or 1. The halogen atom is preferably a fluorine atom or a chlorine atom, more preferably a fluorine atom.

A compound represented by the general formula (L) is preferably a compound selected from the compound group represented by the general formulae (L-1) to (L-7).

A compound represented by the general formula (L-1) is the following compound.

[Chem. 136]

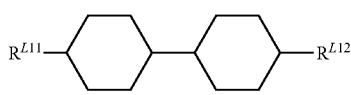
(L-1)

(wherein $R^{L11}$ and $R^{L12}$ have the same meaning as $R^{L1}$ and $R^{L2}$, respectively, in the general formula (L))

$R^{L11}$ and $R^{L12}$ preferably represent a linear alkyl group having 1 to 5 carbon atoms, a linear alkoxy group having 1 to 4 carbon atoms, or a linear alkenyl group having 2 to 5 carbon atoms.

The compounds represented by the general formula (L-1) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The lower limit of the preferred amount is 1%, 2%, 3%, 5%, 7%, 10%, 15%, 20%, 25%, 30%, 35%, 40%, 45%, 50%, or 55% of the total amount of composition according to the present invention. The upper limit of the preferred amount is 95%, 90%, 85%, 80%, 75%, 70%, 65%, 60%, 55%, 50%, 45%, 40%, 35%, 30%, or 25% of the total amount of composition according to the present invention.

When a low viscosity and a high response speed are required for a composition according to the present invention, the lower limit is preferably high, and the upper limit is preferably high. When a high Tni and high temperature stability are required for a composition according to the present invention, the lower limit is preferably medium, and the upper limit is preferably medium. When dielectric constant anisotropy is increased to maintain a low driving voltage, the lower limit is preferably low, and the upper limit is preferably low.

A compound represented by the general formula (L-1) is preferably a compound selected from the compound group represented by the general formula (L-1-1).

[Chem. 137]

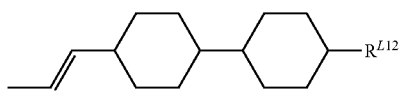
(L-1-1)

(wherein $R^{L12}$ has the same meaning as in the general formula (L-1))

A compound represented by the general formula (L-1-1) is preferably a compound selected from the compound group represented by the formulae (L-1-1.1) to (L-1-1.3), preferably a compound represented by the formula (L-1-1.2) or (L-1-1.3), particularly preferably the compound represented by the formula (L-1-1.3).

[Chem. 138]

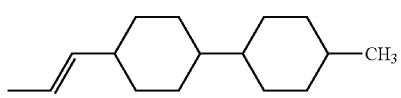
(L-1-1.1)

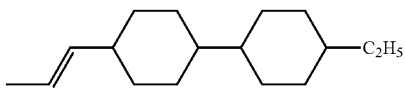
(L-1-1.2)

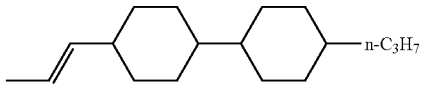
(L-1-1.3)

The lower limit of the preferred amount of the compound represented by the formula (L-1-1.3) is 1%, 2%, 3%, 5%, 7%, or 10% of the total amount of a composition according to the present invention. The upper limit of the preferred amount is 20%, 15%, 13%, 10%, 8%, 7%, 6%, 5%, or 3% of the total amount of a composition according to the present invention.

A compound represented by the general formula (L-1) is preferably a compound selected from the compound group represented by the general formula (L-1-2).

[Chem. 139]

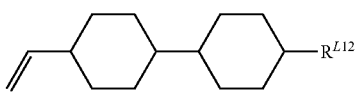
(L-1-2)

(wherein $R^{L12}$ has the same meaning as in the general formula (L-1))

The lower limit of the preferred amount of a compound represented by the formula (L-1-2) is 1%, 5%, 10%, 15%, 17%, 20%, 23%, 25%, 27%, 30%, or 35% of the total amount of the composition according to the present invention. The upper limit of the preferred amount is 60%, 55%, 50%, 45%, 42%, 40%, 38%, 35%, 33%, or 30% of the total amount of a composition according to the present invention.

A compound represented by the general formula (L-1-2) is preferably a compound selected from the compound group represented by the formulae (L-1-2.1) to (L-1-2.4), preferably a compound represented by one of the formulae (L-1-2.2) to (L-1-2.4). In particular, the compound represented by the formula (L-1-2.2) is preferred in order to particularly improve the response speed of a composition according to the present invention. The compound represented by the formula (L-1-2.3) or (L-1-2.4) is preferably used when a high Tni rather than a high response speed is required. In order to improve solubility at low temperatures, it is undesirable that the amount of the compound represented by the formula (L-1-2.3) or (L-1-2.4) be 30% or more.

[Chem. 140]

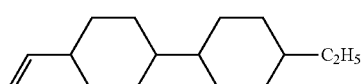
(L-1-2.1)

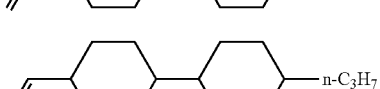
(L-1-2.2)

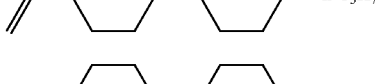
(L-1-2.3)

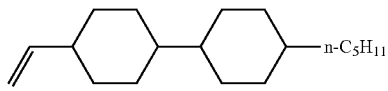
(L-1-2.4)

The lower limit of the preferred amount of the compound represented by the formula (L-1-2.2) is 10%, 15%, 18%, 20%, 23%, 25%, 27%, 30%, 33%, 35%, 38%, or 40% of the total amount of the composition according to the present invention. The upper limit of the preferred amount is 60%, 55%, 50%, 45%, 43%, 40%, 38%, 35%, 32%, 30%, 27%, 25%, or 22% of the total amount of a composition according to the present invention.

The lower limit of the preferred total amount of the compound represented by the formula (L-1-1.3) and the compound represented by the formula (L-1-2.2) is 10%, 15%, 20%, 25%, 27%, 30%, 35%, or 40% of the total amount of a composition according to the present invention. The upper limit of the preferred amount is 60%, 55%, 50%, 45%, 43%, 40%, 38%, 35%, 32%, 30%, 27%, 25%, or 22% of the total amount of a composition according to the present invention.

A compound represented by the general formula (L-1) is preferably a compound selected from the compound group represented by the general formula (L-1-3).

[Chem. 141]

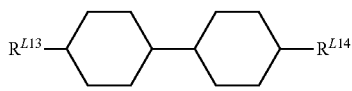
(L-1-3)

(wherein $R^{L13}$ and $R^{L14}$ independently represent an alkyl group having 1 to 8 carbon atoms or an alkoxy group having 1 to 8 carbon atoms)

$R^{L13}$ and $R^{L14}$ preferably represent a linear alkyl group having 1 to 5 carbon atoms, a linear alkoxy group having 1 to 4 carbon atoms, or a linear alkenyl group having 2 to 5 carbon atoms.

The lower limit of the preferred amount of a compound represented by the formula (L-1-3) is 1%, 5%, 10%, 13%, 15%, 17%, 20%, 23%, 25%, or 30% of the total amount of a composition according to the present invention. The upper limit of the preferred amount is 60%, 55%, 50%, 45%, 40%, 37%, 35%, 33%, 30%, 27%, 25%, 23%, 20%, 17%, 15%, 13%, or 10% of the total amount of a composition according to the present invention.

A compound represented by the general formula (L-1-3) is preferably a compound selected from the compound group represented by the formulae (L-1-3.1) to (L-1-3.13), preferably a compound represented by the formula (L-1-3.1), (L-1-3.3), or (L-1-3.4). In particular, the compound represented by the formula (L-1-3.1) is preferred in order to particularly improve the response speed of a composition according to the present invention. The compounds represented by the formulae (L-1-3.3), (L-1-3.4), (L-1-3.11), and (L-1-3.12) are preferably used when a high Tni rather than a high response speed is required. In order to improve solubility at low temperatures, it is undesirable that the total amount of compounds represented by the formulae (L-1-3.3), (L-1-3.4), (L-1-3.11), and (L-1-3.12) be 20% or more.

[Chem. 142]

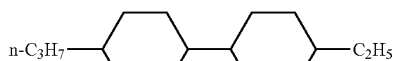
(L-1-3.1)

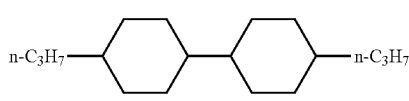
(L-1-3.2)

(L-1-3.3)

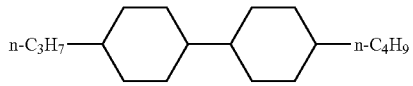

(L-1-3.4)

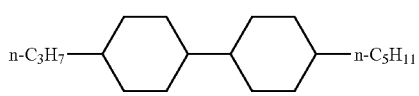

(L-1-3.11)

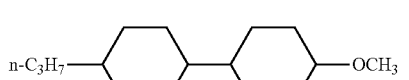

(L-1-3.12)

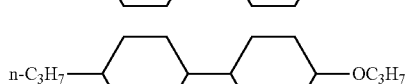

(L-1-3.13)

The lower limit of the preferred amount of the compound represented by the formula (L-1-3.1) is 1%, 2%, 3%, 5%, 7%, 10%, 13%, 15%, 18%, or 20% of the total amount of a composition according to the present invention. The upper limit of the preferred amount is 20%, 17%, 15%, 13%, 10%, 8%, 7%, or 6% of the total amount of a composition according to the present invention.

A compound represented by the general formula (L-1) is preferably a compound selected from the compound group represented by the general formulae (L-1-4) and/or (L-1-5).

[Chem. 143]

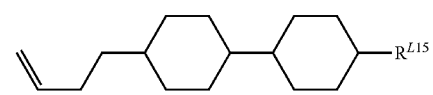
(I-1-4)

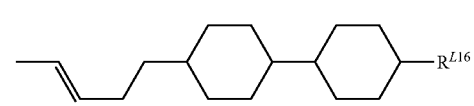
(I-1-5)

(wherein $R^{L15}$ and $R^{L16}$ independently represent an alkyl group having 1 to 8 carbon atoms or an alkoxy group having 1 to 8 carbon atoms)

$R^{L15}$ and $R^{L16}$ preferably represent a linear alkyl group having 1 to 5 carbon atoms, a linear alkoxy group having 1 to 4 carbon atoms, or a linear alkenyl group having 2 to 5 carbon atoms.

The lower limit of the preferred amount of a compound represented by the formula (L-1-4) is 1%, 5%, 10%, 13%, 15%, 17%, or 20% of the total amount of a composition according to the present invention. The upper limit of the preferred amount is 25%, 23%, 20%, 17%, 15%, 13%, or 10% of the total amount of a composition according to the present invention.

The lower limit of the preferred amount of a compound represented by the formula (L-1-5) is 1%, 5%, 10%, 13%, 15%, 17%, or 20% of the total amount of a composition according to the present invention. The upper limit of the preferred amount is 25%, 23%, 20%, 17%, 15%, 13%, or 10% of the total amount of a composition according to the present invention.

A compound represented by the general formula (L-1-4) or (L-1-5) is preferably a compound selected from the compound group represented by the formulae (L-1-4.1) to (L-1-5.3), preferably a compound represented by the formula (L-1-4.2) or (L-1-5.2).

[Chem. 144]

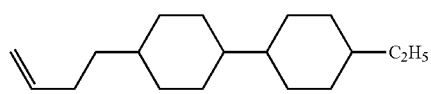
(L-1-4.1)

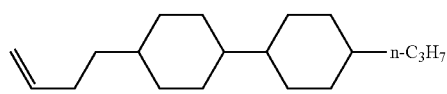
(L-1-4.2)

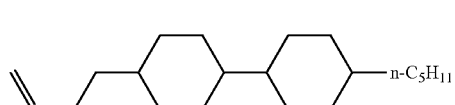
(L-1-4.3)

(L-1-5.1)

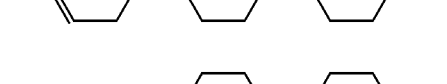
(L-1-5.2)

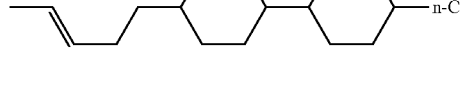
(L-1-5.3)

The lower limit of the preferred amount of the compound represented by the formula (L-1-4.2) is 1%, 2%, 3%, 5%, 7%, 10%, 13%, 15%, 18%, or 20% of the total amount of a composition according to the present invention. The upper limit of the preferred amount is 20%, 17%, 15%, 13%, 10%, 8%, 7%, or 6% of the total amount of a composition according to the present invention.

Two or more compounds selected from the compounds represented by the formulae (L-1-1.3), (L-1-2.2), (L-1-3.1), (L-1-3.3), (L-1-3.4), (L-1-3.11), and (L-1-3.12) are preferably combined, and two or more compounds selected from the compounds represented by the formulae (L-1-1.3), (L-1-2.2), (L-1-3.1), (L-1-3.3), (L-1-3.4), and (L-1-4.2) are preferably combined. The lower limit of the preferred total amount of these compounds is 1%, 2%, 3%, 5%, 7%, 10%, 13%, 15%, 18%, 20%, 23%, 25%, 27%, 30%, 33%, or 35% of the total amount of a composition according to the present invention. The upper limit is 80%, 70%, 60%, 50%, 45%, 40%, 37%, 35%, 33%, 30%, 28%, 25%, 23%, or 20% of the total amount of a composition according to the present invention. When the reliability of the composition is regarded as important, two or more compounds selected from the compounds represented by the formulae (L-1-3.1), (L-1-3.3), and (L-1-3.4) are preferably combined. When the response speed of the composition is regarded as important, two or more compounds selected from the compounds represented by the formulae (L-1-1.3) and (L-1-2.2) are preferably combined. A compound represented by the general formula (L-1) is preferably a compound selected from the compound group represented by the general formula (L-1-6).

[Chem. 145]

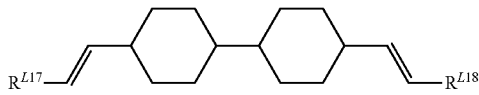
(L-1-6)

(wherein $R^{L17}$ and $R^{L18}$ independently represent a methyl group or a hydrogen atom)

The lower limit of the preferred amount of a compound represented by the formula (L-1-6) is 1%, 5%, 10%, 15%, 17%, 20%, 23%, 25%, 27%, 30%, or 35% of the total amount of the composition according to the present invention. The upper limit of the preferred amount is 60%, 55%, 50%, 45%, 42%, 40%, 38%, 35%, 33%, or 30% of the total amount of a composition according to the present invention.

A compound represented by the general formula (L-1-6) is preferably a compound selected from the compound group represented by the formulae (L-1-6.1) to (L-1-6.3).

[Chem. 146]

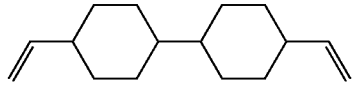
(L-1-6.1)

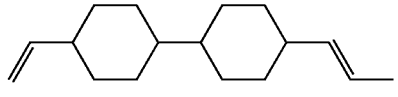
(L-1-6.2)

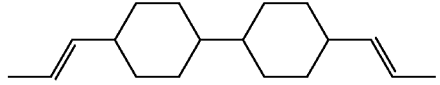
(L-1-6.3)

A compound represented by the general formula (L-2) is the following compound.

[Chem. 147]

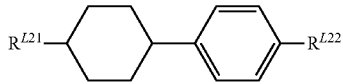
(L-2)

(wherein $R^{L21}$ and $R^{L22}$ have the same meaning as $R^{L1}$ and $R^{L2}$, respectively, in the general formula (L))

$R^{L21}$ preferably represents an alkyl group having 1 to 5 carbon atoms or an alkenyl group having 2 to 5 carbon atoms, and $R^{L22}$ preferably represents an alkyl group having 1 to 5 carbon atoms, an alkenyl group having 4 or 5 carbon atoms, or an alkoxy group having 1 to 4 carbon atoms.

The compounds represented by the general formula (L-1) may be used alone or as a combination of two or more thereof. Although compounds of any types may be combined, these compounds are combined in a manner that depends on the desired characteristics, such as solubility at low temperatures, transition temperature, electrical reliability, and birefringence index. For example, one, two, three, four, five, or more compounds are used in one embodiment of the present invention.

When solubility at low temperatures is regarded as important, greater amounts are effective. When the response speed is regarded as important, smaller amounts are effective. When reduced drop marks or improved image-sticking characteristics are desired, the amount is preferably set in a medium range.

The lower limit of the preferred amount of a compound represented by the formula (L-2) is 1%, 2%, 3%, 5%, 7%, or 10% of the total amount of a composition according to the present invention. The upper limit of the preferred amount is 20%, 15%, 13%, 10%, 8%, 7%, 6%, 5%, or 3% of the total amount of a composition according to the present invention.

A compound represented by the general formula (L-2) is preferably a compound selected from the compound group represented by the formulae (L-2.1) to (L-2.6), preferably a compound represented by the formula (L-2.1), (L-2.3), (L-2.4), or (L-2.6).

[Chem. 148]

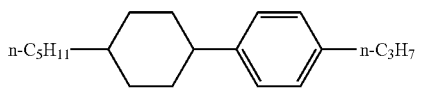
(L-2.1)

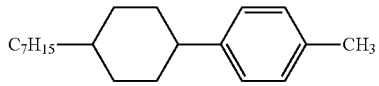
(L-2.2)

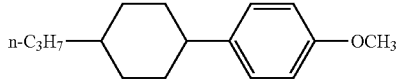
(L-2.3)

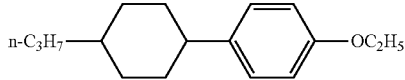
(L-2.4)

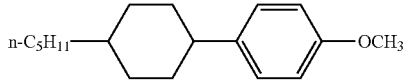
(L-2.5)

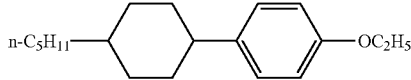
(L-2.6)

A compound represented by the general formula (L-3) is the following compound.

[Chem. 149]

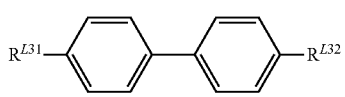
(L-3)

(wherein $R^{L31}$ and $R^{L32}$ have the same meaning as $R^{L1}$ and $R^{L2}$, respectively, in the general formula (L))

$R^{L31}$ and $R^{L32}$ preferably independently represent an alkyl group having 1 to 5 carbon atoms, an alkenyl group having 4 or 5 carbon atoms, or an alkoxy group having 1 to 4 carbon atoms.

The compounds represented by the general formula (L-3) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The lower limit of the preferred amount of a compound represented by the formula (L-3) is 1%, 2%, 3%, 5%, 7%, or 10% of the total amount of a composition according to the present invention. The upper limit of the preferred amount is 20%, 15%, 13%, 10%, 8%, 7%, 6%, 5%, or 3% of the total amount of a composition according to the present invention.

When a high birefringence index is desired, greater amounts are effective. When a high Tni is regarded as important, smaller amounts are effective. When reduced drop marks or improved image-sticking characteristics are desired, the amount is preferably set in a medium range.

A compound represented by the general formula (L-3) is preferably a compound selected from the compound group represented by the formulae (L-3.1) to (L-3.7), preferably a compound represented by one of the formulae (L-3.2) to (L-3.7).

[Chem. 150]

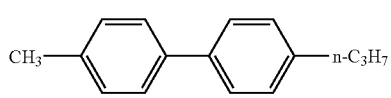
(L-3.1)

(L-3.2)

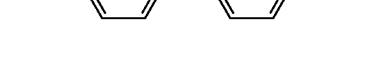
(L-3.3)

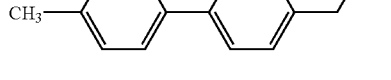
(L-3.4)

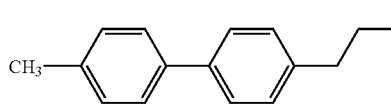
(L-3.6)

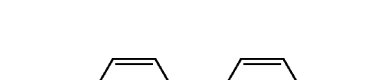
(L-3.7)

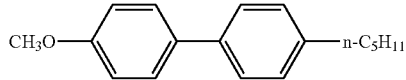

A compound represented by the general formula (L-4) is the following compound.

[Chem. 151]

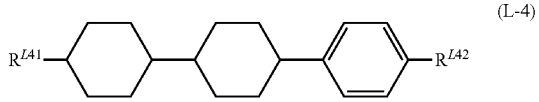

(L-4)

(wherein $R^{L41}$ and $R^{L42}$ have the same meaning as $R^{L1}$ and $R^{L2}$, respectively, in the general formula (L))

$R^{L41}$ preferably represents an alkyl group having 1 to 5 carbon atoms or an alkenyl group having 2 to 5 carbon atoms, and $R^{L42}$ preferably represents an alkyl group having 1 to 5 carbon atoms, an alkenyl group having 4 or 5 carbon atoms, or an alkoxy group having 1 to 4 carbon atoms)

The compounds represented by the general formula (L-4) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount of a compound represented by the general formula (L-4) in a composition according to the present invention should be appropriately adjusted in a manner that depends on the desired characteristics, such as solubility at low temperatures, transition temperature, electrical reliability, birefringence index, process compatibility, drop marks, image-sticking, and dielectric constant anisotropy.

The lower limit of the preferred amount of a compound represented by the formula (L-4) is 1%, 2%, 3%, 5%, 7%, 10%, 14%, 16%, 20%, 23%, 26%, 30%, 35%, or 40% of the total amount of a composition according to the present invention. The upper limit of the preferred amount of a compound represented by the formula (L-4) is 50%, 40%, 35%, 30%, 20%, 15%, 10%, or 5% of the total amount of a composition according to the present invention.

A compound represented by the general formula (L-4) is preferably a compound represented by one of the formulae (L-4.1) to (L-4.3), for example.

[Chem. 152]

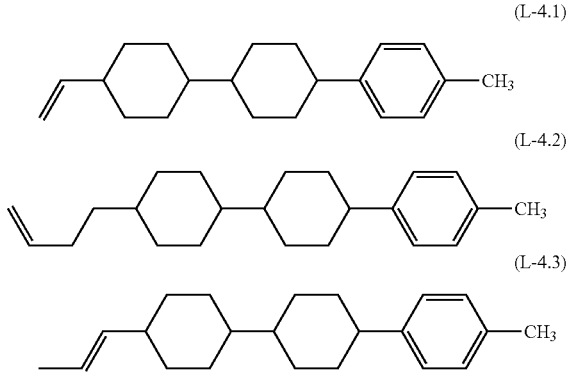

Depending on the desired characteristics, such as solubility at low temperatures, transition temperature, electrical reliability, and birefringence index, the compound represented by the formula (L-4.1), the compound represented by the formula (L-4.2), or both the compound represented by the formula (L-4.1) and the compound represented by the formula (L-4.2) may be contained, or all the compounds represented by the formulae (L-4.1) to (L-4.3) may be contained. The lower limit of the preferred amount of the compound represented by the formula (L-4.1) or (L-4.2) is 3%, 5%, 7%, 9%, 11%, 12%, 13%, 18%, or 21% of the total amount of a composition according to the present invention, and the preferred upper limit thereof is 45, 40%, 35%, 30%, 25%, 23%, 20%, 18%, 15%, 13%, 10%, or 8%.

When both the compound represented by the formula (L-4.1) and the compound represented by the formula (L-4.2) are contained, the lower limit of the preferred amount of both compounds is 15%, 19%, 24%, or 30% of the total amount of a composition according to the present invention, and the preferred upper limit thereof is 45, 40%, 35%, 30%, 25%, 23%, 20%, 18%, 15%, or 13%.

A compound represented by the general formula (L-4) is preferably a compound represented by one of the formulae (L-4.4) to (L-4.6), for example, preferably the compound represented by the formula (L-4.4).

[Chem. 153]

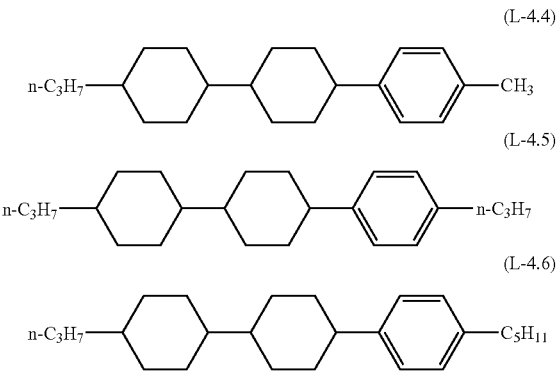

Depending on the desired characteristics, such as solubility at low temperatures, transition temperature, electrical reliability, and birefringence index, the compound represented by the formula (L-4.4), the compound represented by the formula (L-4.5), or both the compound represented by the formula (L-4.4) and the compound represented by the formula (L-4.5) may be contained.

The lower limit of the preferred amount of the compound represented by the formula (L-4.4) or (L-4.5) is 3%, 5%, 7%, 9%, 11%, 12%, 13%, 18%, or 21% of the total amount of a composition according to the present invention. The preferred upper limit is 45, 40%, 35%, 30%, 25%, 23%, 20%, 18%, 15%, 13%, 10%, or 8%.

When both the compound represented by the formula (L-4.4) and the compound represented by the formula (L-4.5) are contained, the lower limit of the preferred amount of both compounds is 15%, 19%, 24%, or 30% of the total amount of a composition according to the present invention, and the preferred upper limit thereof is 45, 40%, 35%, 30%, 25%, 23%, 20%, 18%, 15%, or 13%.

A compound represented by the general formula (L-4) is preferably a compound represented by one of the formulae (L-4.7) to (L-4.10), particularly preferably the compound represented by the formula (L-4.9).

[Chem. 154]

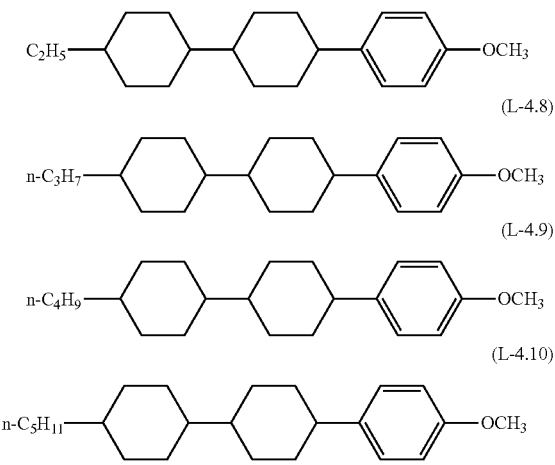

A compound represented by the general formula (L-5) is the following compound.

[Chem. 155]

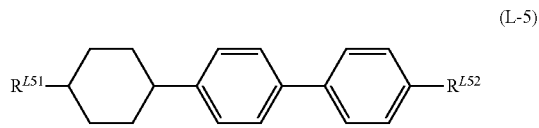

(wherein $R^{L51}$ and $R^{L52}$ have the same meaning as $R^{L1}$ and $R^{L2}$, respectively, in the general formula (L))

$R^{L51}$ preferably represents an alkyl group having 1 to 5 carbon atoms or an alkenyl group having 2 to 5 carbon atoms, and $R^{L52}$ preferably represents an alkyl group having 1 to 5 carbon atoms, an alkenyl group having 4 or 5 carbon atoms, or an alkoxy group having 1 to 4 carbon atoms.

The compounds represented by the general formula (L-5) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount of a compound represented by the general formula (L-5) in a composition according to the present invention should be appropriately adjusted in a manner that depends on the desired characteristics, such as solubility at low temperatures, transition temperature, electrical reliability, birefringence index, process compatibility, drop marks, image-sticking, and dielectric constant anisotropy.

The lower limit of the preferred amount of a compound represented by the formula (L-5) is 1%, 2%, 3%, 5%, 7%, 10%, 14%, 16%, 20%, 23%, 26%, 30%, 35%, or 40% of the total amount of a composition according to the present invention. The upper limit of the preferred amount of a compound represented by the formula (L-5) is 50%, 40%, 35%, 30%, 20%, 15%, 10%, or 5% of the total amount of a composition according to the present invention.

A compound represented by the general formula (L-5) is preferably the compound represented by the formula (L-5.1) or (L-5.2), particularly preferably the compound represented by the formula (L-5.1).

The lower limit of the preferred amount of these compounds is 1%, 2%, 3%, 5%, or 7% of the total amount of a composition according to the present invention. The upper limit of the preferred amount of these compounds is 20%, 15%, 13%, 10%, or 9%.

[Chem. 156]

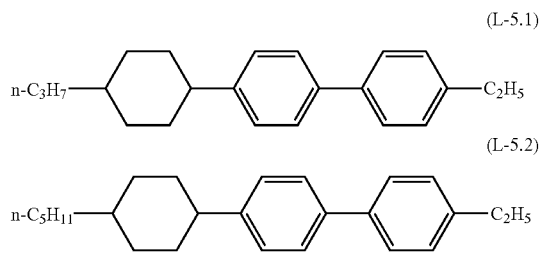

A compound represented by the general formula (L-5) is preferably the compound represented by the formula (L-5.3) or (L-5.4).

The lower limit of the preferred amount of these compounds is 1%, 2%, 3%, 5%, or 7% of the total amount of a composition according to the present invention. The upper limit of the preferred amount of these compounds is 20%, 15%, 13%, 10%, or 9%.

[Chem. 157]

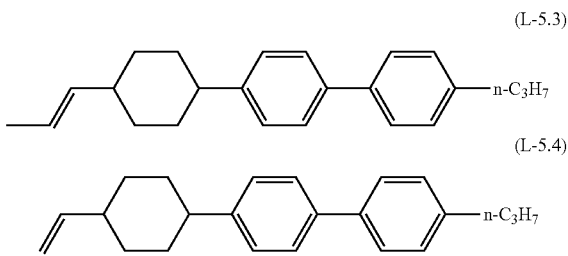

A compound represented by the general formula (L-5) is preferably a compound selected from the compound group represented by the formulae (L-5.5) to (L-5.7), particularly preferably the compound represented by the formula (L-5.7).

The lower limit of the preferred amount of these compounds is 1%, 2%, 3%, 5%, or 7% of the total amount of a composition according to the present invention. The upper limit of the preferred amount of these compounds is 20%, 15%, 13%, 10%, or 9%.

[Chem. 158]

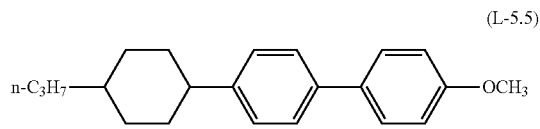

-continued (L-5.6)

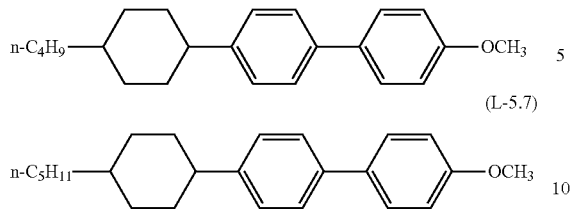

(L-5.7)

A compound represented by the general formula (L-6) is the following compound.

[Chem. 159]

(L-6)

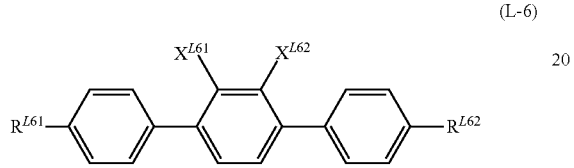

(wherein $R^{L61}$ and $R^{L62}$ independently have the same meaning as $R^{L1}$ and $R^{L2}$ in the general formula (L), and $X^{L61}$ and $X^{L62}$ independently represent a hydrogen atom or a fluorine atom)

$R^{L61}$ and $R^{L62}$ preferably independently represent an alkyl group having 1 to 5 carbon atoms or an alkenyl group having 2 to 5 carbon atoms, one of $X^{L61}$ and $X^{L62}$ preferably represents a fluorine atom, and the other preferably represents a hydrogen atom.

The compounds represented by the general formula (L-6) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The lower limit of the preferred amount of a compound represented by the formula (L-6) is 1%, 2%, 3%, 5%, 7%, 10%, 14%, 16%, 20%, 23%, 26%, 30%, 35%, or 40% of the total amount of a composition according to the present invention. The upper limit of the preferred amount of a compound represented by the formula (L-6) is 50%, 40%, 35%, 30%, 20%, 15%, 10%, or 5% of the total amount of a composition according to the present invention. When an increased Δn is regarded as important, the amount is preferably increased, and when precipitation at low temperatures is regarded as important, the amount is preferably decreased.

A compound represented by the general formula (L-6) is preferably a compound represented by one of the formulae (L-6.1) to (L-6.9).

[Chem. 160]

(L-6.1)

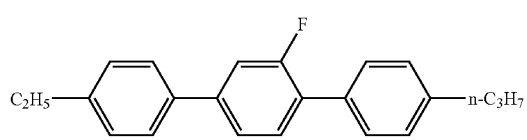

(L-6.2)

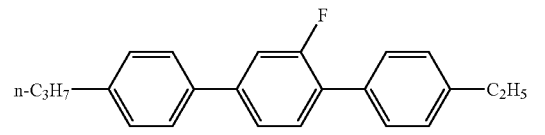

(L-6.3)

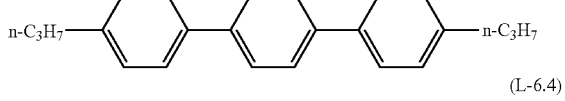

(L-6.4)

(L-6.5)

(L-6.6)

(L-6.7)

(L-6.8)

(L-6.9)

Although compounds of any types may be combined, one to three of these compounds are preferably contained, and one to four of these compounds are more preferably contained. Because a broad molecular weight distribution of a compound to be selected is also effective for solubility, for example, one compound represented by the formula (L-6.1) or (L-6.2), one compound represented by the formula (L-6.4) or (L-6.5), one compound represented by the formula (L-6.6) or (L-6.7), and one compound represented by the formula (L-6.8) or (L-6.9) are preferably appropriately combined. Among these, the compounds represented by the formulae (L-6.1), (L-6.3), (L-6.4), (L-6.6), and (L-6.9) are preferably contained.

A compound represented by the general formula (L-6) is preferably a compound represented by one of the formulae (L-6.10) to (L-6.17), for example, and is particularly preferably the compound represented by the formula (L-6.11).

[Chem. 161]

(L-6.10)
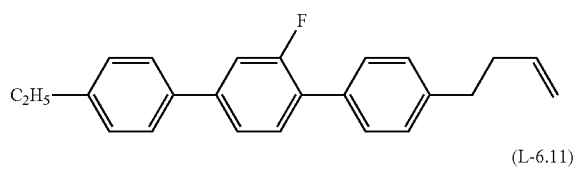

(L-6.11)
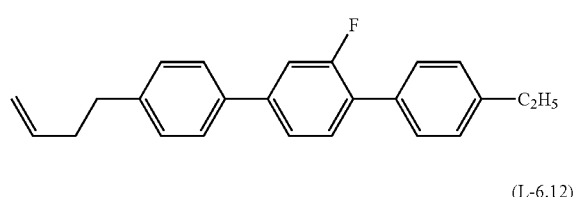

(L-6.12)
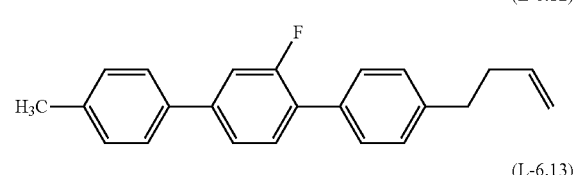

(L-6.13)
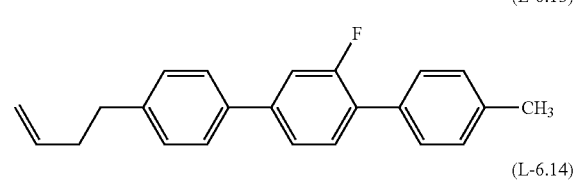

(L-6.14)
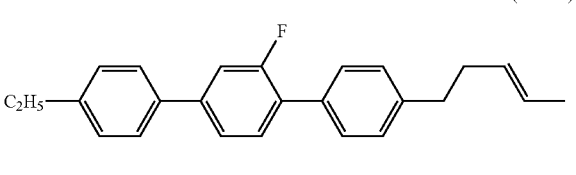

(L-6.15)
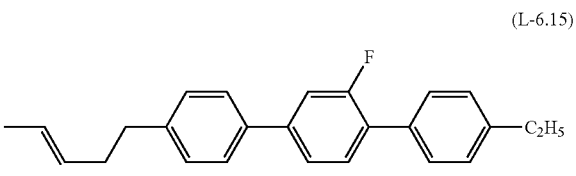

(L-6.16)
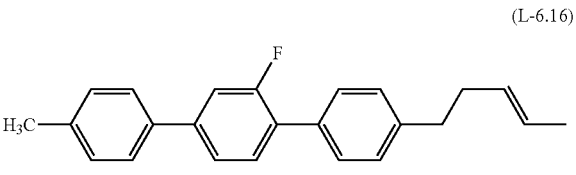

(L-6.17)
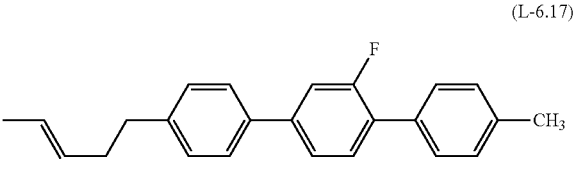

The lower limit of the preferred amount of these compounds is 1%, 2%, 3%, 5%, or 7% of the total amount of a composition according to the present invention. The upper limit of the preferred amount of these compounds is 20%, 15%, 13%, 10%, or 9%.

A compound represented by the general formula (L-7) is the following compound.

[Chem. 162]

(L-7)
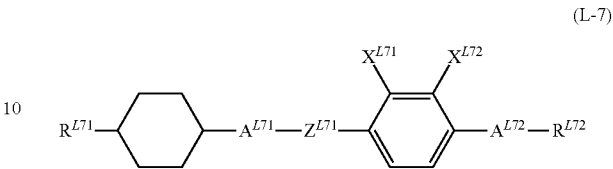

(wherein $R^{L71}$ and $R^{L72}$ independently have the same meaning as $R^{L1}$ and $R^{L2}$ in the general formula (L), $A^{L71}$ and $A^{L72}$ independently have the same meaning as $A^{L2}$ and $A^{L3}$ in the general formula (L), a hydrogen atom in $A^{L71}$ and $A^{L72}$ is independently optionally substituted with a fluorine atom, $Z^{L71}$ has the same meaning as $Z^{L2}$ in the general formula (L), and $X^{L71}$ and $X^{L72}$ independently represent a fluorine atom or a hydrogen atom)

$R^{L71}$ and $R^{L72}$ preferably independently represent an alkyl group having 1 to 5 carbon atoms, an alkenyl group having 2 to 5 carbon atoms, or an alkoxy group having 1 to 4 carbon atoms, $A^{L71}$ and $A^{L72}$ preferably independently represent a 1,4-cyclohexylene group or a 1,4-phenylene group, a hydrogen atom in $A^{L71}$ and $A^{L72}$ is independently optionally substituted with a fluorine atom, $Z^{L71}$ preferably represents a single bond or —COO—, preferably a single bond, and $X^{L71}$ and $X^{L72}$ preferably represent a hydrogen atom.

Although compounds of any types may be combined, these compounds are combined in a manner that depends on the desired characteristics, such as solubility at low temperatures, transition temperature, electrical reliability, and birefringence index. For example, one, two, three, four, or more compounds are used in one embodiment of the present invention.

The amount of a compound represented by the general formula (L-7) in a composition according to the present invention should be appropriately adjusted in a manner that depends on the desired characteristics, such as solubility at low temperatures, transition temperature, electrical reliability, birefringence index, process compatibility, drop marks, image-sticking, and dielectric constant anisotropy.

The lower limit of the preferred amount of a compound represented by the formula (L-7) is 1%, 2%, 3%, 5%, 7%, 10%, 14%, 16%, or 20% of the total amount of a composition according to the present invention. The upper limit of the preferred amount of a compound represented by the formula (L-7) is 30%, 25%, 23%, 20%, 18%, 15%, 10%, or 5% of the total amount of a composition according to the present invention.

In an embodiment in which a composition according to the present invention with a high Tni is desired, the amount of a compound represented by the formula (L-7) is preferably increased. In an embodiment in which a composition according to the present invention with a low viscosity is desired, the amount of a compound represented by the formula (L-7) is preferably decreased.

A compound represented by the general formula (L-7) is preferably a compound represented by one of the formulae (L-7.1) to (L-7.4), preferably the compound represented by the formula (L-7.2).

[Chem. 163]

(L-7.1)
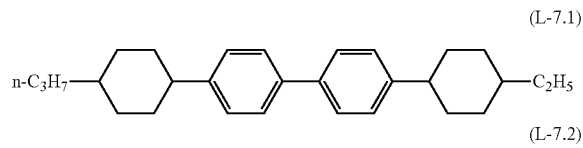

(L-7.2)

(L-7.3)

(L-7.4)

A compound represented by the general formula (L-7) is preferably a compound represented by one of the formulae (L-7.11) to (L-7.13), preferably the compound represented by the formula (L-7.11).

[Chem. 164]

(L-7.11)
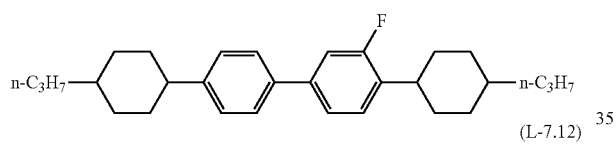

(L-7.12)

(L-7.13)

A compound represented by the general formula (L-7) is a compound represented by one of the formulae (L-7.21) to (L-7.23). The compound represented by the formula (L-7.21) is preferred.

[Chem. 165]

(L-7.21)
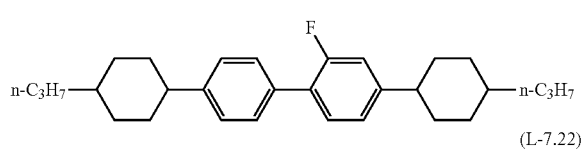

(L-7.22)

(L-7.23)
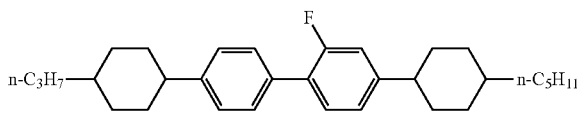

A compound represented by the general formula (L-7) is preferably a compound represented by one of the formulae (L-7.31) to (L-7.34), preferably the compound represented by the formula (L-7.31) or/and (L-7.32).

[Chem. 166]

(L-7.31)
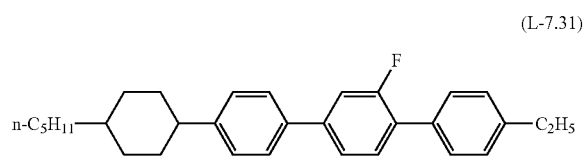

(L-7.32)

(L-7.33)
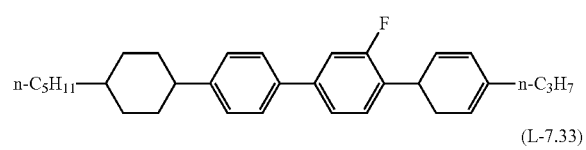

(L-7.34)

A compound represented by the general formula (L-7) is preferably a compound represented by one of the formulae (L-7.41) to (L-7.44), preferably the compound represented by the formula (L-7.41) or/and (L-7.42).

[Chem. 167]

(L-7.41)
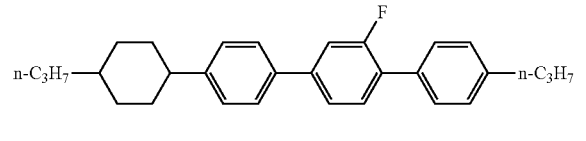

(L-7.42)
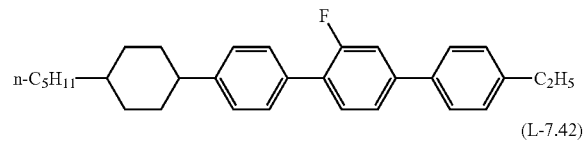

(L-7.43)
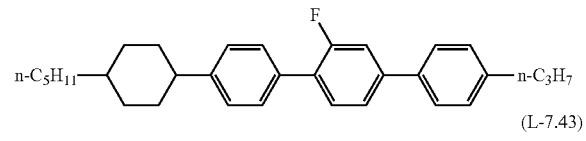

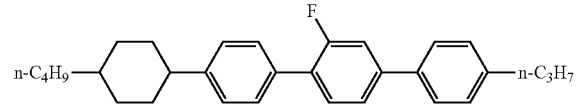

(L-7.44)

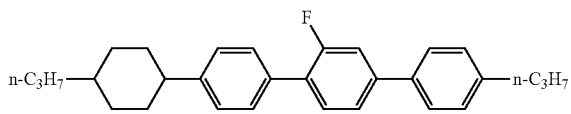

A compound represented by the general formula (L-7) is preferably a compound represented by one of the formulae (L-7.51) to (L-7.53).

[Chem. 168]

(L-7.51)

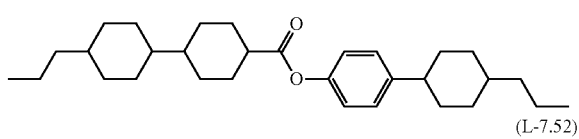

(L-7.52)

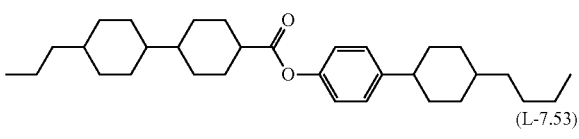

(L-7.53)

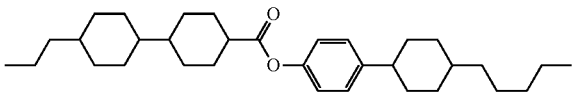

A liquid crystal composition according to the present invention may contain another polymerizable compound in combination with a polymerizable compound represented by the general formula (I). The other polymerizable compound is preferably a polymerizable compound represented by the general formula (II).

[Chem. 169]

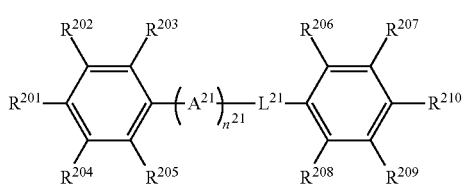

(II)

(wherein $R^{201}$, $R^{202}$, $R^{203}$, $R^{204}$, $R^{205}$, $R^{206}$, $R^{207}$, $R^{208}$, $R^{209}$, and $R^{210}$ independently represent $P^{21}$—$S^{21}$—, a fluorine atom, or a hydrogen atom, an alkyl group having 1 to 18 carbon atoms optionally substituted with a fluorine atom, or an alkoxy group having 1 to 18 carbon atoms optionally substituted with a fluorine atom, and $P^{21}$ is represented by one of the formulae (R-1) to (R-9) in the general formula (I), $S^{21}$ represents a single bond or an alkylene group having 1 to 15 carbon atoms, and one or two or more —$CH_2$—'s in the alkylene group are optionally substituted with —O—, —OCO—, or —COO—, provided that oxygen atoms are not directly adjacent to each other, $n^{21}$ is 0, 1, or 2, $A^{21}$ represents a group selected from the group consisting of (a) a 1,4-cyclohexylene group (in which one —$CH_2$— or two or more nonadjacent —$CH_2$—'s are optionally substituted with —O—), (b) a 1,4-phenylene group (in which one —CH= or two or more nonadjacent —CH='s are optionally substituted with —N=), and (c) a naphthalene-2,6-diyl group, a 1,2,3,4-tetrahydronaphthalene-2,6-diyl group, or a decahydronaphthalene-2,6-diyl group (one —CH= or two or more nonadjacent —CH='s in the naphthalene-2,6-diyl group or in the 1,2,3,4-tetrahydronaphthalene-2,6-diyl group are optionally substituted with —N=), the groups (a), (b), and (c) are independently optionally substituted with a halogen, a cyano group, a nitro group, $P^{21}$—$S^{21}$—, an alkyl group having 1 to 12 carbon atoms, or an alkoxy group having 1 to 12 carbon atoms, one molecule of the general formula (II) has at least one $P^{21}$—$S^{21}$—, $L^{21}$ represents a single bond, —$OCH_2$—, —$CH_2O$—, —$C_2H_4$—, —$OC_2H_4O$—, —COO—, —OCO—, —CH=$CR^a$—COO—, —CH=$CR^a$—OCO—, —COO—$CR^a$=CH—, —OCO—$CR^a$=CH—, —$(CH_2)_z$—COO—, —$(CH_2)_z$—OCO—, —OCO—$(CH_2)_z$—, —COO—$(CH_2)_z$—, —CH=CH—, —$CF_2O$—, —$OCF_2$—, or —C≡C— (wherein $R^a$ independently represents a hydrogen atom or an alkyl group having 1 to 3 carbon atoms, and z is independently an integer in the range of 1 to 4), and pluralities of $P^{21}$s, $S^{21}$s, and $A^{21}$s, if present, may be the same or different $P^{21}$s, $S^{21}$s, and $A^{21}$s, respectively, but the compounds represented by the general formula (I) are excluded)

A liquid crystal composition containing a polymerizable compound represented by the general formula (I) and a polymerizable compound represented by the general formula (II) is effective in reducing the occurrence of display defects due to a change in pretilt angle.

In the general formula (II), one molecule of the compound represented by the general formula (II) preferably has one or two or more $P^{21}$—$S^{21}$— groups and preferably has four or less $P^{21}$—$S^{21}$— groups. The number of $P^{21}$—$S^{21}$— groups in one molecule of the general formula (II) preferably ranges from one to four, more preferably one to three, and the number of $P^{21}$—$S^{21}$— groups in a molecule of the compound represented by the general formula (II) is particularly preferably 2 or 3.

A compound represented by the general formula (II) has a structure in which two benzene rings and an optional ring $A^{21}$ are bonded, and has the functions and effects of a polymerizable compound due to at least one $P^{21}$—$S^{21}$— in the two benzene rings and the ring $A^{21}$.

In the general formula (II), when one or two or more selected from the group consisting of $R^{201}$, $R^{202}$, $R^{203}$, $R^{204}$, $R^{205}$, $R^{206}$, $R^{207}$, $R^{208}$, $R^{209}$, and $R^{210}$ are $P^{21}$—$S^{21}$—, one or two or more of $R^{201}$, $R^{202}$, $R^{204}$, $R^{207}$, $R^{209}$, and $R^{210}$ are preferably $P^{21}$—$S^{21}$—, and $R^{201}$ and $R^{210}$ are more preferably $P^{21}$—$S^{21}$—.

In the general formula (II), $R^{201}$ and $R^{210}$ are preferably independently $P^{21}$—$S^{21}$—, and $R^{201}$ and $R^{210}$ may be the same $P^{21}$—$S^{21}$— or different $P^{21}$—$S^{21}$— groups.

In the general formula (II), $R^{201}$, $R^{202}$, $R^{203}$, $R^{204}$, $R^{205}$, $R^{206}$, $R^{207}$, $R^{208}$, $R^{209}$, and $R^{210}$ independently represent $P^{21}$—$S^{21}$—, a fluorine atom, or a hydrogen atom, an alkyl group having 1 to 18 carbon atoms optionally substituted with a fluorine atom, or an alkoxy group having 1 to 18 carbon atoms optionally substituted with a fluorine atom, wherein the number of carbon atoms in the alkyl group and the alkoxy group preferably ranges from 1 to 16, more preferably 1 to 10, still more preferably 1 to 8, still more preferably 1 to 6, still more preferably 1 to 4, particularly preferably 1 to 3. The alkyl group and the alkoxy group may be linear or branched and are particularly preferably linear.

In the general formula (II), $R^{202}$, $R^{203}$, $R^{204}$, $R^{205}$, $R^{206}$, $R^{207}$, $R^{208}$, and $R^{209}$ independently represent $P^{21}$—$S^{21}$—, a fluorine atom, a hydrogen atom, or an alkyl group having 1 to 3 carbon atoms, more preferably $P^{21}$—$S^{21}$—, a fluorine atom, or a hydrogen atom, still more preferably a fluorine atom or a hydrogen atom.

$P^{21}$ is preferably represented by the formula (R-1), more preferably represents an acryl group or a methacryl group, still more preferably represents a methacryl group.

$S^{21}$ preferably represents a single bond or an alkylene group having 1 to 3 carbon atoms, more preferably a single bond.

In the general formula (II), $n^{21}$ is preferably 0 or 1.

In the general formula (II), $A^{21}$ preferably represents a 1,4-phenylene group or a naphthalene-2,6-diyl group, more preferably a 1,4-phenylene group.

In the general formula (II), $L^{21}$ preferably represents a single bond, —OCH$_2$—, —CH$_2$O—, —C$_2$H$_4$—, —COO—, —OCO—, —CH═CH—COO—, —CH═CH—OCO—, —COO—CH═CH—, —OCO—CH═CH—, —C$_2$H$_4$—COO—, —C$_2$H$_4$—OCO—, —OCO—C$_2$H$_4$—, —COO—C$_2$H$_4$—, —CH═CH—, —CF$_2$O—, —OCF$_2$—, or —C≡C—.

The amount of a polymerizable compound represented by the general formula (II) ranges from 0.01% to 5% by mass. The lower limit of the amount is preferably 0.02% by mass, preferably 0.03% by mass, preferably 0.04% by mass, preferably 0.05% by mass, preferably 0.06% by mass, preferably 0.07% by mass, preferably 0.08% by mass, preferably 0.09% by mass, preferably 0.1% by mass, preferably 0.15% by mass, preferably 0.2% by mass, preferably 0.25% by mass, preferably 0.3% by mass, preferably 0.35% by mass, preferably 0.4% by mass, preferably 0.5% by mass, preferably 0.55% by mass. The upper limit of the amount is preferably 4.5% by mass, preferably 4% by mass, preferably 3.5% by mass, preferably 3% by mass, preferably 2.5% by mass, preferably 2% by mass, preferably 1.5% by mass, preferably 1% by mass, preferably 0.95% by mass, preferably 0.9% by mass, preferably 0.85% by mass, preferably 0.8% by mass, preferably 0.75% by mass, preferably 0.7% by mass, preferably 0.65% by mass, preferably 0.6% by mass, preferably 0.55% by mass.

The upper limit of the total amount of a polymerizable compound represented by the general formula (I) and a polymerizable compound represented by the general formula (II) is preferably 6% by mass, preferably 5.8% by mass, preferably 5.5% by mass, preferably 5.2% by mass, preferably 5% by mass, preferably 4.8% by mass, preferably 4.6% by mass, preferably 4.4% by mass, preferably 4.2% by mass, preferably 4% by mass, preferably 3.5% by mass, preferably 3% by mass, preferably 2.5% by mass, preferably 2% by mass, preferably 1.5% by mass, preferably 1% by mass, preferably 0.95% by mass, preferably 0.9% by mass, preferably 0.85% by mass, preferably 0.8% by mass, preferably 0.75% by mass, preferably 0.7% by mass, preferably 0.65% by mass, preferably 0.6% by mass, preferably 0.55% by mass, of the total amount of a liquid crystal composition according to the present invention (100% by mass).

The lower limit of the total amount is preferably 0.02% by mass, preferably 0.03% by mass, preferably 0.04% by mass, preferably 0.05% by mass, preferably 0.06% by mass, preferably 0.07% by mass, preferably 0.08% by mass, preferably 0.09% by mass, preferably 0.1% by mass, preferably 0.15% by mass, preferably 0.2% by mass, preferably 0.25% by mass, preferably 0.3% by mass, preferably 0.35% by mass, preferably 0.4% by mass, preferably 0.5% by mass.

A compound represented by the general formula (II) according to the present invention is preferably a polymerizable compound represented by the general formula (IV).

[Chem. 170]

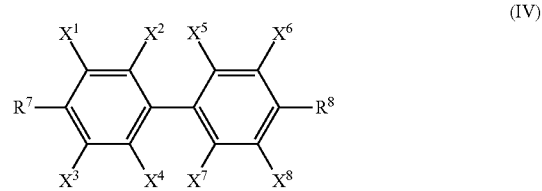

(IV)

In the general formula (IV), $R^7$ and $R^8$ are independently represented by one of the formulae (R-1) to (R-9), and $X^1$ to $X^8$ independently represent a trifluoromethyl group, a fluorine atom, or a hydrogen atom.

In the general formula (IV), $R^7$ and $R^8$ preferably independently represent a methacryl group or an acryl group.

A compound represented by the general formula (IV) is more preferably represented by one or two or more selected from the group consisting of the formulae (IV-11) to (IV-15) and is particularly preferably represented by the formula (IV-11).

[Chem. 171]

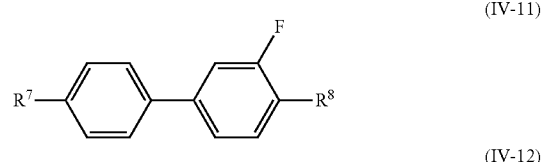

(IV-11)

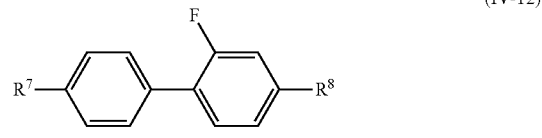

(IV-12)

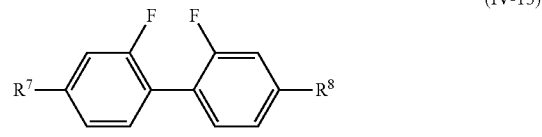

(IV-13)

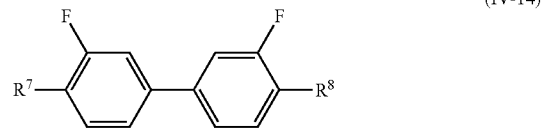

(IV-14)

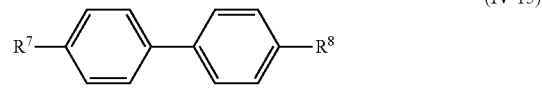

(IV-15)

A polymerizable compound represented by one of the formulae (IV-11) to (IV-15) in combination with a polymerizable compound represented by the general formula (I) provides a better alignment state.

More specifically, a compound represented by the general formula (II) according to the present invention is preferably a compound represented by one of the formula (XX-1) to the general formula (XX-13), for example, more preferably the formulae (XX-1) to (XX-7).

[Chem. 172]

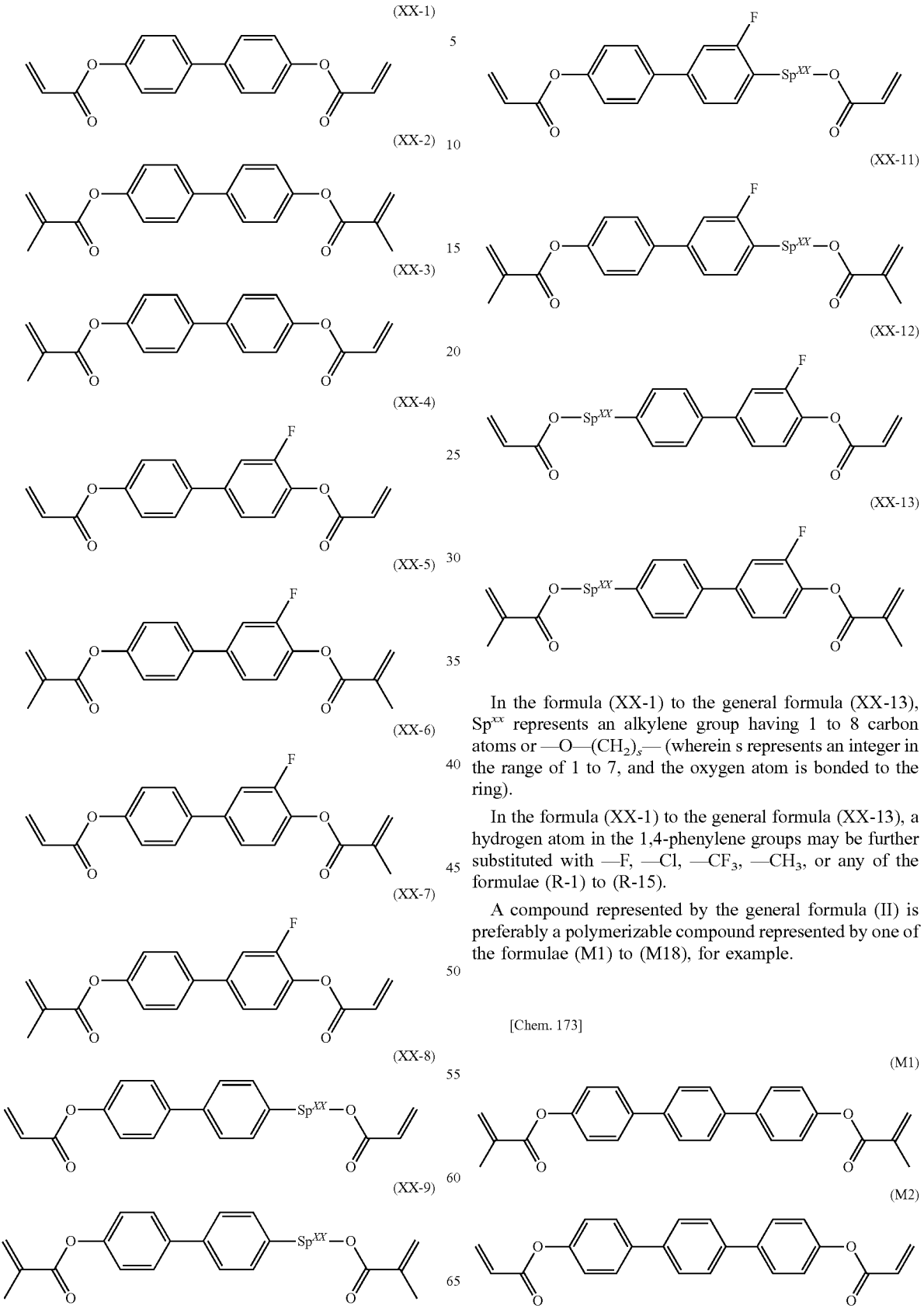

In the formula (XX-1) to the general formula (XX-13), $Sp^{xx}$ represents an alkylene group having 1 to 8 carbon atoms or $-O-(CH_2)_s-$ (wherein s represents an integer in the range of 1 to 7, and the oxygen atom is bonded to the ring).

In the formula (XX-1) to the general formula (XX-13), a hydrogen atom in the 1,4-phenylene groups may be further substituted with —F, —Cl, —CF₃, —CH₃, or any of the formulae (R-1) to (R-15).

A compound represented by the general formula (II) is preferably a polymerizable compound represented by one of the formulae (M1) to (M18), for example.

[Chem. 173]

(M3)
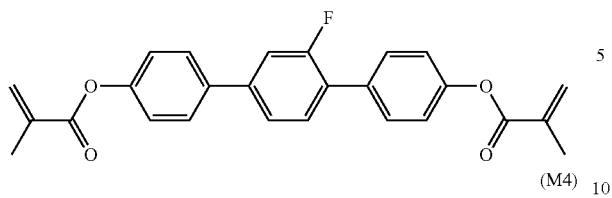
(M4)
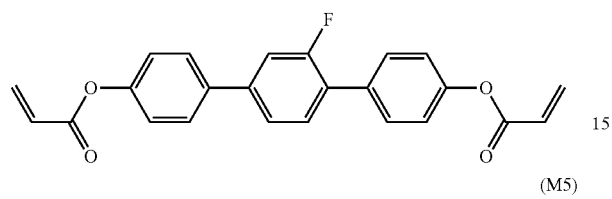
(M5)
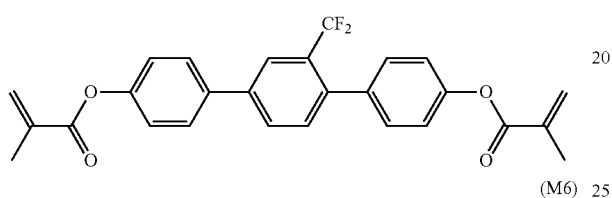
(M6)
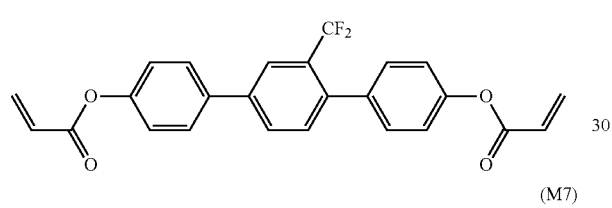
(M7)
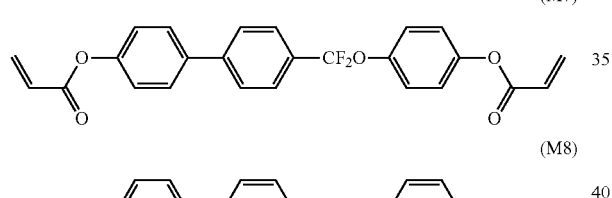
(M8)
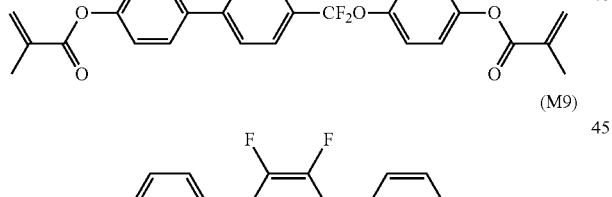
(M9)
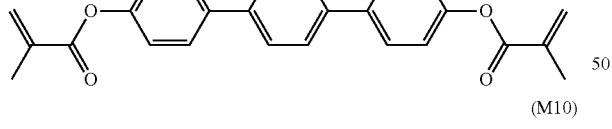
(M10)
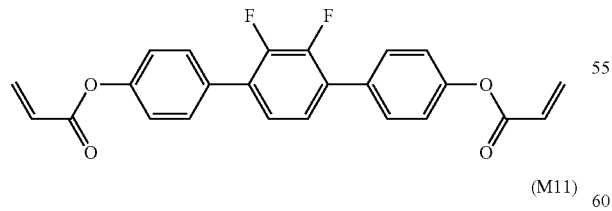
(M11)
(M12)
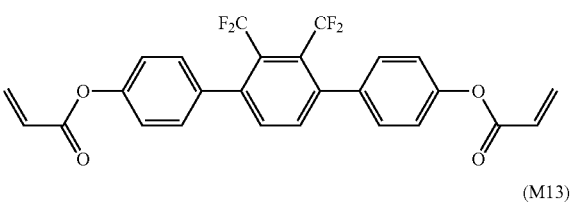
(M13)
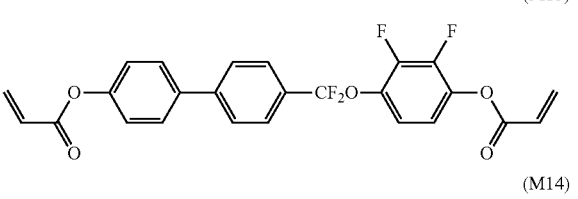
(M14)
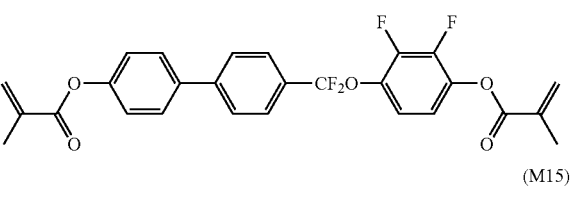
(M15)
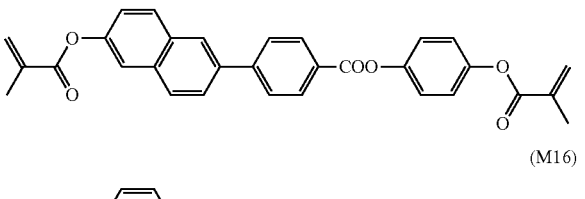
(M16)
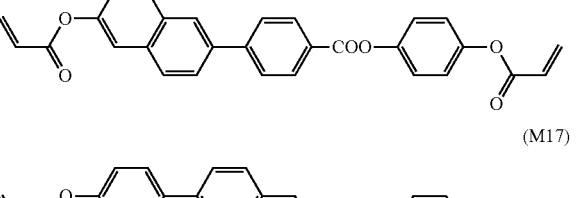
(M17)
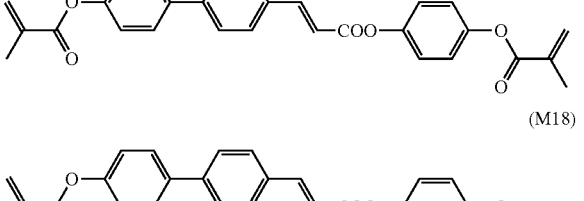
(M18)
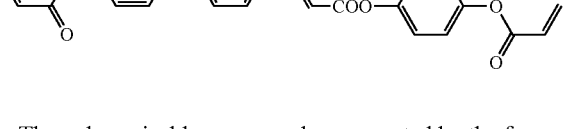
The polymerizable compounds represented by the formulae (M19) to (M34) are also preferred.
[Chem. 174]
(M19)
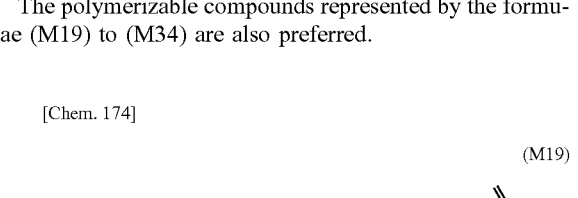

(M20)
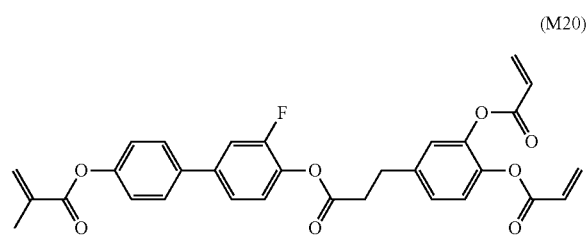
(M26)
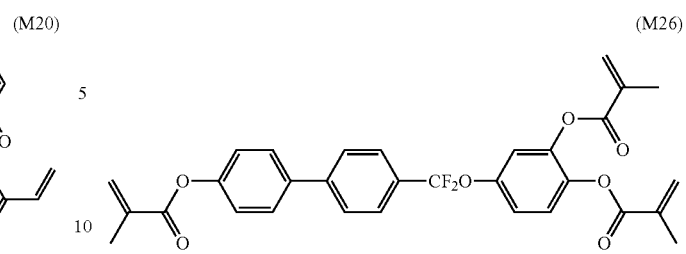
[Chem. 175]
(M21)
(M27)
(M22)
(M28)
(M23)
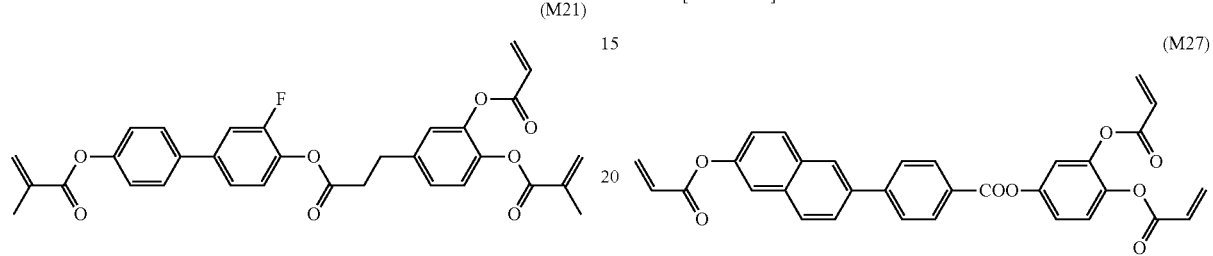
(M29)
(M24)
(M30)
(M25)
(M31)

(M32)
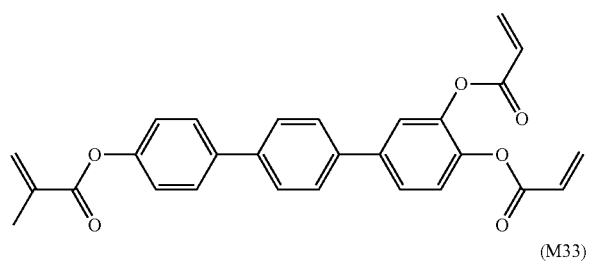
(M33)
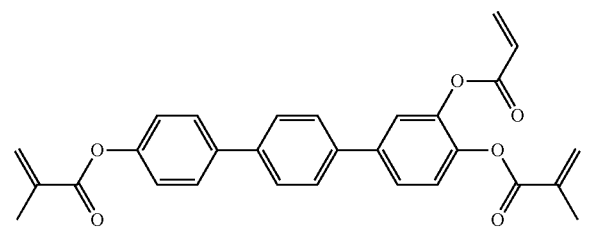
(M34)
A hydrogen atom in the 1,4-phenylene groups and the naphthalene groups in the formulae (M19) to (M34) may be further substituted with —F, —Cl, —CF$_3$, or —CH$_3$.
A compound represented by the general formula (II) is also preferably a polymerizable compound represented by one of the formulae (M35) to (M65).
[Chem. 176]
(M35)
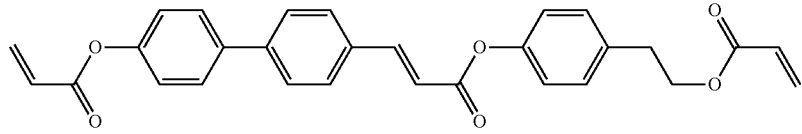
(M36)
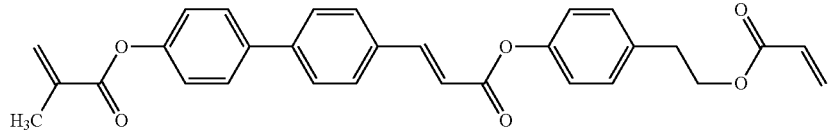
(M37)
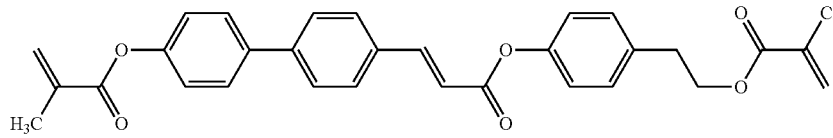
(M38)
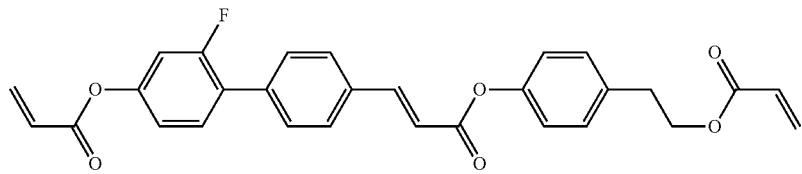
(M39)
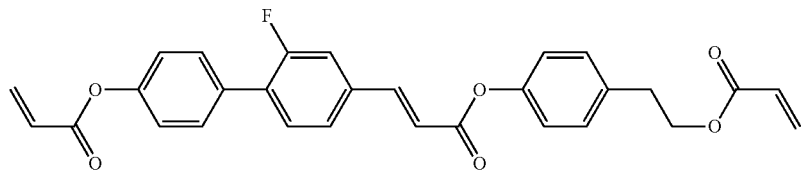
(M40)
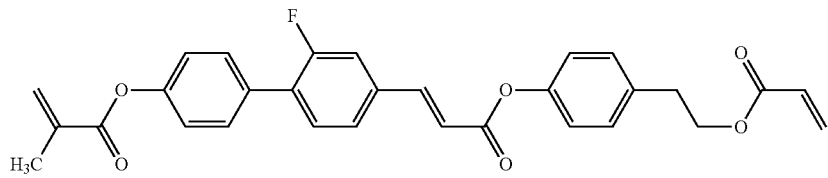

-continued
(M41)
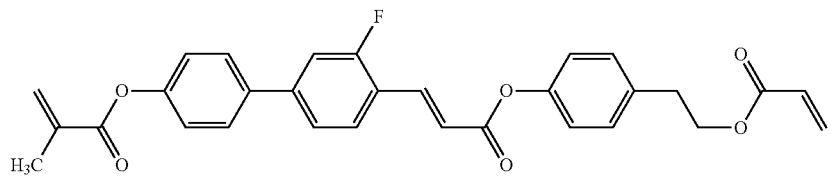
(M42)
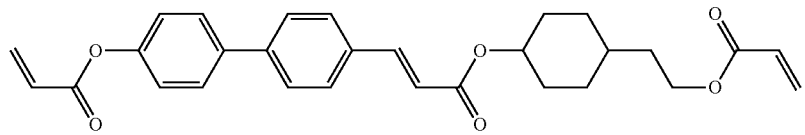
(M43)
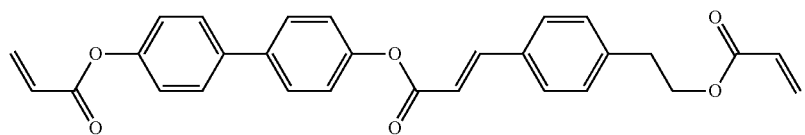
(M44)
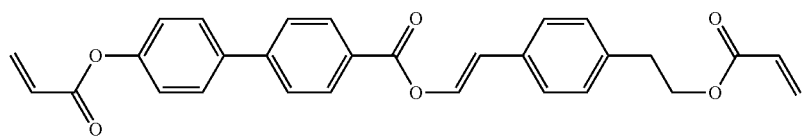
(M45)
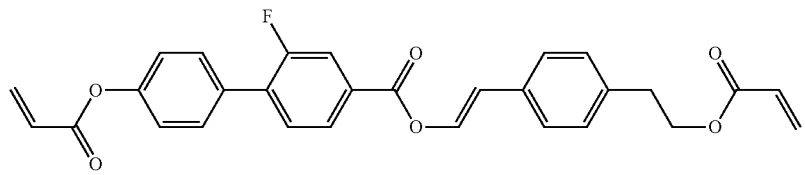
(M46)
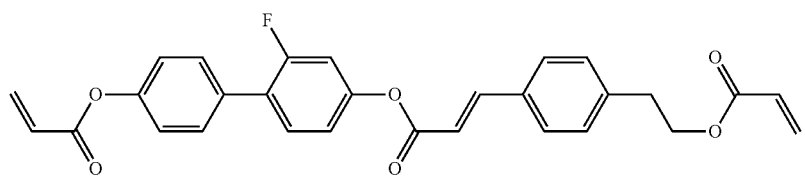
(M47)
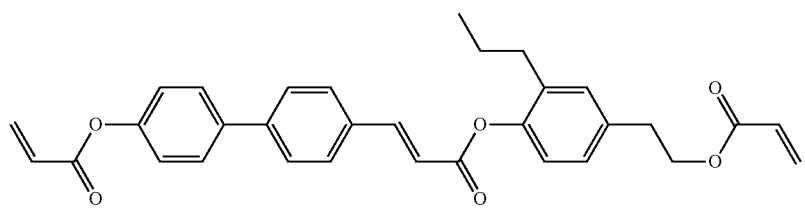
[Chem. 177]
(M48)
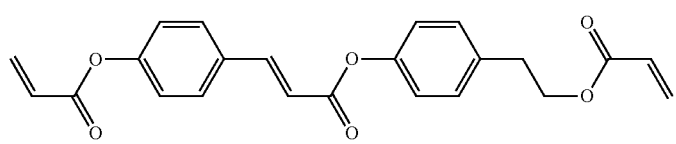
(M49)
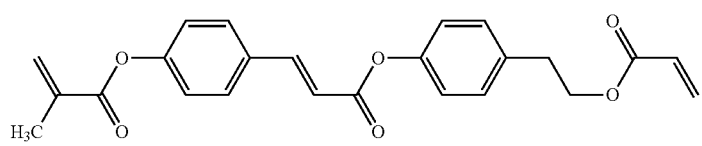

(M50)
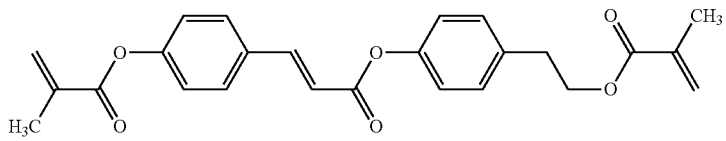
(M51)
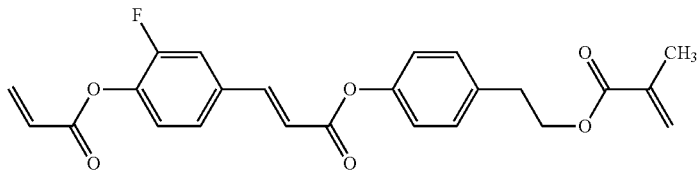
(M52)
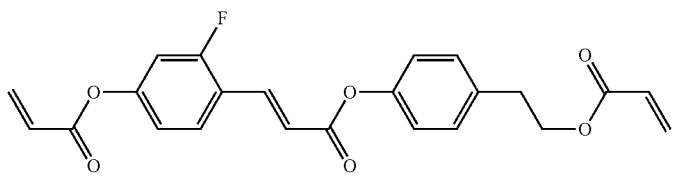
[Chem. 178]
(M53)
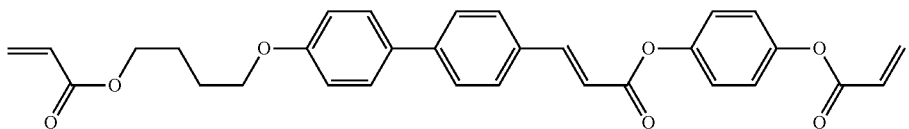
(M54)
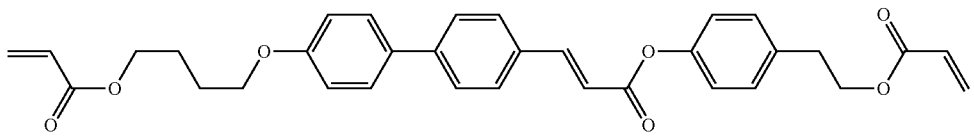
(M55)
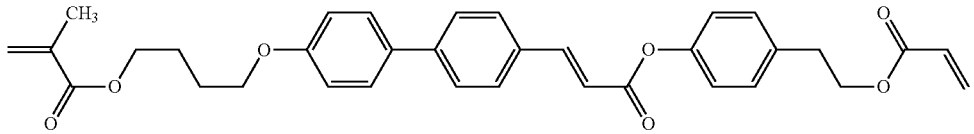
(M56)
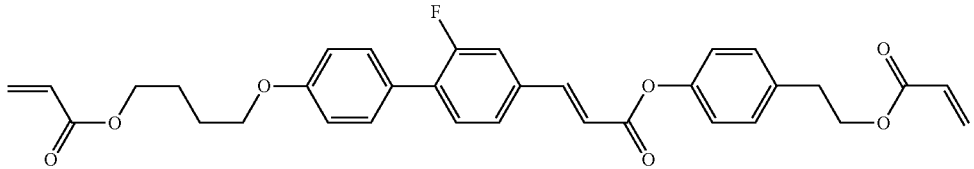
(M57)
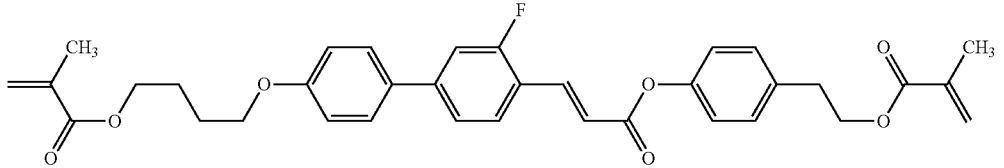
[Chem. 179]
(M58)
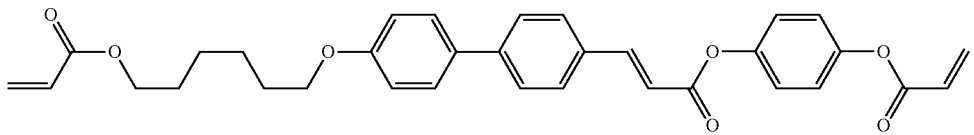

-continued

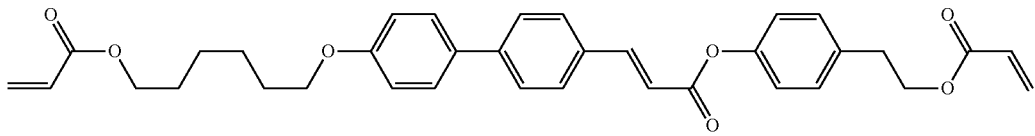
(M59)

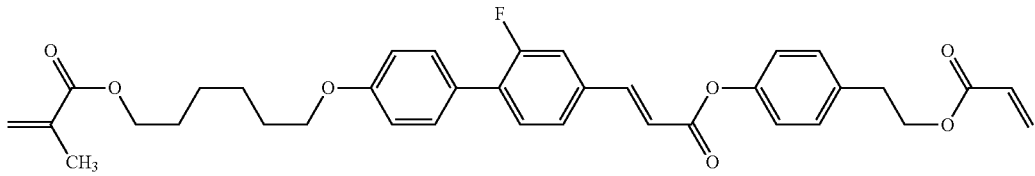
(M60)

(M61)

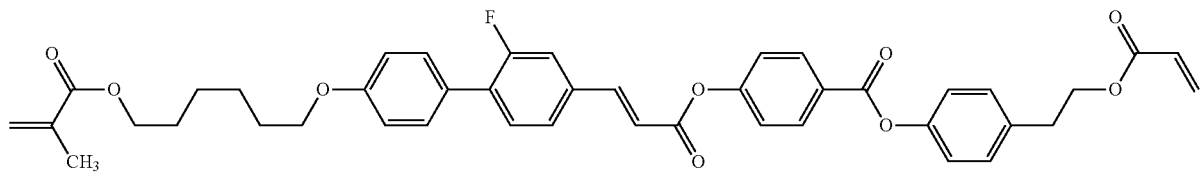

[Chem. 180]

(M62)

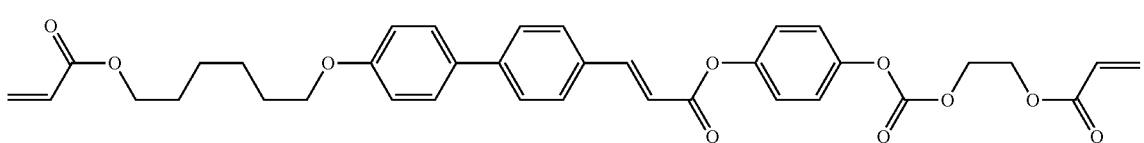

(M63)

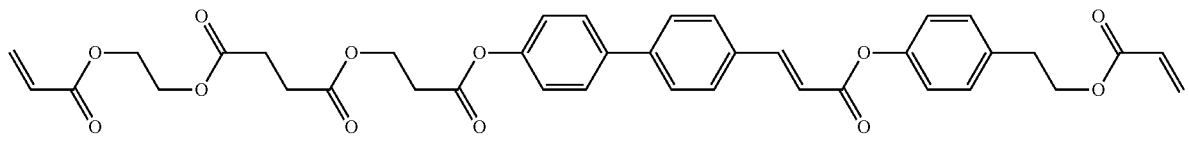

(M64)

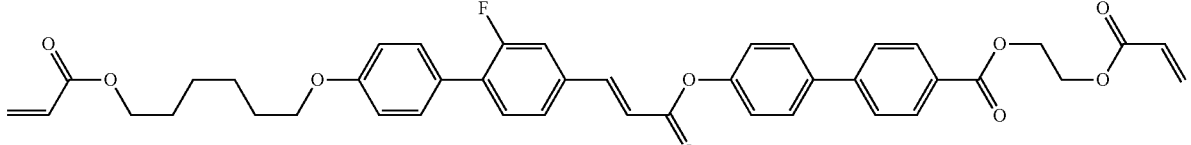

(M65)

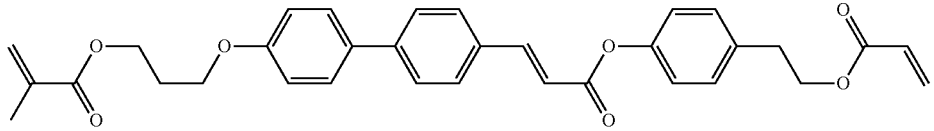

In a liquid crystal composition according to the present invention, the amount of a polymerizable compound represented by one of the formulae (M1) to (M65) ranges from 0.01% to 5% by mass of the amount of the liquid crystal composition. The lower limit of the amount is preferably 0.02% by mass, preferably 0.03% by mass, preferably 0.04% by mass, preferably 0.05% by mass, preferably 0.06% by mass, preferably 0.07% by mass, preferably 0.08% by mass, preferably 0.09% by mass, preferably 0.1% by mass, preferably 0.15% by mass, preferably 0.2% by mass, preferably 0.25% by mass, preferably 0.3% by mass, preferably 0.35% by mass, preferably 0.4% by mass, preferably 0.5% by mass, preferably 0.55% by mass. The upper limit of the amount is preferably 4.5% by mass, preferably 4% by mass, preferably 3.5% by mass, preferably 3% by mass, preferably 2.5% by mass, preferably 2% by mass, preferably 1.5% by mass, preferably 1% by mass, preferably 0.95% by mass, preferably 0.9% by mass, preferably 0.85% by mass, preferably 0.8% by mass, preferably 0.75% by mass, preferably 0.7% by mass, preferably 0.65% by mass, preferably 0.6% by mass, preferably 0.55% by mass.

A liquid crystal composition according to the present invention may contain ordinary nematic liquid crystals, smectic liquid crystals, cholesteric liquid crystals, an antioxidant, an ultraviolet absorber, a light stabilizer, or an infrared absorber, in addition to the compounds described above.

Examples of the antioxidant include hindered phenols represented by the general formulae (H-1) to (H-4).

[Chem. 181]

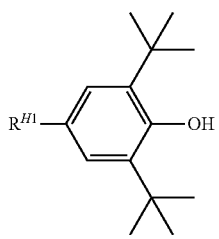
(H-1)

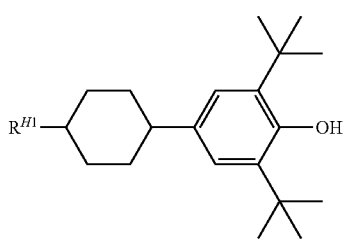
(H-2)

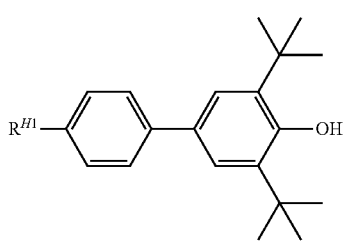
(H-3)

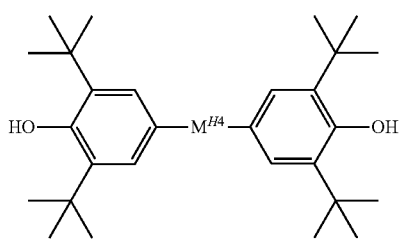
(H-4)

In the general formulae (H-1) to (H-4), $R^{H1}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, one —CH$_2$— or two or more nonadjacent —CH$_2$—'s in the groups are independently optionally substituted with —O— or —S—, and one or two or more hydrogen atoms in the groups are independently optionally substituted with a fluorine atom or a chlorine atom. More specifically, an alkyl group having 2 to 7 carbon atoms, an alkoxy group having 2 to 7 carbon atoms, an alkenyl group having 2 to 7 carbon atoms, or an alkenyloxy group having 2 to 7 carbon atoms is preferred, and an alkyl group having 3 to 7 carbon atoms or an alkenyl group having 2 to 7 carbon atoms is more preferred.

In the general formula (H-4), $M^{H4}$ represents an alkylene group having 1 to 15 carbon atoms (one or two or more —CH$_2$—'s in the alkylene group are optionally substituted with —O—, —CO—, —COO—, or —OCO—, provided that oxygen atoms are not directly adjacent to each other), —OCH$_2$—, —CH$_2$O—, —COO—, —OCO—, —CF$_2$O—, —OCF$_2$—, —CF$_2$CF$_2$—, —CH=CH—COO—, —CH=CH—OCO—, —COO—CH=CH—, —OCO—CH=CH—, —CH=CH—, —C≡C—, a single bond, a 1,4-phenylene group (a hydrogen atom in the 1,4-phenylene group is optionally substituted with a fluorine atom), or a trans-1,4-cyclohexylene group, preferably an alkylene group having 1 to 14 carbon atoms. The number of carbon atoms is preferably large in terms of volatility but is preferably not too large in terms of viscosity. Thus, the number of carbon atoms more preferably ranges from 2 to 12, still more preferably 3 to 10, still more preferably 4 to 10, still more preferably 5 to 10, still more preferably 6 to 10.

In the general formulae (H-1) to (H-4), one —CH= or two or more nonadjacent —CH='s in the 1,4-phenylene groups are optionally substituted with —N=. A hydrogen atom in the 1,4-phenylene groups is independently optionally substituted with a fluorine atom or a chlorine atom.

In the general formulae (H-1) to (H-4), one —CH$_2$— or two or more nonadjacent —CH$_2$—'s in the 1,4-cyclohexylene groups are optionally substituted with —O— or —S—. A hydrogen atom in the 1,4-cyclohexylene groups is optionally substituted with a fluorine atom or a chlorine atom.

Additional specific examples include the formulae (H-11) to (H-15).

[Chem. 182]

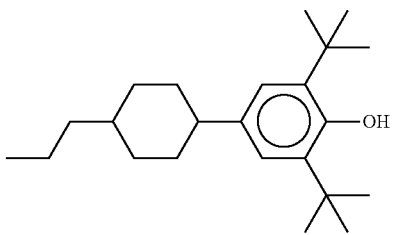
(H-11)

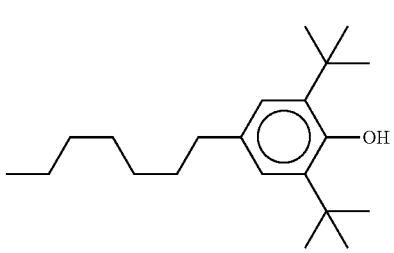
(H-12)

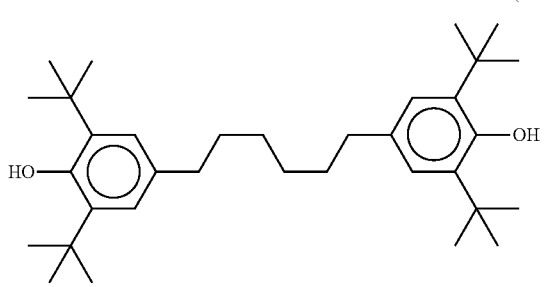
(H-13)

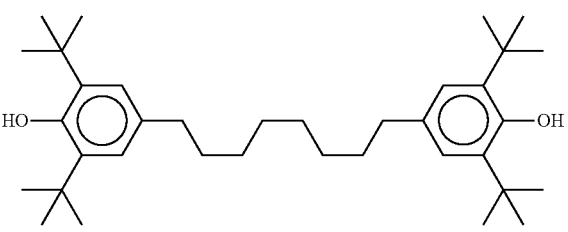
(H-14)

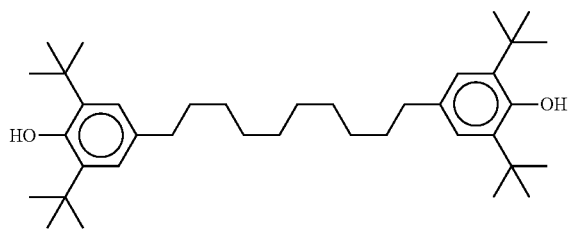
(H-15)

When a liquid crystal composition according to the present invention contains an antioxidant, 10 ppm by mass or more, 20 ppm by mass or more, or 50 ppm by mass or more is preferred. The upper limit of the antioxidant content is 10000 ppm by mass, preferably 1000 ppm by mass, preferably 500 ppm by mass, preferably 100 ppm by mass.

A liquid crystal composition according to the present invention has a dielectric constant anisotropy (Δε) in the range of −2.0 to −8.0, preferably −2.0 to −6.0, more preferably −2.0 to −5.0, particularly preferably −2.5 to −5.0, at 20° C.

A liquid crystal composition according to the present invention has a refractive index anisotropy (Δn) in the range of 0.08 to 0.14, preferably 0.09 to 0.13, particularly preferably 0.09 to 0.12, at 20° C. More specifically, the refractive index anisotropy (Δn) preferably ranges from 0.10 to 0.13 for a small cell gap and 0.08 to 0.10 for a large cell gap.

A liquid crystal composition according to the present invention has a viscosity (η) in the range of 10 to 50 mPa·s, preferably 10 to 45 mPa·s, preferably 10 to 40 mPa·s, preferably 10 to 35 mPa·s, preferably 10 to 30 mPa·s, more preferably 10 to 25 mPa·s, particularly preferably 10 to 22 mPa·s, at 20° C.

A liquid crystal composition according to the present invention has a rotational viscosity ($\gamma_1$) in the range of 50 to 160 mPa·s, preferably 55 to 160 mPa·s, preferably 60 to 160 mPa·s, preferably 60 to 150 mPa·s, preferably 60 to 140 mPa·s, preferably 60 to 130 mPa·s, preferably 60 to 125 mPa·s, more preferably 60 to 120 mPa·s, more preferably 60 to 115 mPa·s, more preferably 60 to 110 mPa·s, particularly preferably 60 to 100 mPa·s, at 20° C.

A liquid crystal composition according to the present invention has a nematic phase-isotropic liquid phase transition temperature ($T_{ni}$) in the range of 60° C. to 120° C., preferably 70° C. to 100° C., particularly preferably 70° C. to 85° C.

Suitable embodiments of a liquid crystal composition according to the present invention are preferably divided into the embodiments in which the entire liquid crystal composition has positive dielectric constant anisotropy and the embodiments in which the entire liquid crystal composition has negative dielectric constant anisotropy.

For example, a liquid crystal composition according to the present invention having positive dielectric constant anisotropy as a whole preferably contains a polymerizable compound represented by the general formula (I), one or two or more compounds selected from the compounds represented by the general formula (J), and a compound represented by the general formula (L).

The upper limit of the amount of a component composed only of a compound represented by the general formula (I), a compound represented by the general formula (J), and a compound represented by the general formula (L) is preferably 100% by mass, 99% by mass, 98% by mass, 97% by mass, 96% by mass, 95% by mass, 94% by mass, 93% by mass, 92% by mass, 91% by mass, 90% by mass, 89% by mass, 88% by mass, 87% by mass, 86% by mass, 85% by mass, or 84% by mass, of the total amount of a liquid crystal composition according to the present invention.

The lower limit of the amount of a component composed only of a compound represented by the general formula (I), a compound represented by the general formula (J), and a compound represented by the general formula (L) is preferably 78% by mass, 80% by mass, 81% by mass, 83% by mass, 85% by mass, 86% by mass, 87% by mass, 88% by mass, 89% by mass, 90% by mass, 91% by mass, 92% by mass, 93% by mass, 94% by mass, 95% by mass, 96% by mass, 97% by mass, 98% by mass, or 99% by mass, of the total amount of a liquid crystal composition according to the present invention.

The upper limit of the amount of a component composed only of a compound represented by the general formula (I), a compound represented by the general formula (M), and a compound represented by the general formula (L) is preferably 100% by mass, 99% by mass, 98% by mass, 97% by mass, 96% by mass, 95% by mass, 94% by mass, 93% by mass, 92% by mass, 91% by mass, 90% by mass, 89% by mass, 88% by mass, 87% by mass, 86% by mass, 85% by mass, or 84% by mass, of the total amount of a liquid crystal composition according to the present invention.

The lower limit of the amount of a component composed only of a compound represented by the general formula (I), a compound represented by the general formula (M), and a compound represented by the general formula (L) is preferably 78% by mass, 80% by mass, 81% by mass, 83% by mass, 85% by mass, 86% by mass, 87% by mass, 88% by mass, 89% by mass, 90% by mass, 91% by mass, 92% by mass, 93% by mass, 94% by mass, 95% by mass, 96% by mass, 97% by mass, 98% by mass, or 99% by mass, of the total amount of a liquid crystal composition according to the present invention.

For example, a liquid crystal composition according to the present invention having negative dielectric constant anisotropy as a whole preferably contains a polymerizable compound represented by the general formula (I), one or two or more compounds selected from the compounds represented by the general formulae (N-1), (N-2), and (N-3), and a compound represented by the general formula (L).

The upper limit of the amount of a component composed only of compounds represented by the general formulae (I), (N-1), (N-2), (N-3), and (L) is preferably 100% by mass, 99% by mass, 98% by mass, 97% by mass, 96% by mass, 95% by mass, 94% by mass, 93% by mass, 92% by mass, 91% by mass, 90% by mass, 89% by mass, 88% by mass, 87% by mass, 86% by mass, 85% by mass, or 84% by mass, of the total amount of a liquid crystal composition according to the present invention.

The lower limit of the amount of a component composed only of compounds represented by the general formulae (I), (N-1), (N-2), (N-3), and (L) is preferably 78% by mass, 80% by mass, 81% by mass, 83% by mass, 85% by mass, 86% by mass, 87% by mass, 88% by mass, 89% by mass, 90% by mass, 91% by mass, 92% by mass, 93% by mass, 94% by mass, 95% by mass, 96% by mass, 97% by mass, 98% by mass, or 99% by mass, of the total amount of a liquid crystal composition according to the present invention.

The upper limit of the amount of a component composed only of compounds represented by the general formulae (I), (N-1a), (N-1b), (N-1c), (N-1d), (N-1e), and (L) is preferably 100% by mass, 99% by mass, 98% by mass, 97% by mass, 96% by mass, 95% by mass, 94% by mass, 93% by mass, 92% by mass, 91% by mass, 90% by mass, 89% by mass, 88% by mass, 87% by mass, 86% by mass, 85% by mass, or 84% by mass, of the total amount of a liquid crystal composition according to the present invention.

The lower limit of the amount of a component composed only of compounds represented by the general formulae (I), (N-1a), (N-1b), (N-1c), (N-1d), (N-1e), and (L) is preferably 78% by mass, 80% by mass, 81% by mass, 83% by mass, 85% by mass, 86% by mass, 87% by mass, 88% by mass, 89% by mass, 90% by mass, 91% by mass, 92% by mass, 93% by mass, 94% by mass, 95% by mass, 96% by mass, 97% by mass, 98% by mass, or 99% by mass, of the total amount of a liquid crystal composition according to the present invention.

The upper limit of the amount of a component composed only of compounds represented by the general formulae (I), (N-1-4), (N-1b), (N-1c), (N-1d), (N-1e), and (L) is preferably 100% by mass, 99% by mass, 98% by mass, 97% by mass, 96% by mass, 95% by mass, 94% by mass, 93% by mass, 92% by mass, 91% by mass, 90% by mass, 89% by mass, 88% by mass, 87% by mass, 86% by mass, 85% by mass, or 84% by mass, of the total amount of a liquid crystal composition according to the present invention.

The lower limit of the amount of a component composed only of compounds represented by the general formulae (I), (N-1-4), (N-1b), (N-1c), (N-1d), (N-1e), and (L) is preferably 78% by mass, 80% by mass, 81% by mass, 83% by mass, 85% by mass, 86% by mass, 87% by mass, 88% by mass, 89% by mass, 90% by mass, 91% by mass, 92% by mass, 93% by mass, 94% by mass, 95% by mass, 96% by mass, 97% by mass, 98% by mass, or 99% by mass, of the total amount of a liquid crystal composition according to the present invention.

The upper limit of the amount of a component composed only of compounds represented by the general formulae (I), (N-1a), (N-1b), (N-1c), (N-1d), (N-1e), (L-1), (L-3), (L-4), (L-5), and (L-6) is preferably 100% by mass, 99% by mass, 98% by mass, 97% by mass, 96% by mass, 95% by mass, 94% by mass, 93% by mass, 92% by mass, 91% by mass, 90% by mass, 89% by mass, 88% by mass, 87% by mass, 86% by mass, 85% by mass, 84% by mass, 83% by mass, 82% by mass, 81% by mass, or 80% by mass, of the total amount of a liquid crystal composition according to the present invention.

The lower limit of the amount of a component composed only of compounds represented by the general formulae (I), (N-1a), (N-1b), (N-1c), (N-1d), (N-1e), (L-1), (L-3), (L-4), (L-5), and (L-6) is preferably 68% by mass, 70% by mass, 71% by mass, 73% by mass, 75% by mass, 78% by mass, 80% by mass, 81% by mass, 83% by mass, 85% by mass, 86% by mass, 87% by mass, 88% by mass, 89% by mass, 90% by mass, 91% by mass, 92% by mass, 93% by mass, 94% by mass, 95% by mass, 96% by mass, 97% by mass, 98% by mass, or 99% by mass, of the total amount of a liquid crystal composition according to the present invention.

The upper limit of the amount of a component composed only of compounds represented by the general formulae (I), (N-1a), (L-1), (L-3), (L-4), (L-5), and (L-6) is preferably 100% by mass, 99% by mass, 98% by mass, 97% by mass, 96% by mass, 95% by mass, 94% by mass, 93% by mass, 92% by mass, 91% by mass, 90% by mass, 89% by mass, 88% by mass, 87% by mass, 86% by mass, 85% by mass, 84% by mass, 83% by mass, 82% by mass, 81% by mass, 80% by mass, 79% by mass, 78% by mass, 77% by mass, 76% by mass, 75% by mass, 74% by mass, 73% by mass, 72% by mass, 71% by mass, 70% by mass, 69% by mass, 68% by mass, 67% by mass, 66% by mass, 65% by mass, 64% by mass, 63% by mass, or 62% by mass, of the total amount of a liquid crystal composition according to the present invention.

The lower limit of the amount of a component composed only of compounds represented by the general formulae (I), (N-1a), (L-1), (L-3), (L-4), (L-5), and (L-6) is preferably 38% by mass, 40% by mass, 41% by mass, 43% by mass, 45% by mass, 48% by mass, 50% by mass, 61% by mass, 63% by mass, 65% by mass, 66% by mass, 67% by mass, 68% by mass, 69% by mass, 70% by mass, 72% by mass, 74% by mass, 76% by mass, 78% by mass, 80% by mass, 82% by mass, 84% by mass, 86% by mass, 88% by mass, 90% by mass, or 92% by mass, of the total amount of a liquid crystal composition according to the present invention.

The upper limit of the amount of a component composed only of compounds represented by the general formulae (I), (N-1d), (L-1), (L-3), (L-4), (L-5), and (L-6) is preferably 100% by mass, 99% by mass, 98% by mass, 97% by mass, 96% by mass, 95% by mass, 94% by mass, 93% by mass, 92% by mass, 91% by mass, 90% by mass, 89% by mass, 88% by mass, 87% by mass, 86% by mass, 85% by mass, 84% by mass, 83% by mass, 82% by mass, 81% by mass, 80% by mass, 79% by mass, 78% by mass, 77% by mass, 76% by mass, 75% by mass, 74% by mass, 73% by mass, 72% by mass, 71% by mass, 70% by mass, 69% by mass, 68% by mass, 67% by mass, 66% by mass, 65% by mass, 64% by mass, 63% by mass, or 62% by mass, of the total amount of a liquid crystal composition according to the present invention.

The lower limit of the amount of a component composed only of compounds represented by the general formulae (I), (N-1d), (L-1), (L-3), (L-4), (L-5), and (L-6) is preferably 38% by mass, 40% by mass, 41% by mass, 43% by mass, 45% by mass, 48% by mass, 50% by mass, 61% by mass, 63% by mass, 65% by mass, 66% by mass, 67% by mass, 68% by mass, 69% by mass, 70% by mass, 72% by mass, 74% by mass, 76% by mass, 78% by mass, 80% by mass, 82% by mass, 84% by mass, 86% by mass, 88% by mass, 90% by mass, or 92% by mass, of the total amount of a liquid crystal composition according to the present invention.

A liquid crystal display device having a liquid crystal composition according to the present invention has a distinctive characteristic of high-speed response, has an adequate tilt angle, contains negligible or no unreacted polymerizable compound, and has a high voltage holding ratio (VHR). Thus, defects, such as poor alignment and display defects, are completely or sufficiently eliminated. Furthermore, the tilt angle and the amount of residual polymerizable compound can be easily controlled, and the energy cost of production can therefore be easily optimized and reduced. These are most suitable for improved production efficiency and stable mass production.

In particular, a liquid crystal display device having a liquid crystal composition according to the present invention is useful for active-matrix driving liquid crystal display devices and can be used in PSA, PSVA, VA, PS-IPS, or PS-FFS mode liquid crystal display devices.

A liquid crystal display device according to the present invention preferably includes a first substrate and a second substrate oppositely disposed, a common electrode on the first or second substrate, a pixel electrode on the first or second substrate, the pixel electrode including a thin-film transistor, and a liquid crystal layer between the first substrate and the second substrate, the liquid crystal layer containing a liquid crystal composition. If necessary, an alignment film that can control the alignment direction of liquid crystal molecules may be disposed in contact with the liquid crystal layer facing at least one of the first substrate and the second substrate. Depending on the drive mode of a liquid crystal display device, the alignment film can be appropriately selected from vertical alignment films and horizontal alignment films and may be a known alignment film, such as a rubbed alignment film (for example, polyimide) or a photo-alignment film (such as degradable polyimide). Furthermore, a color filter may be disposed on the first or second substrate, on the pixel electrode, or on the common electrode.

Two substrates of a liquid crystal cell for use in a liquid crystal display device according to the present invention may be made of glass or a flexible transparent material, such as a plastic. One of the two substrates may be made of an opaque material, such as silicon. A transparent substrate with a transparent electrode layer may be produced by deposition of indium tin oxide (ITO) on a transparent substrate, such as a glass plate, by sputtering.

A color filter may be produced by a pigment dispersion method, a printing method, an electrodeposition method, or a staining method. For example, in a method for producing a color filter by a pigment dispersion method, a curable coloring composition for a color filter is applied to a transparent substrate, is patterned, and is cured by heating or light irradiation. This process is repeatedly performed to produce red, green, and blue pixel units for color filters. A pixel electrode that includes an active device, such as a TFT, a thin-film diode, a metal insulator, metal resistivity device or the like may be formed on a substrate.

The first substrate preferably faces the second substrate such that a common electrode and a pixel electrode layer are interposed therebetween.

The distance between the first substrate and the second substrate may be adjusted with a spacer. The distance between the substrates is preferably adjusted such that the resulting light control layer has a thickness in the range of 1 to 100 μm, preferably 1.5 to 10 μm. When a polarizer is used, the product of the refractive index anisotropy Δn of liquid crystals and the cell thickness d is preferably adjusted to maximize contrast. When two polarizers are used, a polarization axis of each polarizer may be adjusted to improve the viewing angle or contrast. A retardation film for increasing the viewing angle may also be used. Examples of the spacer include glass particles, plastic particles, alumina particles, and photoresist materials. Subsequently, a sealant, such as a theLmosetting epoxy composition, is applied to a substrate by screen printing such that a liquid crystal inlet is formed. The substrates are then joined and heated to cure the sealant.

A liquid crystal composition may be applied between two substrates by a typical vacuum injection method or an ODF method.

In order to achieve high liquid crystal alignment capability, an appropriate rate of polymerization is desirable. Thus, a polymerizable compound in a liquid crystal composition according to the present invention is preferably polymerized by irradiation with an active energy beam, such as ultraviolet light or an electron beam, alone, in combination, or in sequence. When ultraviolet light is used, a polarized or unpolarized light source may be used. When a liquid crystal composition between two substrates is polymerized, at least a substrate to be irradiated must be transparent to an active energy beam. Only a particular portion may be polymerized using a mask during photoirradiation, and then the condition, such as an electric field, a magnetic field, or temperature, may be altered to change the alignment state of an unpolymerized portion, which is then polymerized by irradiation with an active energy beam. In particular, for ultraviolet exposure, a liquid crystal composition is preferably exposed to ultraviolet light in an alternating electric field. The alternating electric field preferably has a frequency in the range of 10 Hz to 10,000 Hz, more preferably 60 Hz to 10,000 Hz. The voltage depends on the desired pretilt angle of a liquid crystal display device. In other words, the pretilt angle of a liquid crystal display device can be controlled through the voltage to be applied. PSVA-mode liquid crystal display devices preferably have a pretilt angle in the range of 80 degrees to 89.9 degrees in terms of alignment stability and contrast.

Irradiation with an active energy beam, such as ultraviolet light or an electron beam, in the polymerization of a polymerizable compound in a liquid crystal composition according to the present invention may be performed at any temperature. For example, when a liquid crystal composition according to the present invention is applied to a liquid crystal display device including a substrate with an alignment film, the temperature range is preferably determined to maintain the liquid crystal state of the liquid crystal composition. The polymerization temperature is preferably close to room temperature, typically in the range of 15 to 35° C.

For example, when a liquid crystal composition according to the present invention is applied to a liquid crystal display device including a substrate without an alignment film, the temperature range may be wider than the temperature range during irradiation of a liquid crystal display device including a substrate with an alignment film.

Examples of lamps for generating ultraviolet light include metal halide lamps, high-pressure mercury lamps, and ultra-high-pressure mercury lamps. The wavelength of ultraviolet light is preferably outside the absorption wavelength range of a liquid crystal composition. Ultraviolet light is preferably filtered as required. The ultraviolet light intensity preferably ranges from 0.1 mW/cm$^2$ to 100 W/cm$^2$, more preferably 2 mW/cm$^2$ to 50 W/cm$^2$. The ultraviolet light energy can be appropriately determined and preferably range from 10 mJ/cm$^2$ to 500 J/cm$^2$, more preferably 100 mJ/cm$^2$ to 200 J/cm$^2$. During ultraviolet irradiation, the ultraviolet light intensity may be changed. The ultraviolet irradiation time depends on the ultraviolet light intensity and preferably ranges from 10 seconds to 3600 seconds, more preferably 10 seconds to 600 seconds.

EXAMPLES

Although the present invention will be further described in the following examples, the present invention is not limited to these examples. The unit "%" with respect to compositions in the following examples and comparative examples refers to "% by mass". The following abbreviations are used to describe compounds in the examples.

(Side Chain)

-n —$C_nH_{2n+1}$ a linear alkyl group having n carbon atoms n- $C_nH_{2n+1}$— a linear alkyl group having n carbon atoms -On —$OC_nH_{2n+1}$ a linear alkoxy group having n carbon atoms nO- $C_nH_{2n+1}O$— a linear alkoxy group having n carbon atoms

—V —CH=CH$_2$

V— CH$_2$=CH—

—V— —CH=CH—

—O1V —O—CH$_2$—V

-V1 —CH=CH—CH₃
1V- CH₃—CH=CH—
-2V —CH₂—CH₂—CH=CH₂
V2- CH₂=CH—CH₂—CH₂—
-2V1 —CH₂—CH₂—CH=CH—CH₃
1V2- CH₃—CH=CH—CH₂—CH₂—
—F —F
—OCF₃ —OCF₃
(Linking Group)
—CF₂O— —CF₂—O—
—OCF₂— —O—CF₂—
-1O- —CH₂—O—
-O1- —O—CH₂—
—COO— —COO—
—OCO— —OCO—
(Ring Structure)

[Chem. 183]

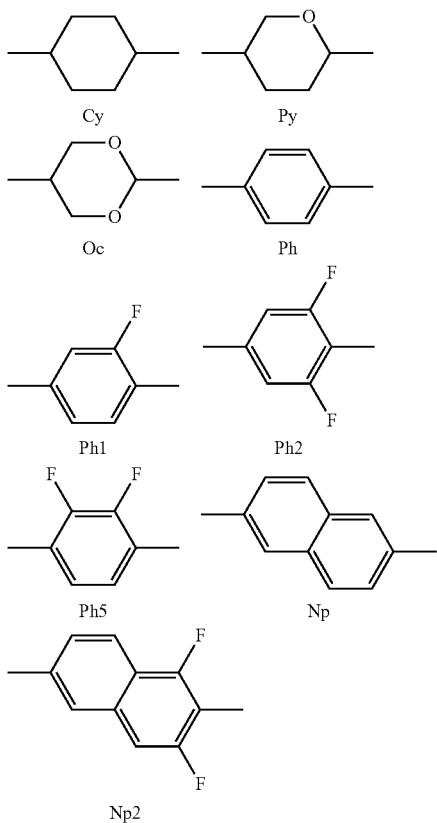

The following characteristics were measured in the examples.

$T_{ni}$: nematic phase-isotropic liquid phase transition temperature (° C.)

Δn: refractive index anisotropy at 20° C.

η: viscosity (mPa·s) at 20° C.

$γ_1$: rotational viscosity (mPa·s) at 20° C.

Δε: dielectric constant anisotropy at 20° C.

$K_{33}$: elastic constant $K_{33}$ (pN) at 20° C.

(Methods for Manufacturing and Testing Liquid Crystal Display Devices)

First, a liquid crystal composition containing a polymerizable compound was injected into a liquid crystal cell having a cell gap of 3.5 μm using a vacuum injection method. The liquid crystal cell was prepared by applying a polyimide alignment film that can induce vertical alignment to an ITO-coated substrate, and then rubbing the polyimide alignment film. The vertical alignment film was made of a material JALS2096 manufactured by JSR.

Subsequently, while a voltage of 10 V was applied at a frequency of 100 Hz to the liquid crystal cell into which the liquid crystal composition containing the polymerizable compound had been injected, the liquid crystal cell was irradiated with ultraviolet light from a high-pressure mercury lamp through a filter that can eliminate ultraviolet light of 325 nm or less. More specifically, the liquid crystal cell was irradiated with ultraviolet light at an illuminance of 100 mW/cm² measured at a center wavelength of 365 nm, and the integrated amount of light was 30 J/cm². The ultraviolet irradiation conditions are referred to as the irradiation conditions 1. The liquid crystal molecules in the liquid crystal cell have a pretilt angle under the irradiation conditions 1.

The liquid crystal cell was then irradiated with ultraviolet light emitted from a fluorescent UV lamp at an illuminance of 3 mW/cm² measured at a center wavelength of 313 nm. The integrated amount of light was 10 J/cm². A liquid crystal display device was thus manufactured. The ultraviolet irradiation conditions are referred to as the irradiation conditions 2. The amount of residual polymerizable compound unreacted under the irradiation conditions 1 in the liquid crystal cell was reduced under the irradiation conditions 2.

After ultraviolet irradiation, a display defect due to a change in pretilt angle (image-sticking) was examined. First, the pretilt angle of the liquid crystal display device was measured as a pretilt angle (initial). While a voltage of 30 V was applied to the liquid crystal display device at a frequency of 100 Hz, the liquid crystal display device was irradiated with backlight for 24 hours. The pretilt angle was then measured as a pretilt angle (after test). The pretilt angle (after test) was subtracted from the pretilt angle (initial) to determine the amount of change in pretilt angle (=the absolute value of a change in pretilt angle) [degrees]. The pretilt angle was measured with OPTIPRO manufactured by Shintech Inc.

An amount of change in pretilt angle closer to 0 [degrees] results in a lower probability of display defects due to a change in pretilt angle, and an amount of change in pretilt angle of 0.5 [degrees] or more results in a higher probability of display defects due to a change in pretilt angle.

The amount of residual polymerizable compound [ppm] in the liquid crystal display device was measured after ultraviolet irradiation under the irradiation conditions 1 and after ultraviolet irradiation under the irradiation conditions 1 and the irradiation conditions 2. The method for measuring the amount of residual polymerizable compound will be described below. First, the liquid crystal display device was disassembled, and an acetonitrile solution of an eluate containing the liquid crystal composition, polymer, and unreacted polymerizable compound was obtained. The eluate was analyzed by high-performance liquid chromatography to determine the peak area of each component. The amount of residual polymerizable compound was determined from the ratio of the peak area of the liquid crystal compound, which served as a reference, to the peak area of the unreacted polymerizable compound. From this value and the amount of initial polymerizable compound, the amount of residual polymerizable compound was determined. The detection limit for the residual polymerizable compound was 100 ppm. The presence of the residual polymerizable compound after ultraviolet irradiation under the irradiation conditions 1 and the irradiation conditions 2 increases the probability of display defects due to the residual polymerizable compound.

(Preparation of Liquid Crystal Composition and Evaluation Results)

Liquid crystal compositions LC-001 to LC-009 were prepared, and some physical properties of the liquid crystal compositions were measured. The components and physical properties of the liquid crystal composition are listed in Tables 1 and 2.

TABLE 1

|  | LC-001 | LC-002 | LC-003 | LC-004 | LC-005 |
|---|---|---|---|---|---|
| 3-Cy—Cy-2 | 18 | 18 | 18 | 22 | 20 |
| 3-Cy—Cy-4 | 8 | 8 | 8 | 10 | 8 |
| 3-Cy—Cy-5 |  |  |  |  | 4 |
| 3-Cy—Ph—O1 |  |  |  | 5 |  |
| 3-Ph—Ph-1 | 13 | 13 | 13 |  | 7 |
| 3-Ph—Ph—O1 |  |  |  |  | 3 |
| 3-Cy—Cy—Ph-1 |  |  |  | 9 |  |
| 3-Cy—Ph—Ph-2 | 6 | 6 | 6 |  | 3 |
| 5-Cy—Ph—Ph-2 | 4 | 4 | 4 |  |  |
| 3-Cy—1O—Ph5—O1 | 6 | 6 |  |  | 7 |
| 3-Cy—1O—Ph5—O2 | 7 | 7 | 7 |  | 9 |
| 2-Cy—Cy—1O—Ph5—O2 | 14 | 14 | 14 |  | 12 |
| 3-Cy—Cy—1O—Ph5—O2 | 3 | 3 |  |  | 10 |
| 3-Cy—Ph—Ph5—O3 | 6 | 6 | 6 | 10 | 4 |
| 3-Cy—Ph—Ph5—O2 |  |  |  | 10 | 4 |
| 3-Cy—Ph—Ph5—O4 | 7 | 7 | 7 |  |  |
| 4-Cy—Ph—Ph5—O3 | 8 |  | 8 |  |  |
| 2-Ph-2-Ph—Ph5—O2 |  | 4 |  |  |  |
| 3-Ph-2-Ph—Ph5—O2 |  | 4 |  |  |  |
| 3-Ph—Ph5—O2 |  |  | 6 | 8 |  |
| 5-Ph—Ph5—O2 |  |  |  | 9 |  |
| 3-Cy—Cy—Ph5—O3 |  |  |  | 8 |  |
| 4-Cy—Cy—Ph5—O2 |  |  |  | 6 |  |
| 3-Ph—Ph5—Ph-1 |  |  |  | 4 |  |
| 3-Ph—Ph5—Ph-2 |  |  | 3 | 8 |  |
| Total | 100 | 100 | 100 | 100 | 100 |
| Tni [° C.] | 73.8 | 69.4 | 72.3 | 76.3 | 75.1 |
| Δn | 0.111 | 0.112 | 0.119 | 0.121 | 0.93 |
| γ1 [mPa · s] | 125 | 114 | 115 | 121 | 114 |
| Δε | -3.2 | -3.2 | -2.9 | -3.0 | -3.2 |
| K33 [pN] | 12.5 | 12.2 | 12.3 | 12.0 | 13.8 |
| γ1/K33 | 10.0 | 9.3 | 9.3 | 10.1 | 8.3 |

TABLE 2

|  | LC-006 | LC-007 | LC-008 | LC-009 |
|---|---|---|---|---|
| 3-Cy—Cy-2 | 20 |  |  |  |
| 3-Cy—Cy-4 | 7 |  |  |  |
| 3-Cy—Cy—V | 10 | 24 | 23 | 21 |
| 2-Cy—Cy—V1 |  |  |  | 6 |
| 3-Cy—Cy—V1 |  | 9 | 10 | 6 |
| 3-Ph—Ph-1 | 5 | 9 | 9 | 3 |
| 3-Cy—Ph—Ph-2 | 10 | 5 | 5 | 3 |
| 3-Cy—1O—Ph5—O2 | 6 | 5 | 5 |  |
| 1V—Cy—1O—Ph5—O2 | 5 | 6 | 6 |  |
| 2-Cy—Cy—1O—Ph5—O2 | 17 | 12 |  |  |
| 3-Cy—Cy—1O—Ph5—O2 | 5 | 10 | 12 |  |
| V—Cy—Cy—1O—Ph5—O2 | 5 | 4 | 4 |  |
| 1V—Cy—Cy—1O—Ph5—O2 |  | 6 | 6 |  |
| 3-Cy—Ph—Ph5—O2 |  |  | 5 |  |
| 3-Cy—Ph—Ph5—O4 |  |  |  | 6 |
| 2-Ph-2-Ph—Ph5—O2 | 5 | 5 | 5 |  |
| 3-Ph-2-Ph—Ph5—O2 | 5 | 5 |  |  |
| 3-Cy—Ph5—O2 |  |  |  | 8 |
| 3-Ph—Ph5—O2 |  |  | 5 | 8 |
| 2-Cy—Cy—Ph5—O2 |  |  |  | 15 |
| 2-Cy—Cy—Ph5—O3 |  |  |  | 15 |
| 3-Ph—Ph5—Ph-2 |  |  | 5 | 9 |
| Total | 100 | 100 | 100 | 100 |
| Tni [° C.] | 75.5 | 76.9 | 72.8 | 74.8 |
| Δn | 0.100 | 0.105 | 0.114 | 0.107 |
| γ1 [mPa · s] | 112 | 118 | 104 | 104 |
| Δε | -2.9 | -3.8 | -3.3 | -2.9 |
| K33 [pN] | 13.0 | 15.5 | 15.6 | 12.0 |
| γ1/K33 | 8.6 | 7.6 | 6.7 | 8.7 |

Comparative Examples 1 to 5

Comparative Example 1 was a liquid crystal composition containing a polymerizable compound containing 99.7 parts by mass of the liquid crystal composition LC-001 and 0.3 parts by mass of the compound represented by the formula (RM-R1).

Comparative Example 2 was a liquid crystal composition containing a polymerizable compound containing 99.7 parts by mass of the liquid crystal composition LC-002 and 0.3 parts by mass of the compound represented by the formula (RM-R1).

Comparative Example 3 was a liquid crystal composition containing a polymerizable compound containing 99.7 parts by mass of the liquid crystal composition LC-003 and 0.3 parts by mass of the compound represented by the formula (RM-R1).

Comparative Example 4 was a liquid crystal composition containing a polymerizable compound containing 99.7 parts by mass of the liquid crystal composition LC-007 and 0.3 parts by mass of the compound represented by the formula (RM-R1).

Comparative Example 5 was a liquid crystal composition containing a polymerizable compound containing 99.7 parts by mass of the liquid crystal composition LC-001 and 0.3 parts by mass of the compound represented by the formula (RM-R2).

Table 3 lists the amount of residual polymerizable compound after ultraviolet irradiation and the amount of change in pretilt angle in Comparative Examples 1 to 5.

TABLE 3

| Liquid crystal composition | Comparative example 1 LC-001 | Comparative example 2 LC-002 | Comparative example 3 LC-003 | Comparative example 4 LC-007 | Comparative example 5 LC-001 |
|---|---|---|---|---|---|
| Liquid crystal composition (parts by mass) | 99.7 | 99.7 | 99.7 | 99.7 | 99.7 |
| RM-R1 (parts by mass) | 0.3 | 0.3 | 0.3 | 0.3 |  |
| RM-R2 (parts by mass) |  |  |  |  | 0.3 |

TABLE 3-continued

| Liquid crystal composition | Comparative example 1 LC-001 | Comparative example 2 LC-002 | Comparative example 3 LC-003 | Comparative example 4 LC-007 | Comparative example 5 LC-001 |
|---|---|---|---|---|---|
| Amount of residual polymerizable compound [ppm] (irradiation conditions 1) | 2100 | 1930 | 1803 | 2205 | 250 |
| Amount of residual polymerizable compound [ppm] (irradiation conditions 1 and 2) | 215 | 195 | 120 | 405 | below minimum limit of detection |
| Change in pretilt angle [degrees] | 0.1 | 0.1 | 0.1 | 0.3 | 1.0 |

[Chem. 184]

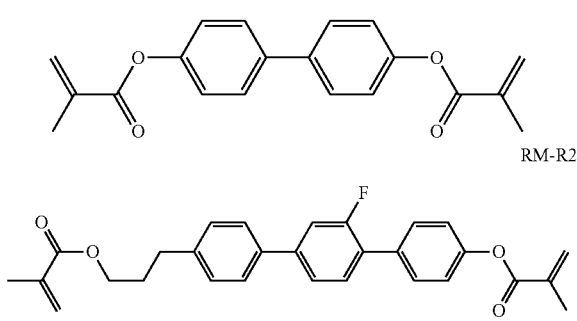

RM-R1

RM-R2

The amount of residual polymerizable compound in Comparative Example 1 was 2100 [ppm] after ultraviolet irradiation under the irradiation conditions 1 or 215 [ppm] after ultraviolet irradiation under the irradiation conditions 1 and the irradiation conditions 2. The amount of change in pretilt angle in Comparative Example 1 was 0.1 [degrees]. These results show that Comparative Example 1 had a small amount of change in pretilt angle but had a large amount of residual polymerizable compound.

As in Comparative Example 1, Comparative Examples 2 to 4 also had a small amount of change in pretilt angle but had a large amount of residual polymerizable compound.

The amount of residual polymerizable compound in Comparative Example 5 was 250 [ppm] after ultraviolet irradiation under the irradiation conditions 1 or below the minimum limit of detection after ultraviolet irradiation under the irradiation conditions 1 and the irradiation conditions 2. The amount of change in pretilt angle in Comparative Example 5 was 1.0 [degree]. These results show that Comparative Example 5 had an amount of residual polymerizable compound below the minimum limit of detection but had a large change in pretilt angle.

Examples 1 to 10

Example 1 was a liquid crystal composition containing a polymerizable compound containing 99.7 parts by mass of the liquid crystal composition LC-001 and 0.3 parts by mass of the compound represented by the formula (RM-1).

Example 2 was a liquid crystal composition containing a polymerizable compound containing 99.7 parts by mass of the liquid crystal composition LC-002 and 0.3 parts by mass of the compound represented by the formula (RM-1).

Example 3 was a liquid crystal composition containing a polymerizable compound containing 99.7 parts by mass of the liquid crystal composition LC-003 and 0.3 parts by mass of the compound represented by the formula (RM-1).

Example 4 was a liquid crystal composition containing a polymerizable compound containing 99.7 parts by mass of the liquid crystal composition LC-004 and 0.3 parts by mass of the compound represented by the formula (RM-1).

Example 5 was a liquid crystal composition containing a polymerizable compound containing 99.6 parts by mass of the liquid crystal composition LC-005 and 0.4 parts by mass of the compound represented by the formula (RM-1).

Example 6 was a liquid crystal composition containing a polymerizable compound containing 99.7 parts by mass of the liquid crystal composition LC-006 and 0.3 parts by mass of the compound represented by the formula (RM-1).

Example 7 was a liquid crystal composition containing a polymerizable compound containing 99.7 parts by mass of the liquid crystal composition LC-007 and 0.3 parts by mass of the compound represented by the formula (RM-1).

Example 8 was a liquid crystal composition containing a polymerizable compound containing 99.7 parts by mass of the liquid crystal composition LC-008 and 0.3 parts by mass of the compound represented by the formula (RM-1).

Example 9 was a liquid crystal composition containing a polymerizable compound containing 99.7 parts by mass of the liquid crystal composition LC-009 and 0.3 parts by mass of the compound represented by the formula (RM-1).

Example 10 was a liquid crystal composition containing a polymerizable compound containing 99.7 parts by mass of the liquid crystal composition LC-001 and 0.3 parts by mass of the compound represented by the formula (RM-2).

[Chem. 185]

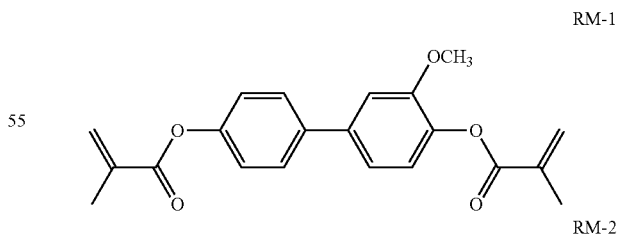

RM-1

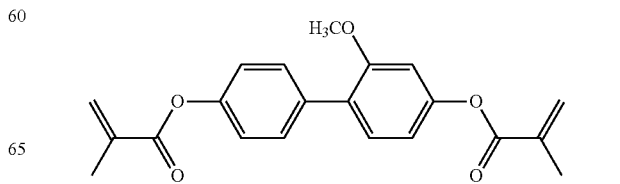

RM-2

Tables 4 and 5 list the amount of residual polymerizable compound after ultraviolet irradiation and the amount of change in pretilt angle in Examples 1 to 10.

TABLE 4

| Liquid crystal composition | Example 1 LC-001 | Example 2 LC-002 | Example 3 LC-003 | Example 4 LC-004 | Example 5 LC-005 |
|---|---|---|---|---|---|
| Liquid crystal composition (parts by mass) | 99.7 | 99.7 | 99.7 | 99.7 | 99.6 |
| RM-1 (parts by mass) | 0.3 | 0.3 | 0.3 | 0.3 | 0.4 |
| Amount of residual polymerizable compound [ppm] (irradiation conditions 1) | 1011 | 850 | 762 | 247 | 1206 |
| Amount of residual polymerizable compound [ppm] (irradiation conditions 1 and 2) | below minimum limit of detection | below minimum limit of detection | below minimum limit of detection | below minimum limit of detection | below minimum limit of detection |
| Change in pretilt angle [degrees] | 0.2 | 0.1 | 0.2 | 0.3 | 0.1 |

TABLE 5

| Liquid crystal composition | Example 6 LC-006 | Example 7 LC-007 | Example 8 LC-008 | Example 9 LC-009 | Example 10 LC-001 |
|---|---|---|---|---|---|
| Liquid crystal composition (parts by mass) | 99.7 | 99.7 | 99.7 | 99.7 | 99.7 |
| RM-1 (parts by mass) | 0.3 | 0.3 | 0.3 | 0.3 | |
| RM-2 (parts by mass) | | | | | 0.3 |
| Amount of residual polymerizable compound [ppm] (irradiation conditions 1) | 1105 | 1250 | 1050 | 442 | 487 |
| Amount of residual polymerizable compound [ppm] (irradiation conditions 1 and 2) | below minimum limit of detection | below minimum limit of detection | below minimum limit of detection | below minimum limit of detection | below minimum limit of detection |
| Change in pretilt angle [degrees] | 0.2 | 0.3 | 0.3 | 0.4 | 0.2 |

The amount of residual polymerizable compound in Example 1 was 1011 [ppm] after ultraviolet irradiation under the irradiation conditions 1 or below the minimum limit of detection after ultraviolet irradiation under the irradiation conditions 1 and the irradiation conditions 2. The amount of change in pretilt angle in Example 1 was 0.2 [degrees]. These results show that Example 1 had an amount of residual polymerizable compound after ultraviolet irradiation below the minimum limit of detection and a small amount of change in pretilt angle.

As in Example 1, Examples 2 to 10 also had an amount of residual polymerizable compound after ultraviolet irradiation (the irradiation conditions 1 and the irradiation conditions 2) below the minimum limit of detection and a small amount of change in pretilt angle.

Thus, Examples 1 to 10 had an amount of residual polymerizable compound below the minimum limit of detection and a small amount of change in pretilt angle.

A comparison between Examples 1 to 10 and Comparative Examples 1 to 4 shows that Examples 1 to 10 had an amount of residual polymerizable compound below the minimum limit of detection, but Comparative Examples 1 to 4 had a certain amount of residual polymerizable compound even after ultraviolet irradiation under the irradiation conditions 1 and the irradiation conditions 2.

A comparison between Examples 1 to 10 and Comparative Example 5 shows that although all of these had an amount of residual polymerizable compound below the minimum limit of detection, Comparative Example 5 had a larger amount of change in pretilt angle than Examples 1 to 10.

The liquid crystal composition containing the polymerizable compound in Examples 1 to 10 maintained the nematic liquid crystal phase without precipitation of the polymerizable compound even after storage at −20° C. for 240 hours.

PSVA liquid crystal display devices having these liquid crystal compositions had an adequate pretilt angle and sufficient high-speed response. The response speed was measured at Von of 6 V and Voff of 1 V and at a temperature of 25° C. with a measuring instrument DMS703 manufactured by AUTRONIC-MELCHERS.

Examples 11 and 12

Example 11 was a liquid crystal composition containing a polymerizable compound containing 99.7 parts by mass of the liquid crystal composition LC-001, 0.15 parts by mass of the compound represented by the formula (RM-R3), and 0.15 parts by mass of the compound represented by the formula (RM-1).

Example 12 was a liquid crystal composition containing a polymerizable compound containing 99.7 parts by mass of the liquid crystal composition LC-001, 0.15 parts by mass of the compound represented by the formula (RM-R4), and 0.15 parts by mass of the compound represented by the formula (RM-1).

[Chem. 186]

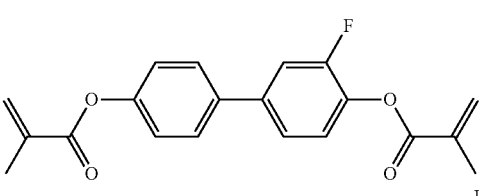

RM-R3

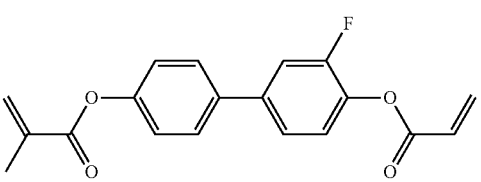

RM-R4

Table 6 lists the amount of residual polymerizable compound after ultraviolet irradiation and the amount of change in pretilt angle in Examples 11 and 12.

TABLE 6

| Liquid crystal composition | Example 11 LC-001 | Example 12 LC-001 |
|---|---|---|
| Liquid crystal composition (parts by mass) | 99.7 | 99.7 |
| RM-R3 (parts by mass) | 0.15 | |
| RM-R4 (parts by mass) | | 0.15 |
| RM-1 (parts by mass) | 0.15 | 0.15 |
| Amount of residual polymerizable compound [ppm] (irradiation conditions 1) | 1188 | 1050 |
| Amount of residual polymerizable compound [ppm] (irradiation conditions 1 and 2) | below minimum limit of detection | below minimum limit of detection |
| Change in pretilt angle [degrees] | 0.1 | 0.1 |

The amount of residual polymerizable compound after ultraviolet irradiation under the irradiation conditions 1 and the irradiation conditions 2 in Examples 11 and 12 was below the minimum limit of detection.

The amount of change in pretilt angle in Examples 11 and 12 was 0.1 [degrees], which was smaller than that in Example 1, which was the liquid crystal composition containing the polymerizable compound containing 99.7 parts by mass of the liquid crystal composition LC-001 and 0.3 parts by mass of the compound represented by the formula (RM-1).

Thus, a combination of polymerizable compounds decreased the amount of change in pretilt angle to nearly 0 [degrees].

The liquid crystal composition containing the polymerizable compound in Examples 11 and 12 maintained the nematic liquid crystal phase without precipitation of the polymerizable compound even after storage at −20° C. for 240 hours.

PSVA liquid crystal display devices having these liquid crystal compositions had an adequate pretilt angle and sufficient high-speed response. The response speed was measured at Von of 6 V and Voff of 1 V and at a temperature of 25° C. with a measuring instrument DMS703 manufactured by AUTRONIC-MELCHERS.

Comparative Example 6 and Example 13

A liquid crystal cell into which the liquid crystal composition containing the polymerizable compound was injected as described above was prepared and was irradiated with ultraviolet light under the irradiation conditions 1. The pretilt angle provided by this process was measured with OPTIPRO manufactured by Shintech Inc. The pretilt angle was also measured when the integrated amount of light under the irradiation conditions 1 was 15 or 60 J/cm$^2$.

Comparative Example 6 was a liquid crystal composition containing a polymerizable compound containing 99.7 parts by mass of the liquid crystal composition LC-001 and 0.3 parts by mass of the compound represented by the formula (RM-R1).

Example 13 was a liquid crystal composition containing a polymerizable compound containing 99.7 parts by mass of the liquid crystal composition LC-001 and 0.3 parts by mass of the compound represented by the formula (RM-1).

Table 7 lists the pretilt angle after ultraviolet irradiation in Comparative Example 6 and Example 13.

TABLE 7

| Liquid crystal composition | Comparative example 6 LC-001 | Comparative example 13 LC-001 |
|---|---|---|
| Liquid crystal composition (parts by mass) | 99.7 | 99.7 |
| RM-R1 (parts by mass) | 0.3 | |
| RM-1 (parts by mass) | | 0.3 |
| Pretilt angle after irradiation at 15 J/cm$^2$ [degrees] | 88 | 86 |
| Pretilt angle after irradiation at 30 J/cm$^2$ [degrees] | 86 | 84 |
| Pretilt angle after irradiation at 60 J/cm$^2$ [degrees] | 85 | 83 |

For ultraviolet irradiation at 15 J/cm$^2$, Comparative Example 6 had a pretilt angle of 88 [degrees], and Example 13 had a pretilt angle of 86 [degrees].

For ultraviolet irradiation at 30 J/cm$^2$, Comparative Example 6 had a pretilt angle of 86 [degrees], and Example 13 had a pretilt angle of 84 [degrees].

For ultraviolet irradiation at 60 J/cm$^2$, Comparative Example 6 had a pretilt angle of 85 [degrees], and Example 13 had a pretilt angle of 83 [degrees].

Ultraviolet irradiance required for a pretilt angle of 86 [degrees] was 30 J/cm$^2$ in Comparative Example 6 and 15 J/cm$^2$ in Example 13.

Example 13, which was a liquid crystal composition containing a polymerizable compound according to the present invention, can form a pretilt angle at a lower ultraviolet irradiance than Comparative Example 6.

Comparative Example 7 and Examples 14 to 19

The following liquid crystal compositions LC-010 to LC-015 were prepared, and some physical properties of the liquid crystal compositions were measured. Tables 8 and 9 list the components and physical properties of the liquid crystal composition.

TABLE 8

| | LC-010 | LC-011 | LC-012 |
|---|---|---|---|
| 3-Cy—Cy—V | 50 | 34 | 22 |
| 3-Cy—Cy—V1 | 4 | 5 | 8 |
| 5-Cy—Cy—V | | | 8 |
| 3-Cy—Cy—Ph-1 | 6 | 9.5 | |
| V—Cy—Cy—Ph-1 | | | 10 |
| 1-Ph—Ph1—Ph—2V | 4 | | 4 |
| 2-Ph—Ph1—Ph—2V | 6 | 3 | |
| 3-Ph—Ph1—Ph—2V | 8 | | |
| 3-Ph—Ph2—CF2O—Ph2—F | 10 | 18.5 | 18 |
| 3-Ph—Ph1—Ph2—CF2O—Ph2—F | 6 | 4 | 4 |
| 4-Ph—Ph1—Ph2—CF2O—Ph2—F | | 8 | 8 |
| 5-Ph—Ph1—Ph2—CF2O—Ph2—F | | 5 | 5 |

TABLE 8-continued

|  | LC-010 | LC-011 | LC-012 |
|---|---|---|---|
| 2-Py—Ph—Ph2—CF2O—Ph2—F |  | 5 | 5 |
| 3-Py—Ph—Ph2—CF2O—Ph2—F | 6 | 8 | 8 |
| Total | 100 | 100 | 100 |
| Tni [° C.] | 73.9 | 78.4 | 82 |
| Δn | 0.112 | 0.108 | 0.111 |
| Δε | 4.83 | 11.5 | 11.4 |
| γ1 [mPa · s] | 45 | 65 | 70 |

TABLE 9

|  | LC-013 | LC-014 | LC-015 |
|---|---|---|---|
| 3-Cy—Cy—V | 32 | 44 | 10 |
| 5-Cy—Cy—V |  | 4 |  |
| 3-Cy—Cy—Ph-1 |  | 3 | 5 |
| V—Cy—Cy—Ph-1 | 6 | 15 | 6 |
| V2—Cy—Cy—Ph-1 | 4 |  | 4 |
| 5-Ph—Ph-1 | 8 |  |  |
| 3-Cy—Ph—Ph-2 | 5 |  |  |
| V—Cy—Ph—Ph-3 | 4 |  | 4 |
| 3-Cy—Cy—OCO—Ph—Cy-3 |  | 3 |  |
| 3-Cy—Cy—Ph2—F |  |  | 6 |
| 3-Cy—Ph—Ph2—F |  |  | 8 |
| 2-Ph—Ph1—Ph2—O1—V |  |  | 6 |
| 3-Ph—Ph1—Ph2—O1—V | 16 | 6 | 8 |
| 5-Ph—Ph1—Ph2—O1—V |  |  | 6 |
| 2-Ph—Ph1—Np-3 | 4 |  |  |
| 2-Cy—Ph—Ph2—O1—Ph2—F |  | 3 |  |
| 3-Cy—Ph—Ph2—O1—Ph2—F |  | 5 |  |
| 3-Ph2—O1—Oc—Ph—Ph2—F |  | 4 |  |
| 4-Ph2—O1—Oc—Ph—Ph2—F | 3 | 4 |  |
| 5-Ph2—O1—Oc—Ph—Ph2—F | 3 |  |  |
| 3-Ph2—O1—Ph—Np2—F | 5 |  |  |
| 3-Ph2—O1—Oc—Ph1—Ph2—F | 6 | 5 |  |
| 5-Ph2—O1—Oc—Ph1—Ph2—F | 4 | 4 |  |
| 3-Ph—Ph2—CF2O—Ph2—F |  |  | 15 |
| 3-Cy—Cy—CF2O—Ph2—F |  |  | 8 |
| 3-Ph—Ph1—Ph2—CF2O—Np2—F |  |  | 4 |
| 3-Ph—Ph1—Ph2—CF2O—Np2—F |  |  | 4 |
| 3-Py—Ph—Ph2—CF2O—Ph2—F |  |  | 6 |
| Total | 100 | 100 | 100 |
| Tni [° C.] | 81.2 | 92.3 | 86.7 |
| Δn | 0.133 | 0.096 | 0.144 |
| Δε | 7.2 | 6.7 | 11.9 |
| γ1 [mPa · s] | 66 | 61 | 114 |

Comparative Example 7 was a liquid crystal composition containing a polymerizable compound containing 99.7 parts by mass of the liquid crystal composition LC-010 and 0.3 parts by mass of the compound represented by the formula (RM-R1).

Example 14 was a liquid crystal composition containing a polymerizable compound containing 99.7 parts by mass of the liquid crystal composition LC-010 and 0.3 parts by mass of the compound represented by the formula (RM-1).

Example 15 was a liquid crystal composition containing a polymerizable compound containing 99.7 parts by mass of the liquid crystal composition LC-011 and 0.3 parts by mass of the compound represented by the formula (RM-1).

Example 16 was a liquid crystal composition containing a polymerizable compound containing 99.7 parts by mass of the liquid crystal composition LC-012 and 0.3 parts by mass of the compound represented by the formula (RM-1).

Example 17 was a liquid crystal composition containing a polymerizable compound containing 99.7 parts by mass of the liquid crystal composition LC-013 and 0.3 parts by mass of the compound represented by the formula (RM-1).

Example 18 was a liquid crystal composition containing a polymerizable compound containing 99.7 parts by mass of the liquid crystal composition LC-014 and 0.3 parts by mass of the compound represented by the formula (RM-1).

Example 19 was a liquid crystal composition containing a polymerizable compound containing 99.7 parts by mass of the liquid crystal composition LC-015 and 0.3 parts by mass of the compound represented by the formula (RM-1).

A liquid crystal composition containing a polymerizable compound was injected into an FFS-mode liquid crystal cell with a cell gap of 3.0 μm by a vacuum injection method. The liquid crystal cell was then irradiated with ultraviolet light from a high-pressure mercury lamp through a filter that can eliminate ultraviolet light of 325 nm or less. More specifically, the liquid crystal cell was irradiated with ultraviolet light at an illuminance of 100 mW/cm$^2$ measured at a center wavelength of 365 nm, and the integrated amount of light was 30 J/cm$^2$. The liquid crystal cell was then irradiated with ultraviolet light emitted from a fluorescent UV lamp at an illuminance of 3 mW/cm$^2$ measured at a center wavelength of 313 nm. The integrated amount of light was 10 J/cm$^2$.

The amount of change in pretilt angle and the amount of residual polymerizable compound in Examples 14 to 19 were measured in the same manner as in Examples 1 to 12. The results show that the amount of residual polymerizable compound was much smaller than Comparative Example 7, and the amount of change in pretilt angle was also smaller than Comparative Example 7.

Examples 20 to 27

Example 20 was a liquid crystal composition containing a polymerizable compound containing 99.7 parts by mass of the liquid crystal composition LC-002 and 0.3 parts by mass of the compound represented by the formula (RM-2).

Example 21 was a liquid crystal composition containing a polymerizable compound containing 99.7 parts by mass of the liquid crystal composition LC-003 and 0.3 parts by mass of the compound represented by the formula (RM-2).

Example 22 was a liquid crystal composition containing a polymerizable compound containing 99.7 parts by mass of the liquid crystal composition LC-004 and 0.3 parts by mass of the compound represented by the formula (RM-2).

Example 23 was a liquid crystal composition containing a polymerizable compound containing 99.6 parts by mass of the liquid crystal composition LC-005 and 0.4 parts by mass of the compound represented by the formula (RM-2).

Example 24 was a liquid crystal composition containing a polymerizable compound containing 99.7 parts by mass of the liquid crystal composition LC-006 and 0.3 parts by mass of the compound represented by the formula (RM-2).

Example 25 was a liquid crystal composition containing a polymerizable compound containing 99.7 parts by mass of the liquid crystal composition LC-007 and 0.3 parts by mass of the compound represented by the formula (RM-2).

Example 26 was a liquid crystal composition containing a polymerizable compound containing 99.7 parts by mass of the liquid crystal composition LC-008 and 0.3 parts by mass of the compound represented by the formula (RM-2).

Example 27 was a liquid crystal composition containing a polymerizable compound containing 99.7 parts by mass of the liquid crystal composition LC-009 and 0.3 parts by mass of the compound represented by the formula (RM-2).

Tables 10 and 11 list the amount of residual polymerizable compound after ultraviolet irradiation and the amount of change in pretilt angle in Examples 20 to 27.

TABLE 10

| Liquid crystal composition | Example 20 LC-002 | Example 21 LC-003 | Example 22 LC-004 | Example 23 LC-005 |
|---|---|---|---|---|
| Liquid crystal composition (parts by mass) | 99.7 | 99.7 | 99.7 | 99.6 |
| RM-2 (parts by mass) | 0.3 | 0.3 | 0.3 | 0.4 |
| Amount of residual polymerizable compound [ppm] (irradiation conditions 1) | 476 | 352 | 121 | 736 |
| Amount of residual polymerizable compound [ppm] (irradiation conditions 1 and 2) | below minimum limit of detection | below minimum limit of detection | below minimum limit of detection | below minimum limit of detection |
| Change in pretilt angle [degrees] | 0.2 | 0.1 | 0.3 | 0.1 |

TABLE 11

| Liquid crystal composition | Example 24 LC-006 | Example 25 LC-007 | Example 26 LC-008 | Example 27 LC-009 |
|---|---|---|---|---|
| Liquid crystal composition (parts by mass) | 99.7 | 99.7 | 99.7 | 99.7 |
| RM-2 (parts by mass) | 0.3 | 0.3 | 0.3 | 0.3 |
| Amount of residual polymerizable compound [ppm] (irradiation conditions 1) | 369 | 507 | 561 | 104 |
| Amount of residual polymerizable compound [ppm] (irradiation conditions 1 and 2) | below minimum limit of detection | below minimum limit of detection | below minimum limit of detection | below minimum limit of detection |
| Change in pretilt angle [degrees] | 0.3 | 0.4 | 0.3 | 0.4 |

The amount of change in pretilt angle and the amount of residual polymerizable compound in Examples 20 to 27 were measured in the same manner as in Examples 1 to 19. The results show that the amount of residual polymerizable compound was sufficiently small, and the amount of change in pretilt angle was also small.

The invention claimed is:

1. A liquid crystal composition comprising:
   at least one polymerizable compound represented by a general formula (I), and
   at least one polymerizable compound selected from a compound group represented by a general formula (II):

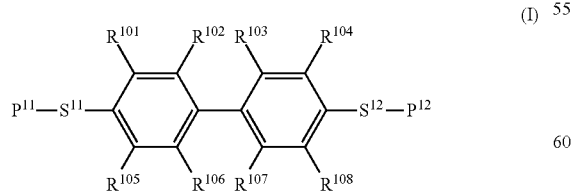

(I)

wherein $R^{101}$, $R^{102}$, $R^{105}$, $R^{106}$, $R^{107}$, and $R^{108}$ represent a hydrogen atom,
$R^{103}$ and $R^{104}$ independently represent an alkoxy group having 1 to 6 carbon atoms optionally substituted with a fluorine atom, a fluorine atom, or a hydrogen atom, and at least one of $R^{103}$ and $R^{104}$ represents an alkoxy group having 1 to 6 carbon atoms,
$P^{11}$, and $P^{12}$ independently represent a group selected from formula (R-1),

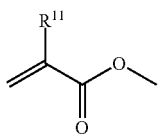

(R-1)

wherein $R^{11}$ represents methyl group or a hydrogen atom, $S^{11}$, and $S^{12}$ independently represent a single bond

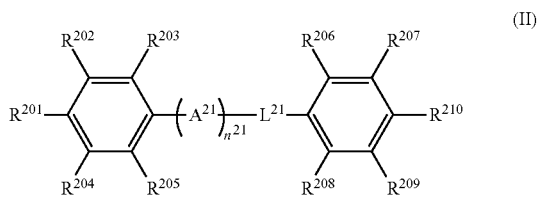

(II)

wherein $R^{201}$, and $R^{210}$ independently represent $P^{21}$-$S^{21}$-, $R^{202}$, $R^{203}$, $R^{204}$, $R^{205}$, $R^{208}$, and $R^{209}$ represent a hydrogen atom, one of $R^{206}$ and $R^{207}$ represents a fluorine atom, and the other of $R^{206}$ and $R^{207}$ represents a hydrogen atom, $P^{21}$ is independently represented by the formula (R-1), $S^{21}$ represents a single bond, $n^{21}$ is 0, $A^{21}$ represents a group selected from the group consisting of
(a) a 1,4-cyclohexylene group in which one —$CH_2$— or two or more nonadjacent —$CH_2$—'s are optionally substituted with —O—,
(b) a 1,4-phenylene group in which one —CH= or two or more nonadjacent —CH='s are optionally substituted with —N=, and
(c) a naphthalene-2,6-diyl group, a 1,2,3,4-tetrahydronaphthalene-2,6-diyl group, or a decahydronaphthalene-2,6-diyl group wherein one —CH= or two or more nonadjacent —CH='s in the naphthalene-2,6-diyl group or in the 1,2,3,4-tetrahydronaphthalene-2,6-diyl group are optionally substituted with —N=, the groups (a), (b), and (c) are independently optionally substituted with an alkyl group having 1 to 12 carbon atoms, an alkoxy group having 1 to 12 carbon atoms, a halogen, a cyano group, a nitro group, or $P^{21}$-$S^{21}$-, $L^{21}$ represents a single bond.

2. The liquid crystal composition according to claim 1, comprising at least one compound selected from compounds represented by general formulae (N-1), (N-2), and (N-3):

(N-1)

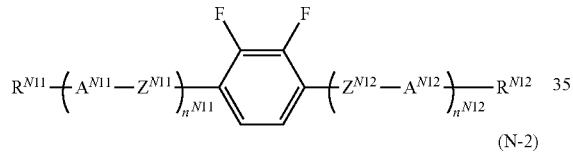

(N-2)

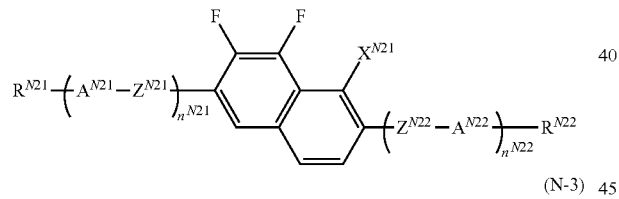

(N-3)

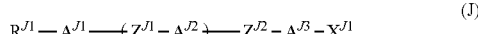

wherein $R^{N11}$, $R^{N12}$, $R^{N21}$, $R^{N22}$, $R^{N31}$, and $R^{N32}$ independently represent an alkyl group having 1 to 8 carbon atoms, and one —$CH_2$— or two or more nonadjacent —$CH_2$—'s in the alkyl group are independently optionally substituted with —CH=CH—, —C≡C—, —O—, —CO—, —COO—, or —OCO—, $A^{N11}$, $A^{N12}$, $A^{N21}$, $A^{N22}$, $A^{N31}$, and $A^{N32}$ independently represent a group selected from the group consisting of
(a) a 1,4-cyclohexylene group in which one —$CH_2$— or two or more nonadjacent —$CH_2$—'s are optionally substituted with —O—,
(b) a 1,4-phenylene group in which one —CH= or two or more nonadjacent —CH='s are optionally substituted with —N=,
(c) a naphthalene-2,6-diyl group, a 1,2,3,4-tetrahydronaphthalene-2,6-diyl group, or a decahydronaphthalene-2,6-diyl group wherein one —CH= or two or more nonadjacent —CH='s in the naphthalene-2,6-diyl group or in the 1,2,3,4-tetrahydronaphthalene-2,6-diyl group are optionally substituted with —N=, and
(d) a 1,4-cyclohexenylene group, the groups (a), (b), (c), and (d) are independently optionally substituted with a cyano group, a fluorine atom, or a chlorine atom, $Z^{N11}$, $Z^{N12}$, $Z^{N21}$, $Z^{N22}$, $Z^{N31}$, and $Z^{N32}$ independently represent a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF—, or —C≡C—, $X^{N21}$ represents a hydrogen atom or a fluorine atom, $T^{N31}$ represents —$CH_2$— or an oxygen atom, and $n^{N11}$, $n^{N12}$, $n^{N21}$, $n^{N22}$, $n^{N31}$, and $n^{N32}$ independently represent an integer of 0 to 3, $n^{N11}+n^{N12}$, $n^{N21}+n^{N22}$, and $n^{N31}+n^{N32}$ are independently 1, 2, or 3, and pluralities of $A^{N11}$s to $A^{N32}$s and $Z^{N11}$s to $Z^{N32}$s, if present, may be the same or different $A^{N11}$s to $A^{N32}$s and $Z^{N11}$s to $Z^{N32}$s, respectively.

3. The liquid crystal composition according to claim 1, comprising at least one compound selected from compounds represented by a general formula (J):

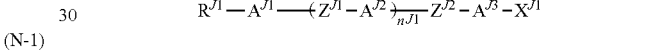

(J)

wherein $R^{J1}$ represents an alkyl group having 1 to 8 carbon atoms, and one —$CH_2$— or two or more nonadjacent —$CH_2$—'s in the alkyl group are independently optionally substituted with —CH=CH—, —C≡C—, —O—, —CO—, —COO—, or —OCO—, $n^{J1}$ is 0, 1, 2, 3, or 4, $A^{J1}$, $A^{J2}$, and $A^{J3}$ independently represent a group selected from the group consisting of
(a) a 1,4-cyclohexylene group in which one —$CH_2$— or two or more nonadjacent —$CH_2$—'s are optionally substituted with —O—,
(b) a 1,4-phenylene group in which one —CH= or two or more nonadjacent —CH='s are optionally substituted with —N=, and
(c) a naphthalene-2,6-diyl group, a 1,2,3,4-tetrahydronaphthalene-2,6-diyl group, or a decahydronaphthalene-2,6-diyl group wherein one —CH= or two or more nonadjacent —CH='s in the naphthalene-2,6-diyl group or in the 1,2,3,4-tetrahydronaphthalene-2,6-diyl group are optionally substituted with —N=, the groups (a), (b), and (c) are independently optionally substituted with a cyano group, a fluorine atom, a chlorine atom, a methyl group, a trifluoromethyl group, or a trifluoromethoxy group, $Z^{J1}$ and $Z^{J2}$ independently represent a single bond, —$CH_2CH_2$—, —$(CH_2)_4$—, —$OCH_2$—, —$CH_2O$—, —$OCF_2$—, —$CF_2O$—, —COO—, —OCO—, or —C≡C—, if $n^{J1}$ is 2, 3, or 4, a plurality of $A^{J2}$s may be the same or different, and if $n^{J1}$ is 2, 3, or 4, a plurality of $Z^{J1}$s may be the same or different, and $X^{J1}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group.

4. The liquid crystal composition according to claim 2, comprising at least one compound selected from compounds represented by a general formula (L):

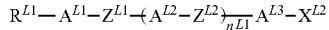

wherein $R^{L1}$ and $R^{L2}$ independently represent an alkyl group having 1 to 8 carbon atoms, and one —$CH_2$— or two or more nonadjacent —$CH_2$—'s in the alkyl group are independently optionally substituted with —CH=CH—, —C≡C—, —O—, —CO—, —COO—, or —OCO—, $n^{L1}$ is 0, 1, 2, or 3, $A^{L1}$, $A^{L2}$, and $A^{L3}$ independently represent a group selected from the group consisting of (a) a 1,4-cyclohexylene group in which one —$CH_2$— or two or more nonadjacent —$CH_2$—'s are optionally substituted with —O—, (b) a 1,4-phenylene group in which one —CH= or two or more nonadjacent —CH='s are optionally substituted with —N=, and (c) a naphthalene-2,6-diyl group, a 1,2,3,4-tetrahydronaphthalene-2,6-diyl group, or a decahydronaphthalene-2,6-diyl group wherein one —CH= or two or more nonadjacent —CH='s in the naphthalene-2,6-diyl group or in the 1,2,3,4-tetrahydronaphthalene-2,6-diyl group are optionally substituted with —N=, the groups (a), (b), and (c) are independently optionally substituted with a cyano group, a fluorine atom, or a chlorine atom, $Z^{L1}$ and $Z^{L2}$ independently represent a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF—, or —C≡C—, and if $n^{L1}$ is 2 or 3, a plurality of $A^{L2}$s may be the same or different, and if $n^{L1}$ is 2 or 3, a plurality of $Z^{L2}$s may be the same or different, provided that said at least one compound represented by the general formulae (N-1), (N-2), and (N-3) are excluded.

5. A liquid crystal display device using the liquid crystal composition according to claim 1.

6. An active-matrix driving liquid crystal display device using the liquid crystal composition according to claim 1.

7. A PSA mode, PSVA mode, PS-IPS mode, or PS-FSS mode liquid crystal display device using the liquid crystal composition according to claim 1.

8. The liquid crystal composition according to claim 1, wherein said at least one polymerizable compound represented by a general formula (I) is a compound represented by formula (RM-1) or (RM-2):

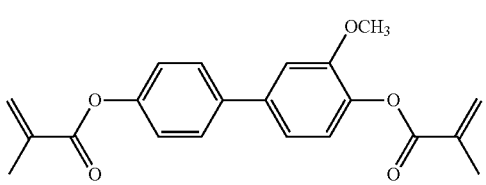

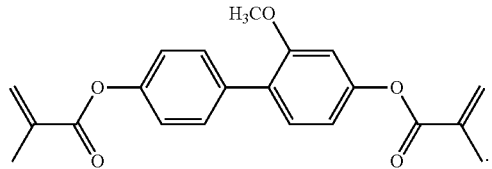

9. A PSVA mode liquid crystal display device comprising the liquid crystal composition according to claim 1, having a pretilt angle after irradiation of the liquid crystal composition at 15 J/cm² is 80 degree to 86 degree.

10. The liquid crystal composition according to claim 8, having a pretilt angle after irradiation of the liquid crystal composition at 15 J/cm² is 80 degree to 86 degree.

11. The liquid crystal composition according to claim 1, wherein the amount of a compound represented by a general formula (I) is 0.05 to 0.45% by mass.

12. The liquid crystal composition according to claim 11, wherein the amount of a compound represented by a general formula (I) is 0.15 to 0.40% by mass.

13. The liquid crystal composition according to claim 1, further comprising at least one selected from the group consisting of a compound represented by general formula (N-1-10) and a compound represented by general formula (N-1-11):

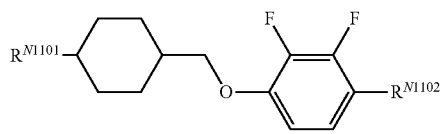

wherein each of $R^{N1101}$ and $R^{N1102}$ represents an alkyl group having 1 to 8 carbon atoms, and one —$CH_2$— or two or more nonadjacent —$CH_2$—'s in the alkyl group are independently optionally substituted with —CH=CH—, —C≡C—, —O—, —CO—, —COO—, or —OCO—,

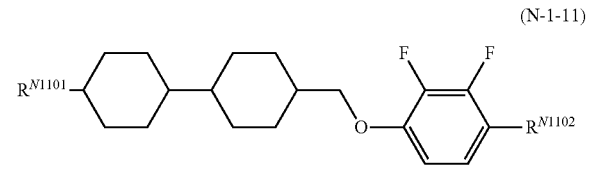

wherein each of $R^{N1111}$ and $R^{N1112}$ an alkyl group having 1 to 8 carbon atoms, and one —$CH_2$— or two or more nonadjacent —$CH_2$—'s in the alkyl group are independently optionally substituted with —CH=CH—, —C≡C—, —O—, —CO—, —COO—, or —OCO—.

14. The liquid crystal composition according to claim 1, wherein when a layer is formed from the liquid crystal composition under an irradiation condition 1 followed by an irradiation condition 2, an amount of residual polymerizable compound in the layer is below minimum limit of detection, wherein the irradiation condition 1 is to irradiate the liquid crystal composition with an ultraviolet light to eliminate ultraviolet light of 325 nm or less at an illuminance of 100 mW/cm² measured at a center wavelength of 365 nm to reach an integrated amount of light of 30 J/cm², while a voltage of 10 V is applied at a frequency of 100 Hz to a liquid crystal cell including the liquid crystal composition,
wherein the irradiation condition 2 is to irradiate the liquid crystal composition after subjecting to the irradiation condition 1 with an ultraviolet light at an illuminance of 3 mW/cm² measured at a center wavelength of 313 nm to reach an integrated amount of light of 10 J/cm².

15. The liquid crystal composition according to claim 1, wherein in the general formula (I), one of $R^{103}$ and $R^{104}$ represents an alkoxy group having 1 to 6 carbon atoms optionally substituted with a fluorine atom, a fluorine atom, and the other of $R^{103}$ and $R^{104}$ represents a hydrogen atom.

16. The liquid crystal composition according to claim 15, wherein said at least one polymerizable compound selected from a compound group represented by a general formula (II) is a compound represented by formula RM-R3 or RM-R4:

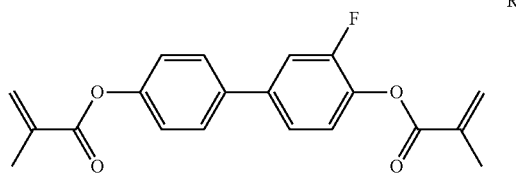

RM-R3

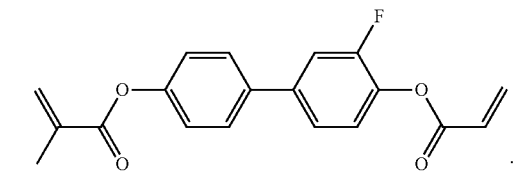

RM-R4

17. The liquid crystal composition according to claim 16, wherein said at least one polymerizable compound represented by a general formula (I) is a compound represented by formula (RM-1) or (RM-2):

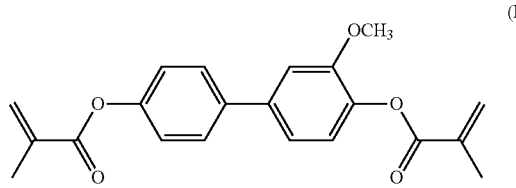

(RM-1)

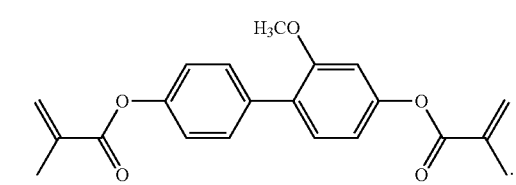

(RM-2)

18. The liquid crystal composition according to claim 14, wherein in the general formula (I), one of $R^{103}$ and $R^{104}$ represents an alkoxy group having 1 to 6 carbon atoms optionally substituted with a fluorine atom, a fluorine atom, and the other of $R^{103}$ and $R^{104}$ represents a hydrogen atom.

19. The liquid crystal composition according to claim 18, wherein said at least one polymerizable compound selected from a compound group represented by a general formula (II) is a compound represented by formula RM-R3 or RM-R4:

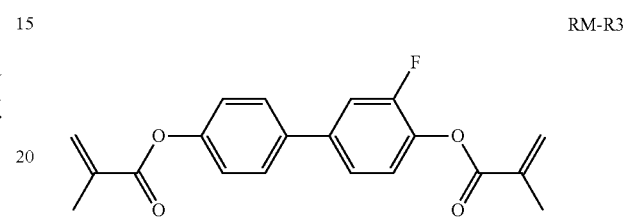

RM-R3

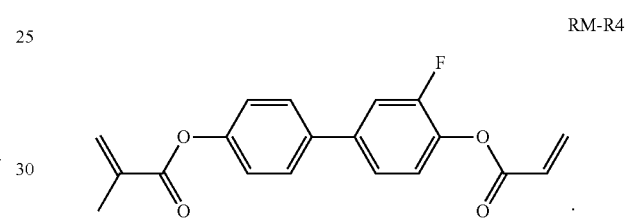

RM-R4

20. The liquid crystal composition according to claim 19, wherein said at least one polymerizable compound represented by a general formula (I) is a compound represented by formula (RM-1) or (RM-2):

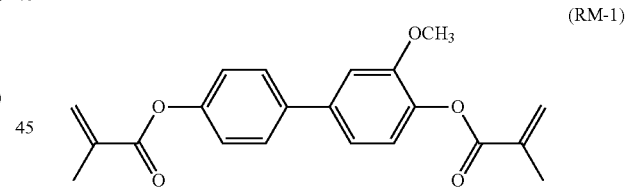

(RM-1)

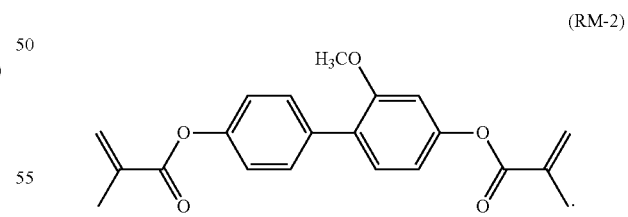

(RM-2)

* * * * *